US009489762B2

(12) United States Patent
Jenkins

(10) Patent No.: US 9,489,762 B2
(45) Date of Patent: Nov. 8, 2016

(54) DELIVERING AND CONTROLLING STREAMING INTERACTIVE MEDIA COMPRISING RENDERED GEOMETRIC, TEXTURE AND LIGHTING DATA

(75) Inventor: Barry Lynn Jenkins, Pottsville, PA (US)

(73) Assignee: PRIMAL SPACE SYSTEMS, INC., Raleigh, NC (US)

( * ) Notice: Subject to any disclaimer, the term of this patent is extended or adjusted under 35 U.S.C. 154(b) by 552 days.

(21) Appl. No.: 13/822,863

(22) PCT Filed: Sep. 13, 2011

(86) PCT No.: PCT/US2011/051403
§ 371 (c)(1),
(2), (4) Date: Apr. 29, 2013

(87) PCT Pub. No.: WO2012/037129
PCT Pub. Date: Mar. 22, 2012

(65) Prior Publication Data
US 2013/0215115 A1 Aug. 22, 2013

Related U.S. Application Data

(63) Continuation-in-part of application No. PCT/US2011/042309, filed on Jun. 29, 2011.

(60) Provisional application No. 61/360,283, filed on Jun. 30, 2010, provisional application No. 61/382,056,
(Continued)

(51) Int. Cl.
*G06T 15/00* (2011.01)
*G06T 15/20* (2011.01)
(Continued)

(52) U.S. Cl.
CPC ......... *G06T 15/00* (2013.01); *G06F 17/30271* (2013.01); *G06T 15/20* (2013.01); *G06T 19/003* (2013.01); *G06T 2200/16* (2013.01); *H04N 21/8146* (2013.01)

(58) Field of Classification Search
None
See application file for complete search history.

(56) References Cited

U.S. PATENT DOCUMENTS 5,914,721 A 6/1999 Lim
6,028,608 A 2/2000 Jenkins
(Continued)

FOREIGN PATENT DOCUMENTS

WO WO 2009/029559 A1 3/2009

OTHER PUBLICATIONS

Aila, Timo. "SuRender Umbra: A Visibility Determination Framework for Dynamic Environments." MS thesis Helsinki U of Technology, 2000. Print.
(Continued)

*Primary Examiner* — Said Broome
(74) *Attorney, Agent, or Firm* — Oblon, McClelland, Maier & Neustadt, L.L.P.

(57) ABSTRACT

In an exemplary embodiment, a method, conducted on a server, sends renderable graphics information to a client device, said graphics information including at least one set of graphics information visible from a second view region and not visible from a first view region. The method includes determining a likelihood that a viewpoint undergoes movement from said first view region to said second view region. The method further includes sending said at least one set of graphics information upon determination that the likelihood that the viewpoint undergoes movement from said first view region to said second view region is greater than a predetermined threshold, said movement determined according to a predetermined motion path.

18 Claims, 108 Drawing Sheets

Related U.S. Application Data filed on Sep. 13, 2010, provisional application No. 61/384,284, filed on Sep. 19, 2010, provisional application No. 61/452,330, filed on Mar. 14, 2011, provisional application No. 61/474,491, filed on Apr. 12, 2011, provisional application No. 61/476,819, filed on Apr. 19, 2011.

(51) Int. Cl.
  *G06T 19/00* (2011.01)
  *G06F 17/30* (2006.01)
  *H04N 21/81* (2011.01)

(56) References Cited

U.S. PATENT DOCUMENTS

| | | | |
|---|---|---|---|
| 6,057,847 | A | 5/2000 | Jenkins |
| 6,111,582 | A | 8/2000 | Jenkins |
| 6,167,142 | A * | 12/2000 | Nozaki ............... G06T 15/20 345/419 |
| 6,326,964 | B1 | 12/2001 | Snyder et al. |
| 6,782,130 | B2 | 8/2004 | Guo |
| 6,933,946 | B1 | 8/2005 | Silva et al. |
| 2003/0117402 | A1 | 6/2003 | Hubrecht et al. |
| 2004/0130552 | A1 | 7/2004 | Duluk, Jr. et al. |
| 2004/0174373 | A1 | 9/2004 | Stevens et al. |
| 2007/0050716 | A1 | 3/2007 | Leahy et al. |
| 2007/0279494 | A1 | 12/2007 | Aman et al. |
| 2009/0289955 | A1 | 11/2009 | Douris et al. |
| 2010/0085273 | A1* | 4/2010 | Nakayama ........... A61B 1/0005 345/1.1 |
| 2010/0299618 | A1* | 11/2010 | Pare ...................... A63F 13/12 715/757 |

OTHER PUBLICATIONS

Aila, Timo, and Ville Miettinen. "dPVS: An Occlusion Culling System for Massive Dynamic Environments." IEEE Computer Graphics and Applications 24.2 (2004): 86-97.
Aila, Timo, Ville Miettinen, and Otso Makinen. "DPVS Reference Manual." Aug. 2006. PDF file.
Aliaga, Daniel, et al., "MMR: An Interactive Massive Model Rendering System Using Geometric and Image-Based Acceleration." Proceedings of the 1999 Symposium on Interactive 3D Graphics. Proc. of Symposium on Interactive 3D Graphics, Apr. 1999, Atlanta. New York: ACM. 1999. 199-206. ACM Portal. Web. Jun. 9, 2010. <http://portal.acm.org>.
Aliage, Daniel G., et al. "Sea of Images." Proceedings of the Confrence on Visualization '02. Washington, DC: IEEE Computer Society, 2002. 331-36. ACM Portal. Web. Jun. 20, 2010. <http://portal.acm.org>.
Amanatides, John, and Andrew Woo. "A Fast Voxel Traversal Algorithm for Ray Tracing." Paper presented at Eurographics 1987. PDF file.
Bajaj, Chandrajit "Computational Visualization." N.d. PDF file. Dec. 11-15, 2002.
Banerjee, Raja, and Jarek R Rossignac. "Topologically Exact Evaluation of Polyhedra Defined in CSG with Loose Primitives." Computer Graphics Forum 15.4 (1996): 205-17. Print.
Batagelo, Harlen Costa, and Shin-Ting Wu. "Dynamic Scene Occlusion Culling using a Regular Grid." Proceedings of the 15th Brazilian Symposium on Computer Graphics and Image Processing. Washington, DC: IEEE Computer Society, 2002. 43-50. ACM Portal. Web. Jun. 21, 2010. <http://portal.acm.org>.
Bernardini, Fausto, Jihad El-Sana, and James T Klosowski. "Direction Discretized Occluders for Accelerated Occlusion Culling." Eurographics '2000. Ed. M. Gross and F. R. A. Hopgood. vol. 19. N.p.: n.p., n.d. N. pag. Print.
Bittner, Jiri. "Efficient Construction of Visibility Maps using Approximate Occlusion Sweep." Proceedings of the 18th Spring Conference on Computer Graphics . New York: ACM, 2002. 167-175. ACM Portal. Web. Jun. 24, 2010. <http://portal.acm.org>.
"Hierarchical Techniques for Visibility Computations." Diss. Czech Technical U in Prague. 2002. Print.
Bittner, Jiri, Vlastimil Havian, and Pavel Slavik. "Hierarchical Visibility Culling with Occlusion Trees." Proceedings of the Computer Graphics International 1998. Washington, DC: IEEE Computer Society, 1998 207. ACM Portal. Web. Jun. 19, 2010. <http://portal.acm.org>.
Bittner, Jiri, and Michael Wimmer. Report on Visibility Algorithms. N.p.: n.p., 2005. Print.
Bittner, Jiri, et al. "Coherent Hierarchical Culling: Hardware Occlusion Queries Made Useful." Eurographics 2004. Ed. M.-P. Cani and M. Slater. vol. 23. Oxford Blackwell Publishing, 2004. N. pag. Print.
Blythe, David. "The Direct3D 10 System." ACM Transactions on Graphics (TOG) 25.3 (2006): 724-34. ACM Portal. Web. Jun. 20, 2010. <http://portal.acm.org>.
Bronnimann, H., et al., "Lines Tangent to Four Triangles in Three-Dimensional Space." Discrete & Computational Geometry 37.3 (2007) 369-80. ACM Portal. Web. Jun. 27, 2010. <http://portal.acm.org>.
Bronnimann, H., et al. Transversals to Line Segments in R3. N.p.: n.p., 2003. Print.--. Transversals to Line Segments in R3. N.p.: n.p., 2003. Print.
Brunet, Pere, and Isabel Navazo. "Solid Representation and Operation Using Extended Octrees." ACM Transactions on Graphics (TOG) 9.2 (1990): 170-97. Print.
Brunet, Pere, et al. "Hoops: 3D Curves as Conservative Occluders for Cell-Visibility." Eurographics 2001. Ed. A. Chalmers and T.-M. Rhyne. vol. 20. N.p.: n.p., n.d. N. pag. Print.
Butchart, J. H. "The Altitude Quadric of a Tetrahedron." The American Mathematical Monthly 47.6 (1940): 383-84. Print.
Campbell, A. T., III, and Donald S. Fussell. "Adaptive Mesh Generation for Global Diffuse Illumination." Proceedings of the 17th Annual Conference on Computer Graphics and Interactive Techniques . New York: ACM, 1990. 155-64. ACM Portal. Web. Jun. 24, 2010. <http://portal.acm.org>.
Cano, Pedro, and Juan Carlos Torres. Representation of Polyhedral Objects using SP-Octrees Granada: n.p., n.d. Print. (created Jan. 5, 2002).
Cano, Pedro, Juan Carlos Torres, and Francisco Velasco. "Progressive Transmission of Polyhedral Solids using a Hierarchical Representation Scheme." Journal of WSCG 11.1 (2003): n. pag. PDF file.
Chan, Timothy. "A Minimalist's Implementation of the 3-d Divide-and-Conquer Convex Hull Algorithm." Jun. 4, 2003. University of Waterloo School of Computer Science. Timothy M. Chan's Publications. Web. May 30, 2010. <http://www.cs.uwaterloo.ca/~tmchan/.html>.
Charneau, Sylvain, Lillian Aveneau, and Laurent Fuchs. "Exact, Robust and Efficient Full Visibility Computation in Plucker Space." The Visual Computer 23 (Jun. 2007): 773-82. Print.
Chen, Wei-Chao, et al. "Light Field Mapping: Hardware-Accelerated Visualization of Surface Light Fields." ACM Transactions on Graphics (TOG) 21.3 (2002): 447-56 ACM Portal. Web. Jun. 20, 2010. <http://portal.acm.org>.
Chhugani, Jatin. "High Fidelity Walkthroughs of Large Virtual Environments." Diss. The Johns Hopkins U, 2004. Print.
Chhugani, Jatin, et al. "vLOD: High-Fidelity Walkthrough of Large Virtual Environments." IEEE Transactions on Visualization and Computer Graphics 11.1 (2005): 35-47. ACM Portal. Web. Jun. 8, 2010. <http://portal.acm.org>.
Chin, Norman, and Steven Feiner. "Fast Object-Precision Shadow Generation for Area Light Sources Using BSP Trees." Proceedings of the 1992 Symposium on Interactive 3D Graphics . Proc. of Symposium on Interactive 3D Graphics, 1992. Cambridge, Massachusetts. New York: Association for Computing Machinery. 1992. 21-30. ACM Portal. Web. May 30, 2010. <http://portal.acm.org>.
Chin, Norman, and Steven Feiner, "Near Real-Time Shadow Generation Using BSP Trees." ACM SIGGRAPH Computer Graphics 23.3 (1989). 99-106. ACM Portal. Web. May 31, 2010. <http://portal.acm.org>.

(56) References Cited

OTHER PUBLICATIONS

Chrysanthou, Yiorgos, Daniel Cohen-Or, and Dani Uschinski. "Fast Approximate Quantitative Visibility for Complex Scenes." Proceedings of the Computer Graphics International 1998 . Washington, DC: IEEE Computer Society, 1998. 220. ACM Portal. Web. Jun. 20, 2010. <http://portal.acm.org>.
Chrysanthou, Yiorgos, and Mel Slater. "Shadow Volume BSP Trees for Computation of Shadows in Dynamic Scenes." Proceedings of the 1995 Symposium on Interactive 3D Graphics . Proc. of Symposium on Interactive 3D Graphics, 1995, Monterey, California. New York: Association for Computing Machinery, 1995. 45-50. ACM Portal. Web. May 30, 2010. <http://portal.acm.org>.
Chrysanthou, Yiorgos, and Mel Slater. "Incremental Updates to Scenes Illuminated by Area Light Sources." Proceedings of the Eurographics Workshop on Rendering Techniques '97. London: Springer-Verlag, 1997. 103-14. ACM Portal. Web. May 29, 2010. <http://portal.acm.org>.
Cohen, Jonathan. "Rendering Software Acceleration." Spring 2000. PDF file.
Cohen-Or, Daniel, et al. "A Survey of Visibility for Walkthrough Applications." IEEE Transactions on Visualization and Computer Graphics 9.3 (2003): 412-31. Print.
Cohen-Or, Daniel, et al. "Conservative Visibility and Strong Occlusion for Viewspace Partitioning of Densely Occluded Scenes." Eurographics '98 Comp. N. Ferreira and M. Gobel. vol. 17. N.p.: n.p., n.d. N. pag. Print. vol. 17, (1998) No. 3.
Cohen-Or, Daniel, and Eyal Zadicarlo. "Visibility Streaming for Network-Based Walkthroughs." Proceedings of Graphics Interface, 1998. N.p.: n.p., 1998. N. pag. Print.
Comba, Joao, and Bruce Naylor. "Conversion of Binary Space Partitioning Trees to Boundary Representation." Geometric Modeling: Theory and Practice: The State of the Art (Focus on Computer Graphics). Ed. Wolfgang Strasser, Reinhard Klein, and Rene Rau. N.p.: Springer Verlag. 1997. 286-301. Print.
Coorg, Satyan, and Seth Teller. "Temporally Coherent Conservative Visibility." Computational Geometry: Theory and Applications 12.1-2 (1999): 105-124. ACM Portal. Web. Jun. 19, 2010. <http://portal.acm.org>.
Coorg, Satyan, and Seth Teller. "Real-Time Occlusion Culling for Models with large Occluders." Proceedings of the 1997 Symposium on Interactive 3D Graphics . Symposium on Interactive 3D Graphics, Providence, RI. New York: ACM, 1997. 83-ff. ACM Portal. Web. Jun. 19, 2010. <http://portal.acm.org>.
Correa, Wagner T., James T. Klosowski, and Claudio T. Silva. "Fast and Simple Occlusion Culling." Game Programming Gems 3. Ed. Dante Treglia. N.p.: Charles River Media, 2002. N. pag. Print. Game Programming Gems ser. 3.
Correa, Wagner T., James T. Klosowski, and Claudio T. Silva. IWalk: Interactive Out-Of-Core Rendering of Large Models. N.p.: n.p., n.d. N. pag. Print. (modified Sep. 4, 2013).
Correa, Wagner T., James T. Klosowski, and Claudio T. Silva. "Out-of-Core Sort-First Parallel Rendering for Cluster-Based Tiled Displays." Proceedings of the Fourth Eurographics Workshop on Parallel Graphics and Visualization. vol. 29. Aire-la-Ville: Eurographics Association, 2002. 89-96. ACM Portal. Web. Jun. 20, 2010. <http://portal.acm.org>.
Correa, Wagner T., James T. Klosowski, and Claudio T. Silva. "Visibility-Based Prefetching for Interactive Out-Of-Core Rendering." Proceedings of the 2003 IEEE Symposium on Parallel and Large-Data Visualization and Graphics. Washington, DC: IEEE Computer Society, 2003 N. pag. ACM Portal. Web. Jun. 20, 2010. <http://portal.acm.org>.
Cozzi, Patrick John. "Visibility Driven Out-of-Core HLOD Rendering." MS thesis. U of Pennsylvania, 2008. Print.
Dachsbacher, Carsten, et al. "Implicit Visibility and Antiradiance for Interactive Global Illumination." ACM Transactions on Graphics (TOG) 26.3 (2007): n. pag. ACM Portal. Web. Jun. 20, 2010. <http://portal.acm.org>.
Decoret, Xavier, Gilles Debunne, and Francois Sillion. "Erosion Based Visibility Preprocessing." Proceedings of the 14th Eurographics Workshop on Rendering. Proc of ACM International Conference Proceeding Series; vol. 44. Aire-la-Ville: Eurographics Association, 2003. 281-88. ACM Portal. Web. Jun. 8, 2010. <http://portal.acm.org>.
Demouth, Julien, et al. "Between Umbra and Penumbra." Proceedings of the Twenty-Third Annual Symposium on Computational Geometry . New York: ACM, 2007. 265-74. ACM Portal. Web. Jun. 29, 2010. <http://portal.acm.org>.
Drettakis, George, and Eugene Fiume. "A Fast Shadow Algorithm for Area Light Sources Using Backprojection." Proceedings of the 21st Annual Conference on Computer Graphics and Interactive Techniques . New York: ACM, 1994. 223-30. ACM Portal. Web. Jun. 27, 2010. <http://portal.acm.org>.
Drettakis, Georgios. Structured Sampling and Reconstruction of Illumination for Image Synthesis. Diss. U of Toronto, 1994. Toronto: UMI, 1994. AAINN92651. ACM Portal. Web. Jun. 24, 2010. <http://portal.acm.org>.
Durand, Fredo. "3D Visibility: Analytical Study and Applications." Diss U of Grenoble, 1999. Print.
Durand, Fredo. "Some Thoughts on Visibility." N.d. PDF file. (created Oct. 16, 2000).
Durand, Fredo, George Drettakis, and Claude Puech. "The 3D Visibility Complex: A New Approach to the Problems of Accurate Visibility." Proceedings of the Eurographics Workshop on Rendering Techniques '96. London: Springer-Verlag, 1996. 245-56. ACM Portal. Web. Jun. 30, 2010. <http://portal.acm.org>.
Durand, Fredo, et al. "Conservative Visibility Preprocessing using Extended Projections." Proceedings of the 27th Annual Conference on Computer Graphics and Interactive Techniques. Proc. of International Conference on Computer Graphics and Interactive Techniques. New York: ACM Press/Wesley Publishing Co., 2000. 239-48. ACM Portal. Web. Jun. 8, 2010. <http://portal.acm.org>.
Edelsbrunner, Herbert. "Triangulations and Meshes in Computational Geometry." Cambridge Journals 9 (Mar. 2001): 133-213. Cambridge Journals. Web. Jun. 20, 2010. <http://journals.cambridge.org>.
Eppstein, David. "Asymptotic Speed-Ups in Constructive Solid Geometry." Algorithmica 13.5 (1995): 462-471. Print.
Fogel, Efi, et al. "A Web Architecture for Progressive Delivery of 3D Content." Proceedings of the Sixth International Conference on 3D Web Technology. Proc. of Virtual Reality Modeling Language Symposium, Paderbon, Germany, 2001. New York: ACM, 2001. 35-41. ACM Portal. Web. Jun. 20, 2010. <http://portal.acm.org>.
Funkhouser, Thomas A. "Visibility." Spring 2006. PDF file.
Funkhouser, Thomas A. "A Visibility Algorithm for Hybrid Geometry-and Image-Based Modeling and Rendering." Computers and Graphics 23.5 (1999): 719-28. Print.
Funkhouser, Thomas A. "Database Management for Interactive Display of Large Architectural Models." Proceedings of the Conference on Graphics Interface '96. Toronto: Canadian Information Processing Society, 1996. 1-8. ACM Portal. Web. Jun. 20, 2010. <http://portal.acm.org>.
Ghali, Sherif. "A Geometric Framework for Computer Graphics Addressing Modeling, Visibility, and Shadows." N.d. HTML file. (Created Jun. 8, 1999).
Ghali, Sherif. "A Survey of Practical Object Space Visibility Algorithms." N.d. MS. Max Planck Institute for Computer Science, Saarbrucken. (Created May 14, 2001).
Ghali, Sherif. "Object Space Visibility." Paper presented at SIGGRAPH 2001. PDF file.
Ghali, Sherif, and Chris Smith. "Computing the Boundary of a Class of Labeled-Leaf BSP Solids." Proceedings of the 17th Canadian Conference on Computational Geometry (CCCG'05). Proc. of Canadian Conference on Computational Geometry, 2005, Windsor, Ontario. N.p.: n.p., 2005. 302-5. The Canadian Conference on Computational Geometry. Web. May 29, 2010. <http://www.cccg.ca/>.
Gigus, Ziv, John Canny, and Raimund Seidel. Efficiently Computing and Representing Aspect Graphics of Polyhedral Objects. Berkeley: U of California, Berkeley, n.d. Print. (Created Sep. 13, 2002).
Gigus, Ziv, and Jitendra Malik. "Computing the Aspect Graph for Line Drawings of Polyhedral Objects." IEEE Transactions on

(56) References Cited

OTHER PUBLICATIONS

Pattern Analysis and Machine Intelligence 12.2 (1990): 113-22. ACM Portal. Web. Jun. 27, 2010. <http://portal.acm.org>.

Goodrich, Michael T. "A Polygonal Approach to Hidden-Line and Hidden-Surface Elimination." CVGIP: Graphical Models and Image processing 54.1 (1992): 1-12. ACM Portal. Web. Jun. 27, 2010. <http://portal.acm.org>.

Gorjanc, Sonja. Some Examples of using mathematica in Teaching Geometry. Zagreb: U of Zagreb, n.d. N. pag. Print. (Created Aug. 29, 2013).

Gotsman, Craig, Oded Sudarsky, and Jeffrey A. Fayman. "Optimized Occlusion Culling using Five-Dimensional Subdivision." Computers & Graphics 23.5: 645-54. Print. (1999).

Gran, Carlos Andujar. "Octree-Based Simplification of Polyhecral Solids." Diss. Polytechnical U of Catalunya, 1999. Print.

Gu, Xianfeng, Steven J. Gortler, and Michael F. Cohen. "Polyhedral Geometry and the Two-Plane Parameterization." Proceedings of the Eurographics Workshop on Rendering Techniques '97. London: Springer-Verlag, 1997. 1-12. ACM Portal. Web. Jun. 29, 2010. <http://portal.acm.org>.

Gueziec, Andre, et al. "Cutting and Stitching: Converting Sets of Polygons to Manifold Surfaces." IEEE Transactions on Visualization and Computer Graphics 7.2 (2001): 136-151. Print.

Haines, Eric. "An Introductory Tour of Interactive Rendering." IEEE Computer Graphics and Applications 26.1 (2006): 76-87. ACM Portal. Web. Jun. 20, 2010. <http://portal.acm.org>.

Hardt, Stephen, and Seth J. Teller. "High-Fidelity Radiosity Rendering at Interactive Rates." Proceedings of the Eurographics Workshop on Rendering Techniques '96. London: Springer-Verlag, 1996. N. pag. ACM Portal. Web. Jun. 29, 2010. <http://portal.acm.org>.

Haumont, D., O. Makinen, and S. Nirenstein. "A Low Dimensional Framework for Exact Polygon-to-Polygon Occlusion Queries." Proceedings of the Eurographics Symposium on Rendering. Ed. Kavita Bala and Philip Dutre. N.p.: n.p., 2005. N. pag. Print.

Havemann, Sven, and Deiter W. Fellner. Generative Mesh Modeling. Braunschweig: U of of Technology Muhlenpfordtstr, 2003. Print.

Heckbert, Paul S. "Discontinuity Meshing for Radiosity." Eurographics '92. N.p.: n.p., 1992. 203-16. Print.

Hedley, David. Discontinuity Meshing for Complex Environments. Bristol: U of Bristol, 1998. ACM Portal. Web. Jun. 27, 2010. <http://portal.acm.org>.

Hertzmann, Aaron, and Denis Zorin. "Illustrating Smooth Surfaces." Proceedings of the 27th Annual Conference on Computer Graphics and Interactive Techniques. New York: ACM Press/Wesley Publishing Co., 2000. 517-26. ACM Portal. Web. Jun. 29, 2010. <http://portal.acm.org>.

Hey, Heinrich, and Werner Purgathofer. "Occlusion Culling Methods." Paper presented at Eurographics 2001. Print.

Hoffmann, Christoph M. "The Problems of Accuracy and Robustness in Geometric Computation." IEEE Transactions on Visualization and Computer Graphics (Mar. 1989): 31-41. Print.

Hoffmann, Christoph M. Robustness in Geometric Computations. N.p.: n.p., 2001. Print.

Hosseini, Mojtaba, and Nicolas D. Georganas. "MPEG-4 BIFS Streaming of Large Virtual Environments and their Animation on the Web." Proceedings of the Seventh International Conference on 3D Web Technology. Proc. of 3D Technologies for the World Wide Web conference, Tempe, AZ, 2002. New York: ACM, 2002. 19-25. ACM Portal. Web. Jun. 20, 2010. <http://portal.acm.org>.

Hubbard, Philip M. Constructive Solid Geometry for Triangulated Polyhedra. Providence: Brown University, 1990. Print.

Hudson, T., et al. "Accelerated Occlusion Culling using Shadow Frusta." Proceedings of the Thirteenth Annual Symposium on Computational Geometry. New York: ACM, 1997. 1-10. ACM Portal. Web. Jun. 19, 2010. <http://portal.acm.org>.

Keyser, John, et al. "ESOLID—A System for Exact Boundary Evaluation."Paper presented at Proceedings of the Seventh ACM Symposium on Solid Modeling and Applications, 2002, Saarbrücken, Germany. ACM Symposium on Solid and Physical Modeling. Web. May 23, 2010.

Kirsanov, D., P. V. Sander, and S. J. Gortler. "Simple Silhouettes for Complex Surfaces." ACM International Conference Proceeding Series. Proc. of the 2003 Eurographics/SIGGRAPH Symposium on Geometry Processing. vol. 43. Aire-la-Ville: Eurographics Association, 2003. 102-6. ACM Portal. Web. Jun. 17, 2010. <http://portal.acm.org>.

Kleinberg, Jon, and Eva Tardos. "Algorithm Design." N.d. PDF file. Copyright 2005.

Klosowski, James T., and Claudio T. Silva. "Efficient Conservative Visibility Culling Using the Prioritized-Layered Projection Algorithm." IEEE Transactions on Visualization and Computer Graphics 7.4 (2001): 365-79. ACM Portal. Web. Jun. 9, 2010. <http://portal.acm.org>.

Koltun, Vladen, Yiorgos Chrysanthou, and Daniel Cohen-Or. "Virtual Occluders: An Efficient Intermediate PVS Representation." Proceedings of the Eurographics Workshop on Rendering Techniques 2000. London: Springer-Verlag, 2000. 59-70. ACM Portal. Web. Jun. 19, 2010. <http://portal.acm.org>.

Koltun, Vladlen, Yiorgos Chrysanthou, and Daniel Cohen-Or. "Hardware-Accelerated from Visivility Using a Dual Ray Space." Proceedings of the 12th Eurographics Workshop on Rendering Techniques. London: Springer-Verlag, 2001. 205-16. ACM Portal. Web. Jun. 19, 2010. <http://portal.acm.org>.

Krishnan, Shankar. "Efficient and Accurate Boundary Evaluation Algorithms for Sculptured Solids." Diss. U of North Carolina at Chapel Hill, 1997. Print.

Krishnan, Shankar, and Dinesh Manocha. Global Visibility and Hidden Surface Removal Algorithms for Free Forum Surfaces. Chapel Hill: U of North Carolina at Chapel Hill, 1994. Print.

Laidlaw, David H., W. Benjamin Trumbore, and John F. Hughes. "Constructive Solid for polyhedral Objects." ACM SIGGRAPH Computer Graphics 20.4 (1986): 161-170. ACM Portal. Web. May 31, 2010. <http://portal.acm.org>.

Laine, Samuli. "A General Algorithm for Putput-Sensitive Visibility Preprocessing." Proceedings of the 2005 Symposium on Interactive 3D Graphics and Games. New York: ACM, 2005. 31-40. ACM Portal. Web. Jun. 21, 2010. <http://portal.acm.org>.

Laurentini, Aldo. "The Visual Hull Concept for Silhouette-Based Image Understanding." IEEE Transactions on Pattern Analysis and Machine Intelligence 16.2 (1994): 150-62. ACM Portal. Web. Jun. 27, 2010. <http://portal.acm.org>.

Leyvand, Tommer, Olga Sorkine, and Daniel Cohen-Or. "Ray Space Factorization for From-Region Visibility." ACM SIGGRAPH 2003 Papers. Proc. of International Conference on Computer Graphics and Interactive Techniques, San Diego, CA, 2003. New York: ACM, 2003. 595-604. ACM Portal. Web. Jun. 29, 2010. <http://portal.acm.org>.

Lim, Hong Lip. "Toward a Fuzzy Hidden Surface Algorithm." Proceedings of the 10th International Conference of the Computer Graphics Society on Visual computing: Integrating Computer Graphics with Computer Vision: Integrating Computer Graphics with Computer Vision. New York: Springer-Verlag New York, Inc, 1992. 621-35. ACM Portal. Web. Jun. 8, 2010. <http://portal.acm.org>.

Lischinski, Dani, Filippo Tampieri, and Donald P. Greenberg. "A Discontinuity Meshing Algorithm for Accurate Radiosity." IEEE Computer Graphics and Applications 12.6 (1997): 25-39. Print.

Lorensen, William E., and Harvey E. Cline. "Marching Cubes: A High Resolution 3D Surface Construction Algorithm." ACM SIGGRAPH Computer Graphics 21.4 (1987): 163-69. ACM Portal. Web. Jun. 20, 2010. <http://portal.acm.org>.

Luebke, David. Collection of various lecture slides. N.d. Microsoft PowerPoint file. (Last printed Jul. 27, 1998).

Luebke, David, and Chris Georges. "Portals and Mirrors: Simple, Fast Evaluation of Potentially Visible Sets." Proceedings of the 1995 Symposium on Interactive 3D Graphics. Proc. of Symposium on Interactive 3D Graphics, 1995, Monterey, CA. New York: ACM, 1995. N. pag. ACM Portal. Web. Jun. 9, 2010. <http://portal.acm.org>.

(56) References Cited

OTHER PUBLICATIONS

Luka, Peter. "Generalized Conservative Visibility Algorithms." May 30, 2003. MS. Massachusetts Institute of Technology, Cambridge.

Mantyla, Martti. "Boolean Operations of 2-Manifolds through Vertex neighborhood Classification." ACM Transactions on Graphics 5.1 (1986): 1-29. ACM Portal. Web. May 31, 2010. <http://portal.acm.org>.

Mattausch, Oliver, Jiri Bittner, and Michael Wimmer. "CHC++: Coherent Hierarchical Culling Revisited." Eurographics 2008. Ed. G. Drettakis and R. Scopigno. vol. 27. N.p.: Blackwell Publishing, 2008. 221-30. Print.

McKenna, Michael. "Worst-Case Optimal Hidden-Surface Removal." ACM Transactions on Graphics (TOG) 6.1 (1987): 19-28. ACM Portal. Web. Jun. 29, 2010. <http://portal.acm.org>.

Meyer, Tom. "Introduction to Time-Critical Scheduling." Oct. 5, 1995. PostScript file.

Mora, F., L. Aveneau, and M. Meriaux. "Coherent and Exact Polygon-to-Polygon Visibility." Journal of WSCG (Jan.-Feb. 2005): n. pag. Print.

Moreira, Fabio O., Joao Comba, and Carla Maria Dal Sasso Freitas. "Smart Visible Sets for Networked Virtual Environments." Proceedings of the 15th Brazilian Symposium on Computer Graphics and Image Processing. Washington, DC: IEEE Computer Society, 2002. 373-80. ACM Portal. Web. Jun. 20, 2010. <http;//portal.acm.org>.

Mount, David M. "CMSC 754 Computational Geometry." Fall 2002. U of Maryland Dept. of Computer Science, College Park. CMSC 754 Computational Geometry. Web. May 31, 2010. <http://www.cs.umd.edu/~mount//>.

Myllarniemi, Varvana. "Dynamic Scene Occlusion Culling." Paper presented at Computer Graphics Seminar, Spring 2003. print.

Naylor, Bruce F. "Partitioning Tree Image Representation and Generation form 3D Geometric Models." Proceedings of the Conference on Graphics Interface '92. San Francisco: Morgan Kaufmann Publishers, Inc., 1992. 201-12. ACM Portal. Web. Jun. 20, 2010. <http://portal.acm.org>.

Nehab, Diego, Joshua Barczak, and Pedro V. Sander. "Triangle Order Optimization for Graphics Hardware computation Culling." Proceedings of the 2006 Symposium on Interactive 3D Graphics and Games. New York: ACM, 2006. 207-11. ACM Portal. Web. Jun. 30, 2010. <http://portal.acm.org>.

Nirenstein, S., E. Blake, and J. Gain. "Exact From-Region Visibility Culling." Proceedings of the 13th Eurographics Workshop on Rendering. Proc. of ACM International Conference Proceeding Series, Pisa, Italy, 2002. vol. 28. Aire-la-Ville: Eurographics Association, 2002. 191-202. ACM Portal. Web. Jun. 24, 2010. <http://portal.acm.org>.

Nishita, Tomoyuki, Isao Okamura, and Eihachiro Nakamae. "Shading Models for Point and Linear Sources." ACM Transactions on Graphics (TOG) 4.2 (1985): 124-46. ACM Portal. Web. Jun. 29, 2010. <http://portal.acm.org>.

"NVIDIA GPU Programming Guide." N.d. PDF file. (Created Oct. 12, 2007).

Panne, Michiel Van de, and A. James Stewart. "Effective Compression Techniques for Precomputed Visibility." Paper presented at Eurographics 1999. Print.

Petitjean, Sylvain. "A Computational Geometric Approach to Visual Hulls." International Journal of Computational Geometry and Applications 8.4 (1998): 407-36. Print.

Plantinga, Harry. "Conservative Visibility Preprocessing for Efficient Walkthroughs of 3D Scenes." Proceedings of Graphics Interface 93. Toronto: Canadian Information Processing Society, 1993. 166-73. Print.

Plantinga, Harry, and Charles R. Dyer. "Visibility, Occlusion, and the Aspect Graph." International Journal of Computer Vision 5.2 (1990): 137-60. ACM Portal. Web. Jun. 29, 2010. <http://portal.acm.org>.

Poulin, Pierre, and John Amanatides. "Shading and Shadowing with Linear Light Sources." Paper presented at Eurographics 90. Print. Comput. & Graphics vol. 15, No. 2, pp. 259-265. 1991. Printed in Great Britain.

Rege, Ashu. "Occlusion (HP and NV Extensions)." N.d. Microsoft PowerPoint file. (Created Sep. 25, 2013).

Requicha, Aristides A. G., and Herbert B. Voelcker. "Boolean Operations in Solid Modelling: Boundary Evaluation and Merging Algorithms." File last modified on Jan. 1984. U of Rochester Coll of Engineering and Applied Science. UR Research. Web. May 31, 2010. <https://urresearch.rochester.edu/.action?institutionalitemId=990>.

Rusinkiewicz, Szymon, and Marc Levoy. "Streaming QSplat: A Viewer for Networked Visualization of Large, Dense Models." Proceedings of the 2001 Symposium on Interactive 3D Graphics . New York: ACM, 2001. 63-8. ACM Portal. Web. Jun. 20, 2010. <http://portal.acm.org>.

Samet, Hanan. "Spatial Data Structures." Modern Database Systems: The Object Model, Interoperability, and Beyond. Reading: Addison Wesley/Press, 1995. N. pag. Print.

Sander, Pedro V., et al. "Silhouette Clipping." Proceedings of the 27th Annual Conference on Computer Graphics and Interactive Techniques. Proc. of International Conference on Computer Graphics and Interactive Techniques, 2000 . New York: ACM Press/Wesley, 2000. 327-34. ACM Portal. Web. Jun. 19, 2010. <http://portal.acm.org>.

Saona-Vasquez, Carlos, Isabel Navazo, and Pere Brunet. "Data Structures and Algorithms for Navigation in Highly Polygon-Populated Scenes." N.d. PDF file. (Created Nov. 7, 2007).

Saona-Vasquez, Carlos, Isabel Navazo, and Pere Brunet. "The Visibility Octree. A Data Structure for 3D Navigation." Computers & Graphics 23.5 (1999): 635-43. Print.

Schaufler, Gernot, et al. "Conservative Volumetric Visibility with Occluder Fusion." Proceedings of the 27th Annual Conference on Computer Graphics and Interactive Techniques. New York: ACM Press/Wesley Publishing Co., 2000. 229-38. ACM Portal. Web. Jun. 27, 2010. <http://portal.acm.org.>.

Schrocker, Gerald. "Visibility Culling for Game Applications." Diss. Graz U of Technology, 2001. Print.

Seidel, Raimund. "Small-Dimensional Linear Programming and Convex Hulls Made Easy." Discrete & Computational Geometry 6.5 (1991): 423-434. ACM Portal. Web. May 31, 2010. <http://portal.acm.org>.

Sharman, James. "The Marching Cubes Algorithm." N.d. HTML file. (Created Sep. 11, 2013).

Sigueira, Marcelo, et al. "A New Construction of Smooth Surfaces from Triangle Meshes Using Parametric Pseudo-Manifolds." Computers and Graphics 33.3 (2009): 331-40. ACM Portal. Web. Jun. 17, 2010. <http://portal.acm.org>.

Soler, Cyril, and Francois X. Sillion. "Fast Calculation of Soft Shadow Textures Using Convolution." Proceedings of the 25th Annual Conference on Computer Graphics and Interactive Techniques. Proc. of International Conference on Computer Graphics and Interactive Techniques. New York: ACM, 1998. 321-32. ACM Portal. Web. Jun. 8, 2010. <http://portal.acm.org>.

Staneker, D. "An Occlusion Culling Toolkit for OpenSG PLUS." Paper presented at OpenSG Symposium, 2003. PDF file. OpenSG Symposium (2003).

Stewart, A. James, and Sherif Ghali. "Fast Computation of Shadow Boundaries Using Spacial Coherence and Backprojections." Proceedings of the 21st Annual Conference on Computer Graphics and Interactive Techniques. New York: ACM, 1994. N. pag. ACM Portal. Web. Jun. 29, 2010. <http://portal.acm.org>.

Takusagawa, Ken. "Representing Smooth Surfaces." Oct. 23, 2001. HTML file.

Teller, Seth, and John Alex. Frustum Casting for Progressive, Interactive Rendering. Computer Graphics Group Publications. Massachusetts Institute of Technology, Jan. 1998. Web. Jun. 9, 2010. <http://groups.csail.mit.edu//.html#Technical_Reports>.

Teller, Seth J. "Computing the Antipenumbra of an Area Light Source." ACM SIGGRAPH Computer Graphics 26.2 (1992): 139-48. ACM Portal. Web. Jun. 29, 2010. <http://portal.acm.org>.

(56) References Cited

OTHER PUBLICATIONS

Teller, Seth J. "Computing the Antipenumbra of an Area Light Source." 1992. PDF file.
Teller, Seth J. Visibility Computations in Densely Occluded Polyhedral Environments. Diss. U of California at Berkeley, 1992. Berkeley: U of California at Berkeley, 1992. GAX93-30757. ACM Portal. Web. Jun. 29, 2010. <http://portal.acm.org>.
Teller, Seth J., and Pat Hanrahan. "Global Visibility Algorithms for Illumination Computations." Proceedings of the 20th Annual Conference on Computer Graphics and Interactive Techniques. New York: ACM, 1993. 239-46. ACM Portal. Web. Jun. 29, 2010. <http://portal.acm.org>.
Teller, Seth J., and Michael E. Hohmeyer. Stabbing Oriented Convex Polygons in Randomized O(n2) Time. ACM Portal. N.p., n.d. Web. Jun. 29, 2010. <http://portal.acm.org>.
Thibault, William C., and Bruce F. Naylor. "Set Operations on Polyhedra Using Binary Space Partitioning Trees." ACM SIGGRAPH Computer Graphics 21.4 (1987): 153-162. ACM Portal. Web. May 31, 2010. <http://portal.acm.org>.
Vlachos, Alex. "Preparing Sushi: How Hardware Guys Write a 3D Graphics Engine." 2001. PDF file.
Wald, Ingo, Andreas Dietrich, and Philipp Slusallek. "An Interactive Out-of-Core Rendering Framework for Visualizing Massively Complex Models." ACM SIGGRAPH 2005 Courses. Proc. of International Conference on Computer Graphics and Interactive Techniques. New York: ACM, 2005. N. pag. ACM Portal. Web. Jun. 20, 2010. <http://portal.acm.org>.
Wang, Yigang, Hujun Bao, and Qunshend Peng. "Accelerated Walkthroughs of Virtual Environments Based on Visibility Preprocessing and Simplification." Computer Graphics Forum 17.3 (1998): 187-94. Print.
Wang, Yusu, Pankaj K. Agarwal, and Sariel Har-Peled. "Occlusion Culling for Fast Walkthrough in Urban Areas." Eurographics 2001. N.p.: n.p., 2001. N. pag. Print.
Weiler, Kevin, and Peter Atherton. "Hidden Surface Removal using Polygon Area Sorting." Proceedings of the 4th Annual Conference on Computer Graphics and Interactive Techniques. New York: ACM, 1977. 214-22. ACM Portal. Web. Jun. 30, 2010. <http://portal.acm.org>.
Weiler, Kevin, and Peter Atherton. Slides explaining polygon clipping. N.d. PDF file. (Created Oct. 23, 2006).
Wloka, Matthias. "Batch, Batch, Batch: What Does it Really Mean?" N.d. Microsoft PowerPoint file. (Created Mar. 12, 2003).
Wonka, Peter. "Occluder Shadows for Fast Walkthroughs of Urban Environments." Eurographics 1999. vol. 18, No. 3. Oxford: Blackwell Publishers, 1999. N. pag. Print.
Wonka, Peter, Michael Wimmer, and Dieter Schmalstieg. "Visibility Preprocessing with Occluder Fusion for Urban Walkthroughs." Proceedings of the Eurographics Workshop on Rendering Techniques 2000. London: Springer-Verlag, 2000. 71-82. ACM Portal. Web. Jun. 8, 2010. <http://portal.acm.org>.

Wonka, Peter, Michael Wimmer, and Francois X. Sillion. "Instant Visibility." Eurographics 2001. Ed. A. Chalmers and T.-M. Rhyne. vol. 20. Oxford: Blackwell Publishers, 2001. N. pag. Print.
Wood, Zoe Justine. "Computational Topology Algorithms for Discrete 2-Manifolds." Diss. California Institute of Technology, 2003. Print.
Worrall, Adam. "Dynamic Discontinuity Meshing." Diss. U of Bristol, 1998. Print.
Yoon, Sung-Eui, Brian Salomon, and Dinesh Manocha. "Interactive View-Dependent Rendering with Conservative Occlusion Culling in Complex Environments." Proceedings of the 14th IEEE Visualization 2003 (VIS'03). Washington, DC: IEEE Computer Society, 2003. N. pag. ACM Portal. Web. Jun. 9, 2010. <http://portal.acm.org>.
Zhang, Hongxin, and Jieqing Feng. "Preliminary Mathematics of Geometric Modeling (2)." Nov. 23, 2006. PDF file.
Zheng, Wenting, et al. "Rendering of Virtual Environments Based on Polygonal & Point-Based Models." Proceedings of the ACM Symposium on Virtual Reality Software and Technology. New York: ACM, 2002. 25-32. ACM Portal. Web. Jun. 20, 2010. <http://portal.acm.org>.
Zhou, Kaichi, et al. "Visibility-Driven Mesh Analysis and Visualization through Graph Cuts." IEEE Transactions on Visualization and Computer Graphics 14.6 (2008): 1667-74. Print.
International Search Report Issued Mar. 25, 2012 in PCT/US11/51403 Filed Sep. 13, 2011.
Notification of the Second Office Action issued Apr. 17, 2015 in Chinese Patent Application No. 201180054647.7 (with English language translation).
Partial Supplementary European Search Report issued Feb. 16, 2016 in Patent Application No. 11625795.5.
Chang-Su Kim, et al., "A Progressive View-Dependent Technique for Interactive 3-D Mesh Transmission" IEEE Transactions on Circuits and Systems for Video Technology, vol. 14, No. 11, XP011120988, Nov. 1, 2004, pp. 1249-1264.
Tian Chen, et al., "EasyMall—An Interactive Virtual Shopping System" Fifth International Conference on Fuzzy Systems and Knowledge Discovery, XP031357882, Oct. 18, 2008, pp. 669-673.
Wei Cheng, et al, "Receiver-Driven View-Dependent Streaming of Progressive Mesh" Network and Operating Systems Support for Digital Audio and Video, XP058023733, May 28, 2008, pp. 9-14.
Zhi Zheng, et al., "Interactive View-Dependent Rendering over Networks" IEEE Transactions on Visualization and Computer Graphics, vol. 14, No. 3, XP011344476, May 1, 2008, p. 576-589.
Jihad El-Sana, et al., "View-Dependent Rendering for Large Polygonal Models Over Networks" International Journal of Image and Graphics, XP055122356, Apr. 1, 2003, 26 Pages.
Extended European Search Report issued Jun. 1, 2016 in Patent Application No. 11825795.5.
Office Action issued Dec. 28, 2015 in Chinese Patent Application No. 201180054647.7 (with English language translation).
Supplementary European Search Report issued Jun. 17, 2016 in Patent Application No. 11825795.5.

\* cited by examiner

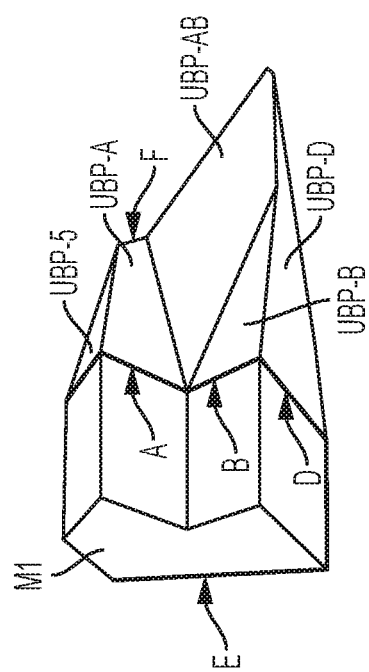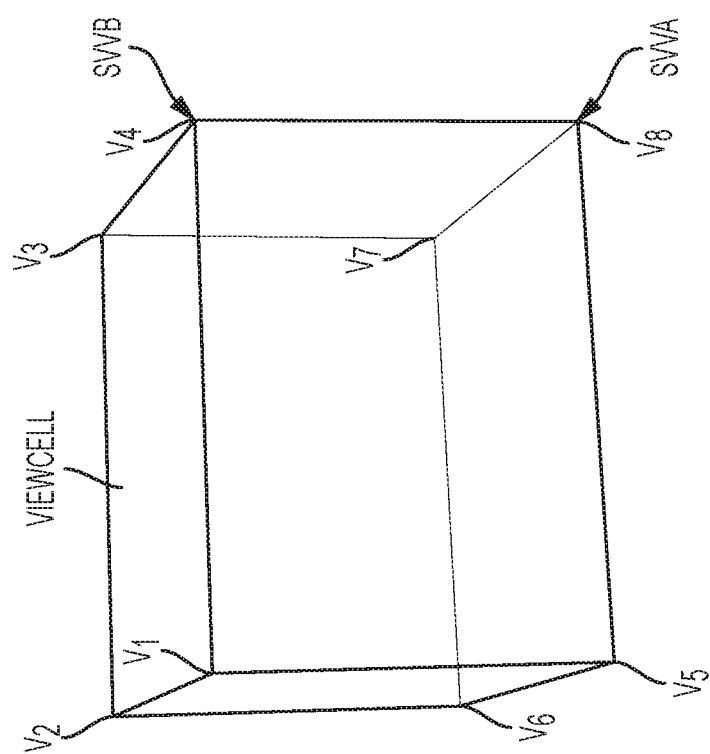
FIG. 10B

```
struct Contour
{
int mesh;          // index to mesh
int edge;          // index to edge of mesh
int vertex;        // index to starting vertex of contour
int node_array;    // index to array of Contour_Nodes
int num_nodes;     // length of coutour_node array
Int VMinfo;        // index to VM_Info array
int last_contour;  // index to next connected contour, head connected
int next_contour;// index to last connected contour, tail connected
char next_edge_type // if ==1 then next edge is next connected silhouette edge
                    // if ==0 then next edge is next previously labeled edge
char contour_type   // if == 1 dynamically occluding, if == 0 dynamically exposing
                    // if==2 hybrid contour, If==3 simple dynamically occluding
};

struct Contour_Node
{
char node_type;// 1 = outside corner, 2=simple inside corner, 3=CSV
char span_type; // 1= run of outside corners only
                // 2= run may contain outside and inside corners
                // 3=skip span_length segments & connect to next vertex-
                // forming simplified silhouette contour edge
                // 4= construct SE-MV on all inside corners of run using pivot and sweep
                // 5= construct all inside corner event surfaces by intersection adjacent SV-ME planes
int span_length; // number of umbral event surfaces (UBPs) generated on contour until next node
int ninfo;       // if node_type==1 then ninfo is index to OC_Info array
                 // if node_type==2 then ninfo is index to IC_Info array
                 // if node_type==3 then ninfo is index to CSV_Info array
};

struct VM_Info
{
int mesh;       // index to mesh containing OB_SEG corresponding to first silhouette element in run
                // if associated with dynamically exposing contour, mesh refers to deltaG+submesh
int triangle;   // index to triangle containing OB_SEG corresponding to first silhouette element in run
int retriangulate_hint // bitmask indicating if mesh triangles intersected by OB_SEGS for 31 -
                // Contour_Nodes of Contour should be retriangulated at runtime 0=no, 1=yes
                // Last Bit indicates VM dynamic boundary type: 0==occluding 1==exposing
float point[3]; // x,y,z value of initial vertex if it is formed by intersection with other OB_SEG
};
```

FIG. 13A

```
struct IC_Info
{
char ic_type;    //(optional)1= form SE-MVs by pivot and sweep
                 //(optional)2= intersect planes of adjacent SV-MEs
char SVSC[4];    // (optional) hints for specific viewcell edges forming SVSC
};

struct CSV_Info
{
int mesh;        // (optional) index to mesh containing intersected edge
Int edge;        // (optional) index to intersected edge
char ic_type;    //(optional)1= hint-form SE-MVs by pivot and sweep
                 //(optional)2= hint- intersect planes of adjacent SV-MEs
char SVSC[4];    // (optional) hints for specific viewcell edges forming SVSC
double point[3]; // (optional) precomputed x,y,z values of vertex of CSV
};

struct tri_seed  // index/pointer to specific triangles of model used to initiate
                 // simplified mesh traversal (FIG. 37) to construct viewcell B visibility
                 //map from viewcell A visibility map
{
int tri_count;   // number of triangles in seed
int* mesh_array; // sequence of mesh ids
int* tri_array;  // sequence of triangle ids
};

struct DeltaGplussubmesh_attach_polyline
                 // precomputed list of mesh edges for attaching submesh and original mesh
{
int contour;     //  reference to a specific Contour
char attach_type; // if ==0 free edges of submesh attached to free edges of mainmesh
                  // if ==1, free edges of submesh attached to listed edges of mainmesh
                  // if ==2, free edges of submesh linked to free edges of mainmesh
                  // if == 3, free edges of submesh lined to listed edges of mainmesh
int submesh;     // reference to attaching submesh
Int edgenumber;// number of edges in the attaching polyline
Int* submesh_edgelist;       // ordered list of edges in submesh which attach
int* mainmesh_edgelist;      // ordered list of edges in mainmesh to which attaches
};
struct OC_Info   // information for an outside corner node of
{
char svsc;       // (optional) hint for specific viewcell vertex forming UBP
};
```

FIG. 13B

```
struct DeltaGplussubmesh
{
int trianglecount;   // number of triangles in the submesh
int vertexcount;     // number of vertices in the submesh
int edgecount;       // number of edges in the submesh Triangle* trianglep;  // array of trianglecount triangles which indexes vertex and edge arrays below
Vertex* vertexp;      // array of vertexcount vertices
Edge* edgep;          // array of edgecount edges
};

struct Triangle
{
int global_id;     // global_id
int vertex[3];     // index of 3 vertices in DeltaGplussubmesh.vertexp array
int edge[3];       // index of 3 edges in DeltaGplussubmesh.edgep array
};

Struct Edge
{
int global_id;     // global id
int vertex[2];     // index of two vertices in DeltaGplussubmesh.vertexp array
};

struct vertex
{
int global_id;     // global id
float point[3];    // x,y,z value of vertex
};

struct Starting_Sil_Edge_UBP_Intersection_Hint
{
Mesh_triangle* INTERSECTED_TRIANGLE
char INTERSECTION_RUNLENGTH   // If > 0 Number of adjacent triangles intersected by UBP
                              // if < 0 Number of adjacent UBPs intersecting same triangle
};

struct Sil_Edge_UBP_Intersection_Hint
{
char INTERSECTION_RUNLENGTH   // If > 0 Number of adjacent triangles intersected by UBP
                              // if < 0 Number of adjacent UBPs intersecting same triangle
};
```

FIG. 13C

```
struct DeltaGplus_Header
{
int viewcell_start;            // unique viewcell number of starting viewcell
int viewcell_end;              // unique viewcell number of ending viewcell
char transition_face;          // indicator of which face of starting viewcell is penetrated
int packet_size;               // byte size of visibility event packet
DeltaGplus* deltaGplus_array;  // pointer to an array of DeltaGplus meshes
Int deltaGplus_count;          // number of deltaGplus structures in array
};

struct DeltaGplus
{
int trianglecount;  // number of triangles in the mesh
int vertexcount;    // number of vertices in the mesh
int edgecount;      // number of edges in the mesh Triangle* trianglep;  // array of trianglecount triangles which indexes vertex and edge arrays below
Vertex* vertexp;      // array of vertexcount vertices
Edge* edgep;          // array of edgecount edges
};

struct Triangle
{
int global_id;       // global_id
int vertex[3];       // index of 3 vertices in DeltaGplus.vertexp array
int edge[3];         // index of 3 edges in DeltaGplus.edgep array
int global_material; // index to array of material data structures;
};

Struct Edge
{
int global_id;   // global id
int vertex[2];   // index of two vertices in DeltaGplussubmesh.vertexp array
};

struct vertex
{
int global_id;     // global id
float point[3];    // x,y,z value of vertexf
float tex[2];      // texture map values
};
```

FIG. 13D

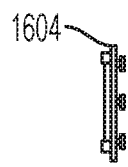
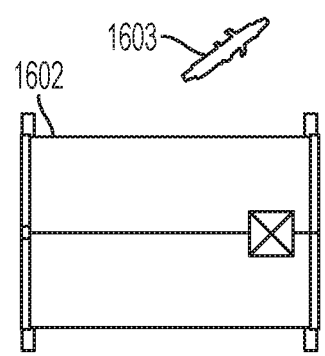
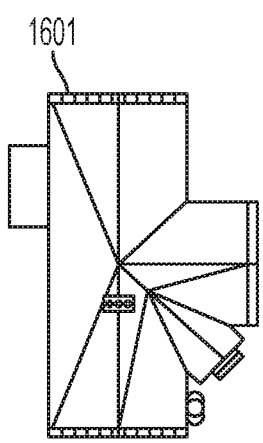
FIG. 25A

VISIBILITY EVENT PRECOMPTATION WORK INSTRUCTIONS SENT FROM SERVER TO CLIENT:

| SUBSCRIBER ID | CLIENT DEVICE ID | GAME OR SIM ID | VIEWCELL ID | VIEWCELL BOUNDARY ID | VIEWCELL PARAMETERS | VIEWCELL BOUNDARY PARAMETERS | GEOMETRY/TEXTURE VERTEX LOAD USED FOR PVS & VISIBILTY EVENT PACKET DETERMINATION |
|---|---|---|---|---|---|---|---|
| | | | | | | | |

FIG. 27B

VISIBILITY EVENT PRECOMPTATION COMPLETED WORK PACKET SENT FROM CLIENT TO SERVER:

| SUBSCRIBER ID | CLIENT DEVICE ID | GAME OR SIM ID | VIEWCELL ID | VIEWCELL BOUNDARY ID | PVS &/OR VISIBILTY EVENT PACKET DATA |
|---|---|---|---|---|---|
| | | | | | |

FIG. 27C

VISIBILITY EVENT PRECOMPTATION PROOF OF WORK TOKEN:

| SUBSCRIBER ID | CLIENT DEVICE ID | GAME OR SIM ID | VIEWCELL ID | VIEWCELL BOUNDARY ID | COMPLETION DATE & TIME | TOKEN VALUE |
|---|---|---|---|---|---|---|
| | | | | | | |

FIG. 27D

LOOK-UP SUBTABLE FOR PROBABILITY OF PENETRATION FOR A SINGLE
VIEWCELL/NAVCELL VC[0][223][22]

| VX | VY | VZ | POPFACE1 | POPFACE2 | POPFACE3 | POPFACE4 | POPFACE5 | POPFACE6 |
|----|----|----|----------|----------|----------|----------|----------|----------|
| .9 | .5 | .5 | .8 | .1 | .23 | .45 | .64 | .53 |
| .7 | .5 | .5 | .75 | .3 | .28 | .48 | 56 | .59 |
| .5 | .5 | .5 | .65 | .56 | .29 | .50 | .50 | .6 |
| .3 | .5 | .5 | .53 | .6 | .33 | .60 | .4 | .75 |
| .2 | .5 | .5 | .33 | .74 | .23 | .80 | .33 | .85 |
| .1 | .5 | .5 | .21 | .8 | .23 | .85 | .25 | .88 |
| .0 | .5 | .5 | 0.0 | .85 | .23 | .90 | .15 | .90 |

FIG. 36B

```
struct DeltaGplussubmesh
{
int trianglecount;   // number of triangles in the submesh
int vertexcount;     // number of vertices in the submesh
int edgecount;       // number of edges in the submesh Triangle* trianglep;  // array of trianglecount triangles which indexes vertex and edge arrays below
Vertex* vertexp;      // array of vertexcount vertices
Edge* edgep;          // array of edgecount edges
};

int DeltaGplussubmesh_subpackets[10][5];// 2D array of indices to an array of DeltaGplussubmesh data
                                //structures
                                        // DeltaGplussubmesh[M][N] where:
                                        // M indicates one of 10 subpackets for the packet
                                        // N incidates one of 5 levels-of-detail
```

FIG. 41

DELIVERING AND CONTROLLING STREAMING INTERACTIVE MEDIA COMPRISING RENDERED GEOMETRIC, TEXTURE AND LIGHTING DATA

CROSS REFERENCE TO RELATED APPLICATIONS

This application claims the benefit of the earlier filing date of PCT patent application number PCT/US2011/042309 entitled "System and Method of From-Region Visibility Determination and Delta-PVS based Content Streaming Using Conservative Linearized Umbral Event Surfaces" and filed on Jun. 29, 2011, which claims the benefit of the earlier filing date of U.S. Provisional Application 61/360,283, filed on Jun. 30, 2010, the entirety of each of which is incorporated herein by reference. This application claims the benefit of the earlier filing date of U.S. Provisional Application 61/382,056 entitled "System and Method of Delivering and Controlling Streaming Interactive Media Comprising Predetermined Packets of Geometric, Texture, Lighting and Other Data Which are Rendered on a Receiving Device" and filed on Sep. 13, 2010, the entirety of which is incorporated herein by reference. This application further claims the benefit of the earlier filing date of U.S. Provisional Application 61/384,284 entitled "System and Method of Recording and Using Clickable Advertisements Delivered as Streaming Interactive Media" and filed on Sep. 19, 2010, the entirety of which is incorporated herein by reference. This application further claims the benefit of the earlier filing date of U.S. Provisional Application 61/452,330 entitled "System and Method of Controlling Visibility-Based Geometry and Texture Streaming for Interactive Content Delivery" and filed on Mar. 14, 2011, the entirety of which is incorporated herein by reference. This application further claims the benefit of the earlier filing date of U.S. Provisional Application 61/474,491 entitled "System and Method of Protecting Game Engine Data Formats and Visibility Event Codec Formats Employing an Application Programming Interface Between the Game Engine and the Codec" and filed on Apr. 12, 2011, the entirety of which is incorporated herein by reference. This application also claims the benefit of the earlier filing date of U.S. Provisional Application 61/476,819 entitled "System and Method of Delivering Targeted, Clickable, Opt-Out or Opt-in Advertising as a Unique, Visibility Event Stream for Games and Streaming Interactive Media" and filed on Apr. 19, 2011, the entirety of which is incorporated herein by reference.

BACKGROUND OF THE INVENTION

Field of the Invention

This invention relates to a method and system for sending and controlling streaming interactive content comprising prefetched packets of geometric, lighting, and other information which is rendered by a receiving device.

Description of Background

The method of transmitting interactive content as single-frame packets of geometry, texture, lighting and other data which is rendered in real-time on a client or receiver device is described in U.S. Pat. Nos. 6,057,847 and 6,111,582. In these methods the single-frame packets are generated in real-time using the method of primitive reprojection.

The method of transmitting interactive content as prefetched packets of geometry, texture, and other information, in which the prefetched packets correspond to delta-PVS (potentially visible set), also called visibility event information, is described in the PCT patent application number PCT/US2011/042309, the entire contents of which are incorporated herein by reference. In this method, the packets contain information representing newly visible graphic elements as well as information indicating newly occluded graphic elements. This information is organized as delta-PVS or visibility event packets, wherein each packet contains information reflecting graphics elements that become potentially newly visible or newly invisible as a viewpoint moves from one viewcell to another. In this method, the packets are not generated in real-time but instead pre-computed using a method of from-viewcell visibility precomputation, and related methods of compression to encode the packets. At runtime, the packets are prefetched to the client rendering device using navigation-based speculative prefetch driven by the viewer's current and predicted viewpoint location in a set of viewcells that represent navigable regions of a model. Together, the methods of PCT patent application number PCT/US2011/042309 comprise an efficient codec for the streaming delivery of interactive content such as video games.

The codec of PCT patent application number PCT/US2011/042309 can also deliver content that is not necessarily interactive. In this use of the codec, camera position and direction is not interactively controlled by the user, but is determined by one or more scripted camera motion paths. This approach allows the codec to deliver scripted, non-interactive content which, of course, may include animated characters and other scripted dynamic effects. Applied in this way, the codec streams content that effectively corresponds to a conventional, non-interactive animated sequence. As detailed in PCT patent application number PCT/US2011/042309, this codec can deliver the information used to generate the corresponding image sequence at very high resolutions using a lower bandwidth to directly transmitting the image sequence using image-based codecs such as MPEG-4 or the real-time image compression method used by the OnLive corporation.

Broadband digital service providers such as cable and satellite television companies constantly seek ways to increase the amount of content that they can deliver using the bandwidth that is available. The codec of PCT patent application number PCT/US2011/042309, when delivering a unidirectional data stream driven by a scripted camera motion path as previously described, can be used to deliver the same compelling story, visual, and audio experience as conventional high-def video, but at a lower bandwidth than video.

Most adults do not play modern shooter or action games such as Call of Duty Modern Warfare 2, Assassin's Creed, Crysis, Bioshock 2 etc. Yet these types of games can often provide a compelling story, visual and audio experience that focus groups of older adults enjoy watching. But in their pure game form, this content often demands too much interaction and can be tiring to play to completion or even to the next "level" or episode of the game.

Thus, there is a need for an efficient content delivery method which provides conventional, non-interactive or passive high-definition video experience while providing viewers the option of switching between the passive video-like experience and an interactive game-like experience on-demand.

Prefetch is a general method of data delivery which hides latency or improves hit rate by pre-sending data to a client unit before it is actually needed by the client unit. As specified in the co-pending application PCT patent application number PCT/US2011/042309, in the context of visibility event data streaming, specific prefetch methods are used to decrease the chance of late packet arrival which would otherwise cause noticeable visibility errors during the streamed visualization.

In general, regardless of the application, prefetch increases the amount of data streamed, since inevitably more data is delivered to a client unit than will actually be used. Rules and algorithms for optimal prefetching and caching in general applications are given by Pei Cao, (Cao, P, Application-Controlled File Caching and Prefetching. PhD Dissertation, Princeton University, January, 1996, the entire contents of which are incorporated herein by reference.) Cao's aggressive and conservative prefetch algorithms provide methods of minimizing the elapsed time of a known sequence of references.

Wu et al. (Wu, B., Kshemkalyani, D., Object-Greedy Algorithms for Long-Term Web Prefetching, Proceedings of the IEEE Conference on Network Computing and Applications, 2004 pp. 61-68, the entire contents of which are incorporated herein by reference) has developed an algorithm which provides a local solution for prefetching, which balances the increased hit rate benefit of prefetching with the cost of increased bandwidth consumption incurred by prefetch of long-term general-purpose web page content.

In 2003, Chim et al. (Jimmy Chim, Rynson W. H. Lau, Hong Va Leong, and Antonio Si, CyberWalk: A Web-Based Distributed Virtual Walkthrough Environment, iEEE TRANSACTIONS ON MULTIMEDIA, VOL. 5, NO. 4, DECEMBER 2003, the entire contents of which are incorporated herein by reference) described basic methods of prefetching graphics elements during a walkthrough application. The Cyberwalk system of Chim et al. prefetches graphics objects based on a viewer's proximity to the objects. Chim et al. describe three methods of predicting a user's future location given past current locations. These methods are based on a moving average of past locations and include mean, windowed, and exponential weighted moving averages of past motion vectors. These motion prediction methods do not explicitly take into account limits of velocity or acceleration of viewer motion, nor do they account for navigational restrictions within the environment. Both of these types of limitations could be employed to increase the predictability of navigation and thereby increase the hit rate and/or lower the bandwidth requirement of navigation-based prefetch.

The prefetch method of Chim et al. are based on proximity of the viewer to the graphics objects. As shown in the co-pending PCT patent application number PCT/US2011/042309, visibility is a more efficient basis of navigation-based prefetch than proximity. This is because objects which are in close proximity to a viewer may actually be occluded from the viewer and, conversely, objects that are far from a viewer may be unoccluded. Using visibility instead of proximity as a basis for prefetch requires a practical and precise method of from-region visibility precomputation, which is specified in the co-pending PCT patent application number PCT/US2011/042309.

SUMMARY

In exemplary embodiments, a method, conducted on a server, sends renderable graphics information to a client device, the graphics information including at least one set of graphics information visible from a second view region and not visible from a first view region. The method determines a likelihood that a viewpoint undergoes movement from said first view region to said second view region. The method further sends said at least one set of graphics information upon determination that the likelihood that the viewpoint undergoes movement from said first view region to said second view region is greater than a predetermined threshold, said movement determined according to a predetermined motion path.

In exemplary embodiments, a system sends renderable graphics information to a client device, said graphics information including at least one set of graphics information visible from a second view region and not visible from a first view region. The system includes a server having a processor configured to determine a likelihood that a viewpoint undergoes movement from said first view region to said second view region. The processor is further configured to send said at least one set of graphics information upon determination that the likelihood that the viewpoint undergoes movement from said first view region to said second view region is greater than a predetermined threshold, said movement determined according to a predetermined motion path. The system further includes said client device to display said at least one set of graphics information.

In exemplary embodiments, a non-transitory computer readable storage medium has executable instructions stored thereon, which when executed by a processor in a server causes the processor to execute a method for sending renderable graphics information to a client device, said graphics information including at least one set of graphics information visible from a second view region and not visible from a first view region. The method includes determining a likelihood that a viewpoint undergoes movement from said first view region to said second view region. The method further includes sending said at least one set of graphics information upon determination that the likelihood that the viewpoint undergoes movement from said first view region to said second view region is greater than a predetermined threshold, said movement determined according to a predetermined motion path.

In exemplary embodiments, a method, conducted on a server, sends renderable graphics information to a client device, said graphics information including at least one set of graphics information visible from a second view region and not visible from a first view region. The method includes determining a likelihood that a viewpoint undergoes movement from said first view region to said second view region. The method further includes sending said at least one set of graphics information upon determination that the likelihood that the viewpoint undergoes movement from said first view region to said second view region is greater than a predetermined threshold, said movement determined according to user input to said client device.

In exemplary embodiments, a system sends renderable graphics information to a client device, said graphics information including at least one set of graphics information visible from a second view region and not visible from a first view region. The system includes a server having a processor configured to determine a likelihood that a viewpoint undergoes movement from said first view region to said second view region. The processor is further configured to send said at least one set of graphics information upon determination that the likelihood that the viewpoint undergoes movement from said first view region to said second view region is greater than a predetermined threshold, said movement determined according to user input to said client device. The system further includes said client device to display said at least one set of graphics information.

In exemplary embodiments, a non-transitory computer readable storage medium has executable instructions stored thereon, which when executed by a processor in a server causes said processor to execute a method for sending renderable graphics information to a client device, said graphics information including at least one set of graphics information visible from a second view region and not visible from a first view region. The method includes determining a likelihood that a viewpoint undergoes movement from said first view region to said second view region. The method further includes sending said at least one set of graphics information upon determination that the likelihood that the viewpoint undergoes movement from said first view region to said second view region is greater than a predetermined threshold, said movement determined according to user input to said client device.

In exemplary embodiments, a method, conducted on a server, sends renderable graphics information to a client device, said graphics information including a first set of graphics information visible from a second view region and not visible from a first view region, and said graphics information including a second set of graphics information visible from said second view region and not visible from said first view region, said second set of graphics information including graphics information representing advertising. The method includes sending said first set of graphics information upon determination that a likelihood that a viewpoint moves from said first view region to said second view region is greater than a predetermined movement threshold, said movement determined according to a predetermined motion path. The method further includes sending said second set of graphics information upon determination that the likelihood that the viewpoint moves from said first view region to said second view region is greater than the predetermined movement threshold, said movement determined according to the predetermined motion path, and upon determination that a maximum available transmission bandwidth from said server to said client device exceeds a predetermined bandwidth threshold.

In exemplary embodiments, a system sends renderable graphics information to a client device, said graphics information including a first set of graphics information visible from a second view region and not visible from a first view region, and said graphics information including a second set of graphics information visible from said second view region and not visible from said first view region, said second set of graphics information including graphics information representing advertising. The system includes a server having a processor configured to send said first set of graphics information upon determination that a likelihood that a viewpoint moves from said first view region to said second view region is greater than a predetermined movement threshold, said movement determined according to a predetermined motion path. The processor is further configured to send said second set of graphics information upon determination that the likelihood that the viewpoint moves from said first view region to said second view region is greater than the predetermined movement threshold, said movement determined according to the predetermined motion path, and upon determination that a maximum available transmission bandwidth from said server to said client device exceeds a predetermined bandwidth threshold. The system further includes said client device configured to display said first set of graphics information or said second set of graphics information.

In exemplary embodiments, a non-transitory computer readable storage medium has executable instructions stored thereon, which when executed by a processor in a server causes said processor to execute a method for sending renderable graphics information to a client device, said graphics information including a first set of graphics information visible from a second view region and not visible from a first view region, and said graphics information including a second set of graphics information visible from said second view region and not visible from said first view region, said second set of graphics information including graphics information representing advertising. The method includes sending said first set of graphics information upon determination that a likelihood that a viewpoint moves from said first view region to said second view region is greater than a predetermined movement threshold, said movement determined according to a predetermined motion path. The method further includes sending said second set of graphics information upon determination that the likelihood that the viewpoint moves from said first view region to said second view region is greater than the predetermined movement threshold, said movement determined according to the predetermined motion path, and upon determination that a maximum available transmission bandwidth from said server to said client device exceeds a predetermined bandwidth threshold.

In exemplary embodiments, a method, conducted on a server, sends renderable graphics information representing an actual environment as a modeled environment to a client device, said graphics information including at least one first set of graphics information visible from a second view region and not visible from a first view region. The method includes receiving data, said data including information conveying position or velocity of said client device. The method further includes sending said at least one first set of graphics information to the client device upon determination that a likelihood that said position changes from said first view region to said second view region is greater than a predetermined movement threshold.

In exemplary embodiments, a system to send renderable graphics information representing an actual environment as a modeled environment to a client device, said graphics information including at least one first set of graphics information visible from a second view region and not visible from a first view region. The system includes a server having a processor configured to receive data, said data including information conveying position or velocity of said client device. The processor is further configured to send said at least one first set of graphics information to the client device upon determination that a likelihood that said position changes from said first view region to said second view region is greater than a predetermined movement threshold. The system further includes said client device configured to display said at least one first set of graphics information.

In exemplary embodiments, a non-transitory computer readable storage medium having executable instructions stored thereon, which when executed by a processor in a server causes the processor to perform a method for sending renderable graphics information representing an actual environment as a modeled environment to a client device, said graphics information including at least one first set of graphics information visible from a second view region and not visible from a first view region. The method includes receiving data, said data including information conveying position or velocity of said client device. The method further includes sending said at least one first set of graphics information to the client device upon determination that a likelihood that said position changes from said first view region to said second view region is greater than a predetermined movement threshold.

In exemplary embodiments, a method, conducted on a server, of sending renderable graphics information to a client device, said graphics information including at least one first set of graphics information visible from a second view region and not visible from a first view region, and at least one second set of graphics information visible from a fourth view region and not visible from a third view region. The method includes determining a first probability that a viewpoint changes position from said first view region to said second view region using data received from said client device, said received data including user input to said client device, said user input controlling the viewpoint position of said client device. The method further includes determining a second probability that the viewpoint changes position from said third view region to said fourth view region, using data received from said client device, said received data including user input to said client device, said user input controlling said viewpoint position of said client device. The method further includes sending said at least one first set of graphics information at a first rate, said first rate determined as a function of said first probability. The method also includes sending said at least one second set of graphics information at a second rate, said second rate determined as a function of said second probability.

In exemplary embodiments, a system to send renderable graphics information to a client device, said graphics information including at least one first set of graphics information visible from a second view region and not visible from a first view region, and at least one second set of graphics information visible from a fourth view region and not visible from a third view region. The system includes a server having a processor configured to determine a first probability that a viewpoint changes position from said first view region to said second view region using data received from said client device, said received data including user input to said client device, said user input controlling the viewpoint position of said client device. The processor is further configured to determine a second probability that the viewpoint changes position from said third view region to said fourth view region, using data received from said client device, said received data including user input to said client device, said user input controlling said viewpoint position of said client device. The processor is further configured to send said at least one first set of graphics information at a first rate, said first rate determined as a function of said first probability. The processor also is further configured to send said at least one second set of graphics information at a second rate, said second rate determined as a function of said second probability. The system further includes said client device configured to display said at least one first set of graphics information or said at least one second set of graphics information.

A non-transitory computer readable storage medium having instructions stored thereon, which when executed by a processor in a server causes the processor to perform a method for sending renderable graphics information to a client device, said graphics information including at least one first set of graphics information visible from a second view region and not visible from a first view region, and at least one second set of graphics information visible from a fourth view region and not visible from a third view region. The method includes determining a first probability that a viewpoint changes position from said first view region to said second view region using data received from said client device, said received data including user input to said client device, said user input controlling the viewpoint position of said client device. The method further includes determining a second probability that the viewpoint changes position from said third view region to said fourth view region, using data received from said client device, said received data including user input to said client device, said user input controlling said viewpoint position of said client device. The method further includes sending said at least one first set of graphics information at a first rate, said first rate determined as a function of said first probability. The method also includes sending said at least one second set of graphics information at a second rate, said second rate determined as a function of said second probability.

In exemplary embodiments, a method, conducted on a server, sends graphics information representing, as a modeled environment, an actual environment to a client device, said graphics information including at least one first set of graphics information visible from a second view region and not visible from a first view region. The method includes receiving data including information conveying a position or velocity of said client device, said received data determined using three dimensional map-matching, said three dimensional map-matching using said graphics information representing, as said modeled environment, said actual environment. The method further includes sending said at least one first set of graphics information to the client device upon determination that a likelihood that said position changes from said first view region to said second view region is greater than a predetermined movement threshold.

In exemplary embodiments, a system to send graphics information representing, as a modeled environment, an actual environment to a client device, said graphics information including at least one first set of graphics information visible from a second view region and not visible from a first view region. The system includes a server having a processor configured to receive data including information conveying a position or velocity of said client device, said received data determined using three dimensional map-matching, said three dimensional map-matching using said graphics information representing, as said modeled environment, said actual environment. The processor is further configured to send said at least one first set of graphics information to the client device upon determination that a likelihood that said position changes from said first view region to said second view region is greater than a predetermined movement threshold. The system further includes said client device configured to display said at least one first set of graphics information.

In exemplary embodiments, a non-transitory computer readable storage medium has executable instructions stored thereon, which when executed by a processor in a server causes the processor to perform a method for sending graphics information representing, as a modeled environment, an actual environment to a client device, said graphics information including at least one first set of graphics information visible from a second view region and not visible from a first view region. The method includes receiving data including information conveying a position or velocity of said client device, said received data determined using three dimensional map-matching, said three dimensional map-matching using said graphics information representing, as said modeled environment, said actual environment. The method further includes sending said at least one first set of graphics information to the client device upon determination that a likelihood that said position changes from said first view region to said second view region is greater than a predetermined movement threshold.

In exemplary embodiments, a method, conducted on a server, for controlling navigation-based pre-fetch sending of graphics information to a client device, said graphics information including at least one first set of graphics information visible from a second view region and not visible from a first view region. The method includes determining a first period during which said first set of graphics information will arrive after said client device is scheduled to access said first set of graphics information on said client device. The method further includes sending instructions to said client device which prevent navigation into said second view region during said first period.

In exemplary embodiments, a system to control navigation-based pre-fetch sending of graphics information to a client device, said graphics information including at least one first set of graphics information visible from a second view region and not visible from a first view region. The system includes a server having a processor configured to determine a first period during which said first set of graphics information will arrive after said client device is scheduled to access said first set of graphics information on said client device. The processor is further configured to send instructions to said client device which prevent navigation into said second view region during said first period. The system further includes said client device to receive said instructions.

In exemplary embodiments, a non-transitory computer readable storage medium having executable instructions stored thereon, which when executed by a processor in a server causes the processor to perform a method for controlling navigation-based pre-fetch sending of graphics information to a client device, said graphics information including at least one first set of graphics information visible from a second view region and not visible from a first view region. The method includes determining a first period during which said first set of graphics information will arrive after said client device is scheduled to access said first set of graphics information on said client device. The method further includes sending instructions to said client device which prevent navigation into said second view region during said first period.

In exemplary embodiments, a method, conducted on a server, for controlling navigation-based pre-fetch sending of graphics information to a client device, said graphics information including a first set of graphics information visible from a second view region and not visible from a first view region, and said graphics information including a second set of graphics information visible from said second view region and not visible from said first view region, said second set of graphics information having a lower level-of-detail than said first set of graphics information. The method includes determining a first period during which said first set of graphics information will arrive after said client device is scheduled to access said first set of graphics information on said client device. The method further includes sending said second set of graphics information during said first period. The method also includes sending instructions to said client device, during said first period, said instructions including instructions for causing rendering of at least one obscuring object in viewport regions containing the projection of said second set of graphics information.

In exemplary embodiments, a system to control navigation-based pre-fetch sending of graphics information to a client device, said graphics information including a first set of graphics information visible from a second view region and not visible from a first view region, and said graphics information including a second set of graphics information visible from said second view region and not visible from said first view region, said second set of graphics information having a lower level-of-detail than said first set of graphics information. The system further includes a server having a processor configured to determine a first period during which said first set of graphics information will arrive after said client device is scheduled to access said first set of graphics information on said client device. The processor is further configured to send said second set of graphics information during said first period. The processor is further configured to send instructions to said client device, during said first period, said instructions including instructions for causing rendering of at least one obscuring object in viewport regions containing the projection of said second set of graphics information. The system further includes said client device configured to display said second set of graphics and receive said instructions.

In exemplary embodiments, a non-transitory computer readable storage medium having executable instructions stored thereon, which when executed by a processor in a server causes the processor to perform a method for controlling navigation-based pre-fetch sending of graphics information to a client device, said graphics information including a first set of graphics information visible from a second view region and not visible from a first view region, and said graphics information including a second set of graphics information visible from said second view region and not visible from said first view region, said second set of graphics information having a lower level-of-detail than said first set of graphics information. The method includes determining a first period during which said first set of graphics information will arrive after said client device is scheduled to access said first set of graphics information on said client device. The method further includes sending said second set of graphics information during said first period. The method also includes sending instructions to said client device, during said first period, said instructions including instructions for causing rendering of at least one obscuring object in viewport regions containing the projection of said second set of graphics information.

In exemplary embodiments, a method, conducted on a server, of sending renderable graphics information to a client device, said graphics information including at least one first set of graphics information visible from a second view region and not visible from a first view region, and at least one second set of graphics information visible from a third view region and not visible from said first view region. The method includes determining a first probability that a viewpoint changes position from said first view region to said second view region using data received from said client device, said received data including user input controlling the viewpoint position. The method further includes determining a second probability that the viewpoint changes position from said first view region to said third view region using data received from said client device, said received data including user input controlling the viewpoint position. The method further includes increasing said first probability as a function of a distance of said second view region to a defined navigational path. The method further includes increasing said second probability as a function of a distance of said third view region to a defined navigational path. The further includes sending said at least one first set of graphics information at a first rate, said first rate determined as a function of said first probability. The method also includes sending said at least one second set of graphics information at a second rate, said second rate determined as a function of said second probability.

In exemplary embodiments, a system to send renderable graphics information to a client device, said graphics information including at least one first set of graphics information visible from a second view region and not visible from a first view region, and at least one second set of graphics information visible from a third view region and not visible from said first view region. The system includes a server having a processor configured to determine a first probability that a viewpoint changes position from said first view region to said second view region using data received from said client device, said received data including user input controlling the viewpoint position. The processor is further configured to determine a second probability that the viewpoint changes position from said first view region to said third view region using data received from said client device, said received data including user input controlling the viewpoint position. The processor is further configured to increase said first probability as a function of a distance of said second view region to a defined navigational path. The processor is further configured to increase said second probability as a function of a distance of said third view region to a defined navigational path. The processor is further configured to send said at least one first set of graphics information at a first rate, said first rate determined as a function of said first probability. The processor is further configured to send said at least one second set of graphics information at a second rate, said second rate determined as a function of said second probability. The system further includes said client device configured to display said at least one first set of graphics and said at least one second set of graphics.

In exemplary embodiments, a non-transitory computer readable storage medium having executable instructions stored thereon which when executed by a processor in a server causes the processor to perform a method for sending renderable graphics information to a client device, said graphics information including at least one first set of graphics information visible from a second view region and not visible from a first view region, and at least one second set of graphics information visible from a third view region and not visible from said first view region. The method includes determining a first probability that a viewpoint changes position from said first view region to said second view region using data received from said client device, said received data including user input controlling the viewpoint position. The method further includes determining a second probability that the viewpoint changes position from said first view region to said third view region using data received from said client device, said received data including user input controlling the viewpoint position. The method further includes increasing said first probability as a function of a distance of said second view region to a defined navigational path. The method further includes increasing said second probability as a function of a distance of said third view region to a defined navigational path. The further includes sending said at least one first set of graphics information at a first rate, said first rate determined as a function of said first probability. The method also includes sending said at least one second set of graphics information at a second rate, said second rate determined as a function of said second probability.

BRIEF DESCRIPTION OF THE DRAWINGS

FIG. 3 shows details of the step 110 in FIG. 1.

FIG. 4A gives additional detail of the process shown in step 116 of FIG. 1.

FIG. 10B is a view of the same polygon mesh as FIG. 10A and the same viewcell, but showing a set of UBPs forming a PAU.

FIG. 13A shows exemplary data structures employed by the method of labeled silhouette edges.

FIG. 13B is a continuation of FIG. 13A.

FIG. 13C is a continuation of FIG. 13B.

FIG. 13D is a continuation of FIG. 13B.

FIG. 25A is an exemplary diagram illustrating a top orthographic view of a modeled environment including two buildings a motorcycle and a billboard, hidden line view.

FIG. 27B is a diagram illustrating an exemplary embodiment of a data structure including work instructions for visibility event precomputation work to be completed by a client unit.

FIG. 27C is a diagram illustrating an exemplary embodiment of a data structure including completed work data for visibility event precomputation, completed by a client unit and sent to a server unit.

FIG. 27D is a diagram illustrating an exemplary embodiment of a data structure including information describing a proof-of-work token corresponding to a specific completed work packet for visibility event precomputation, completed by a client unit.

an additional or incremental fee for receiving the unique, fully interactive visibility event content stream from the visibility event decoder-server process and also illustrating the method of charging a client-user an additional fee for delivering a cash store object.

Figure 36A:
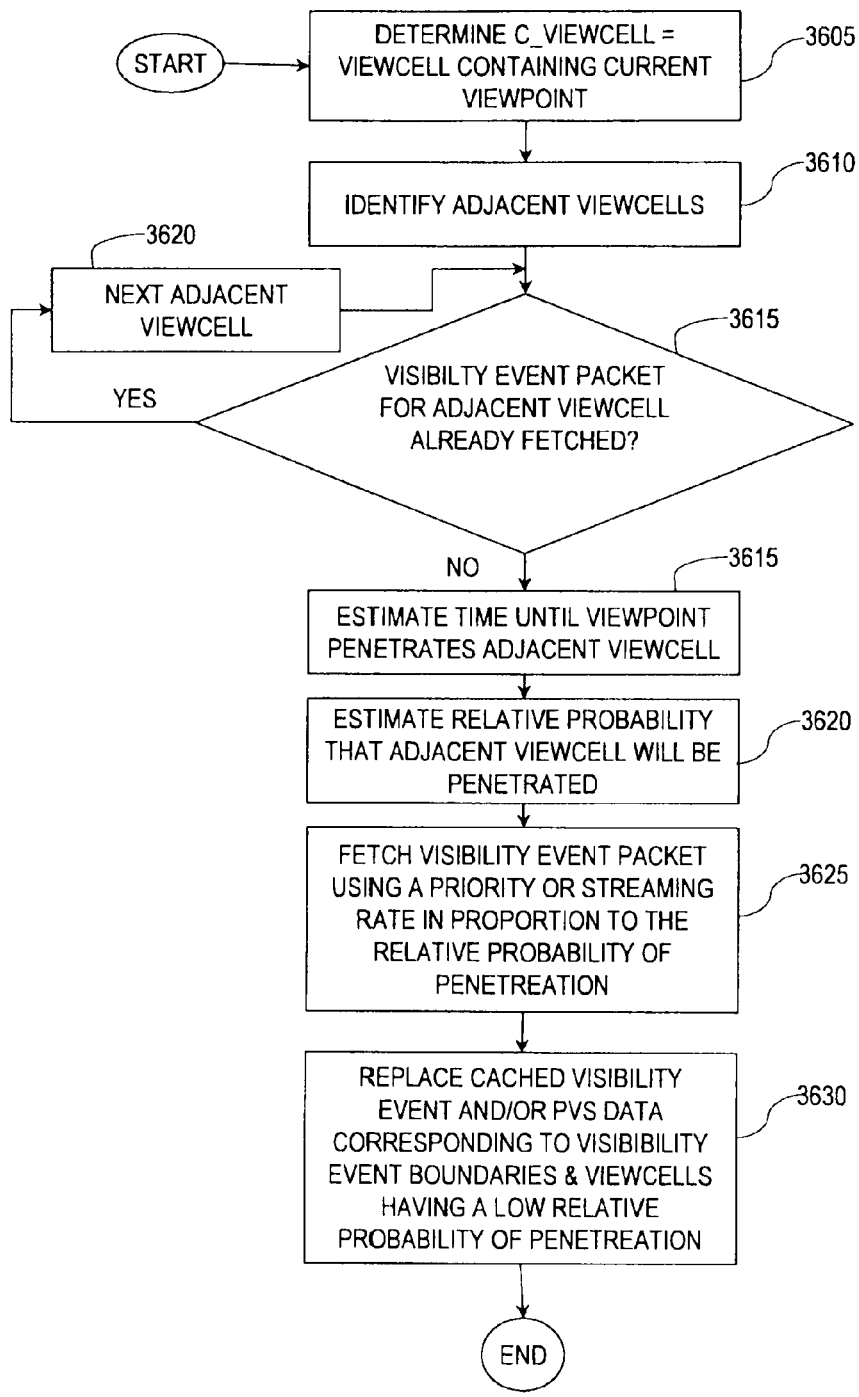

FIG. 36A is an exemplary flow diagram showing techniques for determining the probability that a viewcell will be penetrated, given a current viewpoint position and current states of velocity and acceleration vectors.

FIG. 36B is an exemplary sub-table representing a look-up table for the probability of penetration of viewcell's neighboring face-connected viewcells for a limited set of relative viewpoint velocity vectors.

Figure 37:
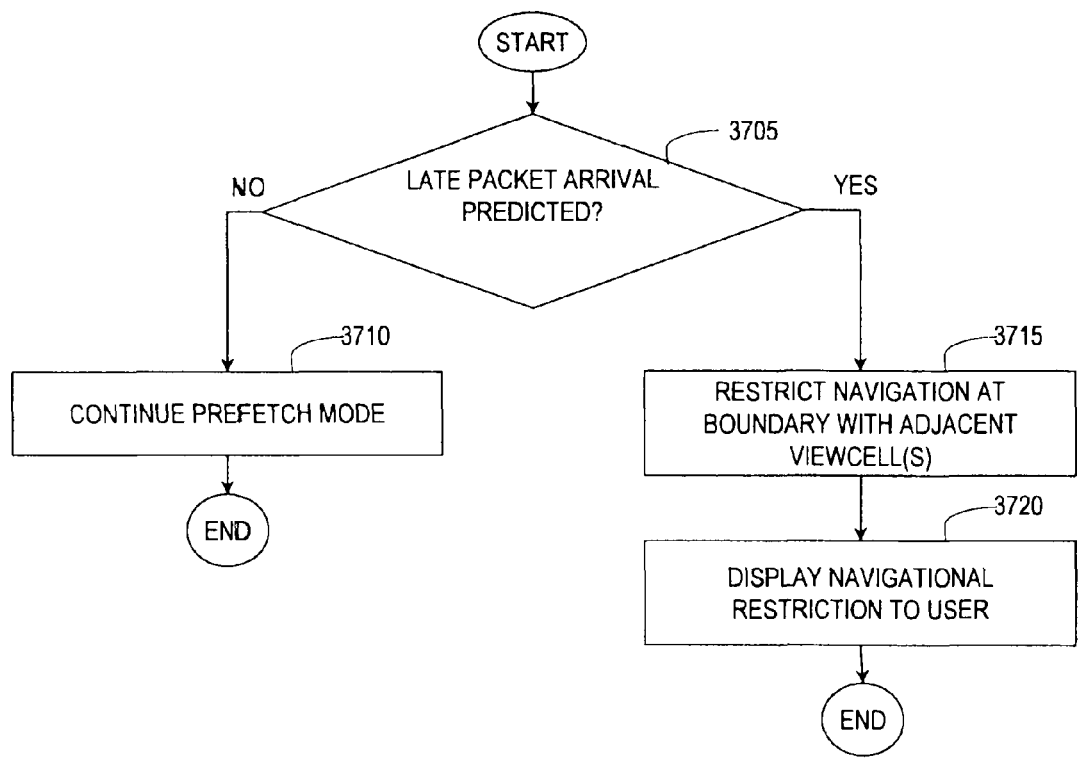

FIG. 37 is an exemplary flowchart showing a method of adaptively imposing navigational constraints during periods of possible late packet arrival.

Figure 38:
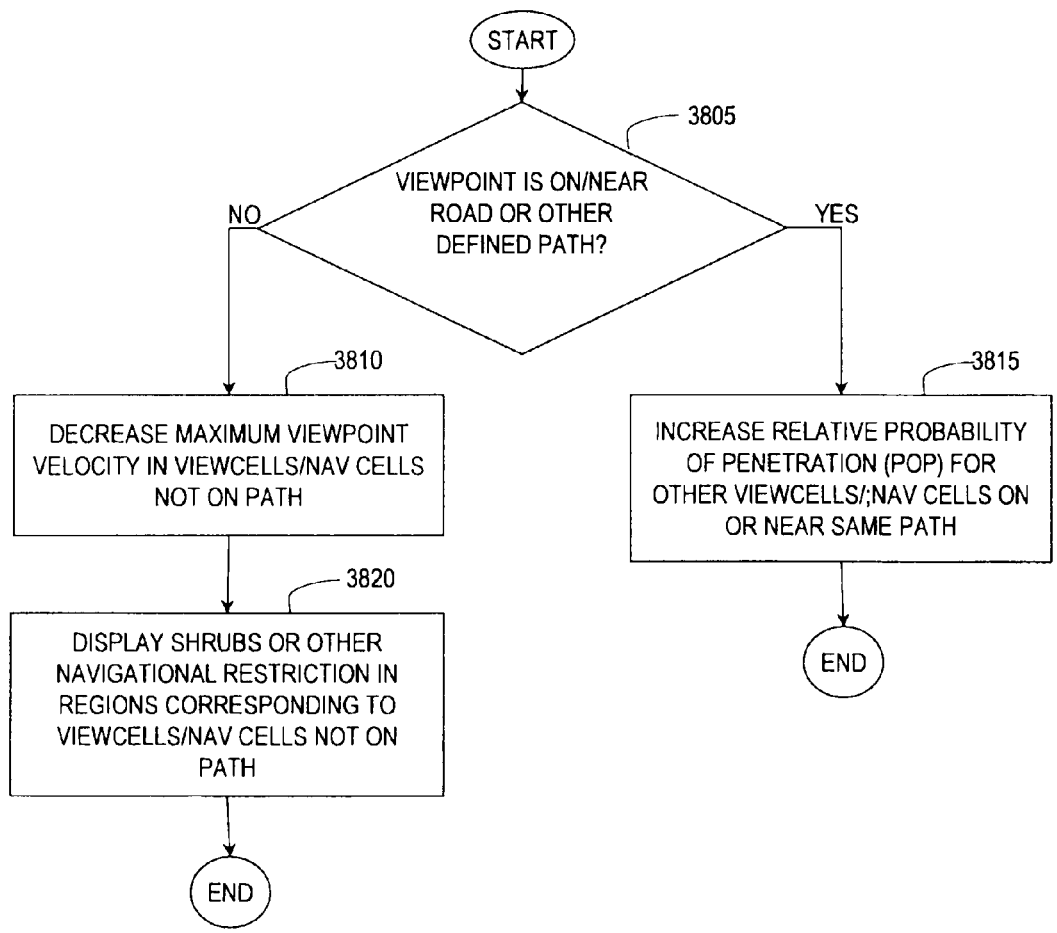

FIG. 38 is an exemplary flow diagram showing an alternate method of decreasing bandwidth requirement for visibility event (VE) packet streaming by preferentially prefetching VE packets that correspond to viewcells/navigation cells that are on a roadway or other path, if the actual viewpoint is located on or near the path.

Figure 39A:
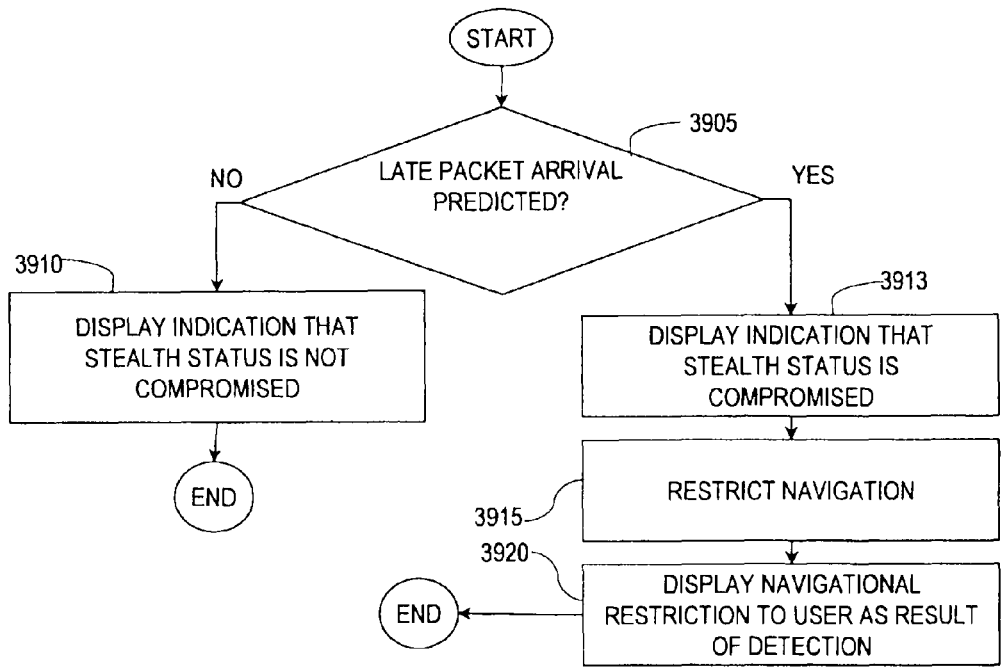

FIG. 39A is an exemplary flow diagram showing a method of imposing navigational constraints to prevent late packet arrival wherein the imposed navigational constraint is accompanied by a visual indication of loss of stealth, and the navigational constraint is caused as a result of this loss of stealth.

Figures 39B, 39C:
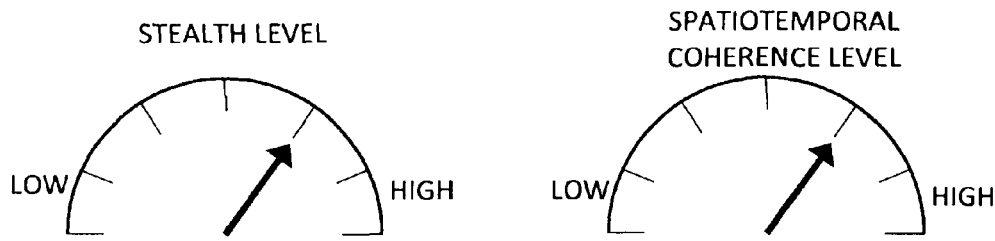

FIG. 39B is exemplary diagram showing, respectively a stealth meter that gives a client-user an indication of the probability of late visibility event packet arrival.

FIG. 39C are exemplary diagram showing a spatiotemporal coherence meter that gives a client-user an indication of the probability of late visibility event packet arrival.

Figure 40A:
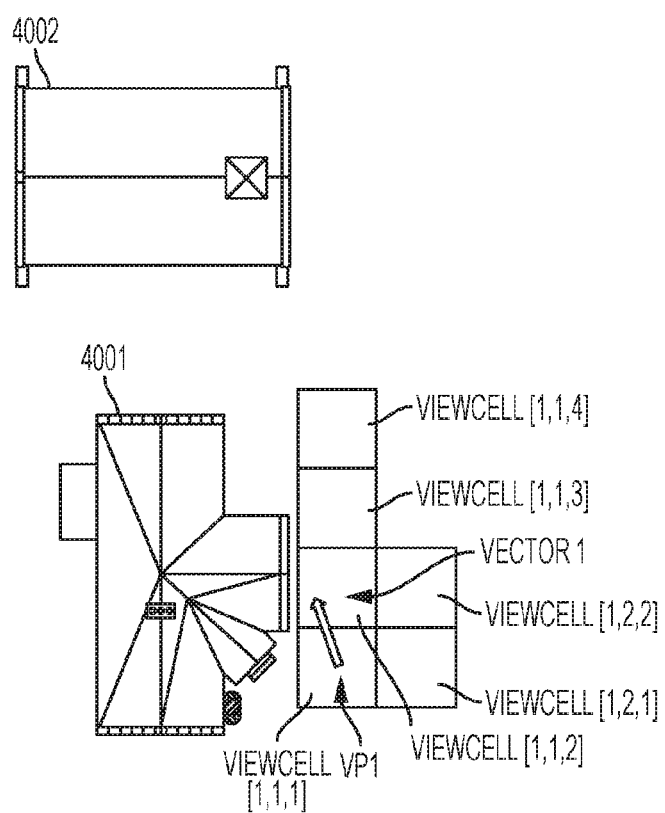

FIG. 40A is an exemplary top orthographic view of a modeled environment showing the viewcells corresponding to cached visibility event packets for a first current camera/viewpoint location.

Figure 40B:
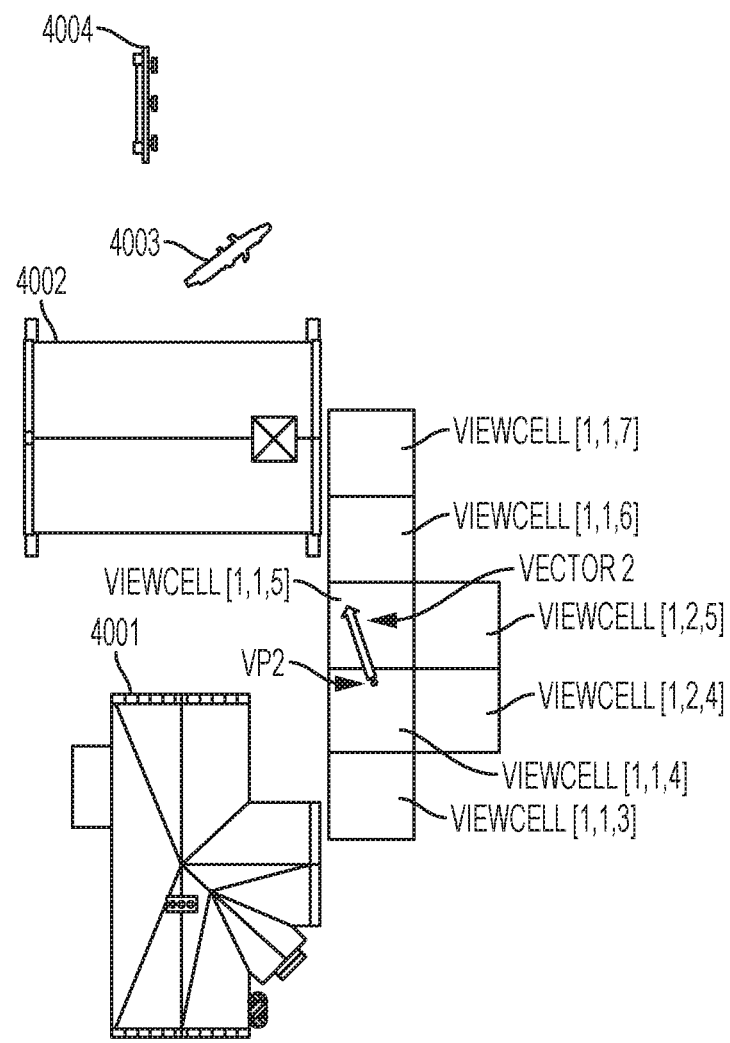

FIG. 40B is an exemplary top orthographic view of a modeled environment showing the viewcells corresponding to cached visibility event packets for a second current camera/viewpoint location.

Figure 40C:
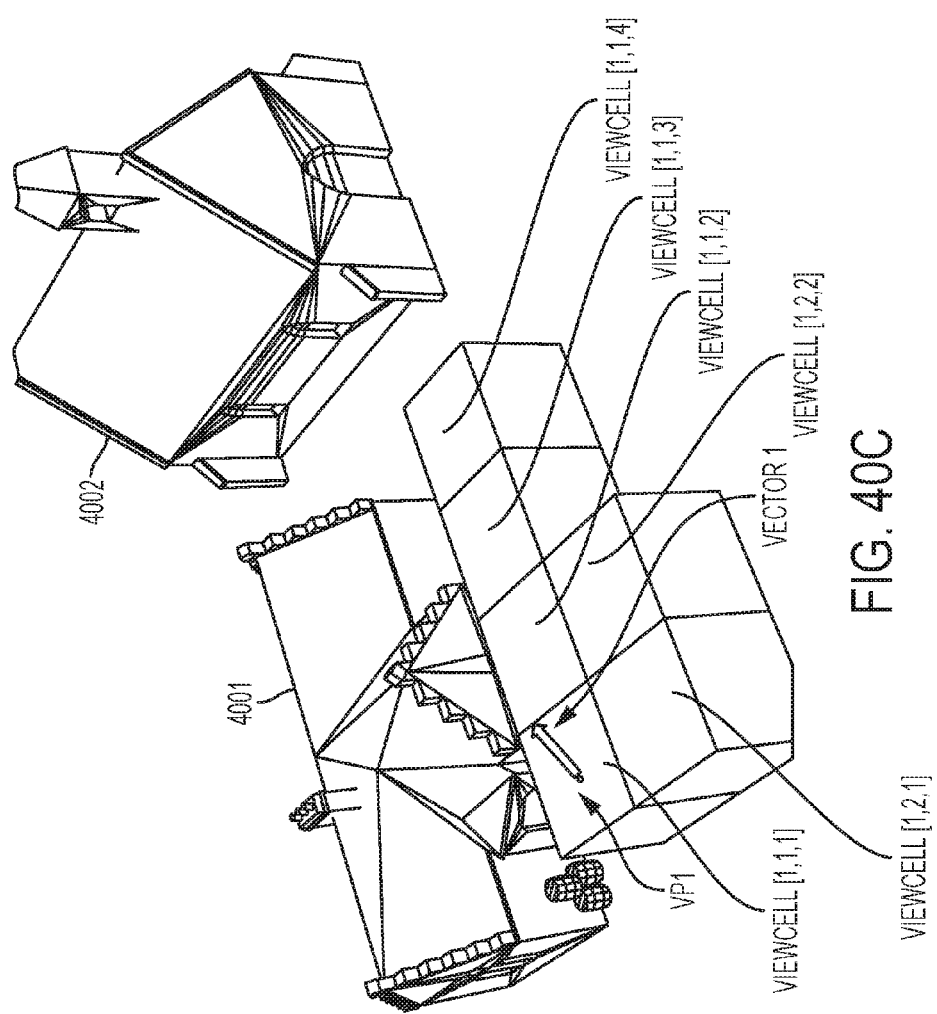

FIG. 40C is an exemplary perspective view of the same objects illustrated in FIG. 40A.

Figure 40D:
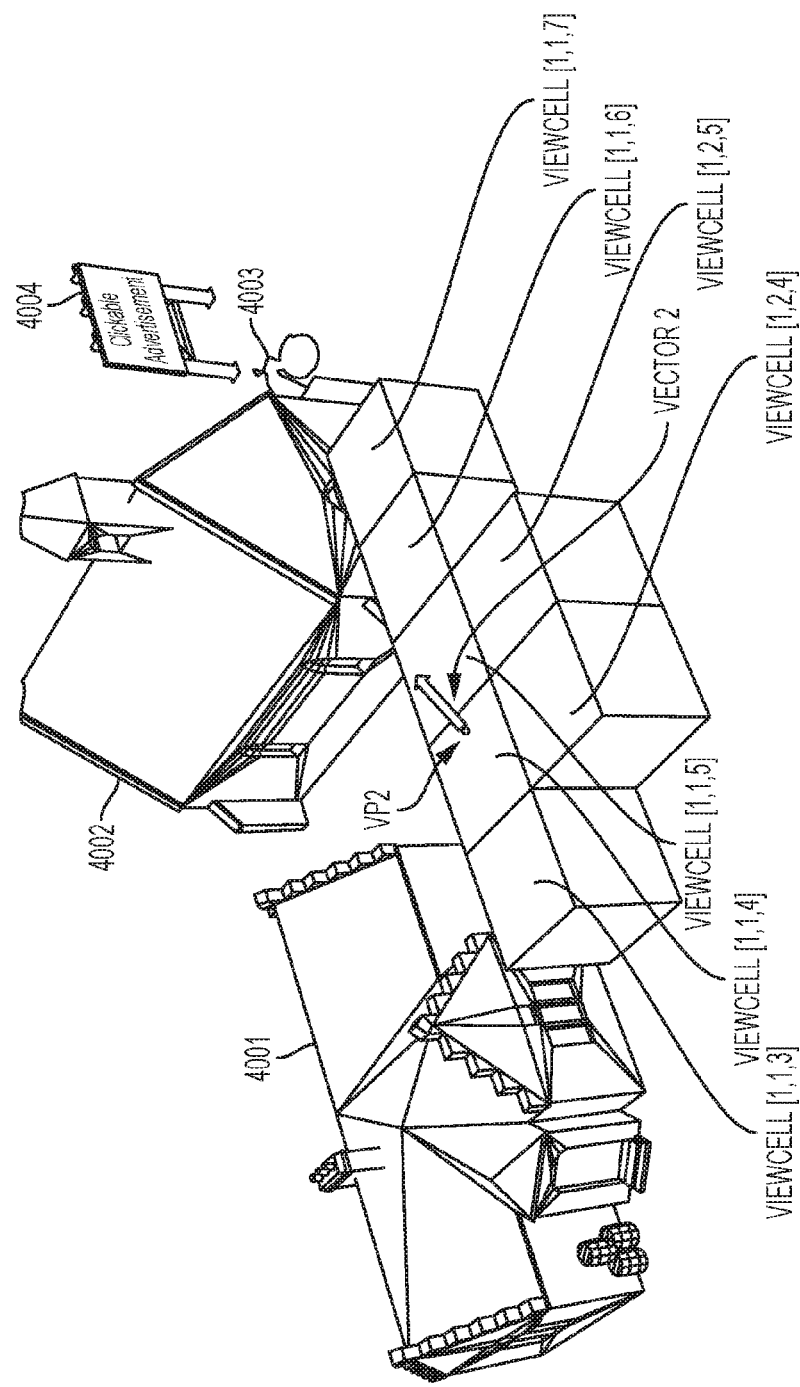

FIG. 40D is an exemplary perspective view of the same objects illustrated in FIG. 40B.

Figure 40E:
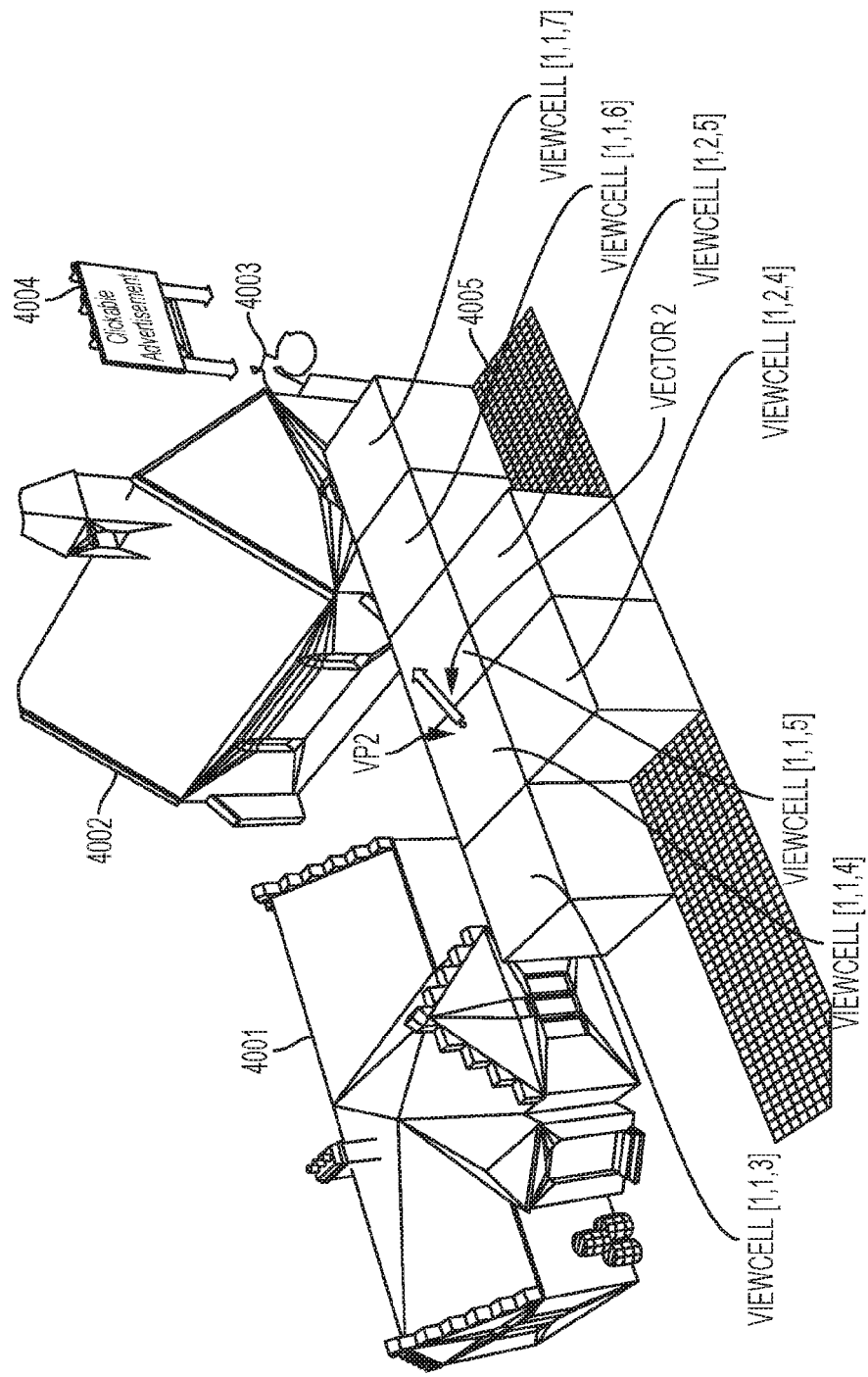

FIG. 40E is the same perspective view shown in FIG. 40D, and including a hatched ground region indicating a region of decreased navigability.

Figure 40F:
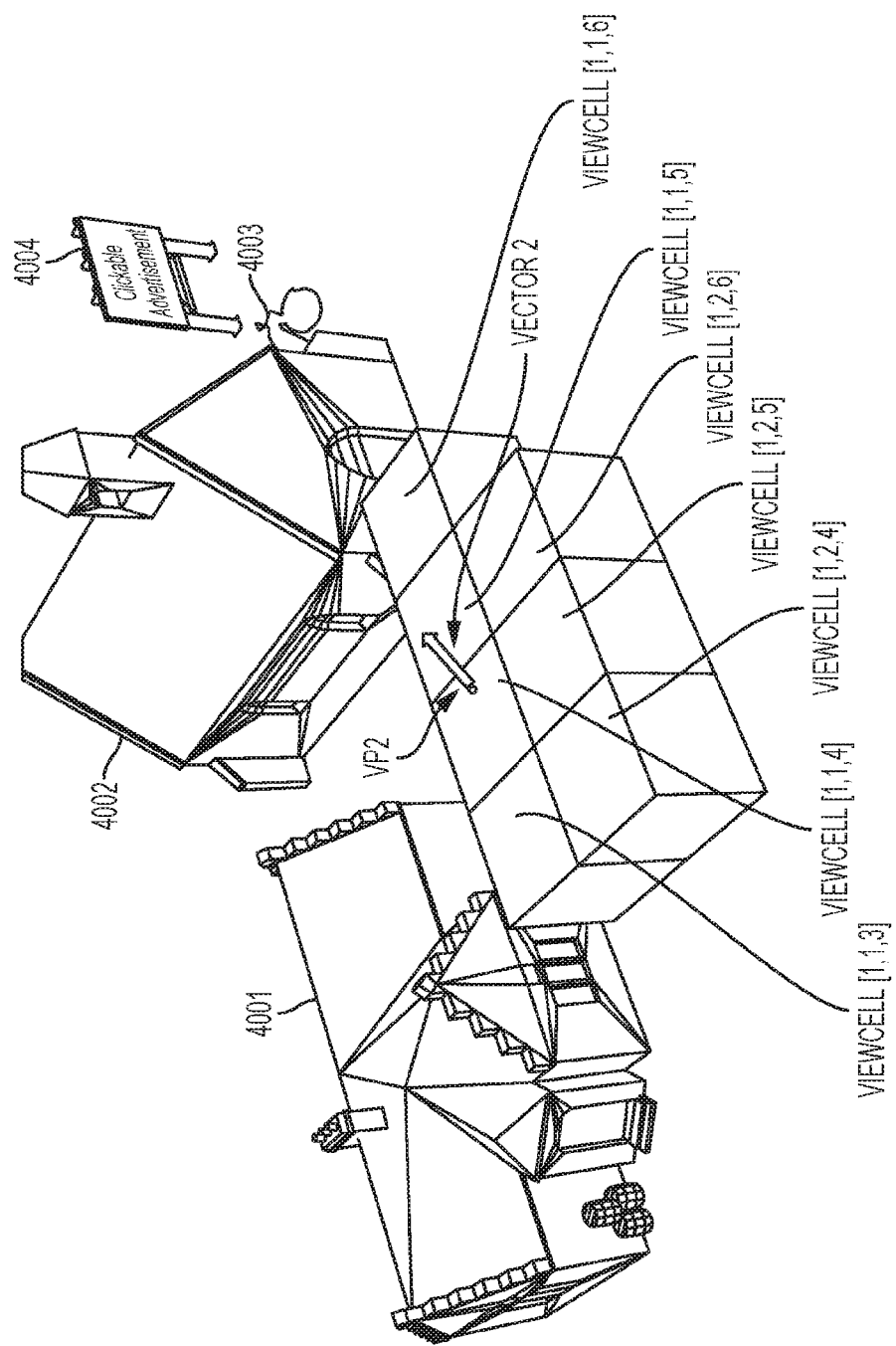

FIG. 40F is the same perspective view of the same modeled environment illustrated in FIG. 40E, but without the region of impeded navigability shown in FIG. 40E, and showing a different visibility event cache state.

FIG. 41 is an exemplary diagram showing data structures which store visibility event sub-packets using the DeltaG-plussubmesh exemplary data structure.

Figure 42A:
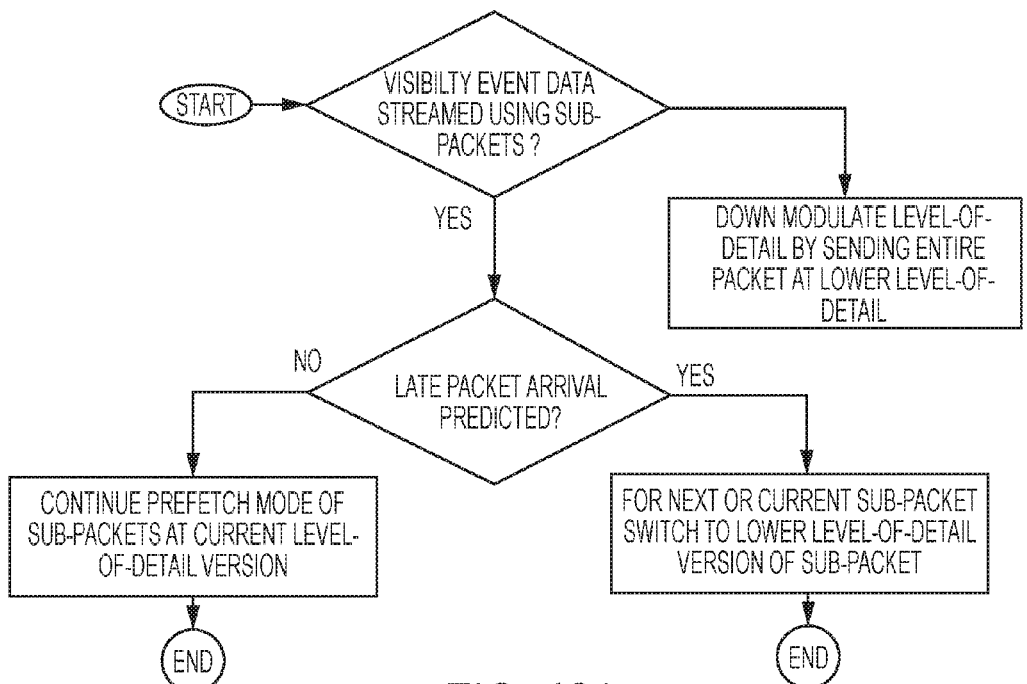

FIG. 42A is an exemplary flow diagram showing a variation of this method in which each visibility event packet is divided into sub-packets, with each sub-packet including a specific subset of the graphic elements (e.g., polygons and texture elements) that become visible during the corresponding viewcell transition.

Figure 42B:
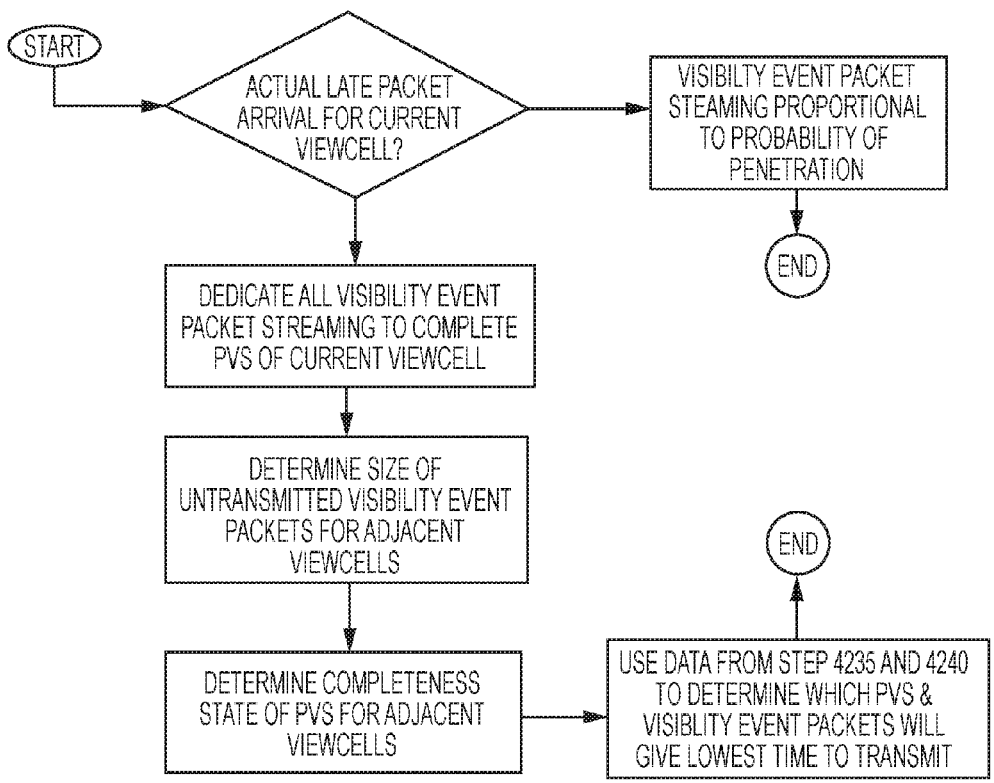

FIG. 42B is an exemplary flow diagram showing a method of mitigating actual late packet arrival by dedicating all available visibility event streaming and processing resources to complete the PVS of the current viewcell in the shortest possible time.

Figure 43:
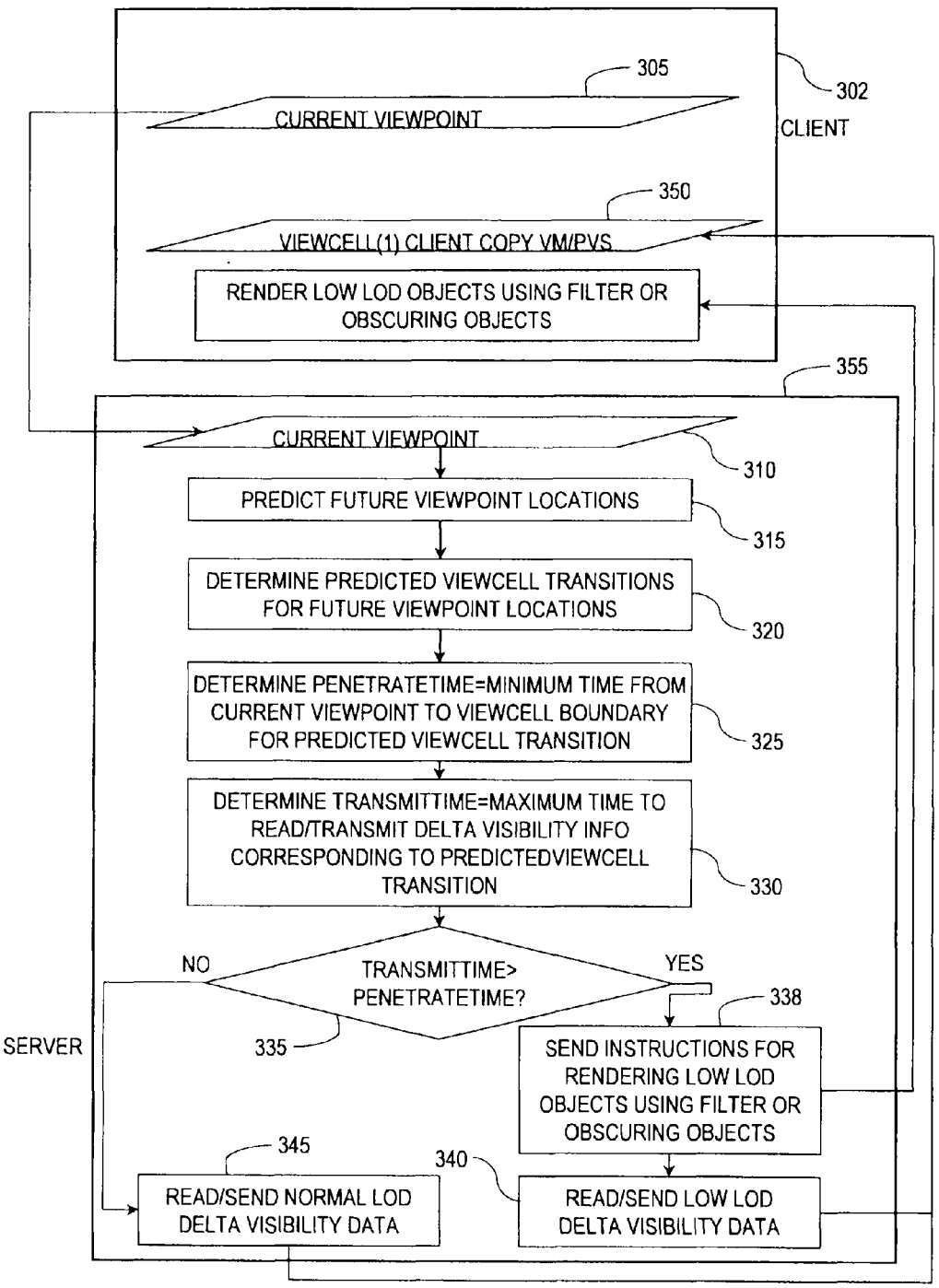

FIG. 43 is an exemplary block diagram/flowchart showing a server process sending reduced level-of-detail visibility event information in case of predicted late packet arrival and a client process rendering the reduced level-of-detail graphical information using a blurring filter or obscuring objects.

Figure 44:
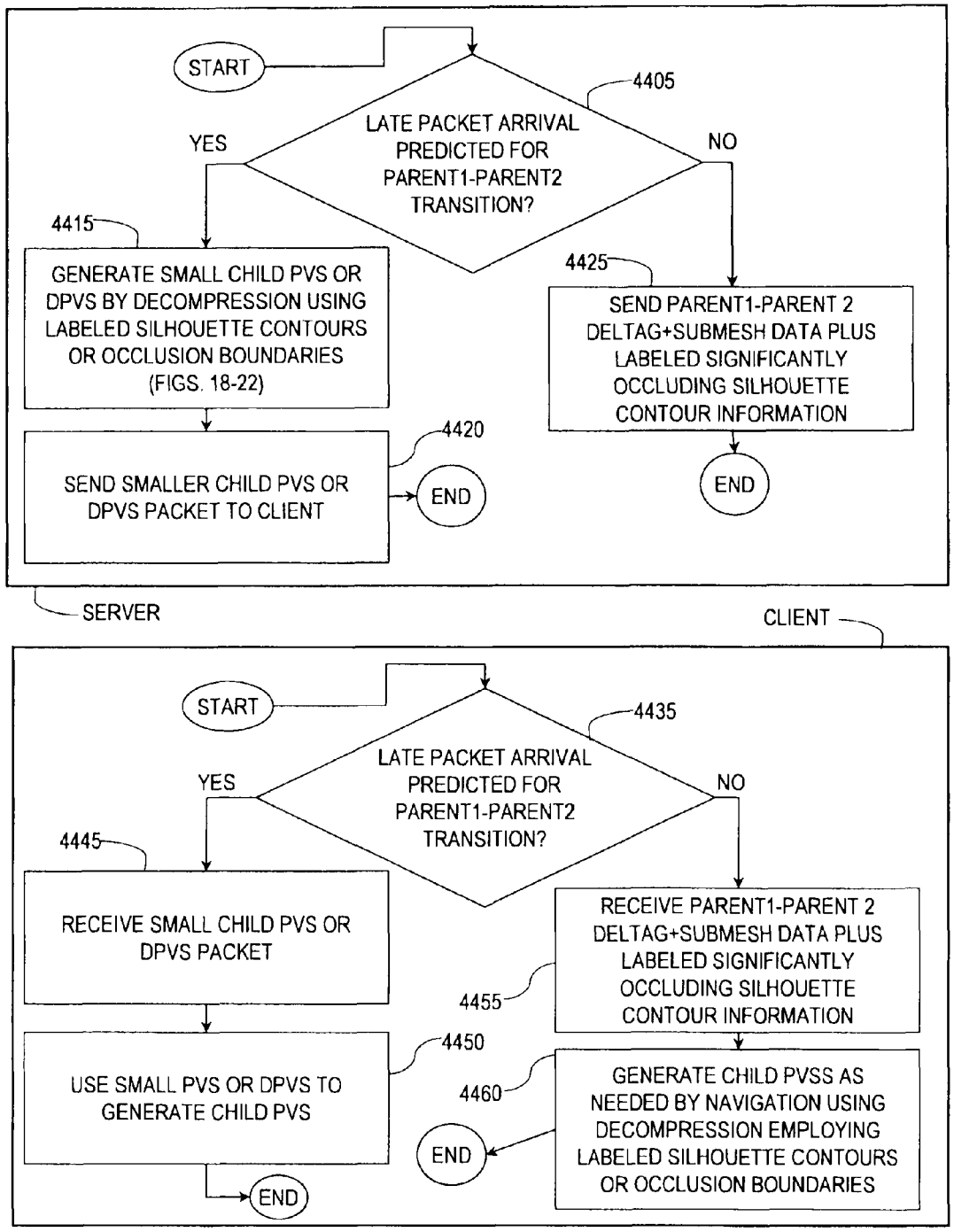

FIG. 44 is an exemplary block diagram/flowchart illustrating a visibility event server sending, in prefetch mode, visibility event packet corresponding to a parent-to-parent viewcell transition and including labeled silhouette contour (or stored occlusion boundary information) that is used by a client process to generate child PVS data; and the same visibility event server, in demand mode, generating smaller child PVS or delta-PVS packets using the labeled silhouette contour information (or occlusion boundary information) and transmitting the smaller packets.

Figure 45A:
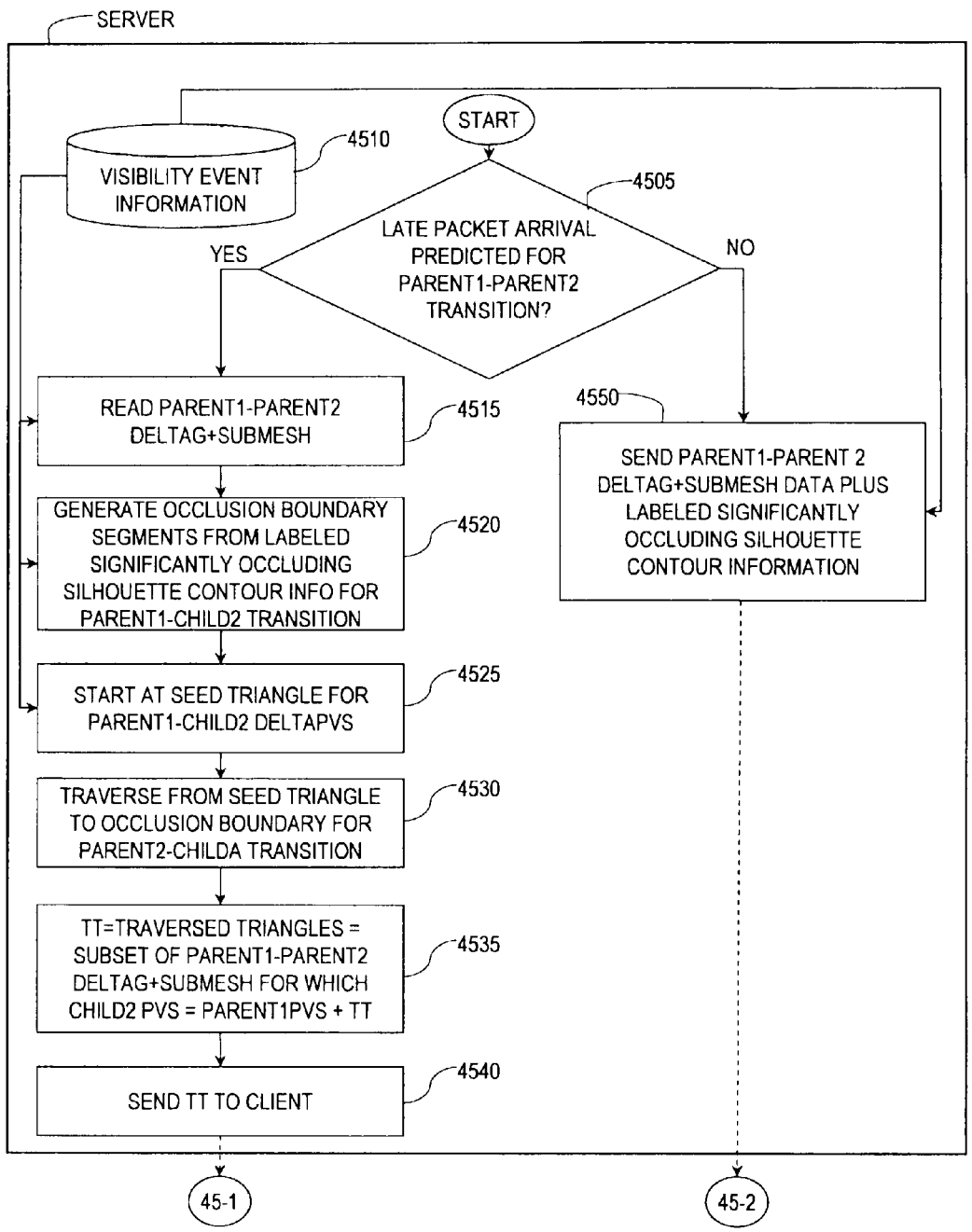

FIG. 45A is an exemplary block diagram/flowchart illustrating additional details of the decoder-server process illustrated in FIG. 44.

Figure 45B:
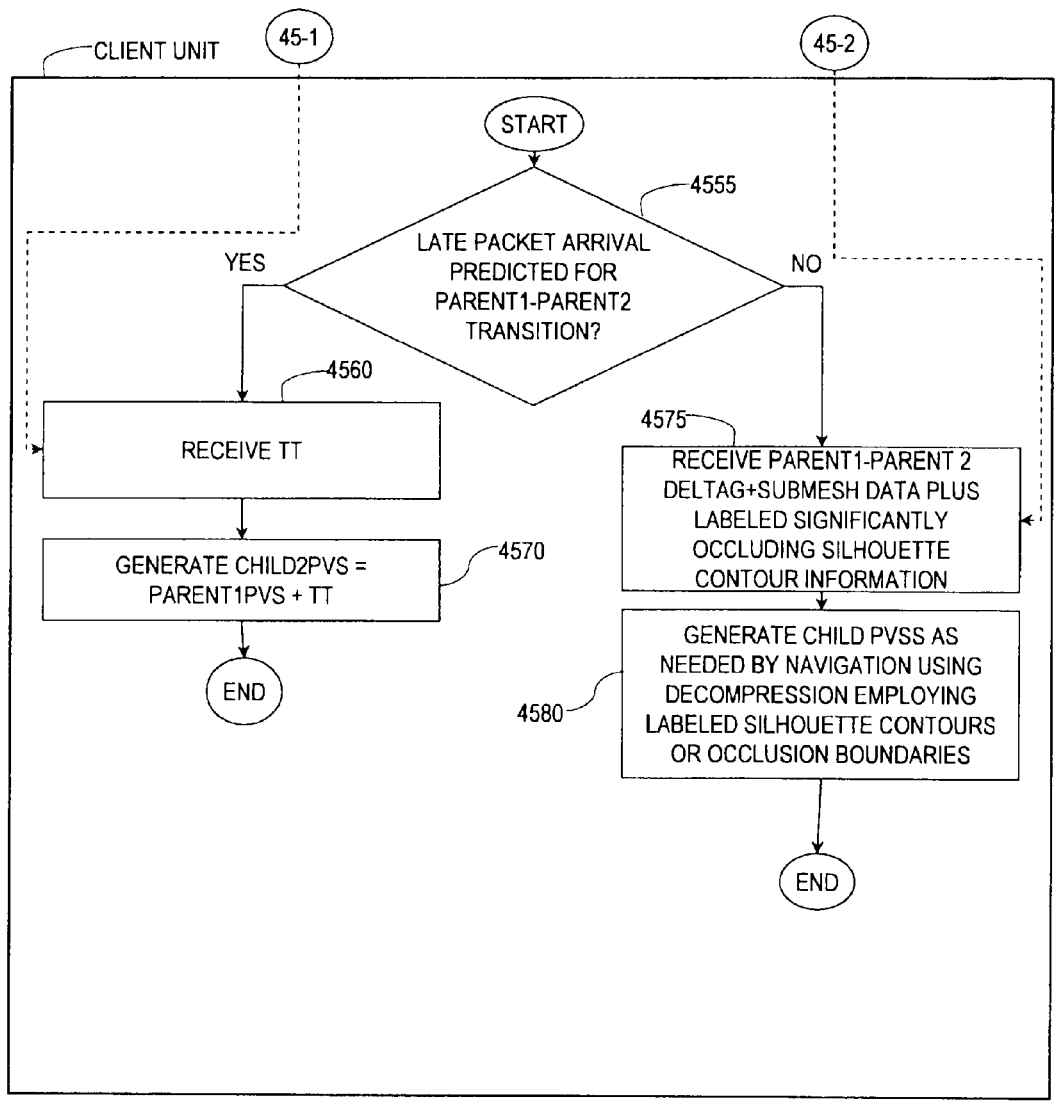

FIG. 45B is an exemplary block diagram/flowchart illustrating additional details of the decoder-client process illustrated in FIG. 44.

Figure 46:
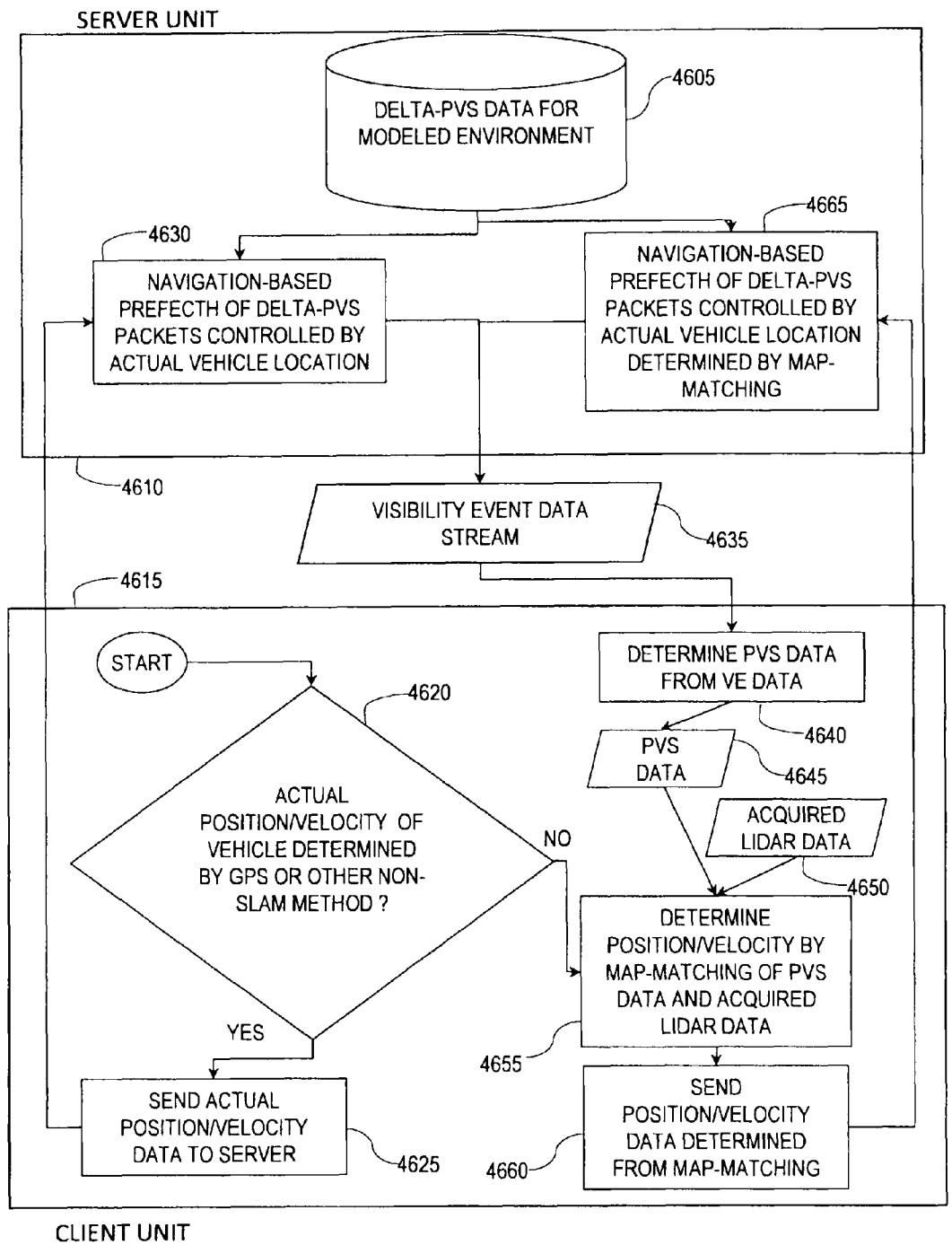

FIG. 46 is an exemplary block diagram/flowchart showing a method of navigation-based prefetch of visibility event data in which prefetch is driven by the location of the client unit in a real environment, as determined by GPS (or other positioning modality) or as computed by a 3D map-matching method.

Figure 47:
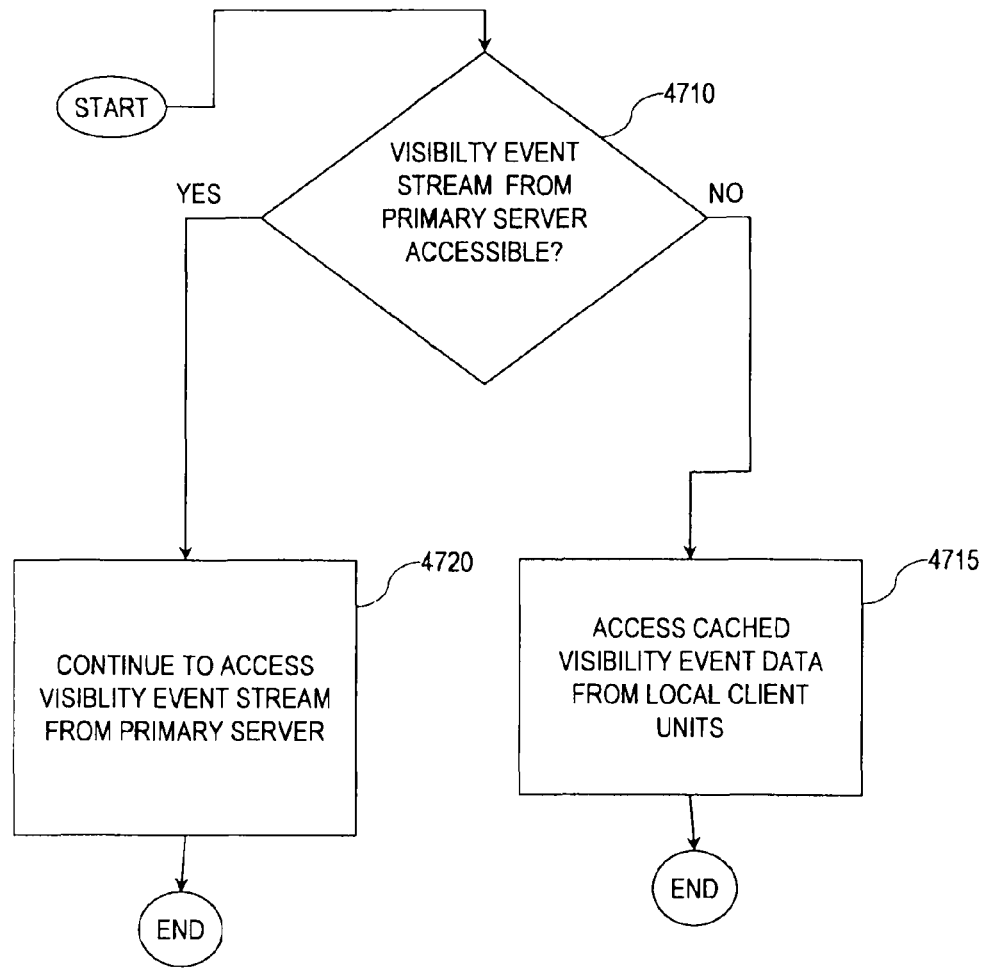

FIG. 47 is an exemplary flow diagram illustrating a process by which the visibility event data stream is maintained even if the communication link with the primary server is lost.

Figure 48:
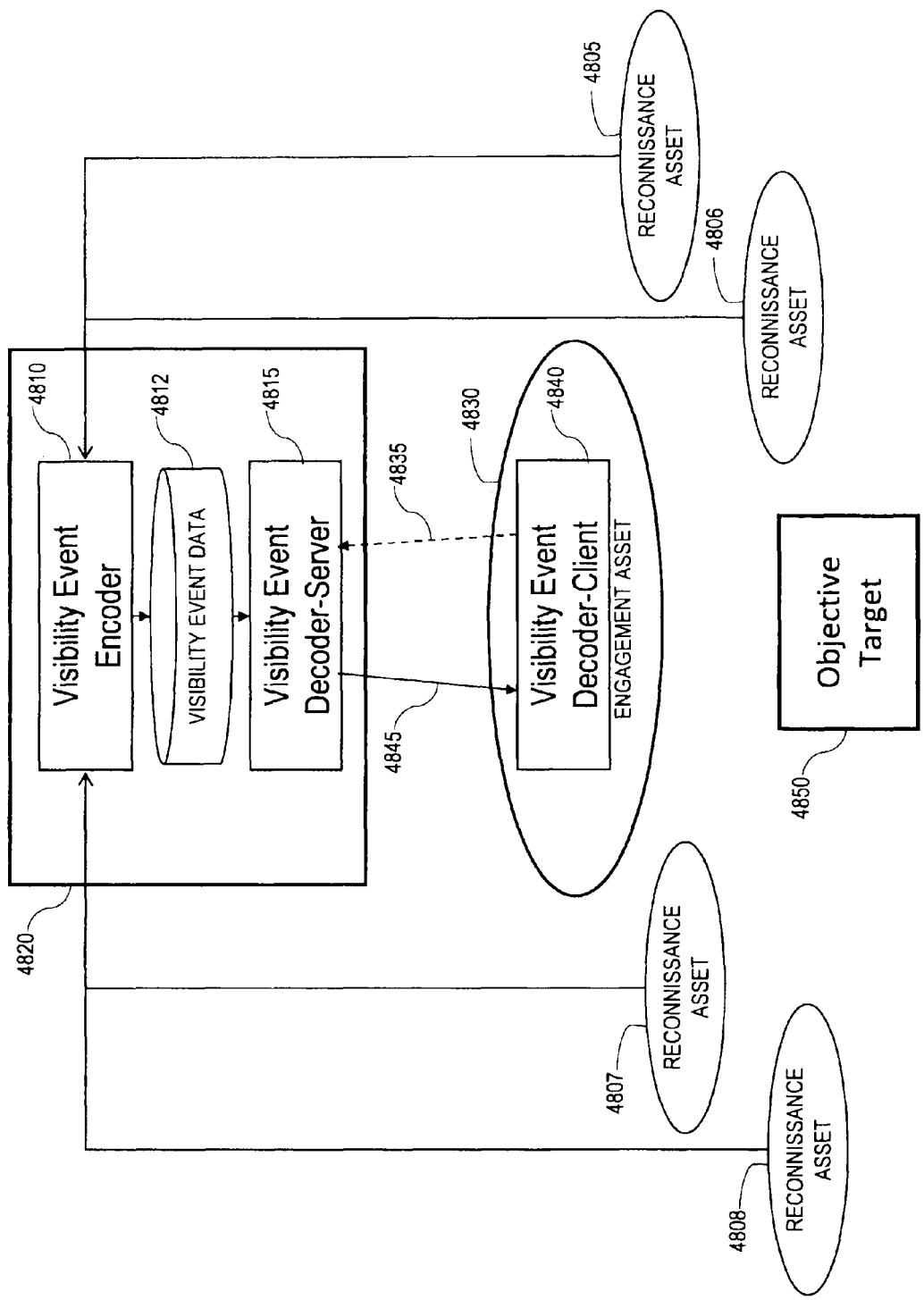

FIG. 48 is an exemplary block diagram/flowchart illustrating forward deployed reconnaissance asset vehicles acquiring 3D data in an actual environment, transmitting this data to a visibility event encoder, and streaming the encoded visibility event data to an engagement or attack asset based on the attack assets movements in the actual environment.

Figure 49A:
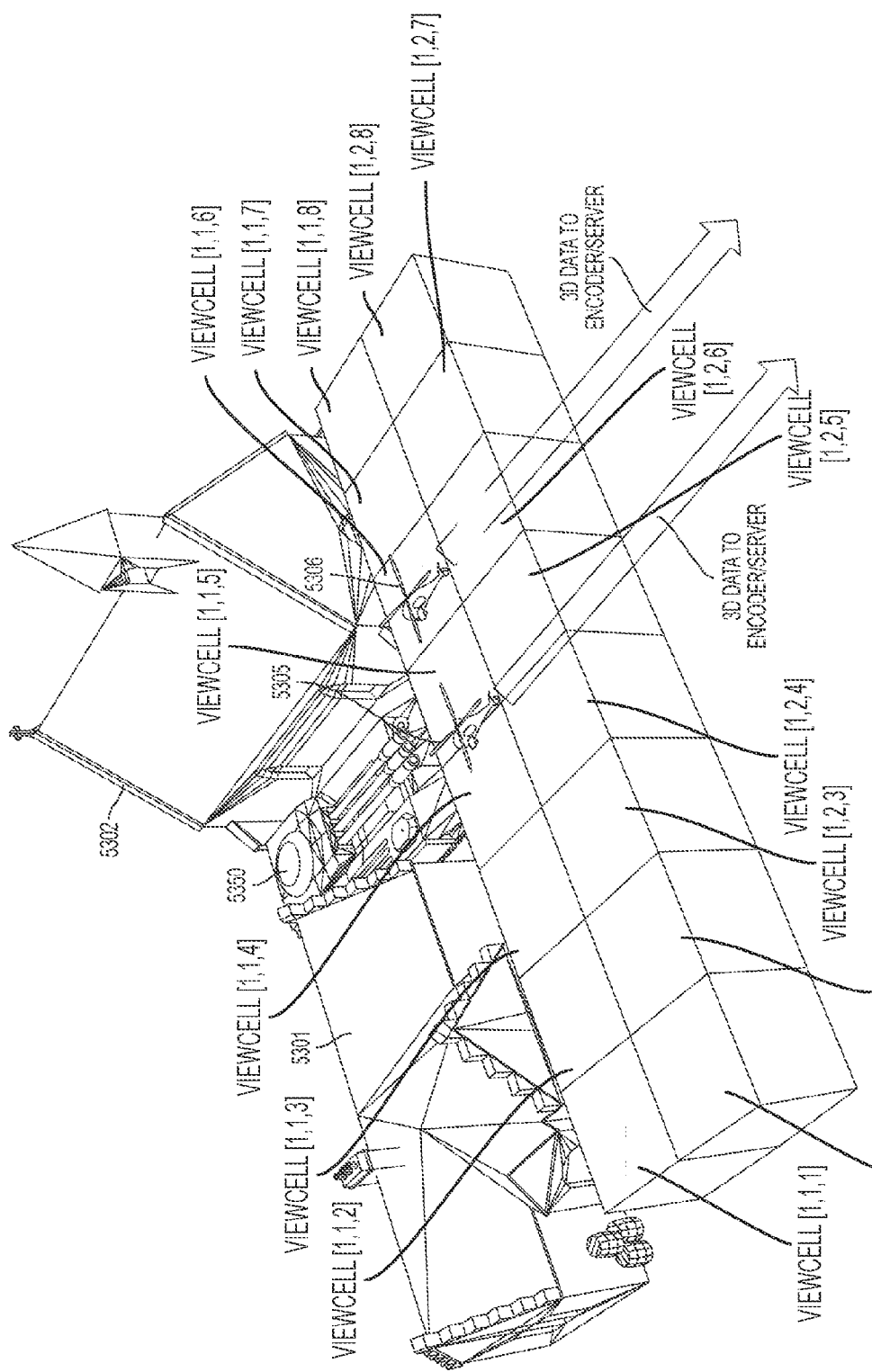

FIG. 49A is an exemplary perspective diagram illustrating a two reconnaissance assets acquiring a three dimensional representation of an actual environment and sending the representation to an encoder for encoding as visibility event data.

Figure 49B:
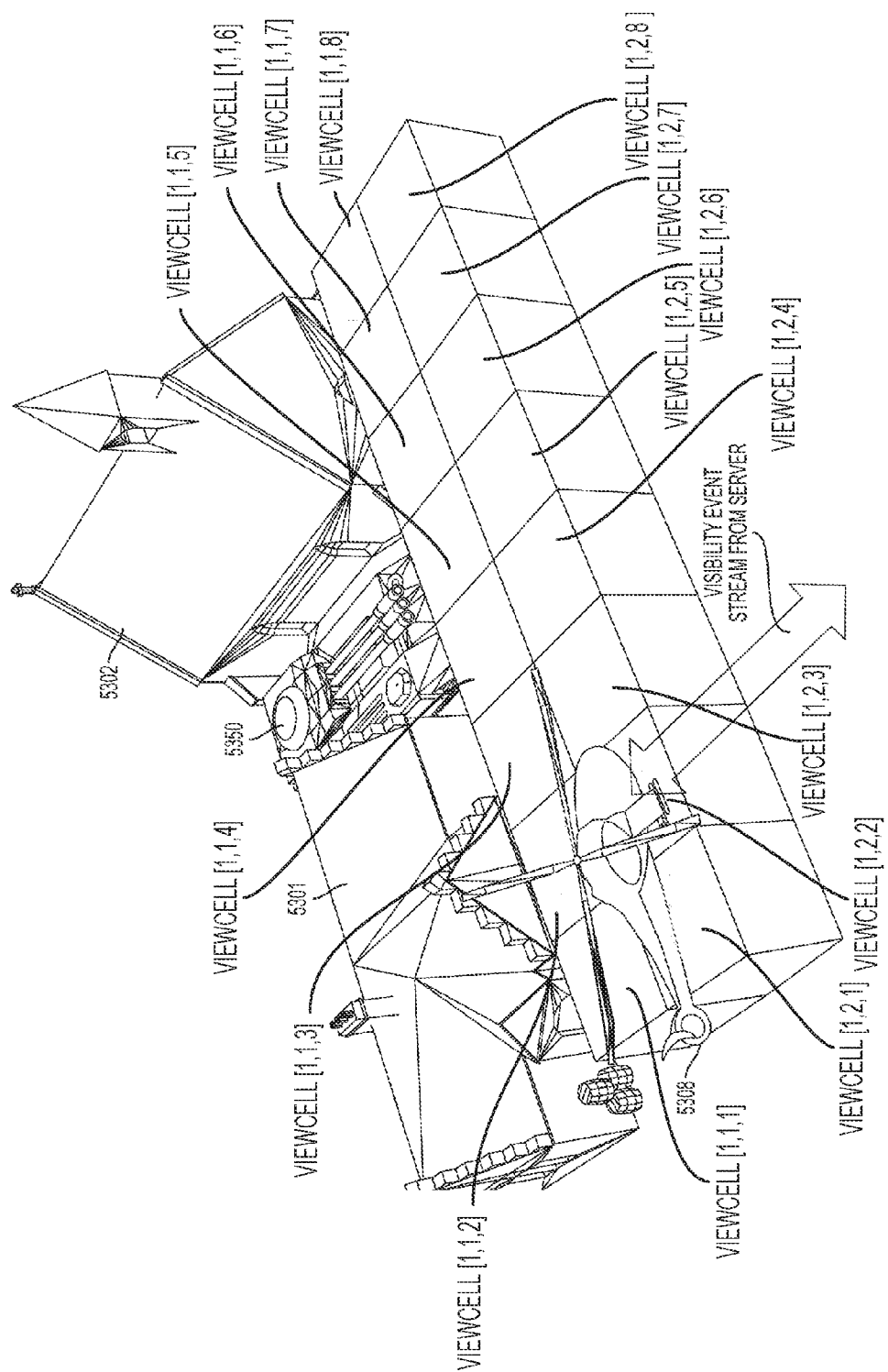

FIG. 49B is an exemplary perspective diagram illustrating an autonomous engagement/attack asset receiving a visibility event data stream representing an actual environment, and using the visibility event data in an efficient 3D map-matching SLAM solution for autonomous navigation.

Figure 50:
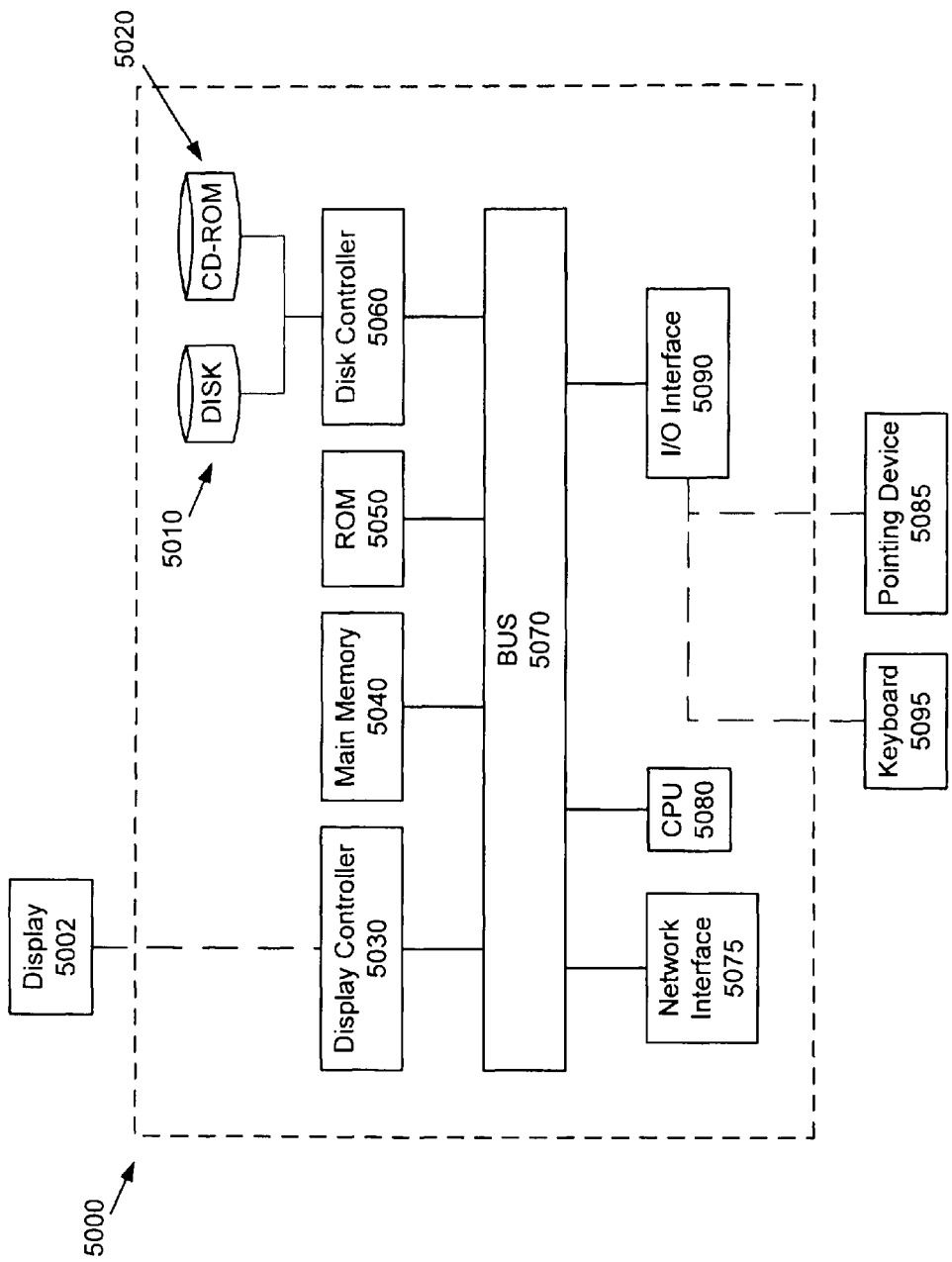

FIG. 50 illustrates an exemplary processor diagram.

DETAILED DESCRIPTION OF THE EMBODIMENTS

The present specification discloses methods of controlling and utilizing a content stream including delta-PVS or visibility event data packets which include geometric, texture and other renderable graphical information. The visibility event data is delivered by a decoder-server process and received and processed into precision-controlled PVS (potentially visible sets) by a decoder-client process. The resulting PVS data is efficiently rendered by a rendering process associated with the client unit. In the context of the present specification renderable graphics information includes 3D graphics primitives, including polygons and other surfaces from which image information is generated by a rendering process.

In some embodiments, the visibility event packets employed are generated in an encoding process which uses methods of from-region visibility precomputation using conservative linearized umbral event surfaces as disclosed in the PCT patent application number PCT/US2011/042309, and titled "System and Method of From-Region Visibility Determination and Delta-PVS Based Content Streaming Using Conservative Linearized Umbral Event Surfaces" the entire contents of which is incorporated herein by reference.

The terminology viewcell or view region, in exemplary embodiments, refers to a polyhedron, which may be represented as a polygon mesh, which describes a region to which the viewpoint is restricted. Viewcells and view regions in this specification are assumed to be convex unless otherwise indicated. A viewcell may be constrained to be a parallelpiped or box, while a view region may not necessarily be so constrained.

The terminology PVS (potentially visible set), in exemplary embodiments, refers to a set of polygons or fragments of polygons that are visible from a viewcell. Generally a PVS is computed to be conservative, including all polygons or polygon fragments that are visible as well as some that are not.

The terminology wedge (see also CLUES), in exemplary embodiments, refers to a visibility event surface formed by a feature (vertex or edge) of a viewcell and vertices or edges of the mesh polygons. In general a wedge defines the visibility from the viewcell's feature, and across the mesh polygon's vertex or edges.

The wedges employed in the prior-art method of discontinuity meshing are exact. These edges may be planar or quadric surfaces. The planar wedges described in the discontinuity mesh literature are of two types renamed here as:

1) SV-ME wedge-Formed by a vertex of the viewcell (or "source") and an edge of the mesh. Also called a pivoted wedge or a supporting vertex wedge.

2) SE-MV wedge-Formed by an edge of the viewcell and a vertex of the polygon mesh. Also called a swept wedge or supporting edge wedge.

3) SE-ME wedge-Formed in the special case where the mesh silhouette edge is parallel to a supporting viewcell silhouette edge.

These definitions assume frontprojection (i.e. using the viewcell as the light souce). In the backprojection method a silhouette edge or segment of a silhouette edge is used as the "source" and various silhouette edges in the shaft between the source edge and the viewcell support the backprojection event surfaces. The definitions are otherwise identical for the backprojection case.

Since the wedges employed in discontinuity meshing are typically used to identify components of the sources penumbra they are constructed on a relatively large number of edges of the polygon meshes, called from viewcell silhouette edges.

Since the planar wedges used in discontinuity meshing are exact event surfaces they are not defined on regions for which the wedge's viewcell feature (vertex or edge) is occluded from the wedge's polygon mesh feature. This definition of a wedge creates "gaps" in the planar event surfaces that cause the surfaces to be discontinuous. In the method of complete discontinuity meshing these gaps are filled with higher-order visibility event surfaces which may be quadric wedges. The gaps are filled by these higher-order event surfaces the and resulting visibility event surfaces, in general, continuous.

Embodiments also employ planar from-feature event surfaces, the conservative linearized umbral event surfaces (CLUES) which are similar to the planar wedges employed in discontinuity meshing but differ from these wedges in important respects.

One difference between the planar wedges used in discontinuity meshing and the CLUES (also called first-order wedges, or simply wedges in the present specification) is that the wedges employed in the present method are only those wedges that could form from-viewcell umbral event surface, penumbral events per se are not considered in from-viewcell visibility. The wedges of the present method are constructed on fewer polygon mesh edges (called the first-order silhouette edges) and they are constructed using a pivot-and-sweep technique which generates only potential umbral event wedges. This means that the number of wedges constructed in the present method is far less than the number of wedges generated in discontinuity meshing.

Another difference between discontinuity meshing wedges and the wedges of the present method is that the wedges of the present method are defined and constructed using only by the wedge's viewcell feature and the wedge's polygon mesh feature. Any intervening geometry between these two features is ignored.

This method of wedge construction is based on the first-order model of visibility propagation in polyhedral environments which insures that conservative, continuous umbral boundaries are constructed.

In actuality, intervening geometry may cause regions for which the viewcell feature is occluded from the polygon mesh feature. These are regions of the wedge in which the corresponding discontinuity mesh wedge would not be defined (thereby producing a gap or discontinuity in the event surface which is normally filled by a higher-order wedge or quadric). By ignoring this intervening geometry the present method constructs wedges which define a continuous event surface without gaps. Since the wedges of the present method are constructed by ignoring this type of higher order occlusion they conservatively represent the actual from-feature umbral event surface. For regions of the wedge in which there is no intervening geometry, the wedges constructed by the present method are exact.

In regions where the wedge is inexact the wedge may be optionally replaced by other wedges constructed using a modified method of wedge construction which accounts for higher-order occlusion caused by the intervening geometry.

The present method includes three types of (first-order) wedges:

1) SV-ME wedge-formed by extending the edges of a corresponding pivoted supporting polygon. The corresponding pivoted supporting polygon is formed by a supporting vertex of the viewcell (SVV) and a first-order silhouette edge of the polygon mesh by the process of pivoting from the edge to the viewcell. The pivoted supporting polygon is also called a SV-ME supporting polygon or a vertex supporting polygon. This type of visibility event surface reflects containment at a point on the viewcell and occlusion by an (silhouette) edge of the mesh. Also called a pivoted wedge. The pivoting process is described as a process that identifies the supporting plane between the first-order silhouette edge and a viewcell. While the process may appear to a human being to be an actual continuous rotation of a plane about the silhouette edge until it touches the viewcell, in fact embodiments can measure specific discrete angles formed by each candidate supporting plane (formed by corresponding viewcell vertex) and another polygon. Comparing these angle measurements in one embodiment allows determination of the actual supporting polygon from a number of candidate supporting polygons.

2) SE-MV wedge-formed by extending the edges of a corresponding swept supporting polygon (also simply called a swept polygon or an edge supporting polygon), which is a supporting polygon formed by a supporting edge of the viewcell and an inside corner mesh silhouette vertex by the process of sweeping along the supporting viewcell silhouette contour (SVSC) between the SVVs supporting the adjacent SV-ME wedges. This type of visibility event surface reflects containment on a (boundary) edge of the viewcell restricted at an (inside corner) mesh silhouette vertex. An SE-MV wedge is also called a swept wedge.

3) SE-ME wedge-formed only where the supporting viewcell edge and the supported mesh silhouette edge are parallel. Formed by extending the edges of the corresponding SE-ME supporting polygon formed between the parallel supporting viewcell edge and the supported mesh silhouette edge. Unlike the other types of planar wedges the determination of on-wedge visibility for an SE-ME wedge is a from-region, not a from-point visibility problem. This type of visibility event surface reflects containment on a (boundary) edge of the viewcell and occlusion by an (silhouette) edge of the mesh.

Another important difference between the wedges used in prior-art discontinuity meshing and those used in the present invention is that in the present method on-wedge visibility is determined using a conservative method in which on-wedge silhouette vertices are constrained to occur on first-order, from-viewcell silhouette edges. This insures that each on-wedge silhouette vertex is a compound silhouette vertex (CSV), a point of intersection of two wedges (one corresponding to the current wedge). In contrast, in prior-art discontinuity meshing methods, on-wedge visibility is determined exactly, typically using from-point object space visibility methods like the Weiler-Atherton algorithm.

In exemplary embodiments, the terminology pivoted wedge refers to an SV-ME wedge formed by extending the edges of a pivoted supporting polygon.

The terminology CLUES (Conservative Linearized Umbral Event Surface) (See Wedge), in exemplary embodiments, refers to another name for the first-order umbral wedges constructed using the pivot-and-sweep method of the present invention. These wedges may be refined to reflect higher-order visibility interactions using the backprojection method of the present invention.

The terminology Umbra Boundary Polygon (UBP), in exemplary embodiments, refers to a polygon that is part of the surface of the from-viewcell umbral volume. In the present method the from-viewcell umbral volumes (called the polyhedral aggregate umbrae, or PAU) may be constructed using conservative UBPs that are derived from the corresponding (first-order) wedges.

The wedges employed by the present method are from-viewcell-feature umbral event surfaces that are guaranteed to be from-viewcell umbral event surfaces (from the entire viewcell) only in the immediate vicinity of the mesh silhouette edge that supports the wedge. This is because the wedge may intersect another wedge beyond the supporting silhouette edge in a way that restricts the from-viewcell umbral boundary on the wedges. That is to say that the wedge itself, which is tangentially visible from the supported viewcell feature, may become visible from other parts of the viewcell.

Higher-order UBPs may be constructed from the corresponding higher-order wedges.

The terminology polygon mesh, in exemplary embodiments, refers to a finite collection of connected vertices, edges, and faces (also called polygons) formed from the vertices and edges. If two polygons of a mesh intersect, the edge or vertex of intersection must be a component of the mesh. No interpenetration of faces is allowed. Also called a polygon mesh object, triangle mesh or simply mesh. If each edge of the mesh is shared by at most two polygons it is a manifold polygon mesh. If each edge is shared by exactly two faces then the mesh is a closed manifold polygon mesh. Polygon meshes in this specification are assumed to be closed manifold meshes unless otherwise indicated.

The terminology From-Region Silhouette Edge, in exemplary embodiments, (also called general from-region silhouette edge) is defined with respect to a region such as a viewcell (or an polygon mesh edge in the case of backprojection) acting as a light source. If the location is a viewcell the from-region silhouette edge may be called a from-viewcell silhouette edge. If the region is an edge then the from-region silhouette edge may be called a from-edge silhouette edge. In the present specification any of type of silhouette edge (from-point, from-viewcell, from-edge) may simply be called a silhouette edge, with the type of silhouette edge being implied by the context.

A from-viewcell general silhouette edge is any edge of a polygon mesh that is a from-point silhouette edge for any point on a viewcell (or area light source). This is the definition of from-viewcell silhouette edge employed by Nierenstein et. al. 2005 and in the complete discontinuity meshing method of Drettakis et. al. 1994.

In general such edges support from-region penumbral event surfaces but a subset actually support from-region umbral event surfaces which are typically quadric surfaces.

From-region silhouette edges may be defined exactly, when higher-order visibility interactions of edge triples are considered. Alternatively from-region silhouette edges may be defined, as in the present method, conservatively by considering only visibility event surfaces that arise as a result of interactions between edge pairs; as in the first-order visibility model of visibility propagation.

The terminology First-Order Silhouette Edge, in exemplary embodiments, refers to a first-order from-viewcell silhouette edge (also called simply a first-order silhouette edge) is an edge of a polygon mesh that has one component polygon that is backfacing for the entire viewcell, and the other component polygon that is front facing for at least one vertex of the viewcell, wherein the component polygons are backfacing with respect to each other.

This definition is based on a simple, conservative model of visibility propagation in polyhedral environments called first-order visibility, which considers only the visibility event surfaces that arise as a result of interactions between edge pairs.

One embodiment of the present invention employs polygon meshes that are manifold triangle meshes. In a manifold triangle mesh, each edge is completely shared by exactly two triangles. The specification of first-order silhouette edges is simplified by using manifold triangle meshes.

A first-order silhouette edge of a polygon mesh with respect to a viewcell is a locally supporting edge of the polygon mesh with respect to the viewcell. A locally supporting edge supports a polygon between the viewcell and the edge if only the viewcell and the two component polygons (triangles) sharing the edge are considered in the test for support. (See definition of test for support)

Generally first-order from-region silhouette edges are a small subset of the exact from-region silhouette edges of any polygon mesh.

In the present specification, any type of first-order silhouette edge (from-viewcell, from-edge) may simply be called a first-order silhouette edge, or simply a silhouette edge with the type of silhouette edge being implied by the context.

The terminology First-Order Visibility (also called first-order model of visibility propagation), in exemplary embodiments, refers to a model of from-region visibility propagation in which from-region umbral event surfaces are incident on (first-order) visible, first-order silhouette edges and are constructed (using the pivot and sweep method) which assumes that the entire view region (e.g., viewcell) is visible from the first-order silhouette edge.

The first-order model of visibility propagation is based on the simplifying conservative assumption that if a silhouette edge is visible from a viewcell, then it is visible from all parts of the viewcell. This assumption leads to a simple definition of first-order silhouette edges as those edges for which one component triangle is backfacing for all points on the viewcell and the other component triangle is frontfacing for at least one point on the viewcell, and further that the component triangles are not facing each other. This definition is effectively identical to the definition of a from-point silhouette edge and reflects the fact that the first-order model effectively treats the viewcell as a viewpoint in some important respects.

The terminology supporting polygon, in exemplary embodiments, refers to a supporting polygon that is "supported" by two structures. In the present method, a supporting polygon between a first-order silhouette edge of a polygon mesh and a viewcell is, in one case, formed by the first-order silhouette edge and a vertex of the viewcell (SV-ME supporting polygon). The vertex of the viewcell supporting this polygon is called the supporting viewcell vertex (SVV). It can be identified by pivoting the plane of the backfacing component polygon of the silhouette edge, wherein the pivoting occurs about the silhouette edge and in a direction of the normal of the backfacing component polygon of the edge toward the viewcell until the plane of the supporting polygon intersects the viewcell. This intersection will, in the general case, occur at the supporting viewcell vertex, which together with the first-order silhouette edge, forms a supporting polygon that is a triangle. If the supporting viewcell vertex is a vertex of an edge of the viewcell that is parallel to the silhouette edge of the mesh then the pivoting plane will intersect the edge of the viewcell, not just a single vertex, and the supporting polygon will be a quadrangle formed by the mesh silhouette edge and the intersected viewcell edge. This second type of supporting polygon is called a SE-ME supporting polygon.

In another case of the present method a different type of supporting polygon is formed between an inside corner vertex of a first-order silhouette edge and an edge of the viewcell (SE-MV supporting polygon also called a supporting triangle).

In the context of the present invention, supporting polygons are conservatively defined as being supported by a first-order silhouette edge (also called a locally supporting edge), or vertex thereof, and the corresponding viewcell, neglecting any occlusion or interference between the first-order silhouette edge and the viewcell. If a supporting polygon, as defined by the present invention, intersects geometry between the first-order edge and the viewcell, then the supporting polygon is not a supporting polygon as defined in the prior art (which does not generally allow a supporting polygon to be defined if such interference exists).

As defined in prior-art a polygon would pass a "test for support" (i.e. be a supporting polygon) between two structures if the polygon is supported by a vertex or edge of one structure and a vertex or edge of the other structure without intersecting anything else. The test for support also requires that the extension of the supporting polygon (e.g. this extension is the "wedge") in the direction away from the first supported object (e.g. the viewcell) also does not intersect the other supported structures (e.g. the polygon meshes) in a way that causes it to be "inside" the other supported structure (e.g. on the topological "inside" of a manifold mesh). This test for support effectively requires a supporting edge to be an "outside" edge of the structure (e.g. a polygon mesh) which will support a supporting polygon tangentially to the structure, as opposed to an "inside" or reflex edge of a structure such as a polygon mesh which will not.

In the present method this test for support is used in a more limited way by including only the polygons sharing an edge of a mesh in the determination of whether the edge supports a conservative supporting polygon between the viewcell and the mesh (i.e., whether the edge is a "locally supporting" or first-order silhouette edge, see definition of first-order silhouette edge and locally supporting edge).

In cases where the difference between the present, conservative, definition of the supporting polygon is distinguished from the prior-art definition of the supporting polygon is to be emphasized, a supporting polygon as defined by the present invention may be called a conservative supporting polygon. Otherwise a conservative supporting polygon as defined in the present invention is simply called a supporting polygon.

As defined in the present invention, wedges derived from (conservative) supporting polygons always form continuous conservative linearized umbral event surfaces that can be intersected with mesh polygons to conservatively determine the set of mesh polygons (or fragments thereof) that are visible from a viewcell, without the need for quadric surfaces that usually dominate (and complicate) exact solutions.

In exemplary embodiments, for the terminology Conservative Supporting Polygon see the above terminology for supporting polygon.

The terminology Test for Support, in exemplary embodiments, refers to a polygon that would pass a "test for support" (i.e. be a supporting polygon) between two polygonal structures if the polygon is supported by a vertex or edge of one structure and a vertex or edge of the other structure without intersecting anything else. The test for support also requires that the extension of the supporting polygon (e.g. this extension is the "wedge") in the direction away from the first supported object (e.g. the viewcell) also does not intersect the other supported structures (e.g. the polygon meshes) in a way that causes it to be "inside" the other supported structure (e.g. on the topological "inside" of a manifold mesh). This test for support effectively requires a supporting edge to be an "outside" edge of the structure (e.g. a polygon mesh) which will support a supporting polygon tangentially to the structure, as opposed to an "inside" or reflex edge of a structure such as a polygon mesh which will not.

In the present method this test for support is used in a more limited way by including only the polygons sharing an edge of a mesh in the determination of whether the edge supports a conservative supporting polygon between the viewcell and the mesh (i.e., whether the edge is a "locally supporting" or first-order silhouette edge, see definition of first-order silhouette edge and locally supporting edge).

In cases where the difference between the present, conservative, definition of the supporting polygon is distinguished from the prior-art definition of the supporting polygon is to be emphasized, a supporting polygon as defined by the present invention may be called a conservative supporting polygon. Otherwise a conservative supporting polygon as defined in the present invention is simply called a supporting polygon.

The terminology Supporting Viewcell Silhouette Contour (SVSC), in exemplary embodiments, refers to that portion of the viewcell silhouette contour, as viewed from an inside corner vertex of a mesh silhouette edge that produces the most extreme umbra boundary. This is the portion of the viewcell silhouette contour which produces the least occlusion when looking through the inside corner mesh silhouette vertex from the viewcell silhouette. It is also the contour that, when subjected to sweep operation, produces SE_MV wedges that have a consistent orientation with the connected SV-ME wedges and form a continuous surface. The supporting viewcell silhouette contour extends between two SVVs that corresponding to the mesh silhouette edges which produce the inside corner vertex.

SE-MV wedges are oriented visibility event surfaces that reflect the restriction of visibility at a mesh silhouette vertex by virtue of containment on the viewcell surface.

In contrast, SV-ME wedges are oriented visibility event surfaces that reflect the restriction of visibility at a mesh silhouette edge by virtue of the (from-viewcell) occlusion caused by the mesh polygon at the silhouette edge.

The SVSC is the set of (from mesh silhouette edge) viewcell silhouette edges that produces corresponding SE-MV wedges having a orientation that is consistent with the orientation of adjacent SV-ME wedges; thus producing a continuous, conservative, consistently oriented umbral event surface at the mesh silhouette vertex.

For the terminology swept triangle, see swept polygon.

The terminology Swept Polygon, (also called a swept supporting polygon or a swept triangle), in exemplary embodiments, refers to the visibility event boundary at an non-convex (or "inside") corner of a first-order silhouette edge of a polygon mesh is formed not only by extending those supporting polygons supported by the silhouette edges forming the inside corner, but possibly also by one or more swept polygons which are a different type of supporting polygon formed between the inside corner vertex of the mesh silhouette and certain edges of the viewcell that are from-point silhouette edges from the perspective of the inside corner silhouette vertex of the mesh object. These from-point silhouette edges of the viewcell form a contour chain (the extremal or supporting viewcell silhouette contour) between the SVVs corresponding to the inside corner edges of the mesh object. Polygons (triangles) are "swept" out for each edge of this chain, forming the swept polygons. The edges of these swept polygons are extended to form SE-MV or swept wedges that also contribute to the first-order visibility event surface at inside corners of the mesh silhouette contour.

The terminology Swept Wedge, in exemplary embodiments, refers to a SE-MV wedge formed by extension of the edges of a swept supporting polygon.

The terminology Simple Silhouette Contour, in exemplary embodiments, refers to a chain of silhouette edges connected by shared vertices belonging to a single mesh object. Also called a simple contour.

The terminology Compound Silhouette Contour, in exemplary embodiments, refers to a chain of silhouette edges comprising silhouette edges connected by shared vertices or connected by vertices formed by the intersection of a wedge/UBP from one contour with a non-adjacent silhouette edge. In the study of smooth manifolds such an intersection is called a t-junction. (See Durand, Fredo PhD thesis University of Grenoble)

In exemplary embodiments, for the terminology T-Junction, also called a compound silhouette vertex (CSV), see Compound Silhouette Contour.

The terminology CSV (Compound Silhouette Vertex), in exemplary embodiments, refers to the point of intersection of a wedge and a silhouette edge. For a first-order implementation the wedge is a first-order wedge and the silhouette edge is a first-order silhouette edge. In topological terms the CSV corresponds to a conservatively defined t-vertex of the from-region compound silhouette contour. Typically an inside corner of the compound silhouette contour occurs at a CSV.

The terminology ESO (Effective Static Occlusion), in exemplary embodiments, refers to a metric that is in some direct proportion to the number of (original mesh) polygons and/or surface area of these polygons inside an occluded region of a visibility map. The ESO is also in some inverse proportion to the number of new polygons introduced in the visible region surrounding the occluded region as a result of retriangulation caused by the edges of the occlusion boundary. The metric is used in conservative simplification of a VM or unified VM.

The terminology EDO (Effective Dynamic Occlusion), in exemplary embodiments, refers to a metric that is in some direct proportion to the number of polygons and/or surface area of polygons occluded in a delta region (DR) of occlusion wherein the DR represents the region of occlusion produced during a specific viewcell transition. The ESO is also in some inverse proportion to the number new polygons introduced in the visible region surrounding the DR as a result of retriangulation caused by the edges of the occlusion boundary.

The terminology EDV (Effective Dynamic Visibility), in exemplary embodiments, refers to a measure of the effectiveness of a delta region (DR) of a unified visibility map. If the DR is a $DR_O$ (delta region of occlusion) for the specific viewcell transition then the EDV corresponds to the EDO of the DR.

If the DR is a $DR_E$ (delta region of exposure) then the EDV is determined by examining the ESO of the surrounding occlusion regions. Simplification of the $DR_E$ proceeds by simplification of the surrounding OR and extending the polygons of the $DR_E$ into the OR or $DR_O$.

The terminology Unified Visibility Map, in exemplary embodiments, refers to a visibility map including from-viewcell occlusion boundaries generated from two viewcells (e.g. A and B) wherein the viewcells are related in one of two ways: 1) one viewcell is completely contained in the other, or 2) the viewcells completely share a common face. The unified visibility map is an arrangement of VM regions such that some regions contain newly occluded mesh triangles/fragments and other regions contain newly exposed mesh triangles/fragments for the transition from viewcell A to viewcell B. The unified visibility map is used to construct delta-PVS data for direct storage. Alternatively the unified visibility map can be used to identify significantly occluding or significantly silhouette contours which can be labeled and used to generate the deltaG/delta-PVS data later.

The terminology Visibility Event Packet, in some embodiments, refers to data packets that include, in some embodiments, delta-PVS data, labeled significantly occluding silhouette contour information, stored occlusion boundary information, and/or PVS data.

Visibility Event Packets, in some embodiments, include other visibility event information. In some embodiments, Visibility Event Packets contain visibility event information. In this specification, visibility event information is also referred to as visibility event data.

The terminology Movement Threshold, in some embodiments, refers to a specific predetermined threshold value for a probability that an actual or predicted camera/viewpoint position will change from one view region to another view region. For example, when a probability (i.e., likelihood) that a viewpoint changes from a first viewpoint and a second viewpoint exceeds the movement threshold, additional information may be sent to a client device.

The terminology, Bandwidth Threshold, in some embodiments, refers to a predetermined threshold value for an available transmission bandwidth between a server and a client unit. For example, when an available bandwidth is less than the bandwidth threshold, information at a lower level of detail may be sent to a client device.

Figure 2:
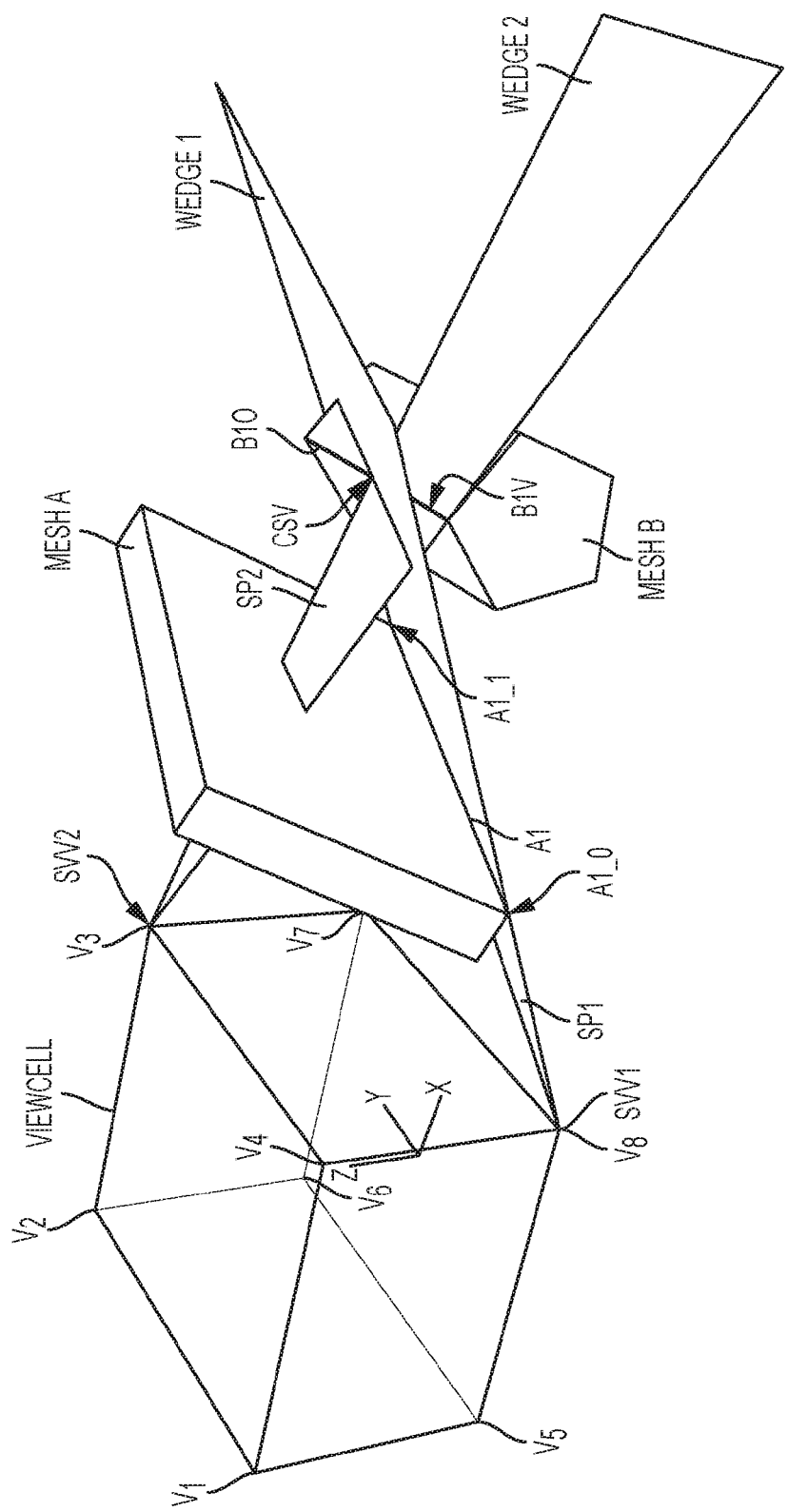
FIG. 2 is an exemplary perspective diagram showing a viewcell and two simple polygon meshes A and B as well as two first-order, from-viewcell silhouette edges: edge A1, and edge B1 (which is subdivided into segments B10 and B1V).

The basic aspects of the first-order model of visibility propagation are illustrated in FIG. 2. Subsequent details are given in the Description-Embodiments sections of the specification.

FIG. 2 is a diagram showing a viewcell and two simple polygon meshes A and B.

FIG. 2 also shows two first-order, from-viewcell silhouette edges: edge A1, and edge B1 (which is subdivided into segments B1O and B1V).

The construction of conservative linearized umbral event surfaces (CLUES) incident on these first-order silhouette edges is now described. In the following discussion, the umbral event surfaces constructed are similar to discontinuity mesh wedges in the sense that they define visibility from a single feature of a viewcell (generally a supporting viewcell vertex or edge). In a subsequent section of this specification, it is shown that these wedges can be used to construct a conservative linearized from-viewcell visibility map (VM) from which a PVS can be derived.

FIG. 2 illustrates a viewcell and mesh objects A and B. In some embodiments, the viewcell is a 3D cube having eight vertices. For example, the viewcell in FIG. 2 is a cube having vertices $V_1$-$V_8$. In further embodiments, the viewcell is any desired convex polyhedron. An edge of mesh A is labeled A1 having edges $A_{1\_0}$ and $A_{1\_1}$. An edge of mesh B is labeled as two segments: B1O and B1V. With respect to first-order silhouette edge A1, segment B1V is visible from supporting viewcell vertex SVV1, as B1V is on the unoccluded side of the event surface WEDGE1 that is formed between edge A1 and the corresponding supporting viewcell vertex SVV1, which corresponds to viewcell $V_8$. In this regard, B1V is on the unoccluded side of WEDGE 1 since a backfacing plane incident on first order silhouette edge A1 pivots in a clockwise direction towards viewcell $V_8$ to determine the corresponding supporting viewcell vertex. Accordingly, in some embodiments, the direction which a backfacing plane incident on a first order silhouette edge pivots toward the viewcell vertex indicates the unoccluded side of an event surface supported by the viewcell vertex. The opposite direction which the backfacing plane pivots indicates the occluded side of the event surface supported by the viewcell vertex.

With respect to first-order silhouette edge A1, segment B1O is occluded from supporting viewcell vertex SVV1, as B1O is on the occluded side of the event surface WEDGE1 that is formed between edge A1 and the corresponding supporting viewcell vertex SVV1.

The first-order visibility event surface, labeled WEDGE1, lies in the supporting plane between edge A1 and the viewcell. The supporting polygon SP1 between edge A1 and the viewcell is the triangle (labeled SP1) formed by the vertices $A_{1\_0}$ and $A_{1\_1}$ of edge A1 and the viewcell vertex labeled SVV1.

According to some embodiments, WEDGE1, the first-order visibility event surface incident on edge A1, is formed by extending the two edges of the corresponding supporting polygon (SP1) that are incident on the vertices $A_{1\_0}$ and $A_{1\_1}$ of edge A1. This extension occurs semi-infinitely starting at the vertices $A_{1\_0}$ and $A_{1\_1}$ of A1, in a direction away from the viewcell. The two extended rays are connected to the vertices $A_{1\_0}$ and $A_{1\_1}$ of edge A1 to form the semi-infinite umbral visibility event surface labeled WEDGE1. Only a portion of WEDGE1 is shown in FIG. 2, as it actually extends semi-infinitely away from the viewcell. In some embodiments, the plane of an event surface is represented by a 3D planar equation such as $ax+by+cz=0$.

Thus, in some embodiments, to form a (from-viewcell) first-order visibility event surface incident on a first-order silhouette edge and a viewcell vertex, the supporting polygon between the silhouette edge and the viewcell is first constructed. This construction is analogous to a pivot operation on the silhouette edge in the direction away from the backfacing component polygon and toward the viewcell until a supporting viewcell feature (edge or vertex) is encountered. In some embodiments the wedge is formed by extending the non-silhouette edges of this supporting polygon away from the viewcell.

As illustrated in FIG. 2, event surface WEDGE1 intersects edge B1, dividing B1 into the two segments B1V, which is first-order visible from the viewcell feature (the viewcell vertex SVV1) with respect to first-order silhouette edge A1, and B1O, which is not first-order visible from SVV1 with respect to first-order silhouette edge A1. Wedge 1 intersects first-order silhouette edge B1 (comprised of segments B1O and B1V) at the point labeled CSV. This point is a compound silhouette vertex.

For the purposes of illustration, assume now that the segment B1V is on the unoccluded side of all first-order visibility event surfaces formed by the edges of mesh A and the features of the VIEWCELL. In this case, B1V is outside (on the unoccluded side) of the first-order polyhedral aggregate umbrae (PAU) formed by the intersection of the first-order wedges with the mesh polygons and with each other. Under these conditions segment B1V is first-order visible from the viewcell.

If the segment B1V is first-order visible from the viewcell, then under the conservative assumptions of the first-order visibility model, segment B1V is assumed to be visible from any part of the viewcell. Consequently, the first-order visibility event surface incident on the segment B1V is constructed, by the previously described pivoting operation, which generates the supporting polygon (SP2), between the segment B1V and the supporting viewcell vertex labeled SVV2. As illustrated in FIG. 2, the supporting polygon SP2 is defined by viewcell vertex $V_3$ (SVV2) the vertices of segment B1V. The previously described method of extending the supporting polygon is once again employed. The resulting first-order visibility event surface incident on BV1 is labeled WEDGE2.

WEDGE1 is an exact visibility event surface incident on edge A1 because in this case, the corresponding supporting viewcell vertex SVV1 is actually visible from the supported first-order silhouette edge A1.

WEDGE2 is not an exact visibility event surface through edge B1V because the conservative assumption of the first-order visibility model is violated in a very specific way: the corresponding supporting viewcell vertex SVV2 is not actually visible from the supported first-order silhouette edge B1V, it is occluded when viewed from this edge.

The exactness of any first-order visibility event surface (e.g., wedge) incident on a silhouette edge can be determined using a 2D visibility test which tests the visibility of the supporting viewcell vertex from the silhouette edge. In some embodiments, if the supporting viewcell feature is a vertex, then this is a from-point visibility test that is equivalent to testing the visibility of the first-order silhouette edge from the corresponding supporting viewcell vertex (SVV). According to some embodiments, segments of the first-order silhouette edge that are visible from the corresponding SVV support exact visibility event surfaces, and segments of the first-order silhouette edge that are occluded from the corresponding SVV support inexact/conservative visibility event surfaces.

In the special case where the silhouette edge is parallel to a supporting viewcell edge, a special from-edge visibility test is required.

Embodiments also include a method to increase the precision of inexact visibility event surfaces. In this method, for each segment of a first-order silhouette edge supporting an inexact wedge, a point on the surface of the viewcell is identified that is the visible supporting viewcell vertex (VSVV) for the segment. The VSVV is actually visible from the corresponding silhouette edge segment and forms a supporting polygon with the segment. These methods employ a higher-order adaptive, progressive refinement of the first-order model, they are described in the PCT patent application number PCT/US2011/042309.

Referring now to the drawings, wherein like reference numerals designate identical or corresponding parts throughout the several views.

FIG. 1-FIG. 6 Detailed Description: First Embodiment Employing Conservative Linearized Umbral Event Surfaces Constructed Using Pivot-and-Sweep Method One embodiment includes a method of conservative, linearized visibility map construction that is based on a simplified first-order model of visibility propagation in polyhedral environments. As previously described in embodiments, the first-order visibility model is based on the conservative assumption that if a silhouette edge of a polygon mesh is visible from any part of a viewcell, then it is visible from all parts of the viewcell. According to embodiments of this model, silhouette edges (called first-order silhouette edges) are limited to those triangle mesh edges that have one component polygon that is backfacing for all vertices of the viewcell and another component polygon that is front facing for at least one vertex of the viewcell. Additionally, to be a first-order silhouette edge, the component polygons is backfacing with respect to each other.

This model also leads to a method in which first-order conservative linearized umbral event surfaces (called CLUES, or also called first-order wedges or simply wedges) are formed either by pivoting from the (first-order) silhouette edge to a vertex of the viewcell (SV-ME wedge derived from the pivoted supporting polygons) or by sweeping from an (first-order) inside corner silhouette vertex through viewcell silhouette edges (SE-MV wedges derived from swept supporting triangles). The method also employs SE-ME wedges generated in the special case where the supported silhouette edge is parallel to a supporting viewcell edge. The first-order embodiment always produces a conservative umbra boundary, and in some cases, it is the exact umbra boundary.

Other embodiments are based on a higher-order model of visibility propagation in polyhedral environments. The higher-order model does not assume that if a silhouette edge is visible from any part of a viewcell then it visible from all parts of the viewcell. Rather, this model accounts for portions of the viewcell that are occluded from a silhouette edge. The higher-order model forms the basis of alternate embodiments which can produce a more precise approximation to the exact umbra boundaries in cases where the first-order method is imprecise. The higher-order refinement method is disclosed in the PCT patent application number PCT/US2011/042309.

Figure 1:
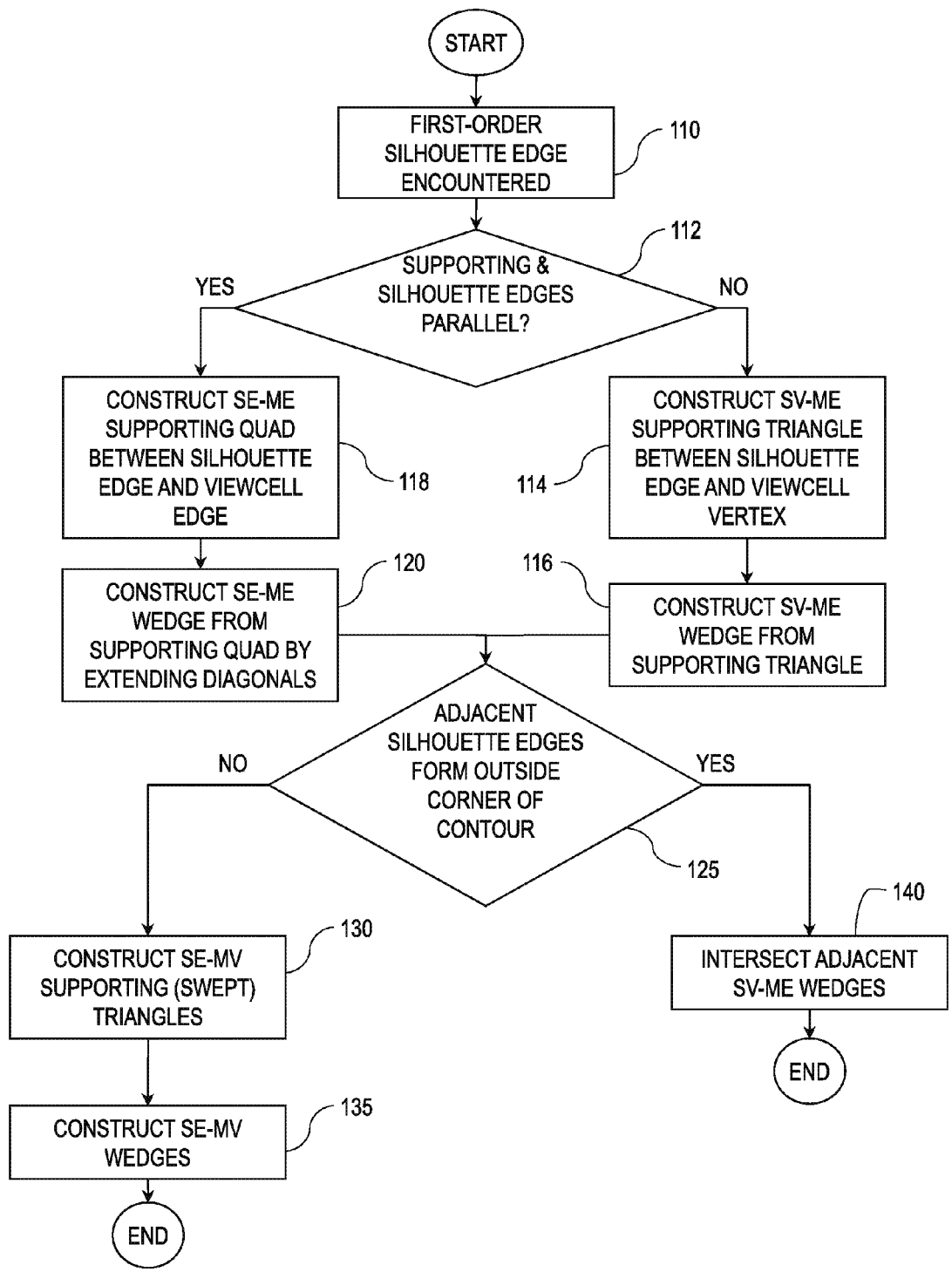
FIG. 1 is an exemplary flow diagram showing the general organization of the construction of first-order wedges formed by a polygon mesh object and a convex viewcell using the pivot and sweep method.

FIG. 1 Construction of First-Order Wedges

Figure 20:
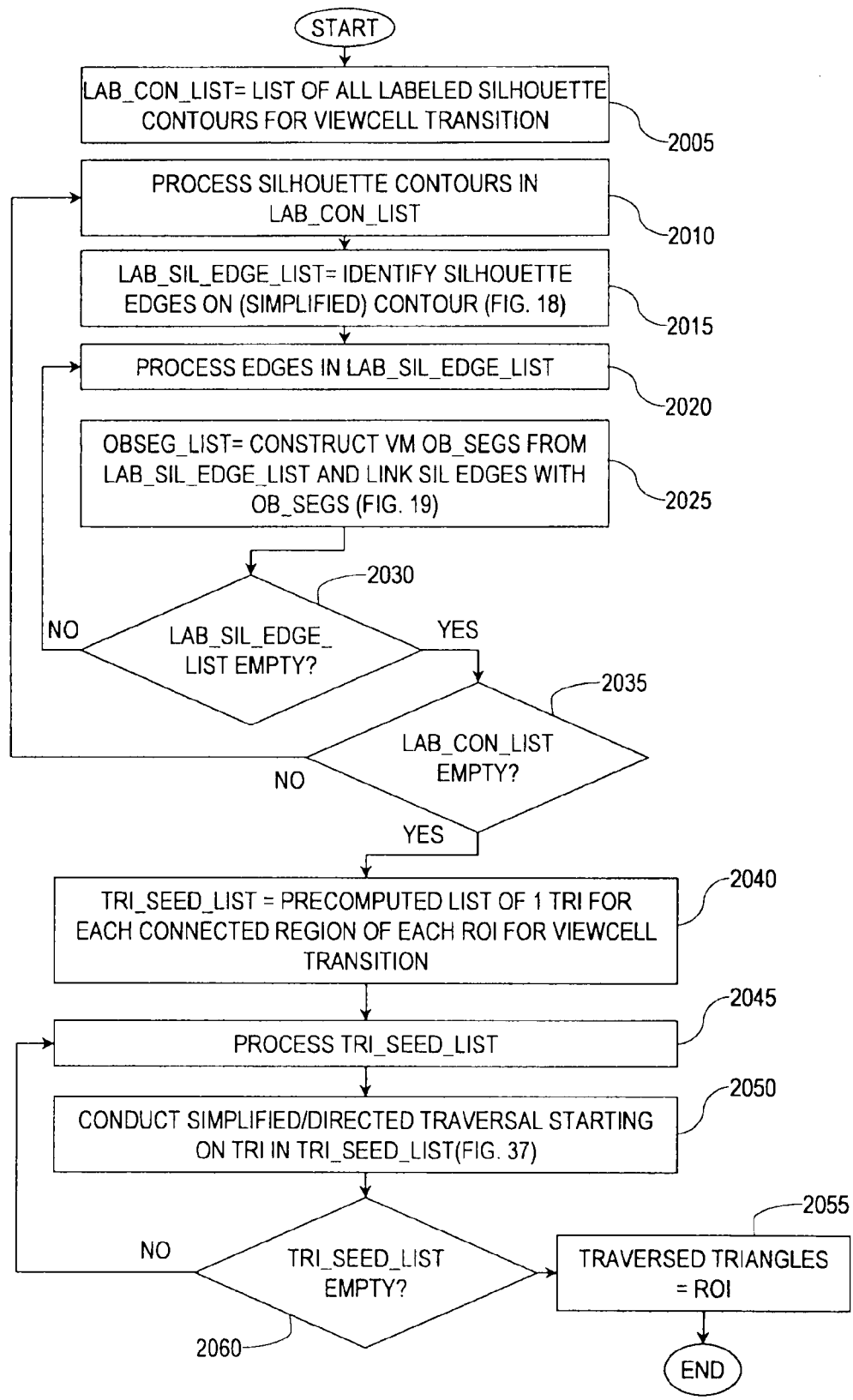
FIG. 20 is an exemplary flowchart showing a process controlling the runtime process of constructing visibility map ROI using ROI boundaries constructed from pre-stored labeled silhouette contours wherein the ROI boundaries define delimit a simplified, hinted, runtime 3D mesh traversal process which traverses the ROI.

FIG. 1 shows a flowchart disclosing the general organization of the construction of first-order wedges formed by a polygon mesh object and a convex viewcell using the pivot and sweep method. According to some embodiments, process flow starts at step 110, where polygons of the polygon mesh object are individually examined for first-order silhouette edges. The method of identifying first-order silhouette edges is disclosed in detail in FIG. 3. Embodiments disclosing the order in which the polygons are examined is illustrated in FIG. 20 of the PCT patent application number PCT/US2011/042309, that illustrates an algorithm enforcing a strict front to back order.

Process flow proceeds to step 112 to determine if the first-order silhouette edge encountered in step 110 is parallel to the supporting viewcell edge.

Figure 4A:
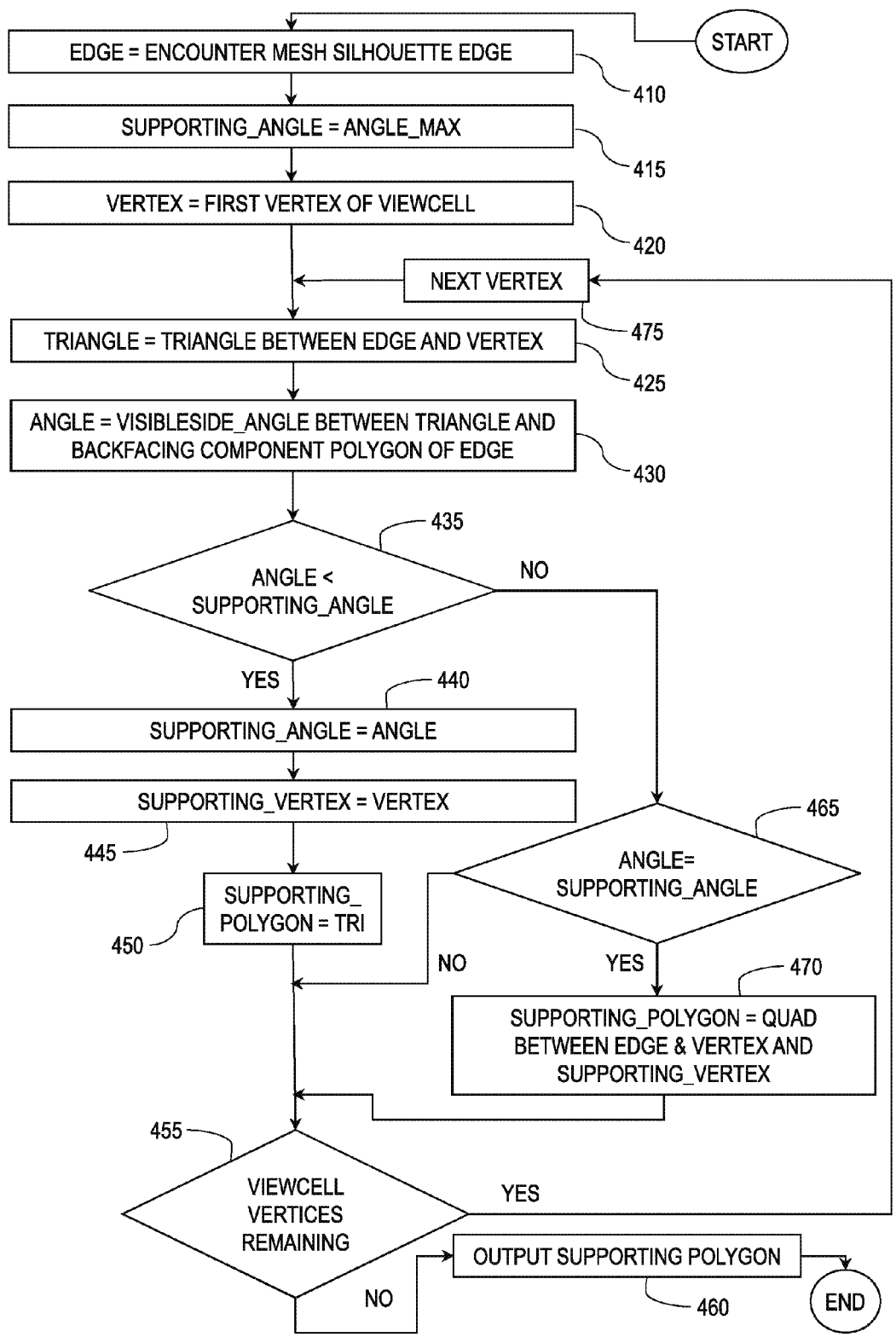
FIG. 4A is an exemplary flowchart showing the method of constructing a SV-ME supporting polygon incident on mesh silhouette edge.

If, in decision step 112, it is determined that the first-order silhouette edge is not parallel to the supporting viewcell vertex, then process flow proceeds to step 114 to construct a supporting polygon between the silhouette edge and the viewcell. FIG. 4A illustrates the details of this construction.

Process flow proceeds to step 116 to construct the SV-ME wedge incident on the first-order silhouette edge by extending specific edges of the corresponding pivoted supporting polygon incident on vertices of the first-order silhouette edge. Additional details of step 120 are disclosed in FIG. 6A.

If the first-order silhouette edge is parallel to a supporting silhouette then process flow proceeds from 112 to step 118.

In step 118, the supporting quadrangle, called a SE-ME (source edge-mesh edge) quadrangle is constructed by pivoting from the viewcell edge to the viewcell as previously described.

Process flow proceeds to step 120 to construct the SE-ME wedge corresponding to the SE-ME supporting quadrangle by extending the line segments formed by diagonal vertices of the SE-ME supporting quad. The edges of the SE-ME wedge are comprised of the supported silhouette edge and the two lines formed by extending the diagonal line segments through the silhouette edge vertices and away from the viewcell.

Process flow proceeds for steps 116 or 120 to decision step 125 to determine if adjacent silhouette edges form an outside corner of the first-order silhouette contour. In some embodiments, this determination is made using a simple test for the relative orientation of adjacent silhouette edges. Each edge, being on the boundary of a polygon mesh, has a natural orientation in which one normal to the edge is facing outside the polyhedron (outfacing normal) and the opposite normal is facing inside the polyhedron. If the two outfacing normals for adjacent silhouette edges are facing away from each other, then the shared silhouette vertex is an inside corner of the silhouette contour. Otherwise the shared silhouette vertex forms an outside corner.

If it is determined, in decision step 125, that the adjacent silhouette edges form an outside corner of the silhouette contour, then process flow proceeds to step 140 to intersect the wedges incident on the adjacent silhouette edges with each other. In some embodiments, if the adjacent SV-ME wedges were generated by pivoting to the same supporting viewcell vertex (SVV), then they exactly intersect at a common edge. Otherwise, the adjacent SV-ME wedges not intersect each other in their polygon interiors and an explicit polygon-polygon intersection determination is made. In either case, the intersecting SV-ME wedges produce continuous umbral event surface spanning portion of the first-order silhouette contour formed by the two supported silhouette edges. In some embodiments, adjacent SV-ME wedges are not intersected. In these embodiments the step 140 is optional. A SV-ME wedge which is not intersected with an adjacent SV-ME wedge can still be intersected with mesh polygons and the resulting wedge-mesh polygon intersection tested to determine if it is a from-viewcell occlusion boundary. Additional discussion of intersecting adjacent SV-ME wedges is given in conjunction with FIG. 7J and FIG. 7K.

If it is determined, in decision step 125, that the adjacent silhouette edges do not form an outside corner of the silhouette contour, then process flow proceeds from step 125 to step 130. This case corresponds to an inside corner of a first-order silhouette contour.

In some embodiments, such inside corners formed by two silhouette edges that are connected by a vertex are simple silhouette vertices. Using the first-order model of visibility propagation inside corners can also form on compound silhouette contours in which the component silhouette edges do not share a vertex in the original manifold mesh. These are called compound silhouette vertices (CSVs), they correspond to from-region t-vertices of the manifolds and are discussed in detail in a later part of this specification.

In step 130, one or more supporting swept triangles are formed between the inside corner mesh silhouette vertex and certain edges of the viewcell that are from-point silhouette edges with respect to the inside corner mesh silhouette vertex. Additional details of this process are disclosed in FIG. 5A and FIG. 5B.

Process flow proceeds to step 135, the corresponding SE-MV wedges are generated from the swept triangles by extending the edges of the swept triangles through the inside corner mesh silhouette vertex. Additional details of this process are disclosed in FIG. 6B.

Alternate embodiments are possible in which the set of first-order wedges are constructed using a different method. For example, in one alternate embodiment, the entire conservative supporting hull between the viewcell and the polygon mesh objects may be constructed, and the first-order wedges selected as a subset of the conservative supporting hull polygons.

Figure 3:
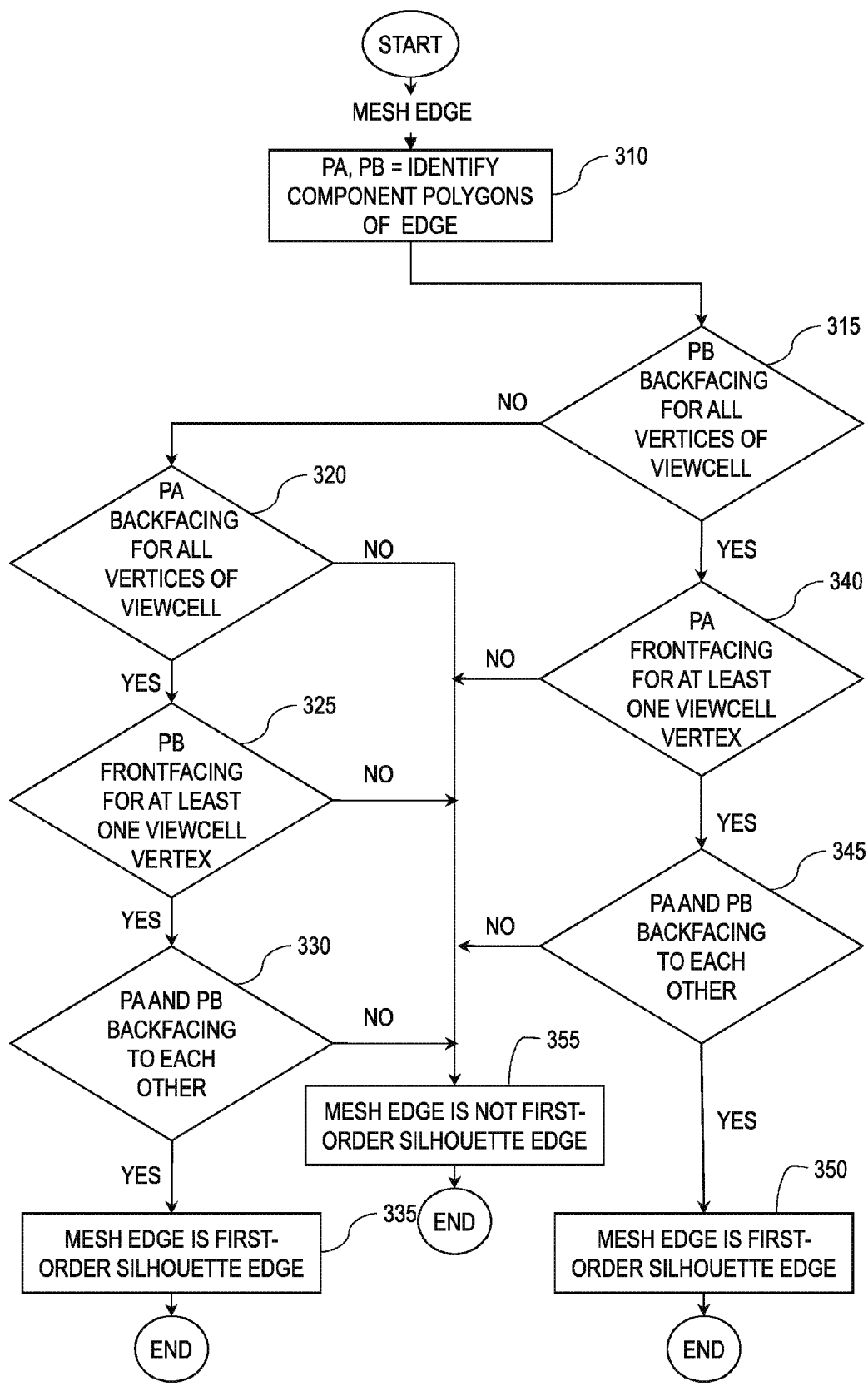
FIG. 3 is an exemplary flowchart showing the method of identifying first-order from-region (in this case from-viewcell) silhouette edges.

FIG. 3 shows details of the step 110 in FIG. 1, the identification of first-order silhouette edges. According to some embodiments, the process illustrated in FIG. 3 is entered at step 110 of FIG. 1. In some embodiments, the process of identifying first-order silhouette edges starts at step 310 to identify the component polygons of the edge. In some embodiments, this process is facilitated by storing the polygon mesh as a linked data structure such as a winged-edge data structure, in which a reference to the component polygons for each edge is stored. In other embodiments, any desired data structure is used to represent the polygon mesh.

In one implementation, the polygon mesh is a closed manifold mesh in which each edge is shared by exactly two component polygons.

Process flow proceeds to decision step 315 to test one component polygon, called polygon B or PB, to determine if the component is backfacing for all vertices of the viewcell. In this case, all vertices of the viewcell would be on the backfacing side of the plane that contains the component polygon.

If, in decision step 315 it is determined that PB is not backfacing for all viewcell vertices, then process flow proceeds from step 315 to step 320 to test the other component polygon, called PA, as described in step 315.

If, in decision step 320, it is determined that PA is backfacing for all vertices of the viewcell, then process flow proceeds to step 325 to determine if component triangle PB is front facing for at least one viewcell vertex.

If, in decision step 325, it is determined that PB is front facing for at least one viewcell vertex then process flow proceeds to decision step 330 to test PA and PB to determine if they are backfacing with respect to each other.

If, in decision step 330, it is determined that PA and PB are backfacing relative to each other, then process flow proceeds to step 335, where the edge being tested is a first-order silhouette edge.

If, in decision step 330, it is determined that PA and PB are not backfacing relative to each other, then process flow proceeds to step 355 which returns a result that the edge being tested is not a first-order silhouette edge.

If in step 315, if PB is backfacing for all vertices of the viewcell, process flow proceeds to step 340 to determine if PA is frontfacing for at least one viewcell vertex. If PA is frontfacing for at least one viewcell vertex, process flow proceeds to step 345 to determine if PA and PB are backfacing to each other as functionally described in step 330.

If PA and PB are backfacing with respect to each other, process flow proceeds to step 350 which returns a result that the edge being tested is a first-order silhouette edge. If PA and PB are not backfacing to each other, process flow proceeds from 345 to 355. If PA is not frontfacing for at least one viewcell vertex, process flow proceeds from 340 to 355. If any of the tests in steps 320, 325, 330, 340, or 345 fail, then the mesh edge is not a first-order silhouette edge, as indicated in step 355.

FIG. 4A Method of Constructing of SV-ME and SE-ME Supporting Polygons

FIG. 4A is a flowchart showing the method of constructing a SV-ME supporting polygon incident on a (first-order) mesh silhouette edge. FIG. 4A gives additional detail of the process shown in step 116. According to some embodiments, the process illustrated in FIG. 4A is entered from step 116 in FIG. 1.

In some embodiments, the process of constructing supporting polygons starts at step 410 upon encountering a silhouette edge of the polygon mesh. In the present embodiment this is a first-order silhouette edge, although other embodiments may potentially use higher order silhouette edges.

Process flow proceeds to step 415 to set a SUPPORTING_ANGLE between the first-order silhouette edge and the viewcell to a MAX value (e.g., 180 degrees). According to some embodiments, the supporting angle is defined as the angle formed when pivoting a plane through the first-order silhouette edge, starting in the plane of the backfacing component polygon and pivoting toward the viewcell (in the general direction of the normal of the backfacing component polygon) until the first vertex or edge of the viewcell is encountered. The position of the pivoting plane on contact with the viewcell is the plane of the supporting polygon between the silhouette edge and the viewcell. The angle traversed during the pivot is called the supporting angle or the pivot angle, and it is measured between the supporting plane and the plane of the backfacing component polygon of the silhouette edge. The viewcell vertex, or edge if the supporting polygon is SE-ME type, that results in the smallest pivot angle is the supporting vertex or supporting edge.

The remainder of FIG. 4A shows the process of identifying the supporting viewcell vertex and constructing the supporting polygon. Process flow proceeds to step 420 to set the VERTEX to the first vertex of the viewcell. In embodiments, the VERTEX is a candidate vertex that is tested to determine if the candidate vertex is a supporting vertex. Process flow proceeds to step 425 to construct a triangle between the mesh silhouette edge EDGE and VERTEX. Process flow proceeds to step 430 to measure the angle between the visible sides of the plane of the TRIANGLE and the plane of the backfacing component polygon of the silhouette edge using a standard method for measuring the angle between planes at their line of intersection. Process flow proceeds to step 435 to compare this ANGLE to the current value of the SUPPORTING_ANGLE. If the ANGLE is less than the current value of the SUPPORTING_ANGLE, then process flow proceeds to step 440 to set the SUPPORTING_ANGLE to ANGLE. Process flow proceeds to 445 to set the SUPPORTING_VERTEX to the current VERTEX.

Process flow proceeds to step 450, where the supporting polygon is set to the triangle formed by the silhouette edge and the supporting vertex.

Process flow proceeds to step 455 to determine if unprocessed viewcell vertices remain. If, in decision step 455, it is determined that no unprocessed viewcell vertices remain, then process flow proceeds to step 460, where the supporting polygon is output.

If, in decision step 455, it is determined that unprocessed viewcell vertices remain, then process flow proceeds to step 475, where the next viewcell vertex is selected for processing.

If, in decision step 435, it is determined that the ANGLE (pivot angle) measured is not less than the current SUPPORTING_ANGLE, then process flow proceeds to step 465 to determine if the pivot angle (ANGLE) equals the current value of SUPPORTING_ANGLE. If this condition is true, then two vertices of the viewcell form the same pivot angle with the silhouette edge, corresponding to a SE-ME supporting polygon, and process flow proceeds to step 470 to set the quadrangle between both viewcell vertices and the viewcell edge (an SE-ME supporting polygon).

A quadrangular supporting polygon is constructed in step 470 only in the special case when the supporting angle between the silhouette edge and two viewcell vertices is equal. For a convex viewcell, which is assumed in the present embodiment, this occurs only when the two supporting viewcell vertices lie on an edge of the viewcell that is parallel to the mesh silhouette edge. In this case, the visibility from the viewcell "across" the silhouette edge is not determined by the usual from-point visibility triangle but instead by a from-segment visibility quadrangle.

Other embodiments are possible which deal with this special case differently, for example by constructing two supporting triangles and a swept triangle incident on the parallel supporting viewcell edge. Using this approach, the resulting corresponding adjacent UBPs will not intersect only at an edge, but instead, they will overlap on their planes, causing a local degeneracy of the bounded polyhedral umbra volume. The present method of identifying quadrangular supporting polygons avoids such degeneracies in later steps.

Regardless of whether the candidate supporting polygon is a triangle or a quadrangle, the process flow proceeds from step 470 to step 455 to determine if any unprocessed vertices remain as described above. If viewcell vertices remain, then process flow returns to step 475, where the next viewcell vertex is selected. Subsequently the process follows the previously described steps.

At the final step 460, the process outputs a supporting polygon that is either a triangle, formed by the mesh silhouette edge and a vertex of the viewcell, or a quadrangle that is formed between the mesh silhouette edge and a viewcell edge.

Alternate embodiments of the method of constructing SV-ME supporting polygons are possible. In one alternate embodiment, the SUPPORTING_VERTEX corresponding to one first-order silhouette edge is limited to those viewcell vertices directly connected to the SUPPORTING_VERTEX for an adjacent first-order silhouette edge, wherein the adjacent edges form an outside corner (convex feature) of the mesh. This method is similar to the method employed in the classic prior-art method of divide-and-conquer method of constructing a convex hull in 3D. In the present application the viewcell is a very simple polyhedron and the speedup afforded by this method is very limited.

Figure 4B:
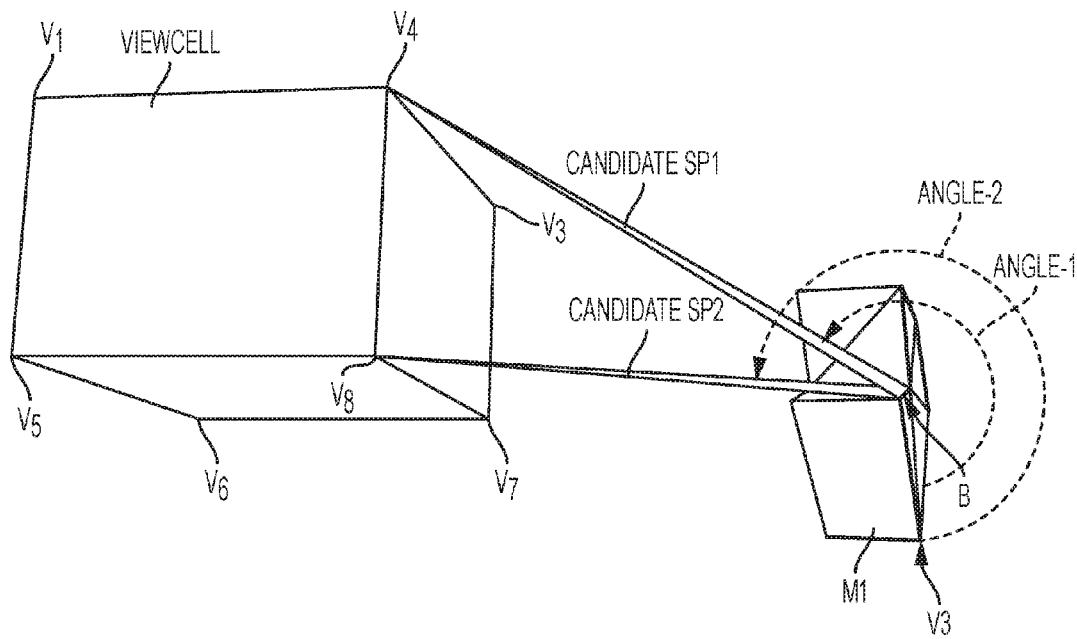
FIG. 4B shows a mesh object M1 a viewcell, and two candidate supporting polygons with their respective pivot angles.

FIG. 4B shows a mesh object M1 and a viewcell. The VIEWCELL and polygon mesh M1 are the same objects shown in FIG. 7A and FIG. 7B. In FIG. 4B the viewpoint is between that of FIG. 7A and FIG. 7B. A first-order silhouette edge labeled B also appears in all three figures. The view direction in FIG. 4B is very close to being parallel to edge B. Thus edge B is seen nearly edge-on as a point. A vertex of the polygon mesh M1 is shown as vertex V3 in FIG. 4B and FIG. 7B.

Two candidate supporting polygons are shown as CANDIDATE SP1 and CANDIDATE SP2. A candidate supporting polygon is identified for first-order silhouette edge B by constructing a triangle formed by edge B and a vertex of the viewcell. The angle of that the plane of this supporting polygon forms with the plane of the backfacing component polygon sharing edge B is measured. This angle corresponds to the variable SUPPORTING_ANGLE determined in step 425 of FIG. 4A and used in steps 435 and 465 of the same figure. In the example shown in FIG. 4B the backfacing component polygon of first-order silhouette edge B is the triangle formed by edge B and vertex V3.

In this example, the angle formed by CANDIDATE SP1 (corresponding to viewcell vertex V4 is indicated by a dashed arc labeled ANGLE-1.

In this example, the angle formed by CANDIDATE SP2 (corresponding to viewcell vertex V8 is indicated by a dashed arc labeled ANGLE-2.

From the two arcs, it is apparent that ANGLE-1 is less than ANGLE-2. According the exemplary flowchart of FIG. 4A, CANDIDATE SP1 would be retained as a candidate for the actual supporting polygon on first-order silhouette. If all the vertices of VIEWCELL are tested by the process shown in the exemplary flowchart of FIG. 4A it will be found that vertex V4 results in the supporting polygon (CANDIDATE SP1) giving the smallest supporting angle. CANDIDATE SP1 is shown as the actual supporting polygon SPB in FIG. 7D.

Standard angle measures can be employed to determine the angle including the cross product between the normal vectors of the plane of the backfacing polygon and the candidate supporting polygon.

Figure 4C:
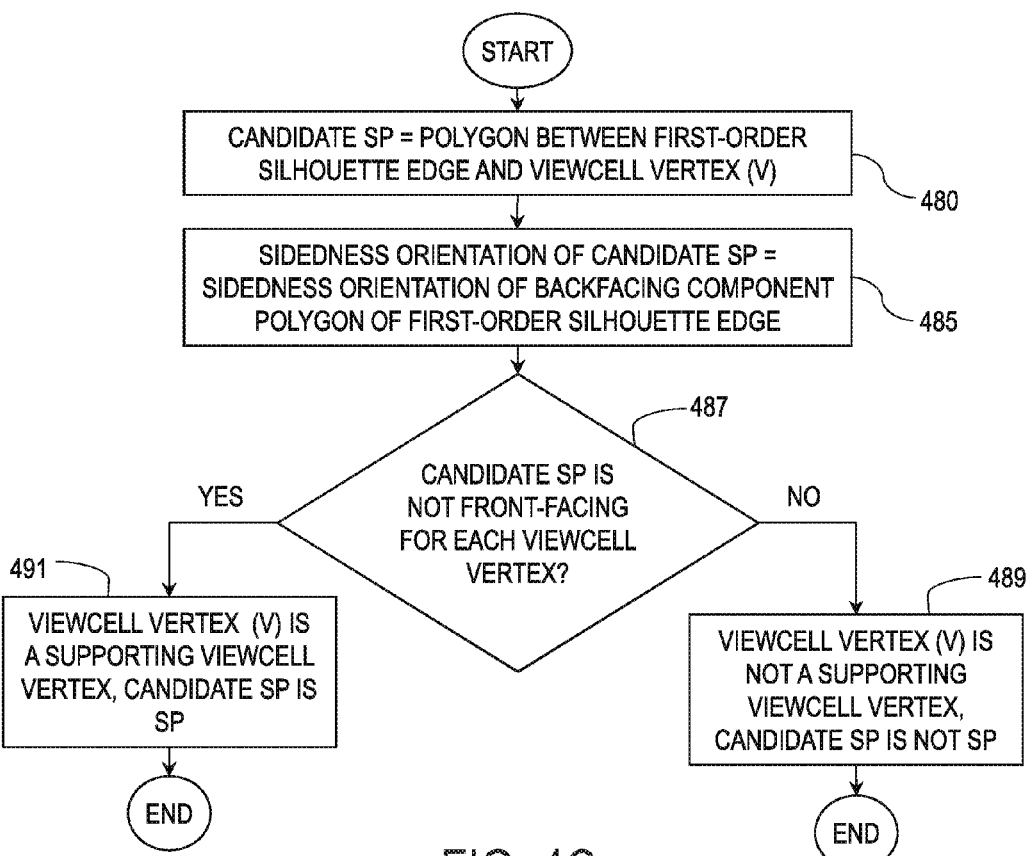
FIG. 4C is an exemplary flow diagram showing a test for determining if a polygon formed between a first-order silhouette edge and a viewcell vertex is a supporting polygon.

FIG. 4C is a flow diagram showing a test for determining if a polygon formed between a first-order silhouette edge and a viewcell vertex is a supporting polygon.

Alternate embodiments are possible in which SV-ME supporting polygons are identified by considering both the "sidedness orientation" of the candidate supporting polygon (relative to the interior of the polygon mesh) and the orientation of the candidate supporting polygon relative to the viewcell vertices.

In one embodiment, mesh polygons are all assumed to be "outside" polygons which have their normal vector locally oriented away from the "inside" of the region contained by the polygon mesh. In such embodiments, all mesh polygons of a polygon mesh consistently have this same "sidedness" orientation.

A polygon is a planar structure which can have two sides, corresponding to the two sides of the plane containing the polygon. Exemplary embodiments include polygon meshes which are manifold or closed. Manifold meshes divide the volume of space in which they are embedded into an inside and an outside. In computer graphics, it is useful to employ manifold meshes in which the normal vector of each polygon in the mesh is locally oriented to face away from the inside of this enclosed volume. This can be called the "outside" side of the polygon. The opposite side can be called the "inside" side of the polygon. If all polygons have this consistent sidedness orientation in a mesh, then no inside side of a polygon should ever be visible from the outside.

In exemplary embodiments, it can be established that polygons of a mesh have the same sidedness orientation by examining the vertex orderings of adjacent polygons i.e., polygons which share an edge. (See Schneider (2003) Schneider, Philip J., Eberely, David H., "Geometric Tools for Computer Graphics" Morgan Kaufmann 2003 pp. 342-345, the entire contents of which are incorporated herein by reference). Let $F_0$ and $F_1$ be two adjacent polygons sharing an edge comprised of two vertices $V_1$ and $V_3$. If vertices $V_1$ and $V_3$ occur in the order $V_1$ followed by $V_3$ for polygon $F_0$, then they must occur in polygon $F_1$ in the order $V_3$ followed by $V_1$. Adjacent polygons in which shared edges have this ordering are said to have a consistent vertex ordering. Polygons with a consistent vertex ordering have the same sidedness orientation. The vertex ordering reflects the order in which the vertices are stored for each triangle. Vertices accessed in this same order for a triangle defines vectors (triangle edges) whose cross products are the coefficients A, B, C of the plane equation or normal vector of the triangle. In some embodiments, all mesh triangles have consistent vertex orderings and all will have normal vectors that point away from the inside of the mesh, i.e. they are all outside facing triangles. Embodiments may employ known algorithms to identify and repair inconsistent vertex orderings in a polygon mesh prior to processing (See MakeConsistent procedure of Schneider (2003), pp 345).

Figures 4D, 4E:
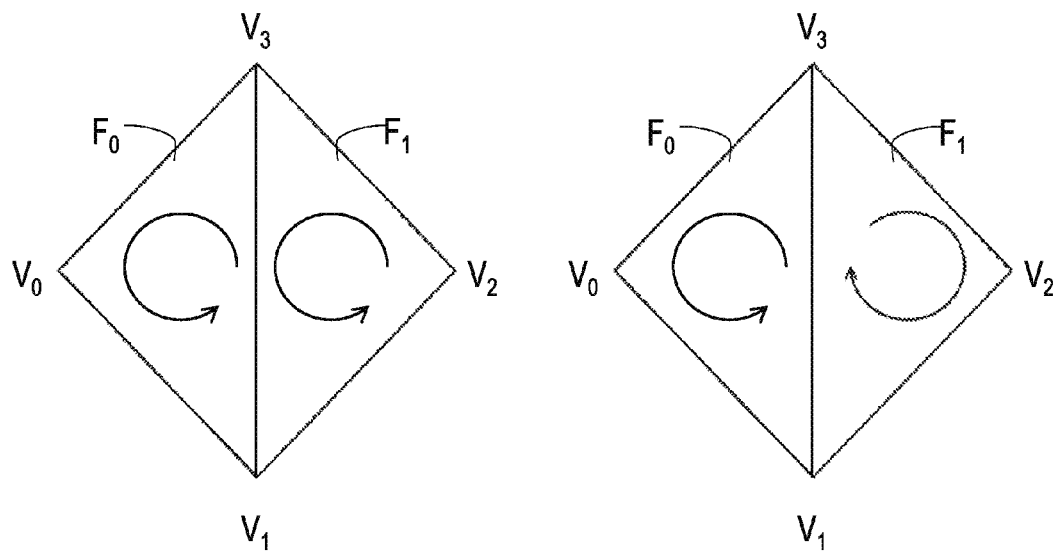
FIG. 4D is an exemplary diagram showing two mesh polygons having a consistent vertex ordering.
FIG. 4E is an exemplary diagram showing two mesh polygons having an inconsistent vertex ordering.

FIG. 4D is an exemplary diagram showing two adjacent polygons $F_0$ and $F_1$ in which the polygons have a consistent vertex ordering. Note that for polygon $F_0$ the shared edge is accessed in $V_1$-$V_3$ order while for the adjacent polygon and $F_1$ the same shared edge is accessed in $V_3$-$V_1$, thus meeting the definition of consistent ordering. Adopting a right-hand rule convention, the normal of both polygons points out of the plane of the image.

FIG. 4E is an exemplary diagram showing two adjacent polygons $F_0$ and $F_1$ in which the polygons do not have a consistent vertex ordering.

In one embodiment, a candidate SV-ME supporting polygon for a first-order silhouette edge is formed between a viewcell vertex and the first-order silhouette edge. The candidate supporting polygon is given the same sidedness orientation as the backfacing mesh polygon sharing the first-order silhouette edge. (Using this consistent sidedness orientation, for example, a person walking across the first-order silhouette edge on the "outside" surface of the backfacing mesh polygon would encounter the "outside" surface of the candidate supporting polygon). The orientation of the plane of each candidate supporting polygon is then examined relative to the viewcell vertices. If the plane of the candidate supporting polygon is not front-facing with respect to each viewcell vertex, then the viewcell vertex forming the candidate supporting polygon is a supporting viewcell vertex, and the candidate supporting polygon is a supporting polygon.

According to some embodiments, the employed definition of front-facing with respect to a viewcell vertex excludes viewcell vertices which are in the plane of the candidate supporting polygon (i.e. admitting a supporting viewcell vertex as not front-facing). Alternate embodiments can employ variations of the definitions of backfacing and front facing to determine that a candidate supporting polygon is not front-facing with respect to each viewcell vertex. In at least one exemplary embodiment, the test includes establishing that the candidate supporting polygon is backfacing with respect to each viewcell vertex, where the definition of a plane that is backfacing to a vertex includes vertices which are in the plane (i.e. admitting a supporting viewcell vertex as backfacing to a supporting polygon).

According to some embodiments, the process illustrated in FIG. 4C is entered from step 480. In step 480 a candidate supporting polygon is formed between the first-order silhouette edge and a viewcell vertex (V).

Process flow proceeds to step 485 to set the sidedness orientation of the candidate supporting polygon formed in step 480 to be the same as the backfacing component polygon sharing the first-order silhouette edge.

Process flow proceeds to step 487 to determine if the candidate supporting polygon is not front-facing for each of the viewcell vertices. If, in decision step 487, it is determined that the candidate supporting polygon is not front-facing with respect to each viewcell vertex then process flow proceeds to step 491 to identify the viewcell vertex (V) as a supporting viewcell vertex and to identify the candidate supporting polygon as a supporting polygon.

If, in decision step 487, it is determined that the candidate supporting polygon is front-facing for any viewcell vertex then process flow proceeds to step 489 to identify the viewcell vertex (V) as not a supporting viewcell vertex and to identify the candidate supporting polygon as not a supporting polygon.

The test illustrated by exemplary flowchart of FIG. 4C can also be employed to identify SE-ME type supporting polygons.

Figure 5A:
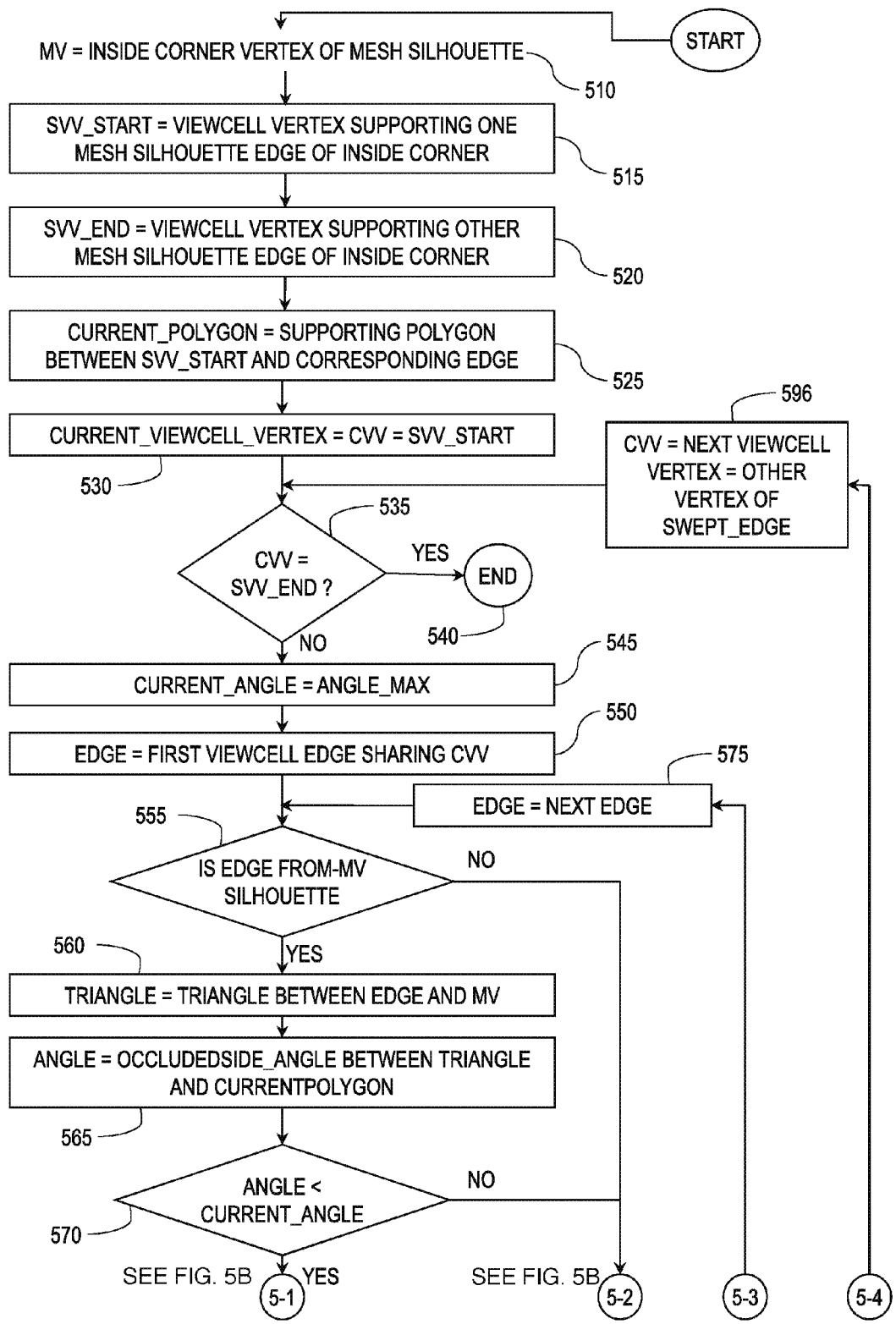
FIG. 5A is an exemplary flowchart showing the method of constructing SE-MV swept triangle incident on an inside corner mesh silhouette vertex.
Figure 5B:
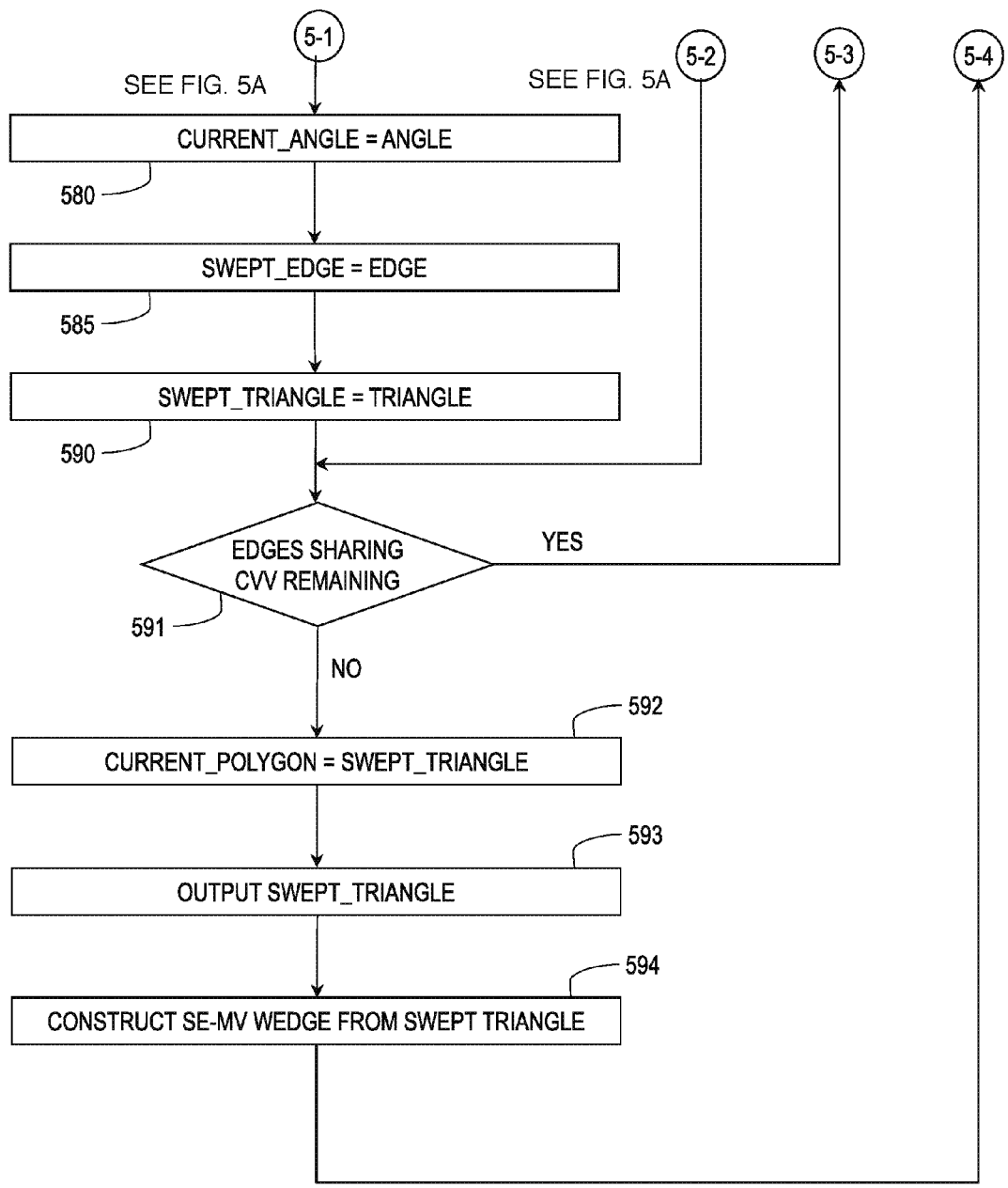
FIG. 5B is a continuation of FIG. 6A.

FIG. 5A and FIG. 5B Flowchart Showing a Method of Constructing SE-MV Supporting (Swept) Triangles FIG. 5A and FIG. 5B comprise a flowchart showing the method of constructing SE-MV supporting swept triangles incident on an inside corner mesh silhouette vertex. This is additional detail of the step 130 of FIG. 1. According to some embodiments, the process illustrated in FIGS. 5A and 5B is entered from step 130 in FIG. 1.

In some embodiments, the process of constructing SE-MV supporting swept triangles starts at step 510 upon encountering an inside corner of a first-order silhouette contour of a polygon mesh. This inside corner may be formed from a simple first-order silhouette contour in which two first-order silhouette edges share a vertex. If the normals of the silhouette edges forming the intersection (with normal direction assumed to be facing away from the interior of their component polygons) are facing each other, then the intersection is an inside corner vertex.

Alternatively, the inside corner may be a vertex of a compound silhouette contour formed by the intersection of a wedge with a first-order silhouette edge. In the latter case, the inside corner silhouette mesh silhouette vertex is called a compound silhouette vertex (CSV).

Process flow proceeds to step 515 to identify the supporting viewcell vertex (SVV) for one of the silhouette edges forming the vertex using, for example, the process disclosed in FIG. 4A. The identity of this vertex is stored as the variable SVV_START. Process flow proceeds to step 520, were the process for step 515 is repeated for the other edge of the inside corner, and the result is stored as the variable SVV_END).

If either supporting polygon of the inside corner is a quadrangle (generated in FIG. 4A, step 470) then the supporting polygon has two SVVs. In this special case, care must be taken to select, in steps 515 and 520, the initial (SVV_START) or terminal (SVV_END) viewcell vertex in the chain as the vertex that is farthest removed from the other end of the chain.

Process flow proceeds to step 525, where the variable CURRENT_POLYGON is set to identify the supporting polygon between the viewcell vertex SVV_START and the corresponding supported edge of the polygon mesh.

Process flow proceeds to step 530, where an initial point for the sweep of the viewcell silhouette contour, which ultimately occurs between the viewcell vertices SVV_START and SVV_END, is set to be the viewcell vertex SVV_START and stored as the variable CVV, which holds the current vertex of the sweep.

Process flow proceeds to decision step 535 to compare CVV to SVV_END to determine if the sweep should be terminated.

If, in decision step 535, it is determined that the current viewcell vertex being processed (CVV) is the same as the last vertex in the sweep (SVV_END), then process flow proceeds to step 540 and terminates. If both edges of the inside corner have the same supporting point on the viewcell then the corresponding SV-ME wedges intersect along a common edge and there is no swept triangle corresponding to the inside corner vertex. This situation would be identified on the initial execution of step 535 and the sweep would be terminated without producing a swept triangle.

If, in decision step 535, it is determined that CVV is not SVV_END, then process flow proceeds to step 545 to set a variable CURRENT_ANGLE to a maximum value.

Process flow proceeds to step 550, where a first viewcell edge sharing the viewcell vertex CVV is selected and referenced by the variable EDGE.

Process flow proceeds to decision step 555 to determine if the edge EDGE is a (from-point) silhouette edge with respect to the inside corner mesh silhouette vertex MV.

If, in decision step 555, it is determined that EDGE is a from-MV silhouette edge, then process flow proceeds to step 560 to form the triangle between the point MV and the edge EDGE. This triangle is a candidate swept triangle between MV and the viewcell, but it must be compared to other swept triangle candidates that share the same viewcell edge.

Process flow proceeds to 565, where the comparison of these other swept triangle candidates begins. In this regard, the angle between the current swept triangle candidate TRIANGLE and the CURRENT_POLYGON (supporting polygon) incident on MV is measured. The value is stored in the variable ANGLE. Since TRIANGLE and CURRENT_POLYGON share a common edge, the angle can be measured at the edge, adopting the convention that the angle is the angle between the occluded sides of each polygon. The occluded side of a supporting polygon is the side that connects to the interior of the mesh polygon at the silhouette edge. The occluded side of the candidate swept triangle is the side that connects to the interior of the mesh polygons at the vertex MV. This angle is stored in the variable ANGLE.

Alternate embodiments are possible in which the orientation of the swept triangle and corresponding SE-MV wedge relative to neighboring wedges is examined. All wedges are oriented surfaces having a "visible" side and an "invisible" side. For SE-MV wedges the visible side is the unoccluded side (visible on this side as a result of being not occluded by mesh polygon beyond the corresponding first-order silhouette edge). For SV-ME wedges the visible side is the "contained" side (visible as a result of being contained in the viewcell when looking through and beyond the corresponding inside-corner first-order silhouette vertex.

In one embodiment the SWEPT_TRIANGLE is constructed from MV viewcell edges which produce a SWEPT_TRIANGLE that has a containment orientation that is consistent with the occlusion orientation of an adjacent SE-MV wedge and consistent with the containment orientation of neighboring SV-ME wedges. SV-ME wedge which do not have this consistent orientation do not contribute to the continuous, conservative linearized umbral event surface.

The orientation of an SV-ME wedge is opposite to the orientation of the corresponding SV-ME supporting polygon. This inversion occurs as a result of the edges of the SV-ME supporting polygons being effectively "projected" through the inside-corner first-order silhouette vertex to form the corresponding SV-ME wedge. (e.g. a particular SE-MV supporting polygon which has the containment shaft between the viewcell and the inside-corner first-order silhouette vertex "below" the supporting polygon in the negative Y direction will produce a corresponding SE-MV wedge which has its "contained" or visible side in the positive Y direction.

Process flow proceeds to decision step 570, to determine if this angle (ANGLE) is less than the current value of CURRENT_ANGLE.

If, in decision step 570, it is determined that the current value of ANGLE is less than the value of CURRENT_ANGLE, then TRIANGLE is a candidate swept triangle and process flow proceeds to process 5-1, which starts at step 580 in FIG. 5B.

In step 580, the variable CURRENT-ANGLE is set to the value of ANGLE.

Process flow proceeds to step 585 to set the variable SWEPT_EDGE to refer to the edge EDGE.

Process flow proceeds to step 590 to set the variable SWEPT_TRIANGLE to reference the triangle TRIANGLE.

Process flow proceeds to decision step 591 to determine if any other edges sharing the current viewcell vertex CVV have been unprocessed.

If, in decision step 591, it is determined that unprocessed edges sharing the viewcell vertex remain, then process flow proceeds to process 5-3, which returns the process flow to step 575 (FIG. 5A), where the variable EDGE is set to reference the next viewcell edge sharing the vertex CVV. Process flow then returns to step 555 to generate the next candidate swept triangle and test it.

If, in decision step 591, is determined that no other unprocessed viewcell edges share the vertex, then process flow proceeds to step 592, where the CURRENT_POLYGON variable is set to reference the triangle SWEPT_TRIANGLE.

Process flow proceeds to step 593 to output the swept triangle SWEPT_TRIANGLE.

Process flow proceeds to step 594 to construct a SE-MV wedge from the swept triangle. Further details of this step is disclosed in FIG. 6B.

Process flow then proceeds to process 5-4, which starts at step 594 (FIG. 5A) to advance to the next connected viewcell vertex. Process flow then returns to step 535.

If, in decision step 555, it is determined that the viewcell edge is not a from-point silhouette edge from the point MV, then process flow proceeds to process 5-2, which starts at step 591 (FIG. 5B) to select a remaining viewcell edge for processing.

Figure 5C:
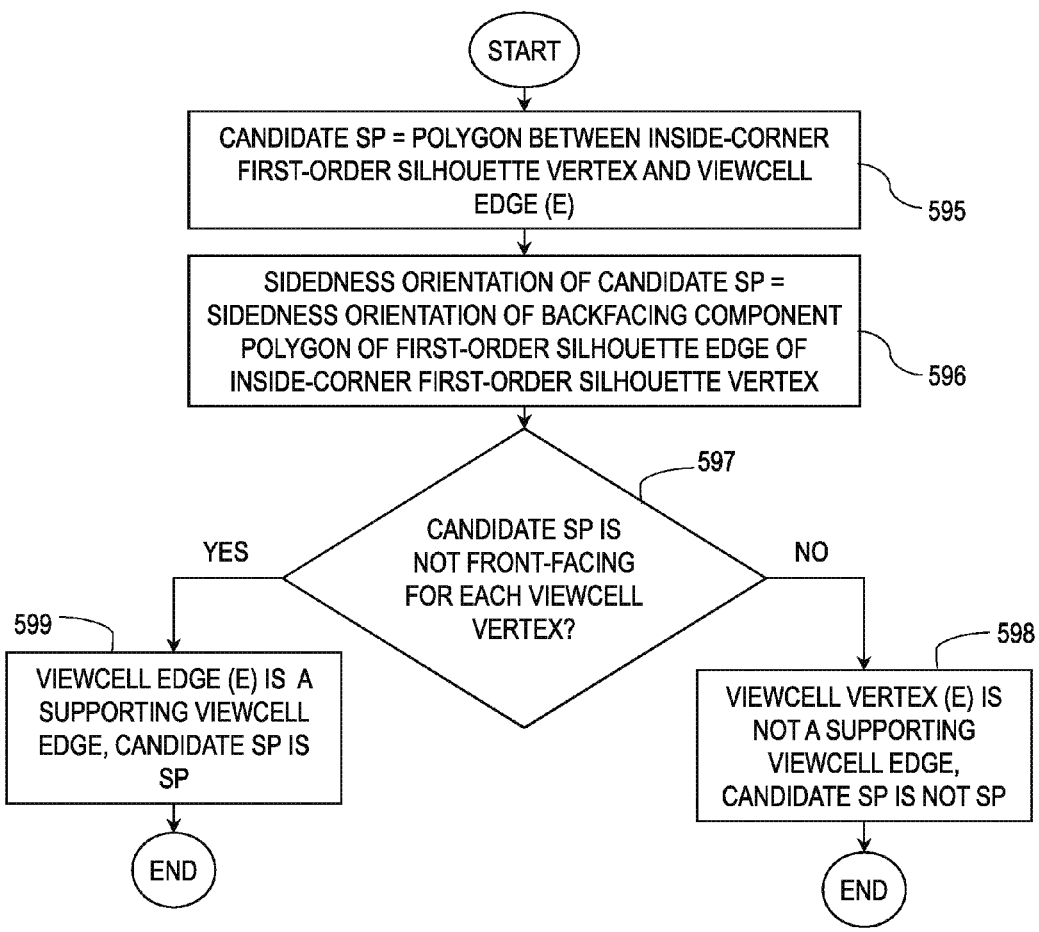
FIG. 5C is an exemplary flow diagram showing a test for determining if a polygon formed between an inside-corner first-order silhouette vertex and a viewcell edge is a supporting polygon.

FIG. 5C is a flow diagram showing a test for determining if a polygon formed between an inside-corner first-order silhouette vertex and a viewcell edge is a supporting polygon.

Alternate embodiments are possible in which SE-MV supporting polygons are identified by considering both the "sidedness orientation" of the candidate supporting polygon (relative to the interior of the polygon mesh) and the orientation of the candidate supporting polygon relative to the viewcell vertices.

In one embodiment, mesh polygons are all assumed to be "outside" polygons which have their normal vector locally oriented away from the "inside" of the region contained by the polygon mesh. In such embodiments, all mesh polygons of a polygon mesh consistently have this same "sidedness" orientation.

As previously described, a polygon is a planar structure which can have two sides, corresponding to the two sides of the plane containing the polygon. Exemplary embodiments include polygon meshes which are manifold or closed. Manifold meshes divide the volume of space in which they are embedded into an inside and an outside. In computer graphics, it is useful to employ manifold meshes in which the normal vector of each polygon in the mesh is locally oriented to face away from the inside of this enclosed volume. This can be called the "outside" side of the polygon. The opposite side can be called the "inside" side of the polygon. If all polygons have this consistent sidedness orientation in a mesh, then no inside side of a polygon should ever be visible from the outside.

In exemplary embodiments, it can be established that polygons of a mesh have the same sidedness orientation by examining the vertex orderings of adjacent polygons i.e., polygons which share an edge. (See Schneider, Philip J., Eberely, David H., "Geometric Tools for Computer Graphics" Morgan Kaufmann 2003 pp. 342-345, the entire contents of which are incorporated herein by reference). Let $F_0$ and $F_1$ be two adjacent polygons sharing an edge comprised of two vertices $V_1$ and $V_2$. If vertices $V_1$ and $V_2$ occur in the order $V_1$ followed by $V_2$ for polygon $F_0$, then they must occur in polygon $F_1$ in the order $V_2$ followed by $V_1$. Adjacent polygons in which shared edges have this ordering are said to have a consistent vertex ordering. Polygons with a consistent vertex ordering have the same sidedness orientation.

In one embodiment, a candidate SE-MV supporting polygon for an inside-corner first-order silhouette vertex is formed between a viewcell edge and the inside-corner first-order silhouette vertex. The candidate supporting polygon is given the same sidedness orientation as a backfacing mesh polygon sharing a first-order silhouette edge of the inside-corner first-order silhouette vertex. (Using this consistent sidedness orientation, for example, a person walking across the first-order silhouette edge on the "outside" surface of the backfacing mesh polygon would encounter the "outside" surface of the candidate supporting polygon). The orientation of the plane of each candidate supporting polygon is then examined relative to the viewcell vertices. If the plane of the candidate supporting polygon is not front-facing with respect to each viewcell vertex then the viewcell edge forming the candidate supporting polygon is a supporting viewcell edge, and the candidate supporting polygon is a supporting polygon.

According to some embodiments the process illustrated in FIG. 5C is entered from step 595. In step 595 a candidate supporting polygon is formed between the inside-corner first-order silhouette vertex and a viewcell edge (E). Process flow proceeds to step 596 to set the sidedness orientation of the candidate supporting polygon formed in step 595 to be the same as the backfacing component polygon sharing a first-order silhouette edge of the inside-corner first-order silhouette vertex. In exemplary embodiments, the sidedness orientation of the SE-MV supporting polygon can be set to be consistent with a previously determined adjacent SV-ME or SE-MV supporting polygon. Because the SE-MV supporting polygon shares an edge with these adjacent polygons the sidedness orientation can be set by insuring that the adjacent polygons have consistent vertex ordering.

Process flow proceeds to step 597 to determine if the candidate supporting polygon is not front-facing for each of the viewcell vertices. If, in decision step 597, it is determined that the candidate supporting polygon is not front-facing with respect to each viewcell vertex then process flow proceeds to step 599 to identify the viewcell edge (E) as a supporting viewcell edge and to identify the candidate supporting polygon as a supporting polygon.

If, in decision step 597, it is determined that the candidate supporting polygon is front-facing for any viewcell vertex then process flow proceeds to step 598 to identify the viewcell edge (E) as not a supporting viewcell edge and to identify the candidate supporting polygon as not a supporting polygon.

Figure 6A:
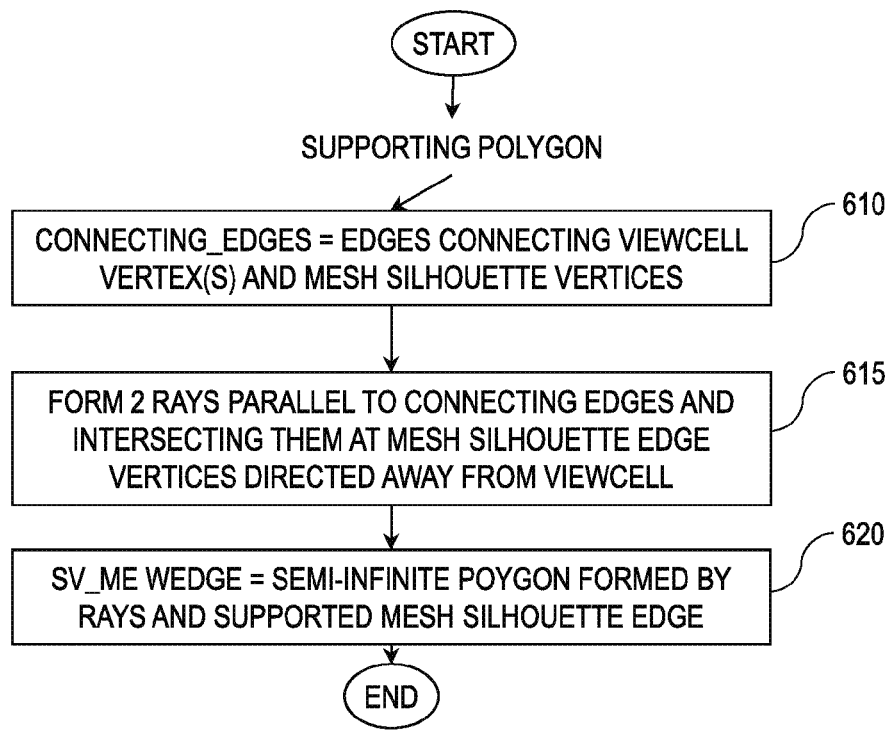
FIG. 6A is an exemplary flowchart showing a method of constructing SV-ME and SE-ME wedges from the corresponding SV-ME and SE-ME supporting polygons

FIG. 6A Flowchart Showing a Method of Constructing SV-ME and SE-ME Wedges from the Corresponding SV-ME and SE-ME Supporting Polygons FIG. 6A is a flowchart showing the process of constructing a SV-ME wedge from the corresponding supporting polygon. This provides additional detail to the step 116 in FIG. 1. According to some embodiments, the process illustrated in FIG. 6A is entered from step 116 in FIG. 1.

In some embodiments, the process to construct SV-ME and SE-ME wedges from corresponding SV-ME and SE-ME supporting polygons starts at step 610, where the connecting edges of the supporting polygon are identified as those edges which have one vertex that is a vertex of the viewcell and another vertex that is a vertex of the polygon mesh.

Process flow proceeds to step 615, to construct rays from the connecting edges by extending the connecting edges in a semi-infinite fashion away from the viewcell starting at the corresponding vertices of the supported silhouette edge. If the supporting polygon is a triangle, then the two edges that connect the viewcell and the silhouette edge are extended. If the supporting polygon is a quadrangle (from FIG. 4A, step 470), then the diagonals connecting the viewcell edge and silhouette edge can be extended. Extending the diagonals produces a larger wedge that actually reflects the visibility from the viewcell edge through the silhouette edge.

Process flow proceeds to step 620 to connect the extended edges to the corresponding (supported) polygon mesh silhouette edge to form the semi-infinite SV-ME (or SE-ME) wedges.

Figure 6B:
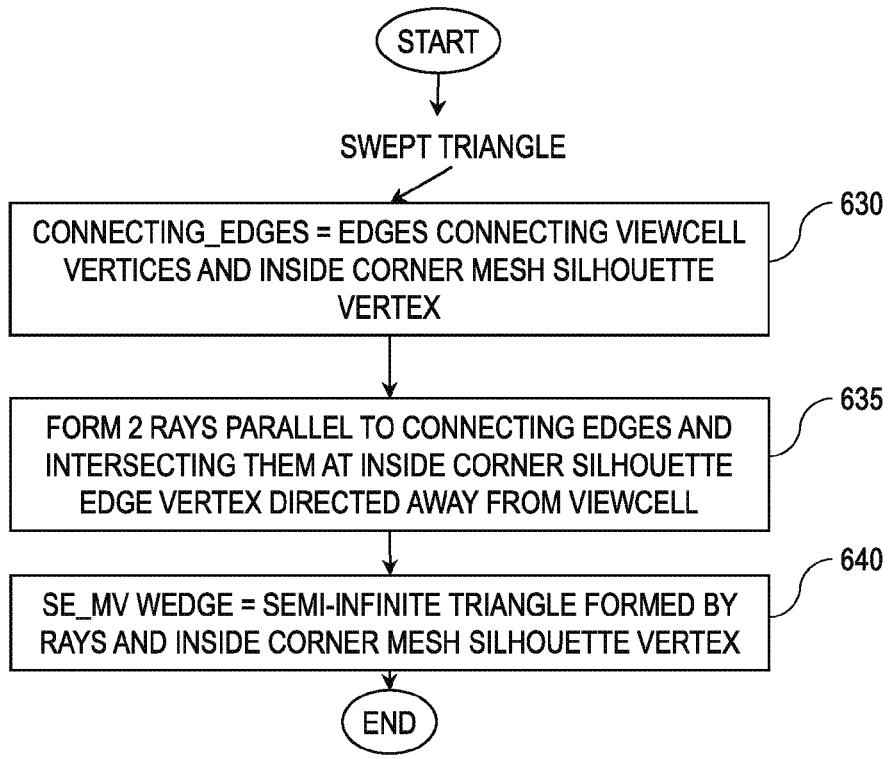
FIG. 6B is an exemplary flowchart showing a method of constructing SE-MV wedges from the corresponding SE-MV supporting polygons

FIG. 6B Flowchart Showing a Method of Constructing SE-MV Wedges from the Corresponding SE-MV Supporting Polygons FIG. 6B is a flowchart showing the process of constructing a SE-MV wedge from the corresponding swept triangle. This provides additional detail to the step 135 in FIG. 1. According to some embodiments, the process illustrated in FIG. 6B is entered from step 135 in FIG. 1.

In some embodiments, the process of constructing a SE-MV wedge from the corresponding swept triangle starts at step 630, where the connecting edges of the swept triangle are identified as those edges which have one vertex that is a vertex of the viewcell and another vertex that is a vertex of the polygon mesh.

Process flow proceeds to step 635 to construct rays from the connecting edges by extending the these edges in a semi-infinite fashion away from the viewcell starting at the corresponding mesh silhouette vertex.

Process flow proceeds to step 640 to connect the extended edges to the corresponding polygon mesh inside corner silhouette vertex to form the semi-infinite wedge.

The process of FIGS. 6A and 6B describe the construction of first-order wedges that are only restricted by their intersection with adjacent wedges on the silhouette contour. These may be called the initial wedges.

According to some embodiments, in subsequent processing, for example in the construction of first-order visibility maps, these initial wedges may later be intersected with mesh polygons and with other wedges. Initial wedges may also be explicitly intersected with other wedges to form umbral boundary polygons (UBPs), which bound the conservative from-viewcell polyhedral aggregate umbral volumes that contain (conservatively) occluded regions.

FIG. 7-FIG. 11 Detailed Description- Output of First Embodiment

Figure 7A:
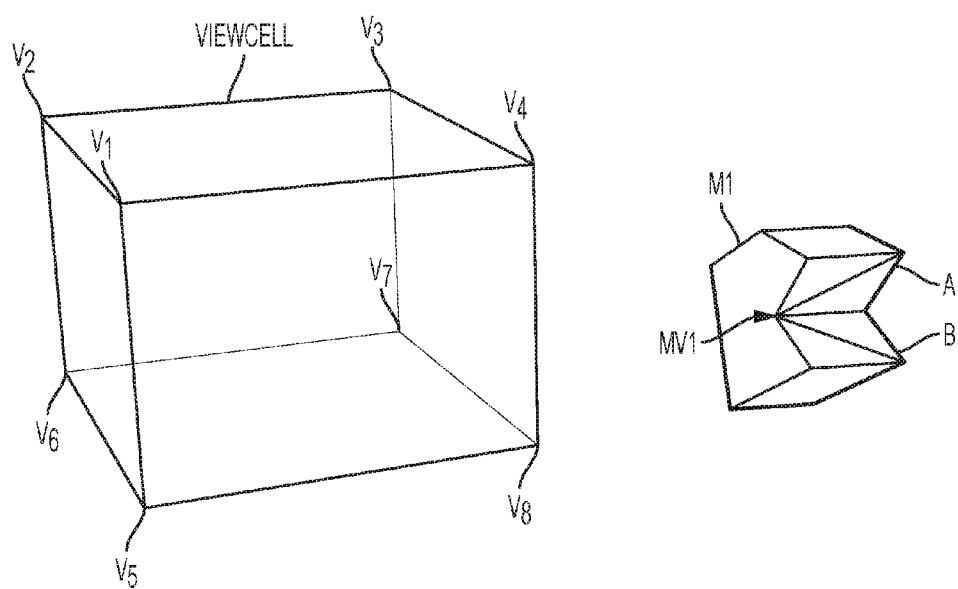
FIG. 7A is an exemplary diagram showing a convex viewcell and a non-convex polygon mesh, First-order, from-viewcell silhouette edges of the mesh are shown in heavy lines, perspective view looking in general direction from the viewcell toward the polygon mesh.

FIG. 7A is a diagram showing a convex viewcell having vertices $V_1$-$V_8$ and a non-convex polygon mesh M1. First-order, from-viewcell silhouette edges of the mesh are shown in bold lines. Two of the first-order silhouette edges are labeled A and B. This is a perspective view looking in general direction from the viewcell toward the polygon mesh.

Figure 7B:
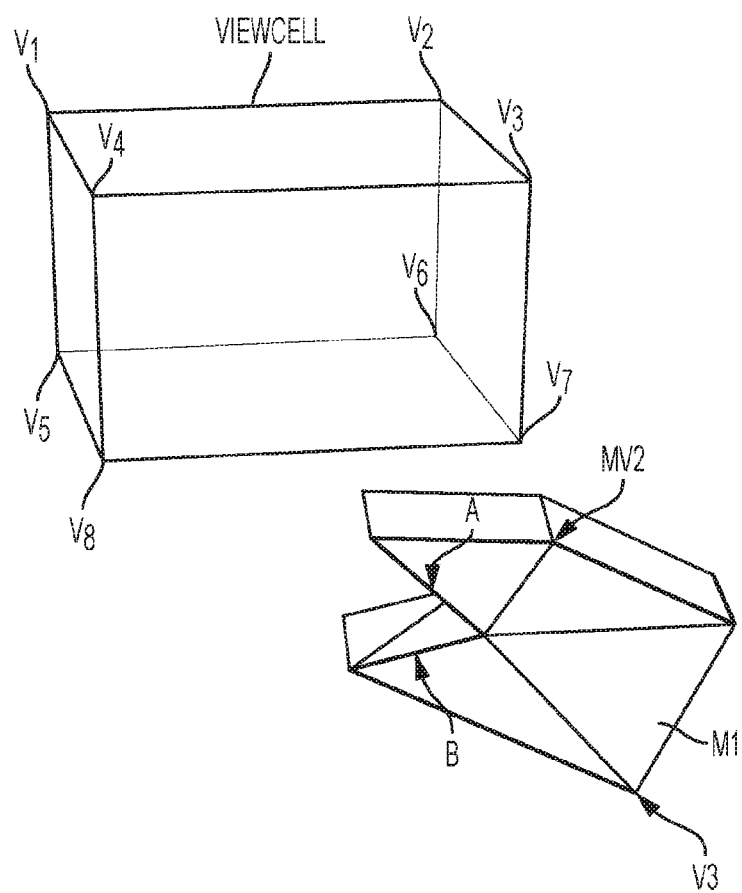
FIG. 7B is an exemplary diagram showing the same objects as FIG. 7B, but from a perspective view looking in a general direction from the polygon mesh toward the viewcell.

First-order silhouette edge A has one component polygon that is front facing for at least one viewcell vertex. This component polygon is the triangle formed by edge A and the mesh vertex labeled MV1. The other component polygon for edge A is the triangle formed by edge A and the mesh vertex MV2 which is shown in FIG. 7B. This component polygon is backfacing for all vertices $V_1$-$V_8$ of the viewcell. Note that these two component polygons sharing edge A are backfacing with respect to each other, making the edge A a locally supporting edge of the polygon mesh M1 and a first-order silhouette edge. It can be determined that the two component polygons sharing edge A are backfacing by selecting a first component polygon, e.g. the triangle formed by edge A and vertex MV2, and determining if a vertex of the other component polygon which is not part of the shared edge, e.g. vertex MV1 in this case, is on the front side or the back side of the plane containing the first polygon. If the unshared vertex is on the back side of the other component polygon's plane then the two component polygons are backfacing, as in this case. This determination can be made using the plane equation as described in the definition of "backfacing" provided in the glossary of terms. In some embodiments, the process illustrated in FIG. 3 is repeated for each edge included in polygon mesh M1 to identify each first order silhouette edge of polygon mesh M1.

FIG. 7B is a diagram showing the same polygon mesh object M1 as FIG. 7A, but from a perspective view looking in a general direction from the polygon mesh toward the viewcell. From this view, edge B has one component triangle (formed by edge B and mesh vertex MV3) that is backfacing for all vertices $V_1$-$V_8$ of the viewcell. As illustrated in FIG. 7A, edge B has another component triangle formed by edge B and mesh vertex MV1 that is front facing to at least one viewcell vertex. Further, these two component polygons sharing edge B are backfacing with respect to each other, making the edge B a locally supporting edge of the polygon mesh M1 and a first order silhouette edge.

Figure 7C:
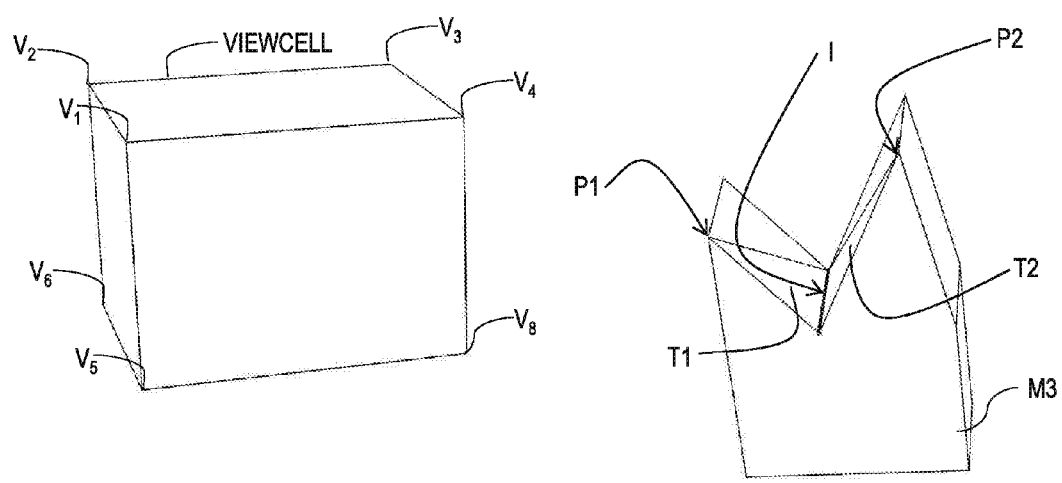
FIG. 7C shows a different polygon mesh than the one shown in FIG. 7B1 and shows an inside-corner edge of the mesh which is not a first-order silhouette edge.

FIG. 7C shows a different polygon mesh than the one depicted in FIG. 7B. This polygon mesh is labeled M3. One edge of polygon mesh M3 is shown bolded and labeled I. This edge has one component polygon which is a triangle labeled T1, and another component polygon which is a triangle labeled T2.

Component polygon T1 is backfacing for all vertices of the viewcell labeled VIEWCELL since all of the viewcell vertices are on the back side of the plane containing triangle T1.

Component triangle T2 has at least one viewcell vertex that is on the front side of the plane containing triangle T2, that is T2 is front facing with respect to at least one viewcell vertex.

Consequently, component triangles T1 and T2 meet two of the criteria required to make their shared edge a first-order silhouette edge with respect to the viewcell.

However the shared edge I, is not a first-order silhouette edge because the two component triangles are not backfacing with respect to each other. This can be determined by selecting triangle T1 and identifying a vertex of the other component triangle (T2) that is not a vertex of the shared edge. In this case the vertex is P2. The vertex P2 is on the front side of the plane containing the other component triangle T1. This fact can be established using the plane equation of triangle T1 as described in the glossary of terms description for "backfacing".

Since T1 and T2 are not backfacing with respect to each other they would, in one embodiment, fail the decision test shown in the exemplary flowchart of FIG. 3 at steps 345 OR 330.

Figure 7D:
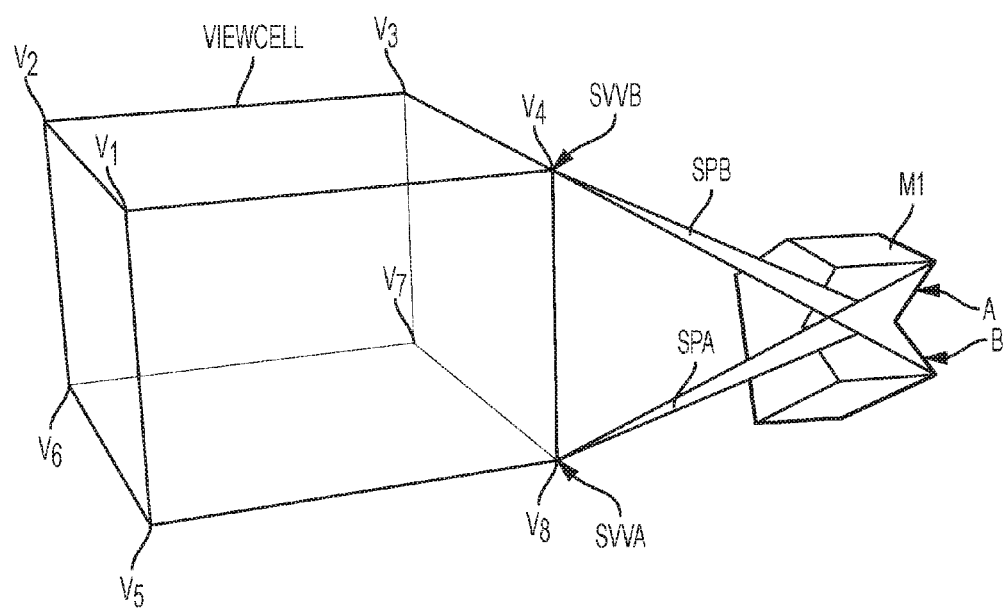
FIG. 7D is an exemplary diagram showing the supporting polygons for first-order silhouette edges A and B, perspective view looking in a general direction from viewcell toward mesh object.

FIG. 7D is a diagram showing the supporting polygons for the first-order silhouette edges A and B. The supporting polygon for first-order silhouette edge A is labeled SPA, and the supporting polygon for the first-order silhouette edge B is labeled SPB. The corresponding supporting viewcell vertices (SVVs) are labeled, respectively SVVA and SVVB, which correspond to viewcell vertices $V_4$ and $V_8$, respectively. This is a perspective view looking in a general direction from viewcell toward mesh object.

Figure 7E:
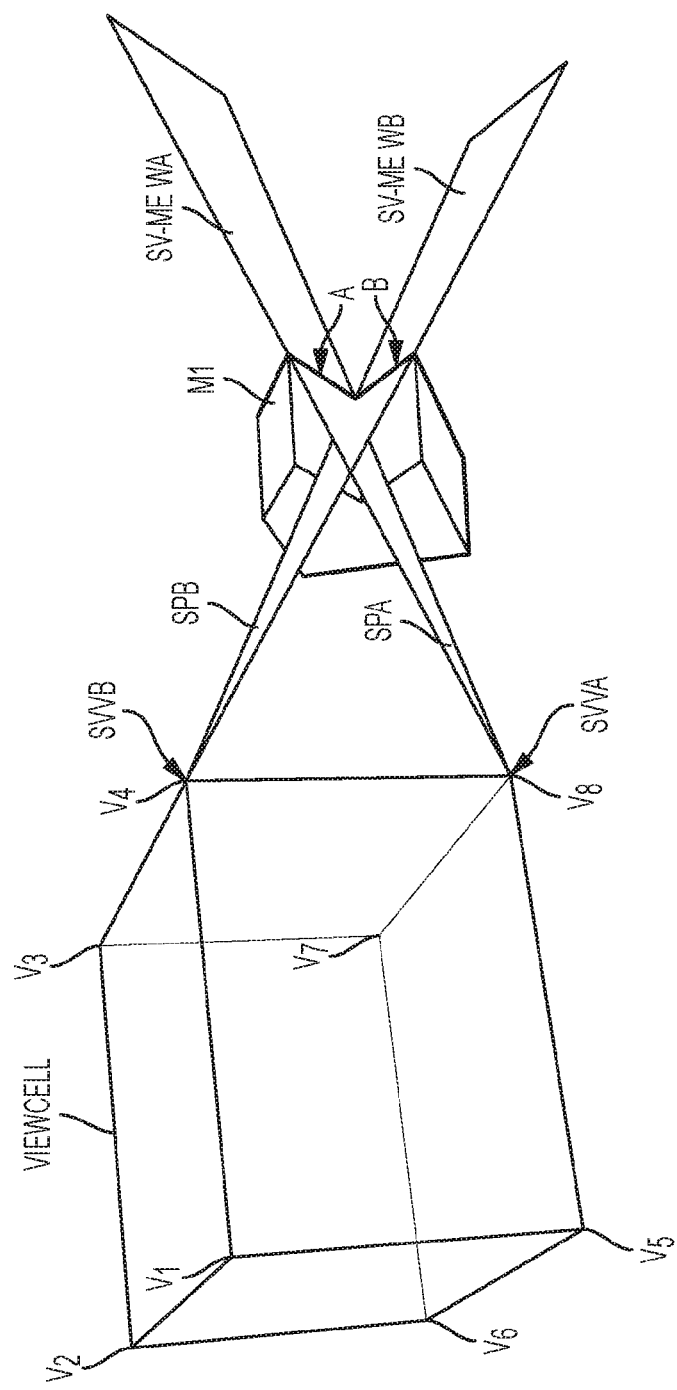
FIG. 7E is an exemplary diagram showing the supporting polygons for the first-order silhouette edges A and B and the corresponding source-vertex mesh-edge (SV-ME) wedges, perspective view looking in a general direction from viewcell toward mesh object.

FIG. 7E is a diagram showing the supporting polygons SPA and SPB for the first-order silhouette edges A and B, respectively, and the corresponding source-vertex mesh-edge (SV-ME) wedges. The supporting polygon for first-order silhouette edge A is labeled SPA, and the supporting polygon for the first-order silhouette edge B is labeled SPB.

The corresponding supporting viewcell vertices (SVVs) are labeled, respectively SVVA and SVVB. The SV-ME wedge is formed by extension of supporting polygon SPA is labeled SV-ME WA. The SV-ME wedge is formed by extension of supporting polygon SPB is labeled SV-ME WB. According to some embodiments, the SV-ME wedges WA and WB are constructed according to the processes illustrated in FIGS. 1, 4, and 6A. This is a perspective view looking in a general direction from viewcell toward mesh object.

Figure 7F:
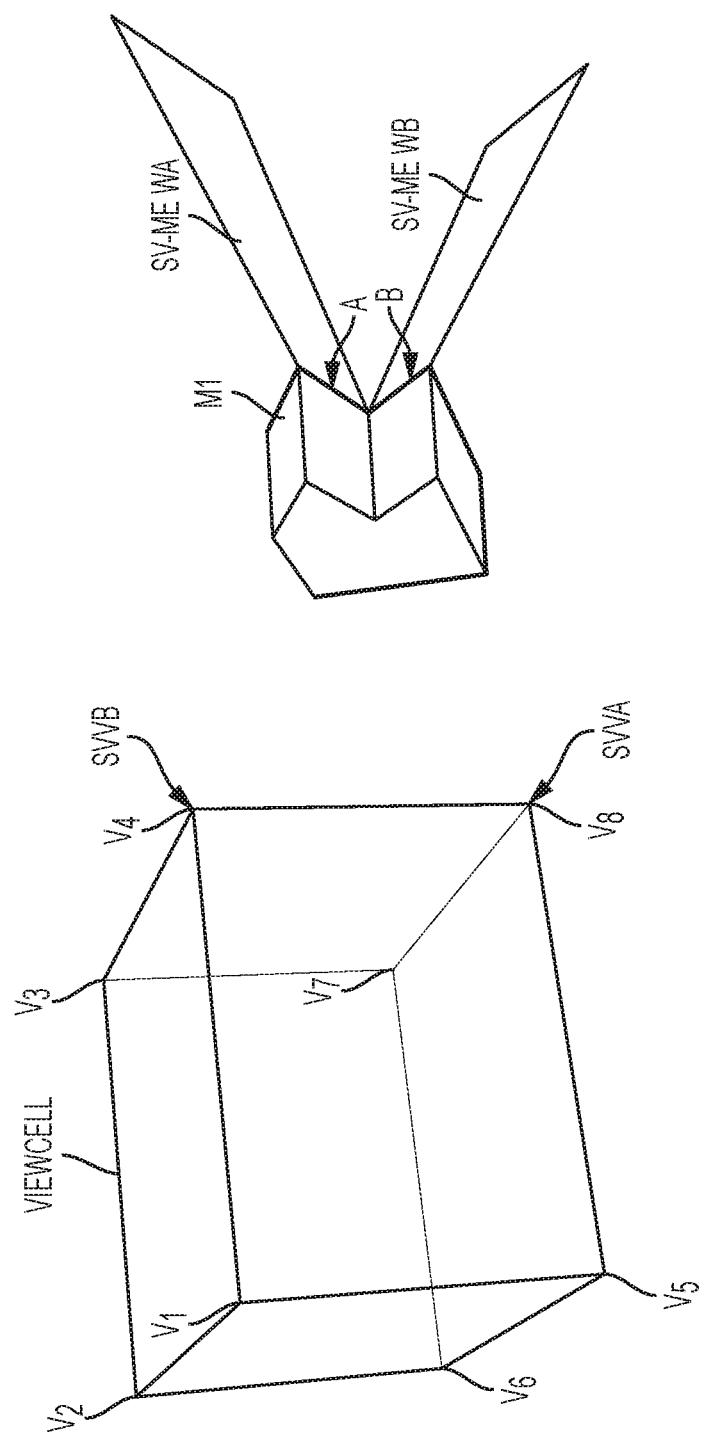
FIG. 7F is an exemplary diagram showing only the SV-ME wedges formed from the extension of the edges of the corresponding supporting polygons.

FIG. 7F is a diagram showing only the SV-ME wedges formed from the extension of the edges of the corresponding supporting polygons. The SV-ME wedge formed by extension of supporting polygon SPA is labeled SV-ME WA. The SV-ME wedge formed by extension of supporting polygon SPB is labeled SV-ME WB. The corresponding supporting viewcell vertices (SVVs) are labeled, respectively SVVA and SVVB. This is a perspective view looking in a general direction from viewcell toward mesh object.

Although FIGS. 7D-7F show wedges incident on first order silhouette edges A and B, further embodiments construct wedges for each first order silhouette edge included in the first order silhouette contour included in mesh M1 according to the processes illustrated in FIGS. 1 and 3-6B.

Figure 7G:
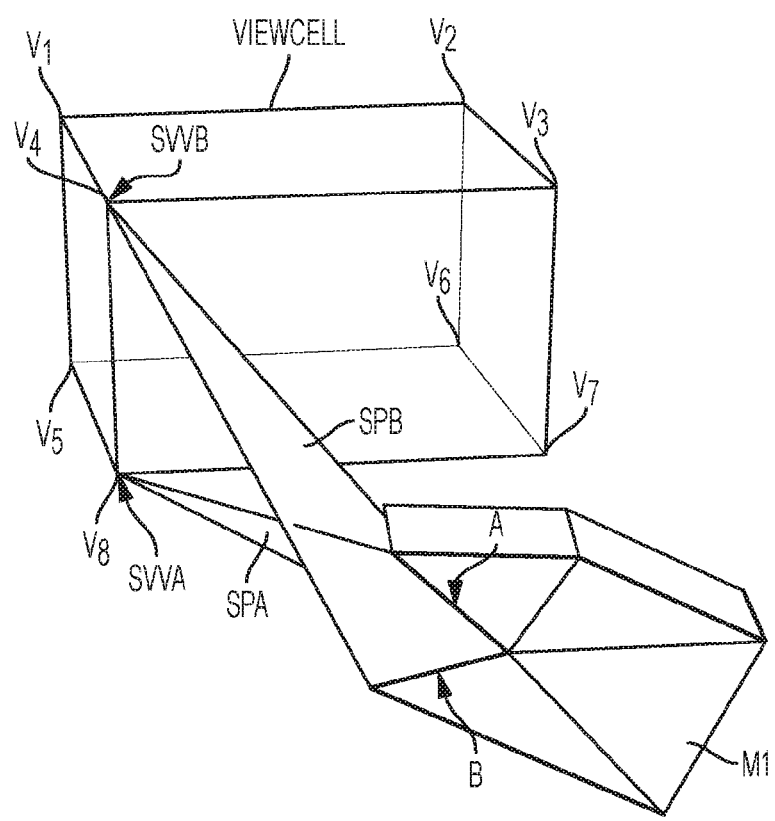
FIG. 7G is an exemplary diagram showing the same objects as FIG. 7C but from a perspective view looking a general direction from mesh object toward viewcell.

FIG. 7G is a diagram showing the same objects as FIG. 7D, but from a perspective view looking in a general direction from mesh object M1 toward the viewcell.

Figure 7H:
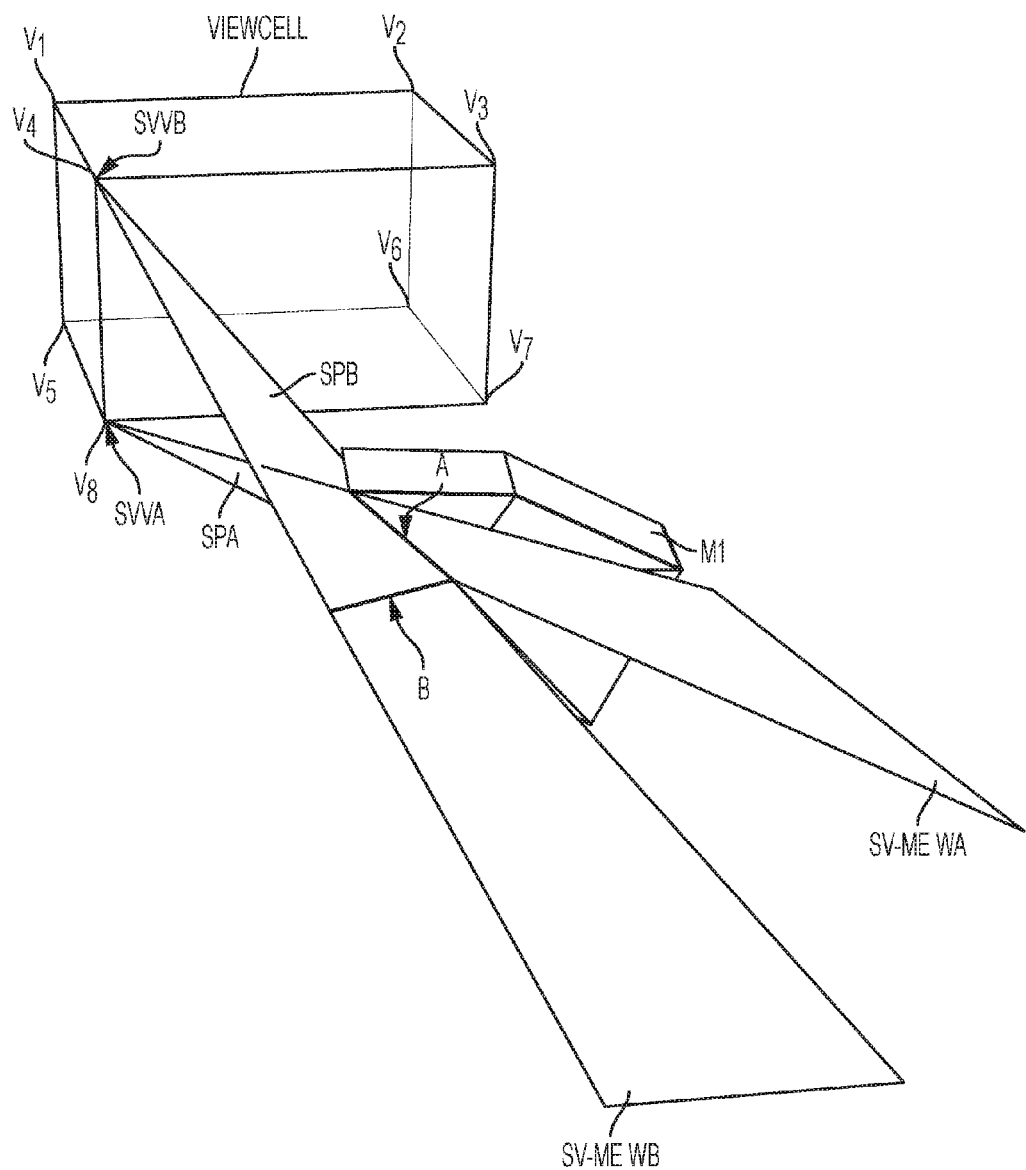
FIG. 7H is an exemplary diagram showing the same objects as FIG. 7D, but from a perspective view looking a general direction from mesh object toward viewcell.

FIG. 7H is a diagram showing the same objects as FIG. 7E, but from a perspective view looking a general direction from mesh object M1 toward viewcell.

Figure 7I:
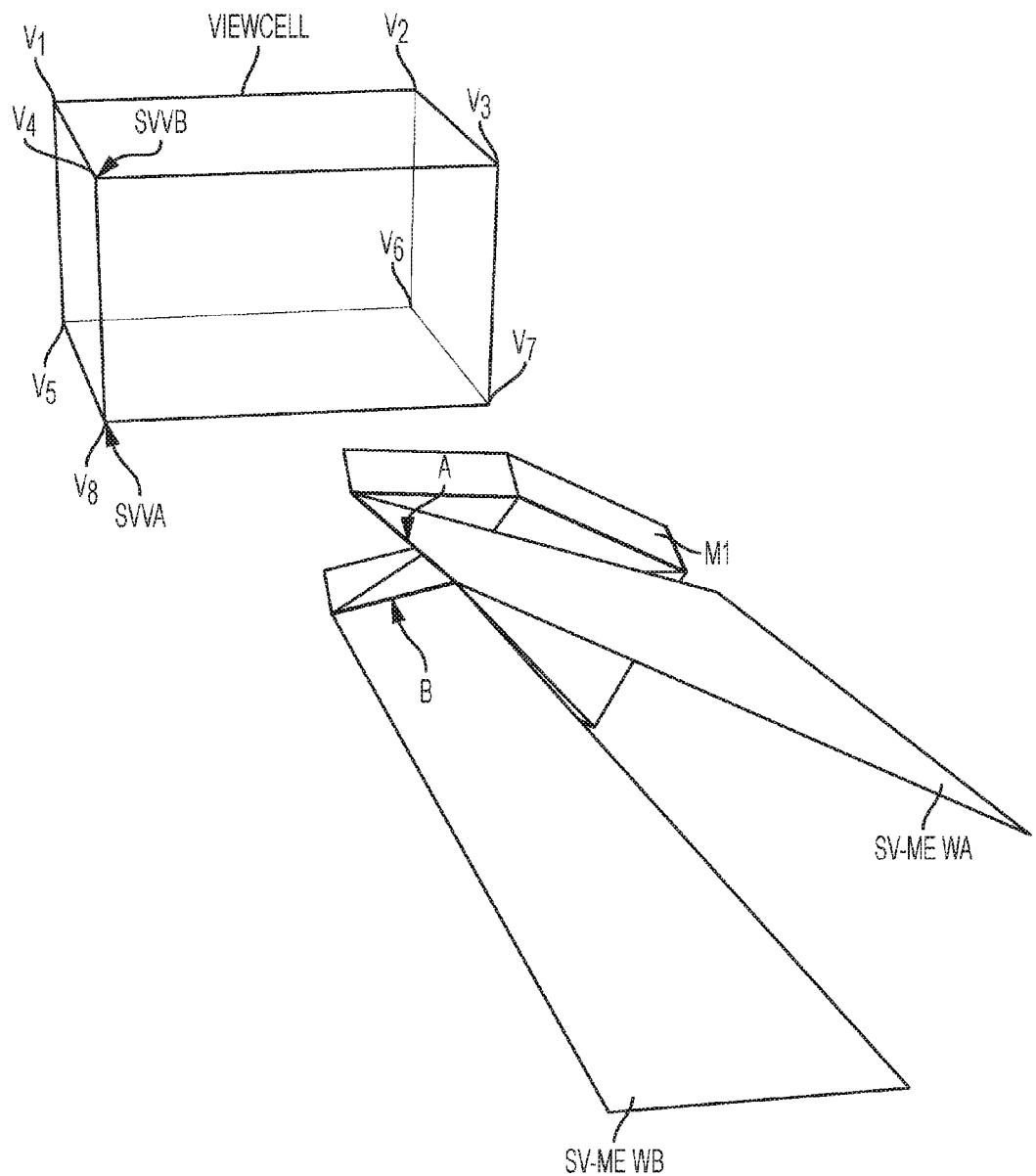
FIG. 7I is a diagram showing the same objects as FIG. 7E but from a perspective view looking a general direction from mesh object toward viewcell.

FIG. 7I is a diagram showing the same objects as FIG. 7E, but from a perspective view looking a general direction from mesh object M1 toward viewcell.

Figure 7J:
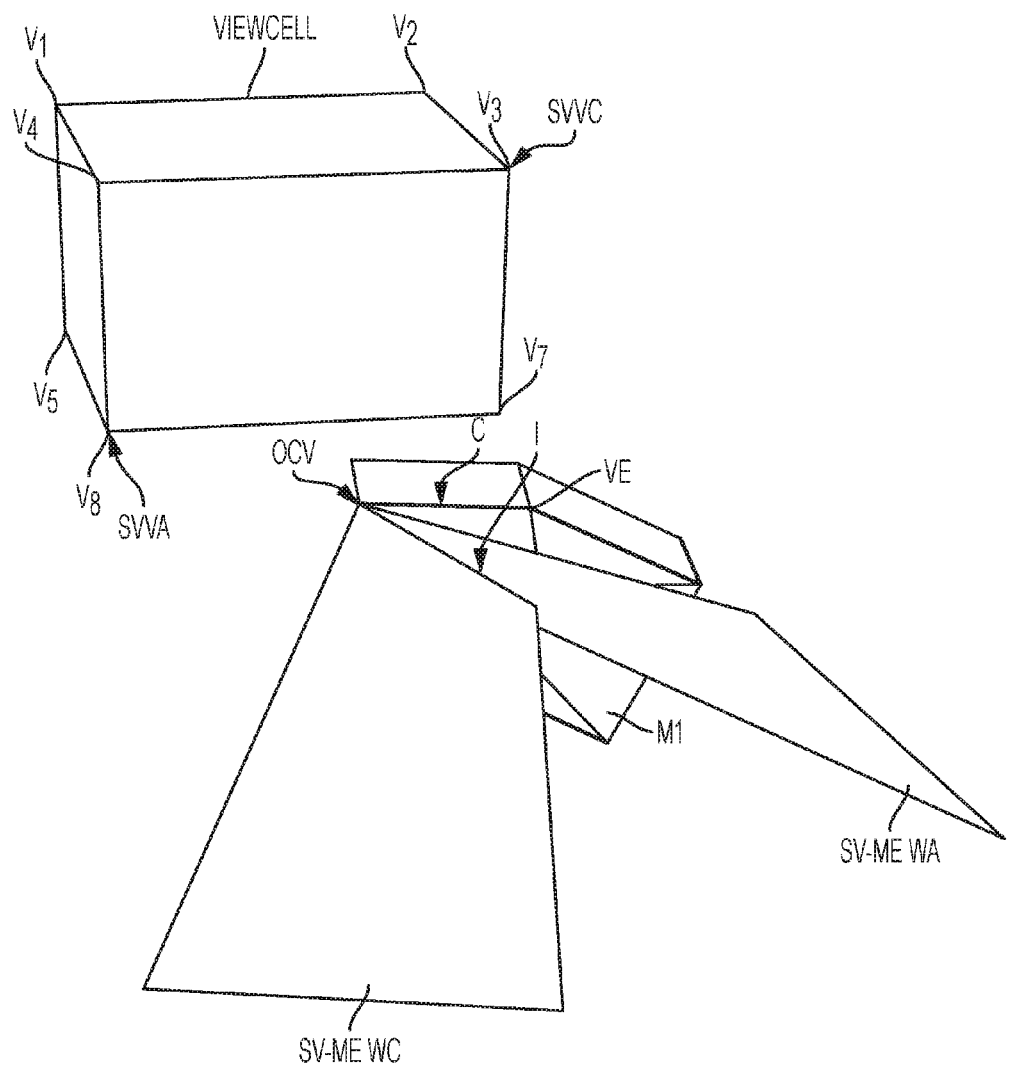
FIG. 7J is a hidden-diagram which shows the same polygon mesh and viewcell as FIG. 7I and shows two pivoted wedges intersecting at an outside corner vertex of a first-order silhouette contour.

FIG. 7J shows the same polygon mesh and viewcell as FIG. 7I, from the same perspective. FIG. 7J shows two pivoted wedges intersecting at an outside corner vertex of a first-order silhouette contour.

One of the pivoted wedges is labeled SV-ME WA, which is also seen in FIG. 7I. In FIG. 7J an additional pivoted wedge SV-ME WC is shown. This wedge is supported by the first-order silhouette edge labeled C, and the supporting viewcell vertex labeled SVVC.

The two pivoted wedges SV-ME WA and SV-ME WC share an outside corner vertex of a first-order silhouette edge. This vertex is labeled OCV. As prescribed in steps 125 and 140 of the exemplary flowchart of FIG. 1, in one embodiment pivoted polygons which share an outside corner vertex are intersected with each other.

Pivoted polygons which share an outside corner silhouette vertex and which pivot to the same supporting viewcell vertex will intersect each other exactly at a shared edge. In this case the shared edge is a ray extending from the shared vertex and on the line formed by the supporting viewcell vertex and the shared outside corner vertex. In this special case the two pivoted wedges restrict each other on the shared edge.

(Pivoted polygons which share an inside corner silhouette vertex and which pivot to the same supporting viewcell vertex also intersect each other exactly at the shared edge. In this case no swept supporting polygon exists and the corresponding swept wedge is not generated.)

In the general case, pivoted wedges sharing an outside corner vertex can pivot to different supporting viewcell vertices. In FIG. 7J wedge SV-ME WA is supported by viewcell vertex $V_4$, while SV-ME WC is supported by SVVC. In this case, the intersection of wedge SV-ME WA and SV-ME WC is the line segment labeled I. Line segment I divides wedge SV-ME WC into two parts. The proximal part of the subdivided wedge SV-ME WC is bounded by line segment I and the vertex labeled VE. A portion of this proximal part is occluded in this view.

Figure 7K:
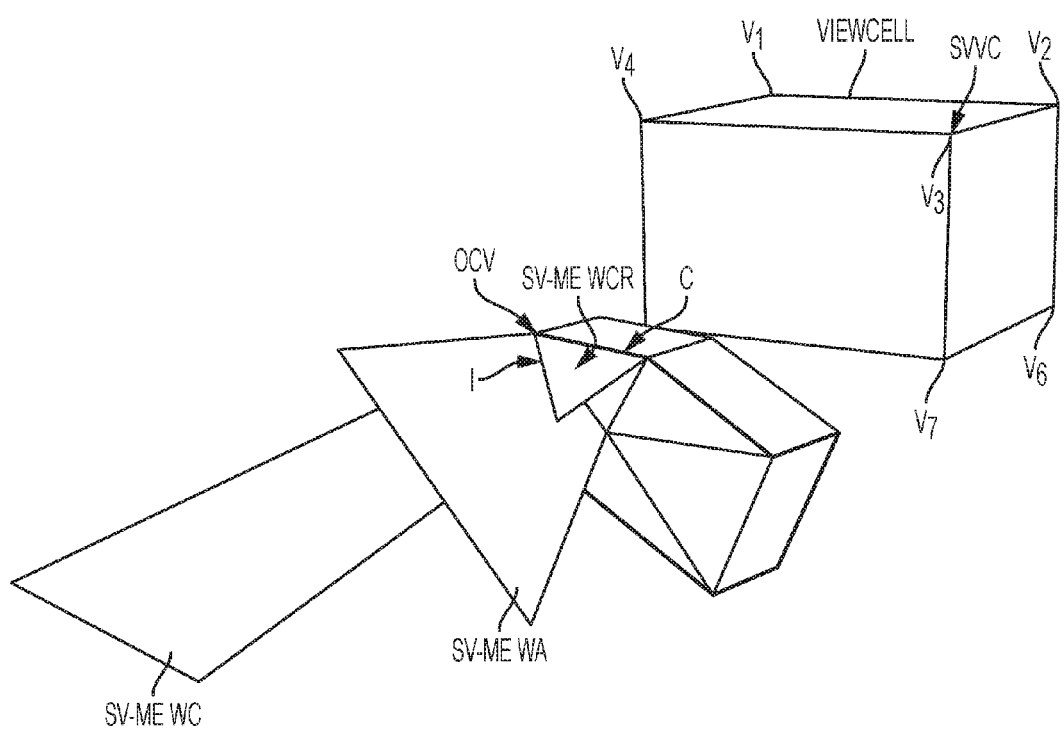
FIG. 7K is a hidden-diagram which shows the same polygon mesh and viewcell and restricted pivoted wedge as FIG. 7J but from a different perspective.

This proximal part of wedge SV-ME WC is completely seen in FIG. 7K, which shows the same objects as FIG. 7J, from a different perspective. This proximal part is labeled SV-ME WCR in FIG. 7K.

In general, the intersection of two pivoted wedges sharing an outside-corner vertex and pivoting to different supporting viewcell vertices will result in one of the wedges being restricted into a proximal portion [e.g., SV-ME WCR (indicating wedge C restricted)] and a distal portion. Only the proximal portion of such a locally restricted wedge is actually a from-viewcell umbral event surface. [Only this proximal portion is a polygon of the corresponding polyhedral aggregate umbra (PAU).] The distal portion, beyond the restriction and in a direction away from the viewcell does not represent a from-viewcell umbral event surface, since it is entirely on the unoccluded side of the adjacent wedge. In the example shown in FIG. 7J and FIG. 7K, mesh polygons on both the unoccluded and the occluded side of the distal portion of SV-ME WC are actually unoccluded from viewcell vertex SVVA, and are therefore not occluded from the viewcell.

This local restriction of a pivoted wedge by an adjacent pivoted wedge sharing an outside corner silhouette vertex in some instances produces a substantially smaller wedge. This smaller, locally restricted wedge can require substantially less processing when it is submitted for the determination of on-wedge visibility since it has an additional containment boundary that limits processing (e.g. at step 1515 in one embodiment using 2D mesh traversal process shown in exemplary flowchart FIG. 15).

The local restriction process can therefore accelerate the determination of on-wedge visibility. Alternate embodiments which do not use this local restriction process can also be employed. Any wedges that have not been restricted by other wedges still intersect mesh polygons to produce discontinuity mesh segments. The determination of whether such a discontinuity segment is actually a from-viewcell umbral boundary is then made using the modified point-in polyhedron test described in the exemplary flowcharts of FIG. 25. This test accommodates both locally restricted and unrestricted wedges.

The preceding discussion assumes that the wedges employed are first-order wedges. Higher-order wedges are subjected to wedge-wedge intersection (restriction by other wedges) as described in one embodiment for example in step 2155 of the exemplary flowchart showing a method for determining if a DM_SEG is an actual from-viewcell occlusion boundary segment.

Figure 8A:
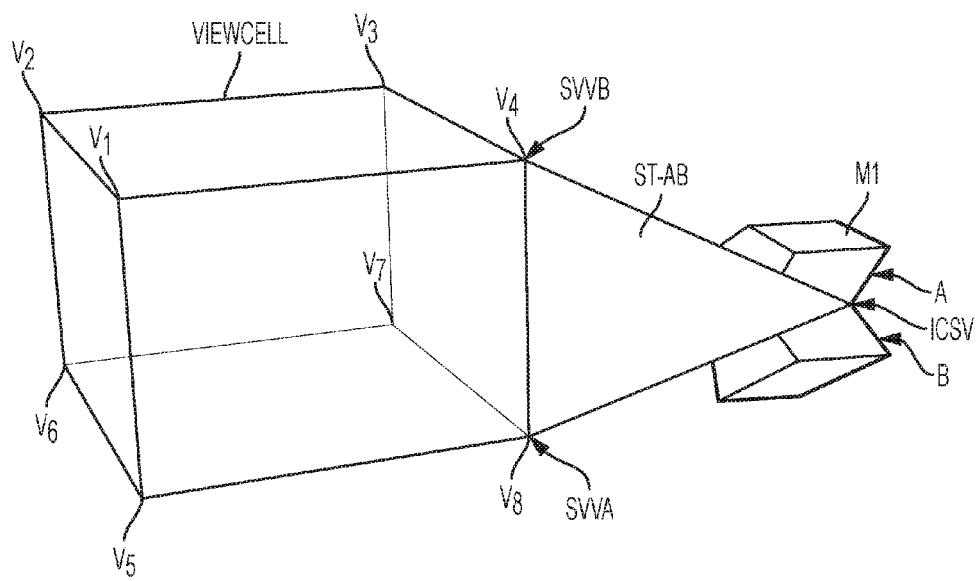
FIG. 8A is an exemplary diagram showing a swept triangle (a SE-MV supporting polygon) on the inside corner vertex shared by first-order silhouette edges labeled A and B. Perspective view looking in the general direction from the viewcell to the polygon mesh object.

FIG. 8A is a diagram showing a swept triangle (a SE-MV supporting polygon) on the inside corner vertex shared by first-order silhouette edges labeled A and B of mesh object M1. The swept triangle is labeled ST_AB. In some embodiments, the swept triangle ST_AB is generated using the sweep process shown in FIG. 5A and FIG. 5B, with the sweep occurring from SVVA ($V_4$) to SVVB ($V_8$) and anchored on the inside-corner silhouette vertex labeled ICSV. In this case, the inside-corner mesh silhouette vertex is a simple inside-corner of the first-order silhouette contour (i.e., the contour formed by all the first-order silhouette edges of mesh object M1), formed where two first-order silhouette edges share a vertex. This is a perspective view looking in a general direction from viewcell toward mesh object similar to the view shown in FIG. 7A and FIG. 7D.

Figure 8B:
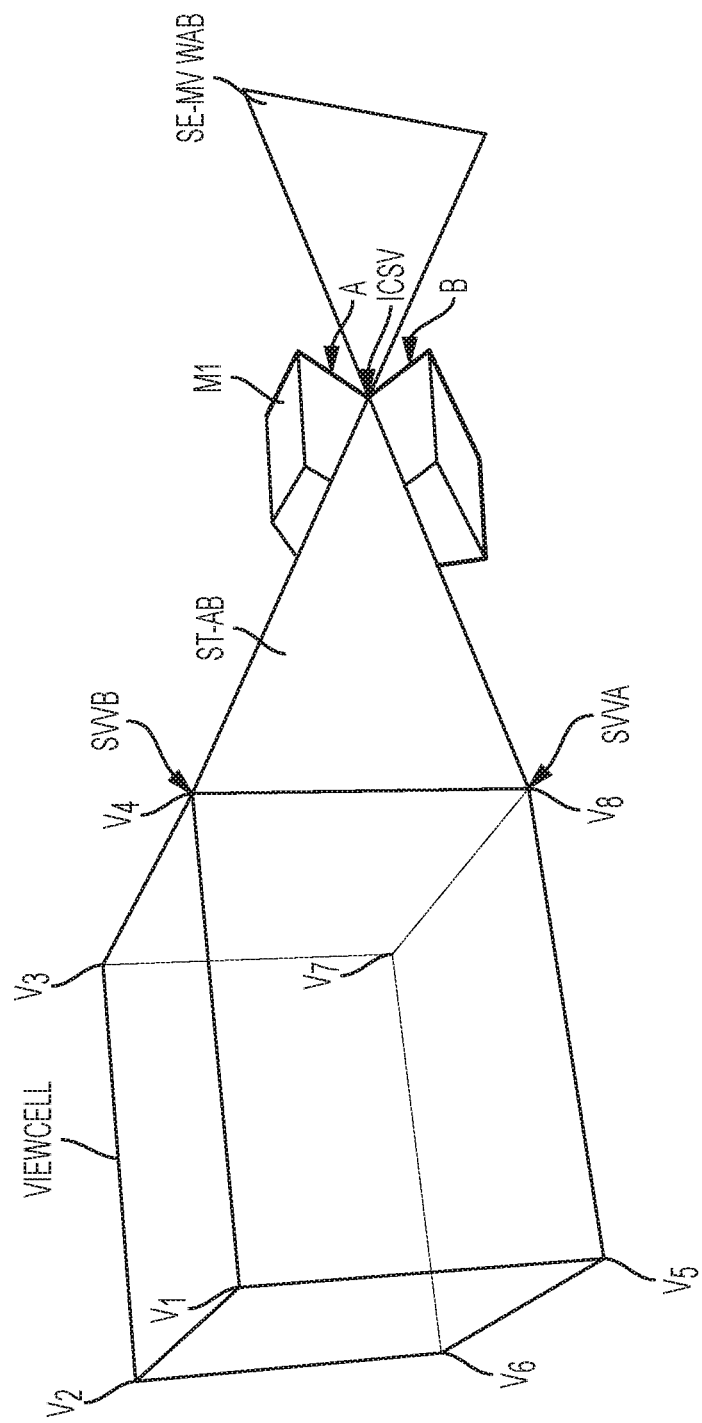
FIG. 8B is an exemplary diagram showing a swept triangle (a SE-MV supporting polygon) on the inside corner vertex shared by first-order silhouette edges labeled A and B and the corresponding SE-MV wedge. Perspective view looking in the general direction from the viewcell to the polygon mesh object.

FIG. 8B is a diagram showing a swept triangle (a SE-MV supporting polygon) on the inside corner vertex shared by first-order silhouette edges labeled A and B. The swept triangle is labeled ST_AB, and is generated, according to some embodiments, using the sweep process shown in FIG. 5A and FIG. 5B, with the sweep occurring from SVVA ($V_4$) to SVVB ($V_8$) and anchored on the inside-corner silhouette vertex labeled ICSV. In this case, the inside-corner mesh silhouette vertex is a simple inside-corner of the first-order silhouette contour, formed where two first-order silhouette edges share a vertex. The corresponding SE-MV wedge, formed by extension of the swept triangle, is labeled SE-MV WAB. According to some embodiments, the SE-MV wedge WAB is formed according to the process illustrated in FIG. 6B. In this regard, the edges of the polygon ST-AB are extended through the inside corner vertex to form SE-MV WAB. This is a perspective view looking in a general direction from viewcell toward mesh object similar to the view shown in FIG. 7A and FIG. 7E.

Figure 8C:
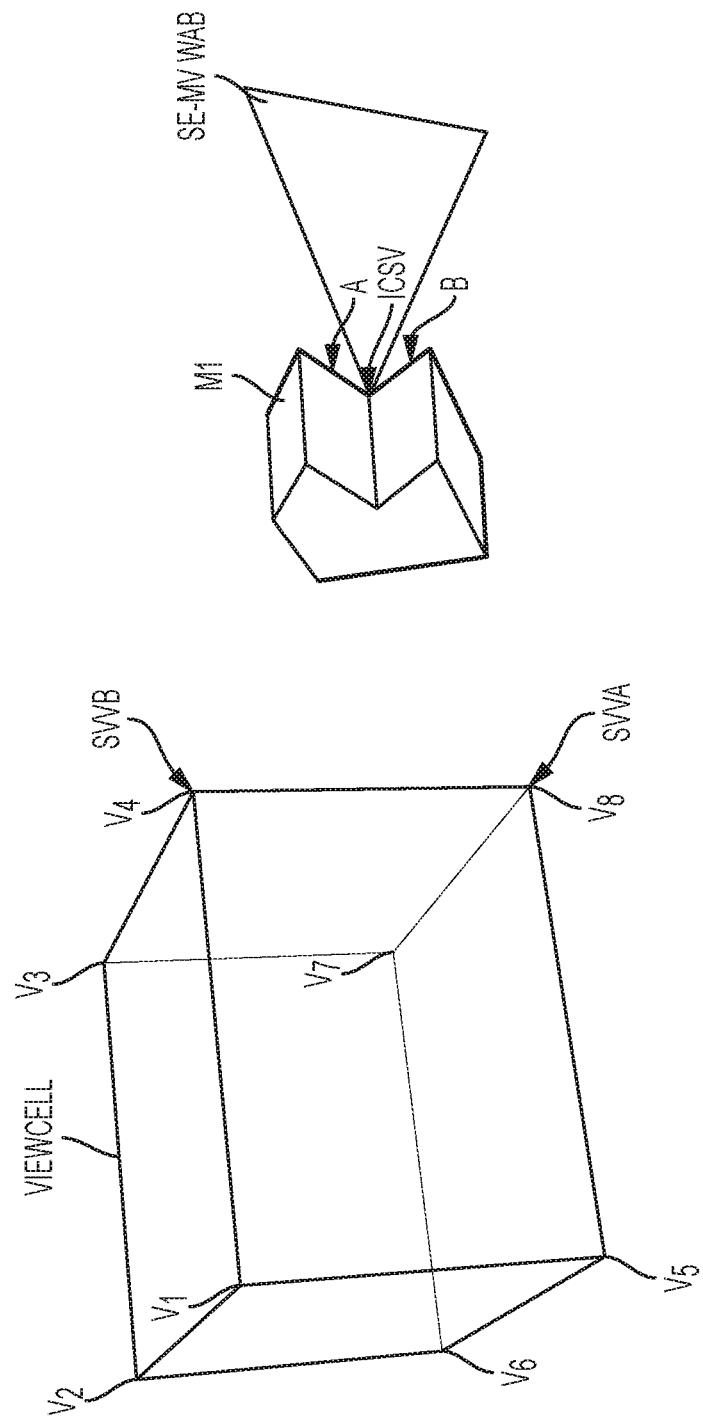
FIG. 8C is an exemplary diagram showing the inside corner vertex shared by first-order silhouette edges labeled A and B and the corresponding SE-MV wedge. Perspective view looking in the general direction from the viewcell to the polygon mesh object.

FIG. 8C is a diagram showing the inside-corner silhouette vertex labeled ICSV. The corresponding SE-MV wedge, formed by extension of the swept triangle is labeled SE-MV WAB. This is a perspective view looking in a general direction from viewcell toward mesh object similar to the view shown in FIG. 7A and FIG. 7F.

Figure 8D:
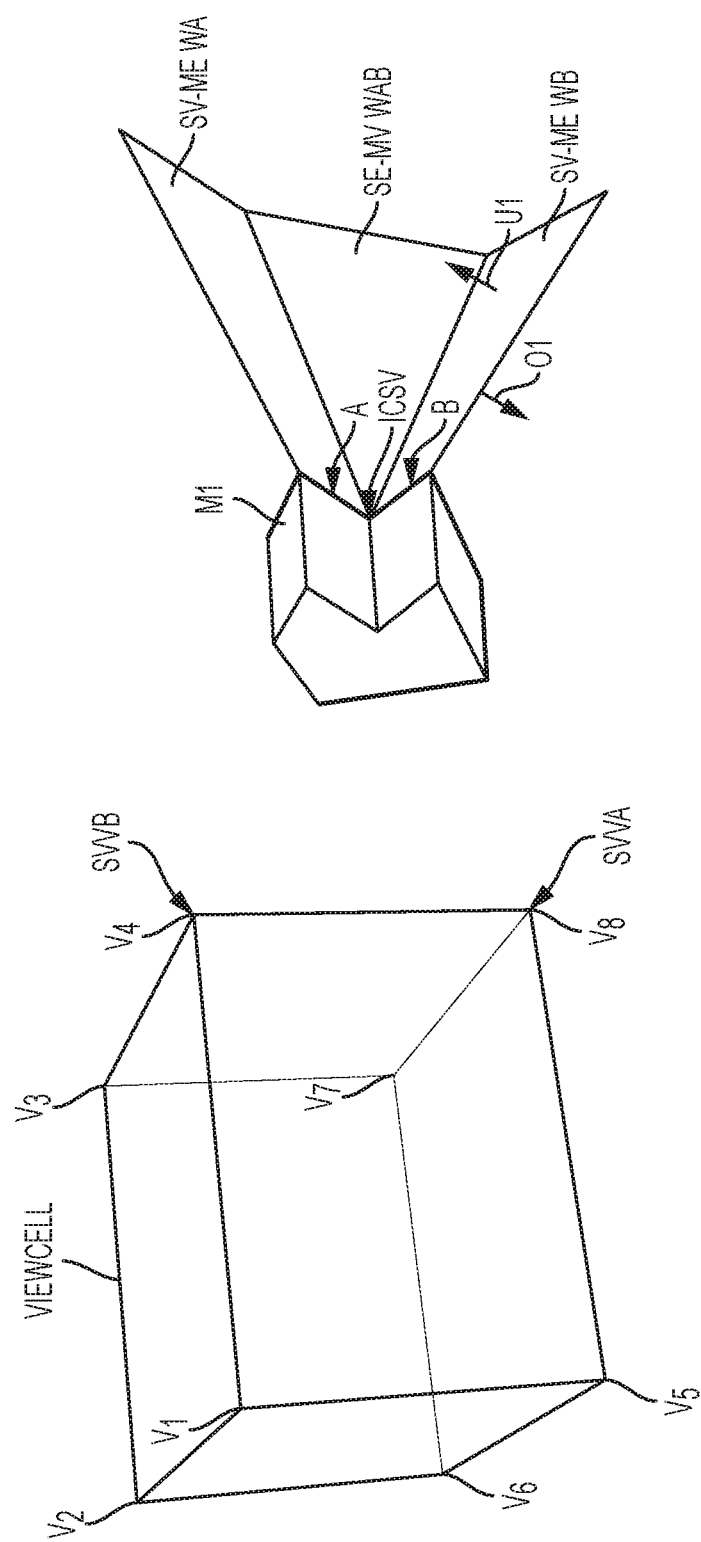
FIG. 8D is an exemplary diagram showing the first-order wedges incident on silhouette edges A and B, including two SV-ME wedges and a single SE-MV wedge, all intersecting at the inside corner silhouette vertex labeled ICSV. Perspective view looking in the general direction from the viewcell to the polygon mesh object

FIG. 8D is a diagram showing the first-order conservative linearized umbral event surface (CLUES) incident on the silhouette edges A and B. As illustrated in FIG. 8D, a continuous umbral event surface is comprised of the two SV-ME wedges (labeled SV-ME WA and SV-ME WB) and, in this case, the single SE-MV wedge (labeled SE_MV WAB). The corresponding supporting viewcell vertices SVVA and SVVB are labeled as is the inside corner first-order silhouette vertex labeled ICSV. This is a perspective view looking in a general direction from viewcell toward mesh object. As illustrated in FIG. 8D, the CLUES comprised of SV-ME WA, SE-MV WAB, and SV-ME WB form an occlusion boundary, where the unoccluded side of the boundary is in the direction of arrow U1, and the occluded side is in the direction of arrow O1.

Figure 8E:
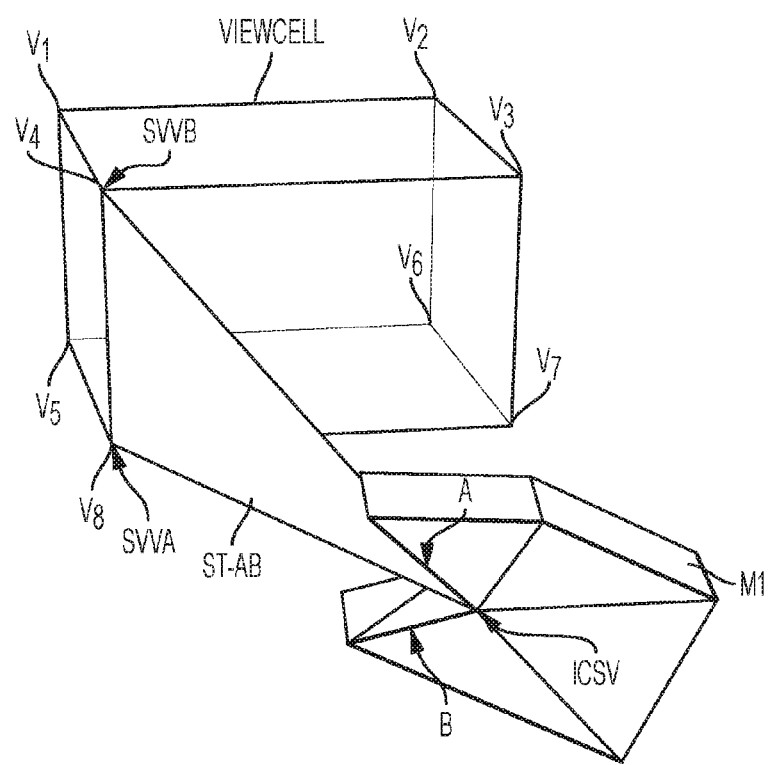
FIG. 8E is an exemplary diagram showing the same objects as FIG. 8A but from a perspective view looking in a general direction from mesh object toward viewcell.

FIG. 8E is a diagram showing the same objects as FIG. 8A, but from a perspective view looking in a general direction from mesh object M1 toward the viewcell.

Figure 8F:
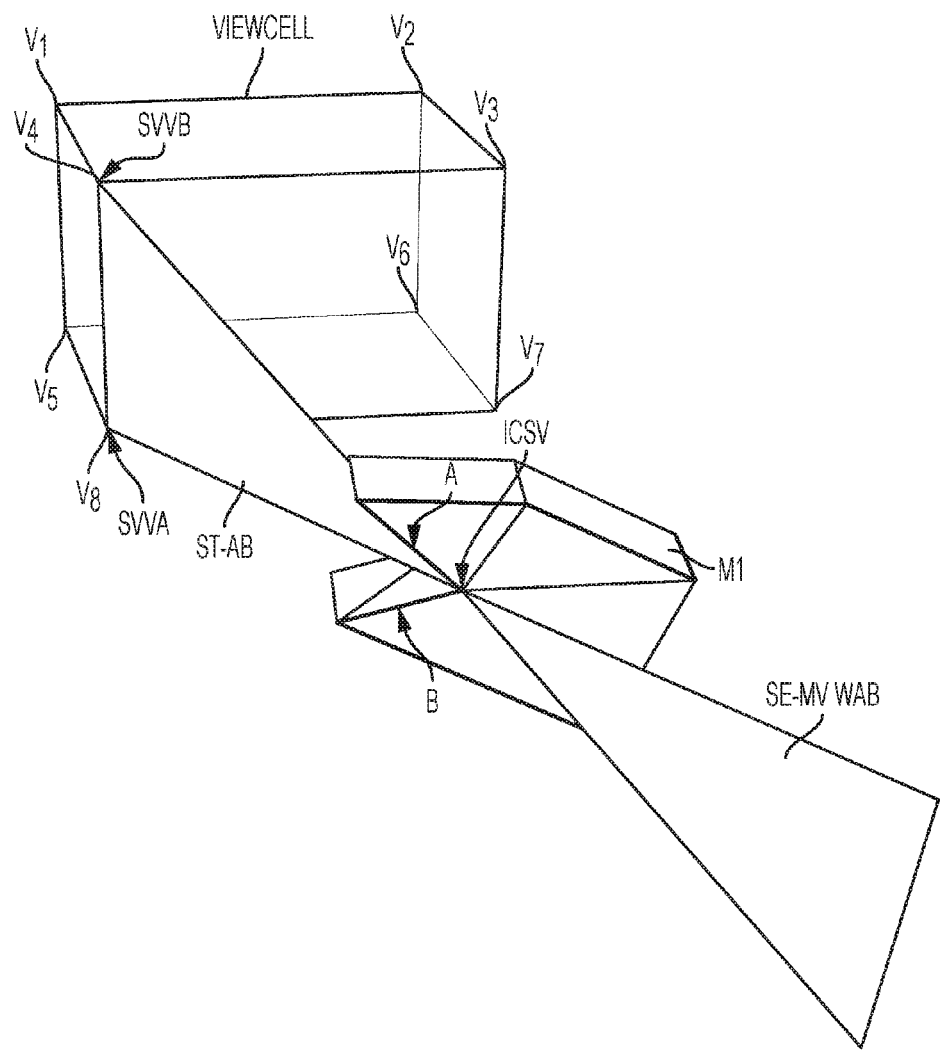
FIG. 8F is an exemplary diagram showing the same objects as FIG. 8B but from a perspective view looking in a general direction from mesh object toward viewcell.

FIG. 8F is a diagram showing the same objects as FIG. 8B, but from a perspective view looking in a general direction from mesh object toward the viewcell.

Figure 8G:
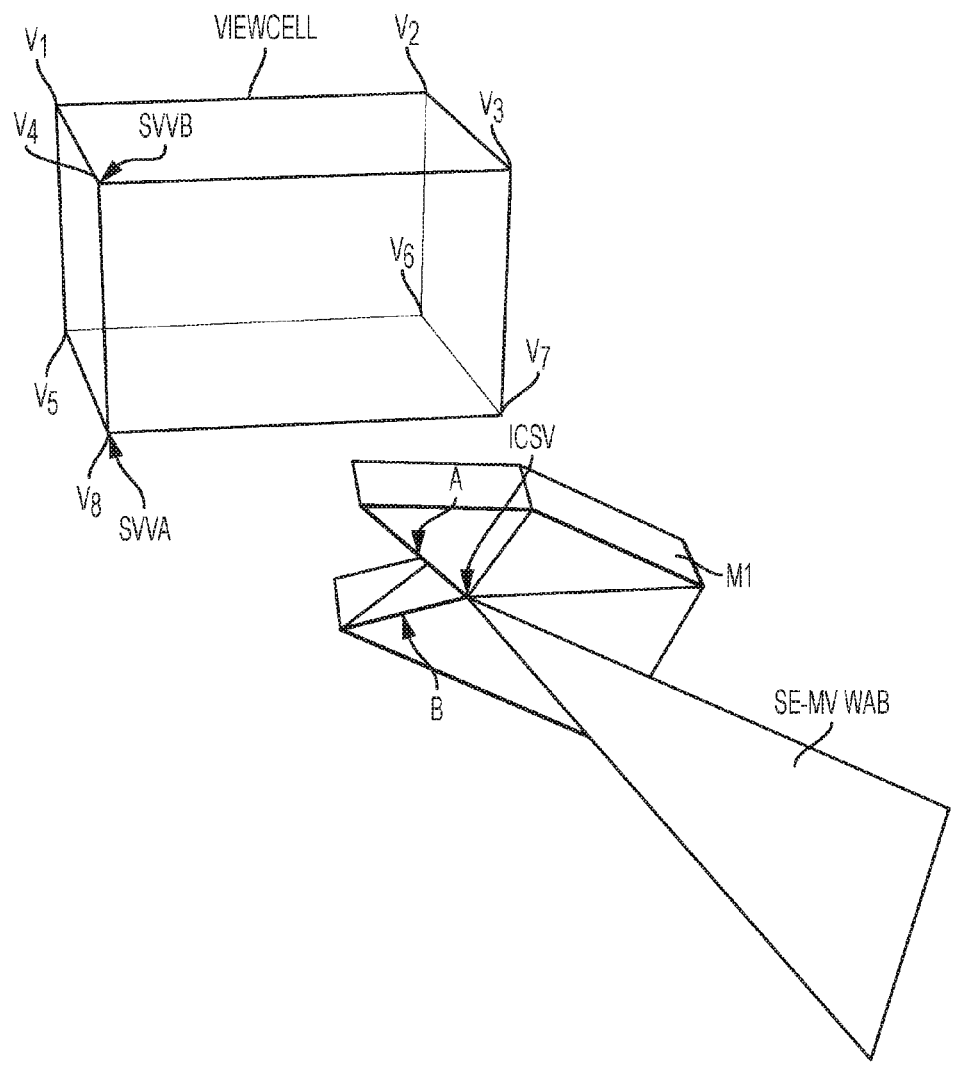
FIG. 8G is an exemplary diagram showing the same objects as FIG. 8C but from a perspective view looking in a general direction from mesh object toward viewcell.

FIG. 8G is a diagram showing the same objects as FIG. 8C, but from a perspective view looking in a general direction from mesh object M1 toward the viewcell.

Figure 8H:
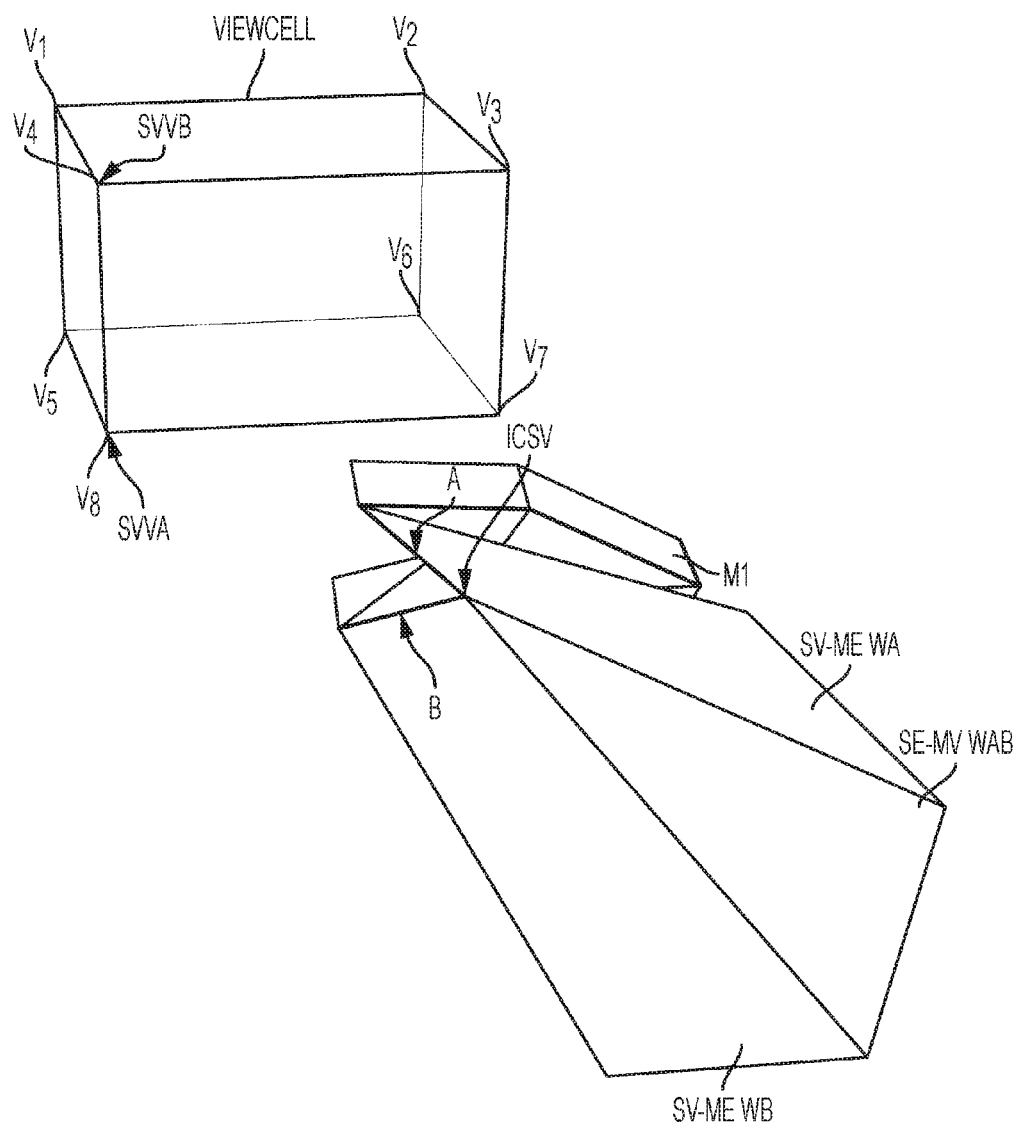
FIG. 8H is an exemplary diagram showing the first-order wedges incident on silhouette edges A and B, including two SV-ME wedges and a single SE-MV wedge, all intersecting at the inside corner silhouette vertex labeled ICSV. Perspective view looking in the general direction from the polygon mesh object toward the viewcell.

FIG. 8H is a diagram showing the same objects as FIG. 8D, but from a perspective view looking in a general direction from mesh object M1 toward the viewcell.

Figure 8I:
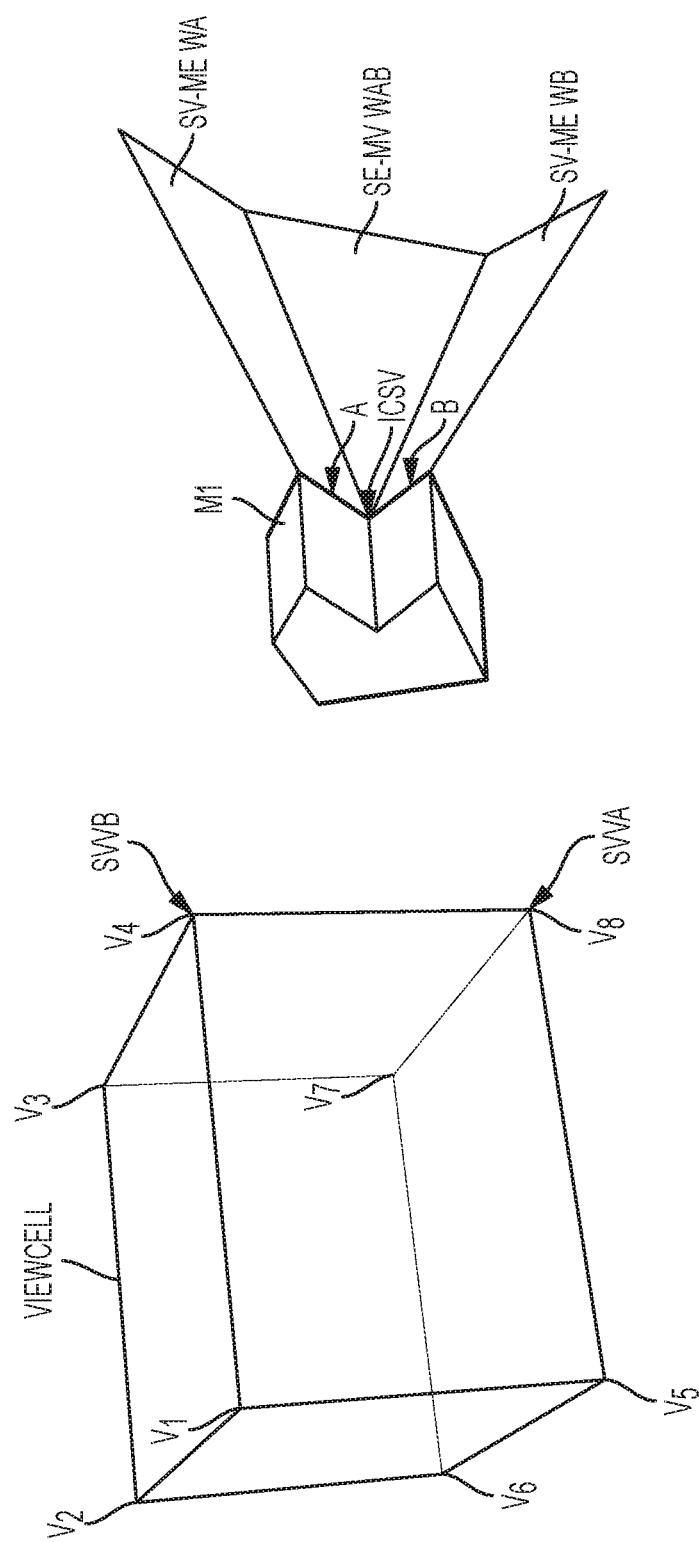
FIG. 8I is an exemplary diagram showing the first-order umbra boundary incident on the silhouette edges A and B, perspective view looking in a general direction from viewcell toward mesh object.

FIG. 8I, the same as FIG. 8D, is a diagram showing the first-order conservative linearized umbral event surface (CLUES) incident on the silhouette edges A and B. This continuous umbral event surface is comprised of the two SV-ME wedges (labeled SV-ME WA and SV-ME WB) and, in this case, the single SE-MV wedge (labeled SE_MV WAB). This is a perspective view looking in a general direction from viewcell toward mesh object.

Figure 9A:
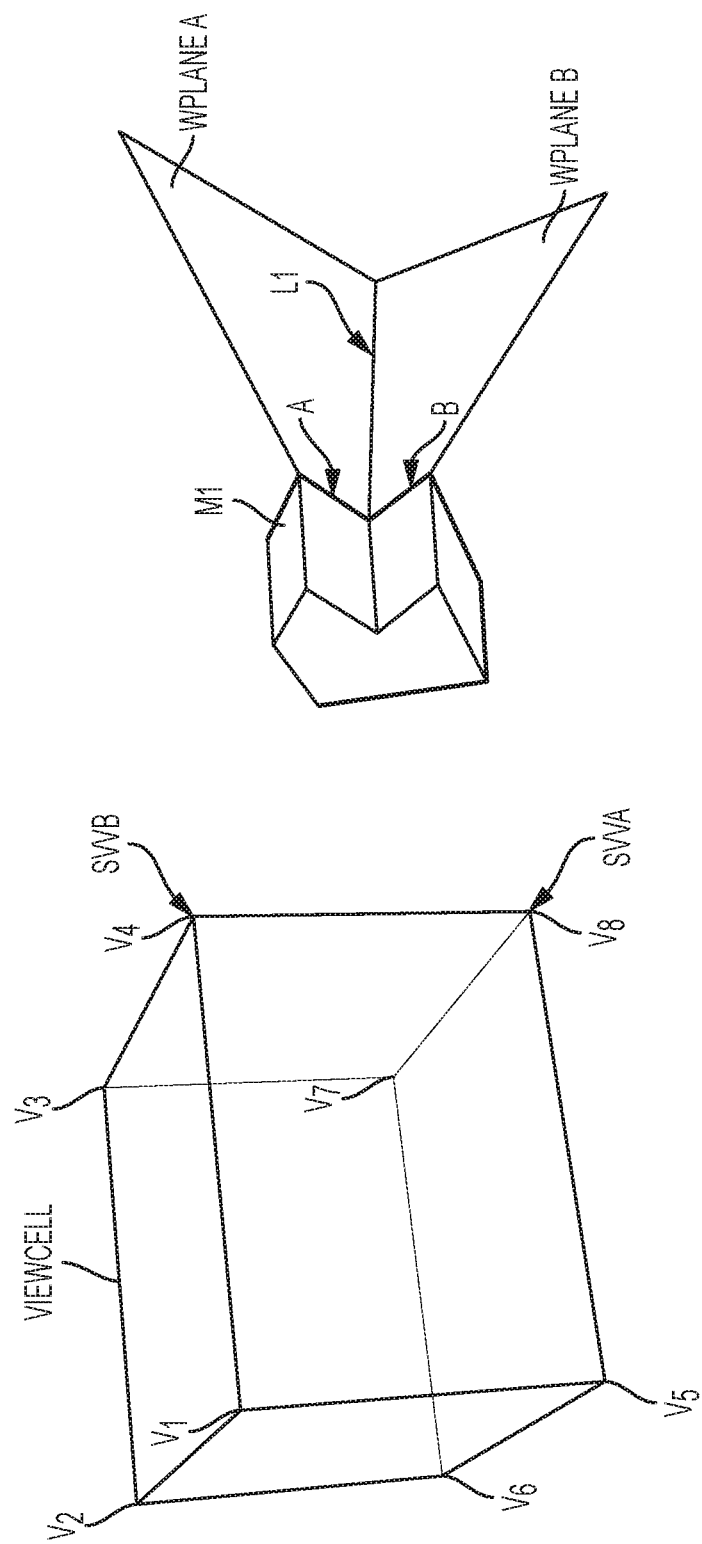
FIG. 9A is an exemplary diagram showing the first-order umbra boundary incident on silhouette edges A and B constructed by the prior art method of Teller (1992) perspective view looking in a general direction from viewcell toward mesh object.

FIG. 9A is a diagram showing the umbral event surfaces incident on silhouette edges A and B constructed by the prior art approach of the linearized antipenumbra described by Teller (1992). In this prior art method, which was used only for the limited problem of portal sequence visibility, the umbral event surface is constructed entirely from the planes of the supporting polygons. Portions of these supporting planes incident on silhouette edges A and B are shown and labeled WPLANE_A and WPLANE_B. These planes intersect at line L1 to form a continuous visibility event surface incident on silhouette edges A and B.

In Teller's prior-art method of linearized antipenumbra, Teller (1992), visibility event surfaces are approximated by intersecting only the planes of supporting polygons incident on portal edges and supported by source vertices wherein the source is an earlier portal in a sequence of portals. Theses supporting polygons correspond to the SV-ME supporting polygons (using the nomenclature of the present embodiments). Teller's method does not employ the corresponding SE-MV supporting polygons in the construction of umbral event surfaces, but the planes of these polygons.

In contrast, SV-ME wedges, as constructed by the present embodiments, are semi-infinite polygons, restricted laterally by the semi-infinite extension of the supporting polygon edges, which are rays. The SV-ME wedges are also restricted at the corresponding first-order silhouette edge. Teller "wedges" are actually planes that have no lateral restriction. The present embodiments of constructing "Teller Wedges" is to extend the planes of adjacent SV-ME wedges at an inside corner until the planes intersect.

In the following analysis, we show that by using visibility event surfaces constructed from both SV-ME and SE-MV supporting polygons, the present method can provide a significantly more precise from-region visibility solution than by using Teller's approach in which the planes of only one type of supporting polygon are intersected.

It must be emphasized that the method of Teller (1992 PhD Thesis U.C. Berkley) is designed only to provide a solution to the restricted visibility problem of visibility through a sequence of polygonal portals. Teller's method does not identify silhouette edges on which to construct visibility event surfaces, because in Teller's method, the edges supporting visibility event surfaces are limited to the edges of the portals. Since Teller's method does not apply the intersecting-planes method to construct visibility event surfaces on silhouette edges of general polygon meshes; the following analysis amounts to a theoretical comparison of Teller's intersecting-planes method if it were applied to the general problem of from-region visibility in polyhedral environments versus the present method of pivot-and-sweep visibility event surface construction, which is actually used in the more general visibility problem.

Figure 9B:
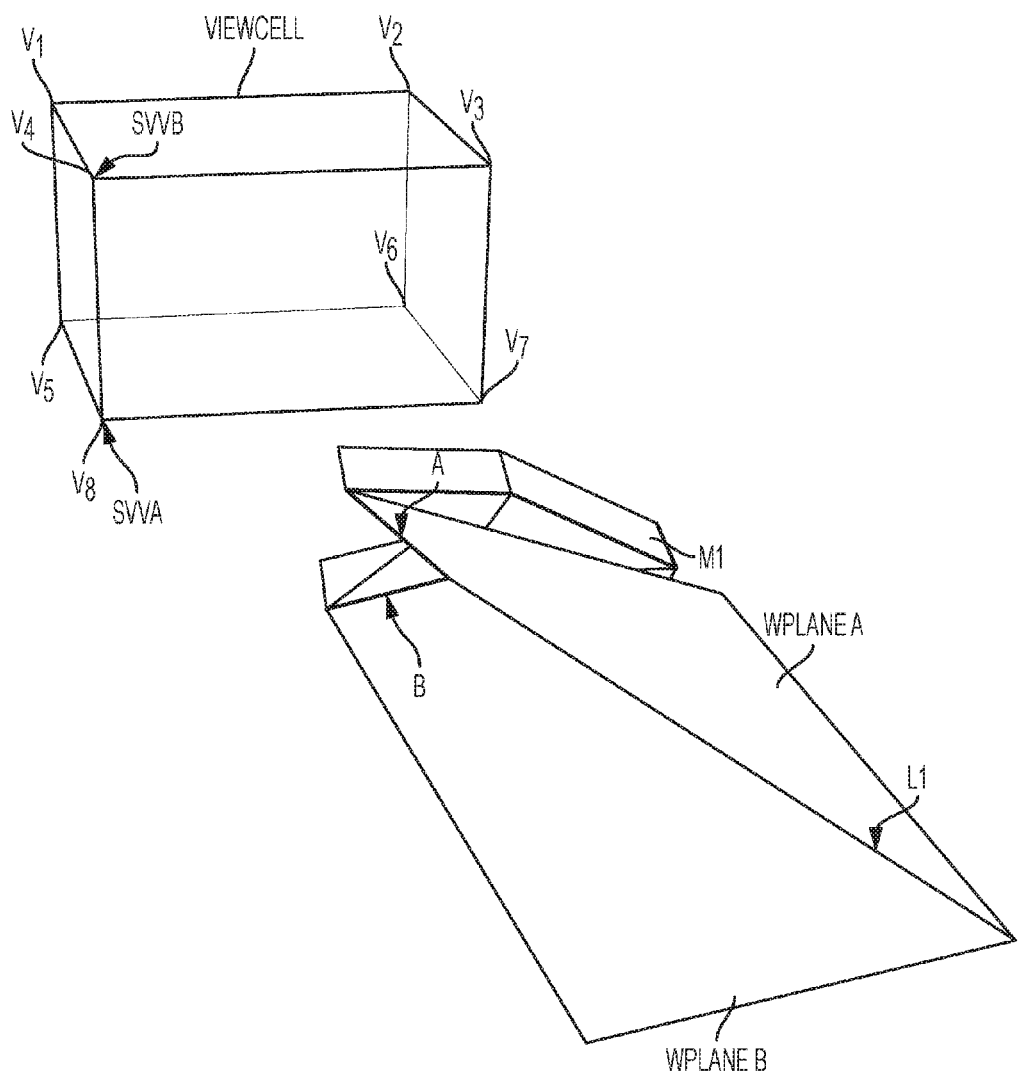
FIG. 9B is an exemplary diagram showing the same objects as FIG. 9A but from a perspective view looking in a general direction from mesh object toward viewcell.

FIG. 9B is a diagram showing the same objects as FIG. 9A, but from a perspective view looking in a general direction from mesh object toward viewcell.

Figure 9C:
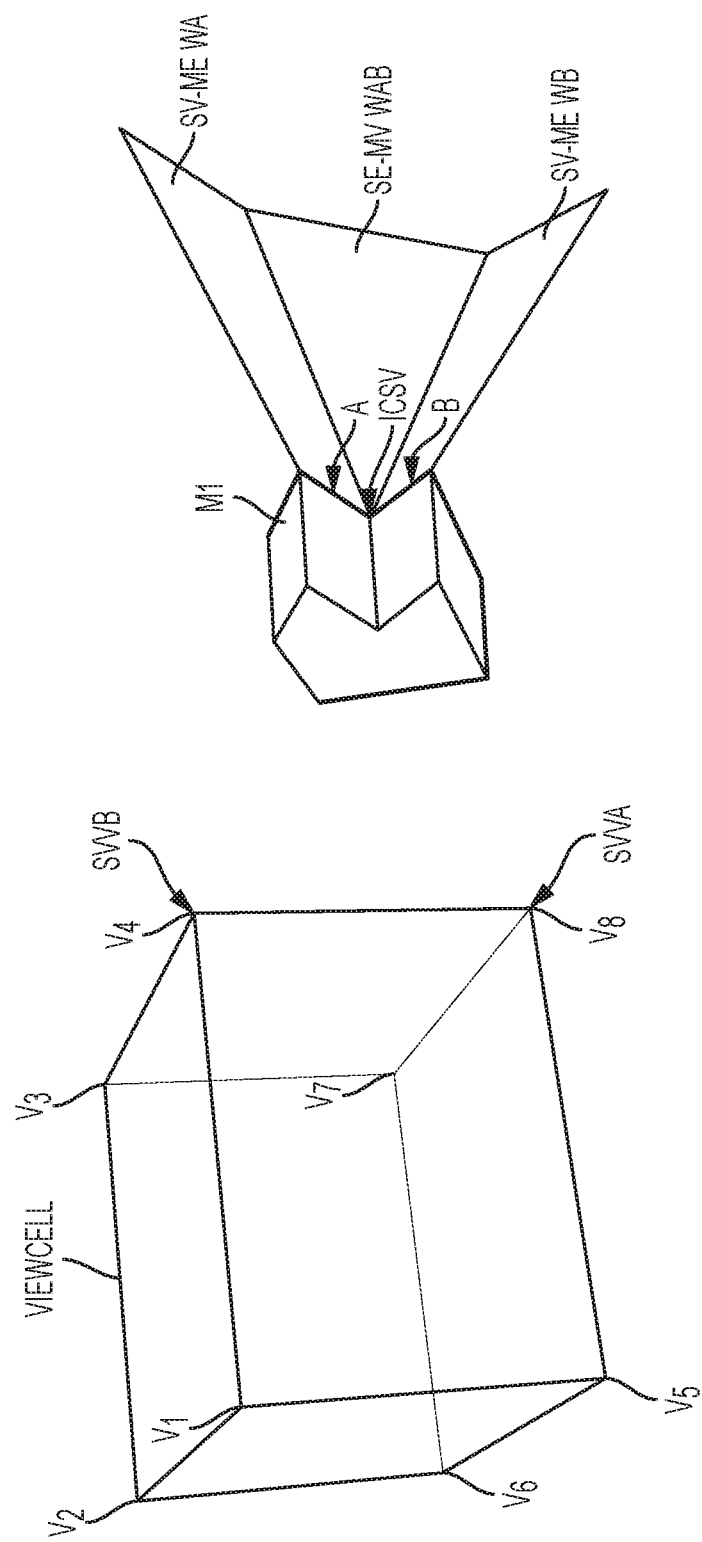
FIG. 9C is an exemplary diagram showing the more precise umbra boundary produced by the present method as compared to the umbra boundary produced by the prior art method of Teller, perspective view looking in a general direction from viewcell toward mesh object.
Figure 9D:
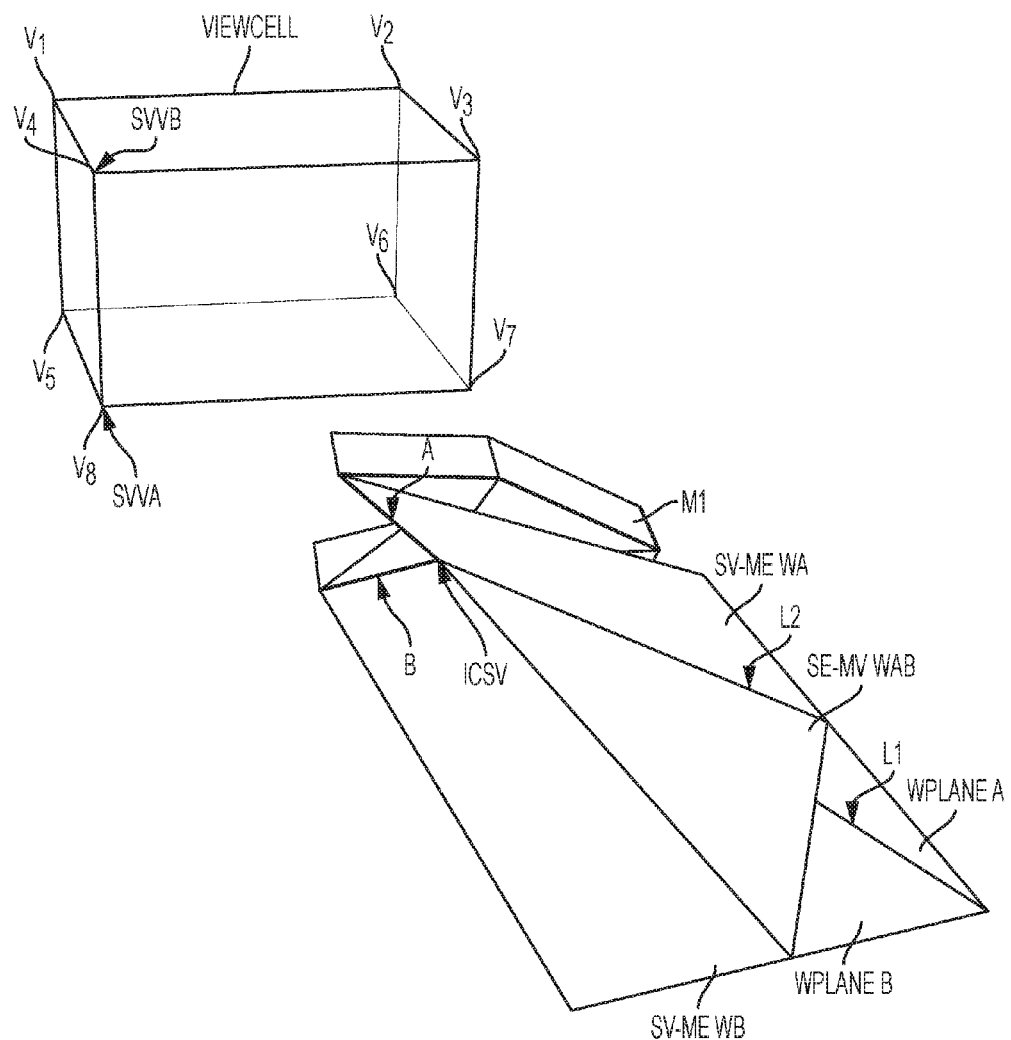
FIG. 9D is an exemplary diagram showing the same objects as FIG. 9C but from a perspective view looking in a general direction from mesh object toward viewcell.

FIG. 9C and FIG. 9D are a diagrams showing the more precise umbral event surface produced by the present method as compared to the umbra event surface that would be produced by the prior art method of intersecting supporting planes. In FIG. 9C and FIG. 9D, the umbral event surface formed by the present method of pivot and sweep construction of wedges is shown superimposed on the umbral event surface formed by the prior-art method of intersecting supporting planes. From the perspective view of FIG. 9D, looking in a general direction from viewcell toward mesh object, it can be seen that the present method produces a larger, more precise, umbra volume than the prior art method. The addition of the SE-MV wedge generated from the swept triangle (SE-MV supporting polygon) produces a larger conservative umbra volume (and hence a more precise potentially visible set) than the intersection of the supporting planes alone. Unlike the prior art method of intersecting planes, the present method of sweeping the viewcell silhouette contour can account for the effect of containment on the viewcell surface on the visibility at inside corner silhouette vertices. Consequently, for any silhouette contour with inside corner vertices in which adjacent supporting polygons pivot to different vertices of the viewcell, the present method will produce a more precise result than the intersecting-planes approach.

FIG. 9D also shows that the deviation between the umbral event surfaces produced by the present pivot-and-sweep method and the prior-art intersecting planes method tends to increase with distance from the supported silhouette edges and vertex. Consequently, for most inside-corner silhouette vertices, the precision of the present method can be much higher than the prior-art method of using intersecting planes.

FIG. 9D is a diagram showing the same objects as FIG. 9C, but from a perspective view looking in a general direction from mesh object toward viewcell.

Flipbook Views of Identifying Conservative Supporting Polygons and Constructing Corresponding Wedges.

Subsets of FIGS. 7-9, when viewed in specific sequences, provide flipbook views of the method of identifying conservative supporting polygons and constructing the corresponding wedges. These sequences are listed below:

Pivoted supporting polygon & wedge: View generally from behind viewcell: 7A, 7C, 7D, 7E.

Pivoted supporting polygon & wedge: View generally from in front of viewcell: 7B, 7D, 7G, 7H.

Swept supporting polygon & wedge: View generally from behind viewcell: 7A, 8A, 8A, 8B, (8C showing combination of pivoted wedges and swept wedges).

Swept supporting polygon & wedge: View generally from in front of viewcell: 7B, 8B, 8E, 8F, (8G showing combination of pivoted wedges and swept wedges).

Figure 10A:
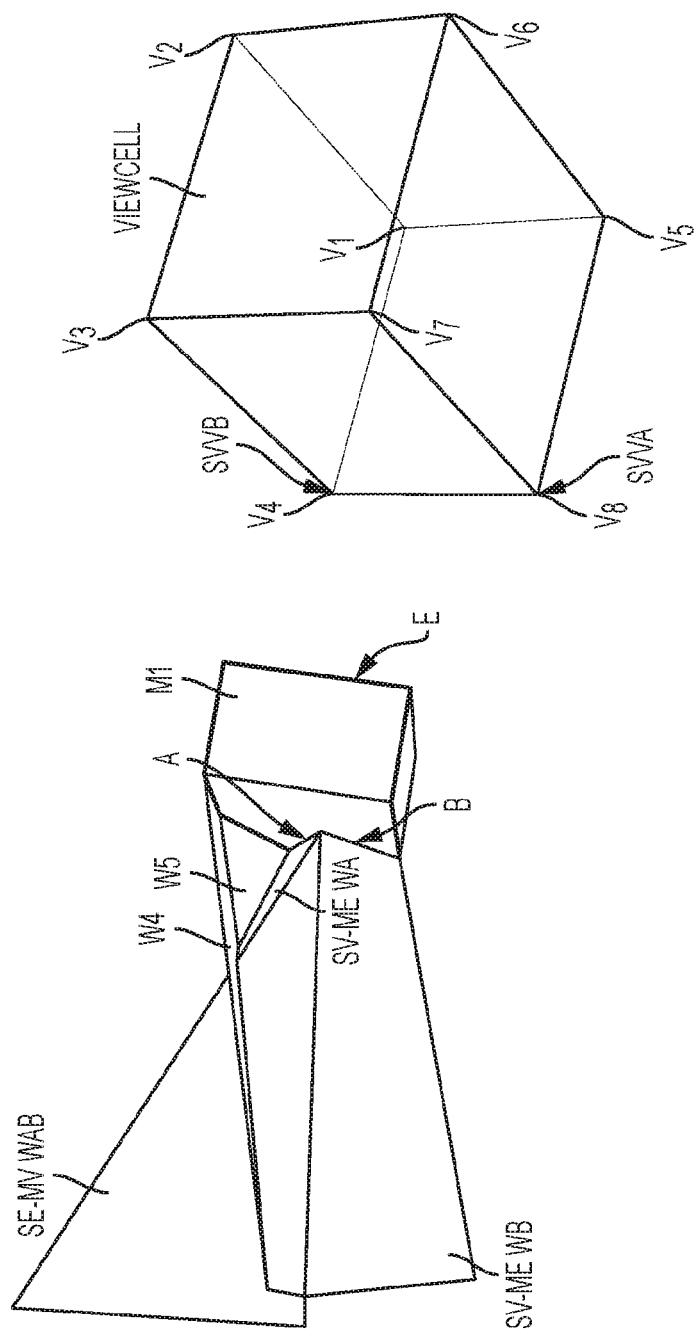
FIG. 10A is an exemplary diagram showing some additional UBPs of the umbra boundary surface formed by the intersection of UBPs for several adjacent first-order silhouette edges, perspective view looking in a general direction from viewcell toward mesh object.

FIG. 10A is a diagram showing the same mesh polygon and viewcell as FIGS. 9A and 9B, but in a perspective view looking in a general direction from beneath the polygon mesh. FIG. 10A shows the same first-order visibility event surfaces (wedges) as shown in FIG. 9C. Specifically SV-ME WA, incident on first-order silhouette edge A, SV-ME WB, incident on first-order silhouette edge B, and SE-MV WAB are shown.

Two additional first-order SV-ME wedges, W4 and W5, are also shown. The supporting viewcell vertex for wedges W4 and W5 is $V_3$. The intersection of these wedges is shown. Wedges intersect each other and other mesh polygons to form umbra boundary polygons (UBPs). These UBPs form the surface of first-order polyhedral aggregate umbrae (PAU). The volume of space enclosed by the PAU is first-order occluded from the corresponding viewcell. The UBPs corresponding to the intersections of the wedges are not explicitly shown in FIG. 10A but can be inferred from the intersection lines that are shown. Some of the wedges that would form the complete PAU are omitted so the interior structure of part of the first-order PAU can be seen (e.g. intersection of wedges W4, W5, SV-ME WA, SE-MV WAB, and SV-ME WB).

FIG. 10B is a view of the same polygon mesh (M1) as shown in FIG. 10A. In FIG. 10B mesh M1 and the viewcell are viewed from a perspective similar to that of FIG. 8I, looking generally at the "top" side of mesh M1, containing the inside corner mesh edge. This view is very different from the view of M1 and the viewcell given in FIG. 10A. Note the same edge of M1 is labeled E in both figures and is on the "bottom" of mesh M1. Edge A and edge B are also labeled in both figures.

In FIG. 10A the occluded side of the wedges is shown. In FIG. 10B the unoccluded side of the corresponding UPBs is shown.

FIG. 10B shows 5 UBPs that are formed by intersecting the corresponding wedges with other wedges.

UBP-A is formed by the intersection of the corresponding wedge (SV-ME WA) with wedge W5 (shown in FIG. 10A). UBP-A is also restricted by the intersection of SV-ME WA with wedge W4 shown in FIG. 10A. W4 is completely hidden in FIG. 10B, but the intersection of W4 and wedge SV-ME WA is shown as the edge labeled F in FIG. 10B. Edge F is an edge of UBP-A. Additionally, UBP-A shares a common edge with UBP-AB (which is derived from SE-MV WAB, shown in FIG. 10A).

UBP-AB is formed by the intersection of SE-MV WAB with wedge W4 and with the wedge of UBP-D. UBP-AB shares a common edge with both UBP-A and UBP-B as a consequence of the sweep construction of the corresponding wedge SE-ME WAB. UBP-AB is also restricted by its intersection with the pivoted wedge corresponding to UBP-D (which is supported by mesh edge D).

UBP-5 is formed by the intersection of the corresponding pivoted wedge (W5 shown in FIG. 10A, which has corresponding supporting viewcell vertex $V_3$) with W4, and with SV-ME WA.

UPB-D is formed by the intersection of the wedge incident on first-order silhouette edge D (wedge is not shown, but having supporting viewcell vertex $V_8$) with wedges SV-ME B, SE-MV AB, and W4 as well as the wedge supported by edge E (wedge not shown).

The UBPs form the boundary of the PAU for M1. Not all of UBPs forming the PAU of M1 are seen in the view given in FIG. 10B.

FIG. 10B illustrates wedges which are fully restricted by other wedges. Embodiments using such fully restricted wedges (e.g. the output-sensitive construction of PAU in the exemplary flowchart FIG. 26) are possible. Additionally, embodiments using partially restricted wedges (e.g. SV-ME wedges intersecting each other at outside-corner first-order silhouette edges) such as may optionally be employed in the output-sensitive construction of visibility maps shown in exemplary flowchart of FIG. 20A of the PCT patent application number PCT/US2011/042309, which employs SV-ME wedges that may be optionally locally restricted by intersecting adjacent SV-ME wedges as described in a step 140 of the exemplary flowchart shown in FIG. 1. Additionally, the wedges can be used without such local wedge-wedge restriction because the described methods of determining if an intersection of a wedge with a mesh polygon is actually an occlusion boundary (employing the modified point-in-polyhedron test) do not require the a-priori local or global restriction of a wedge with other wedges prior to making this determination.

Figure 11A:
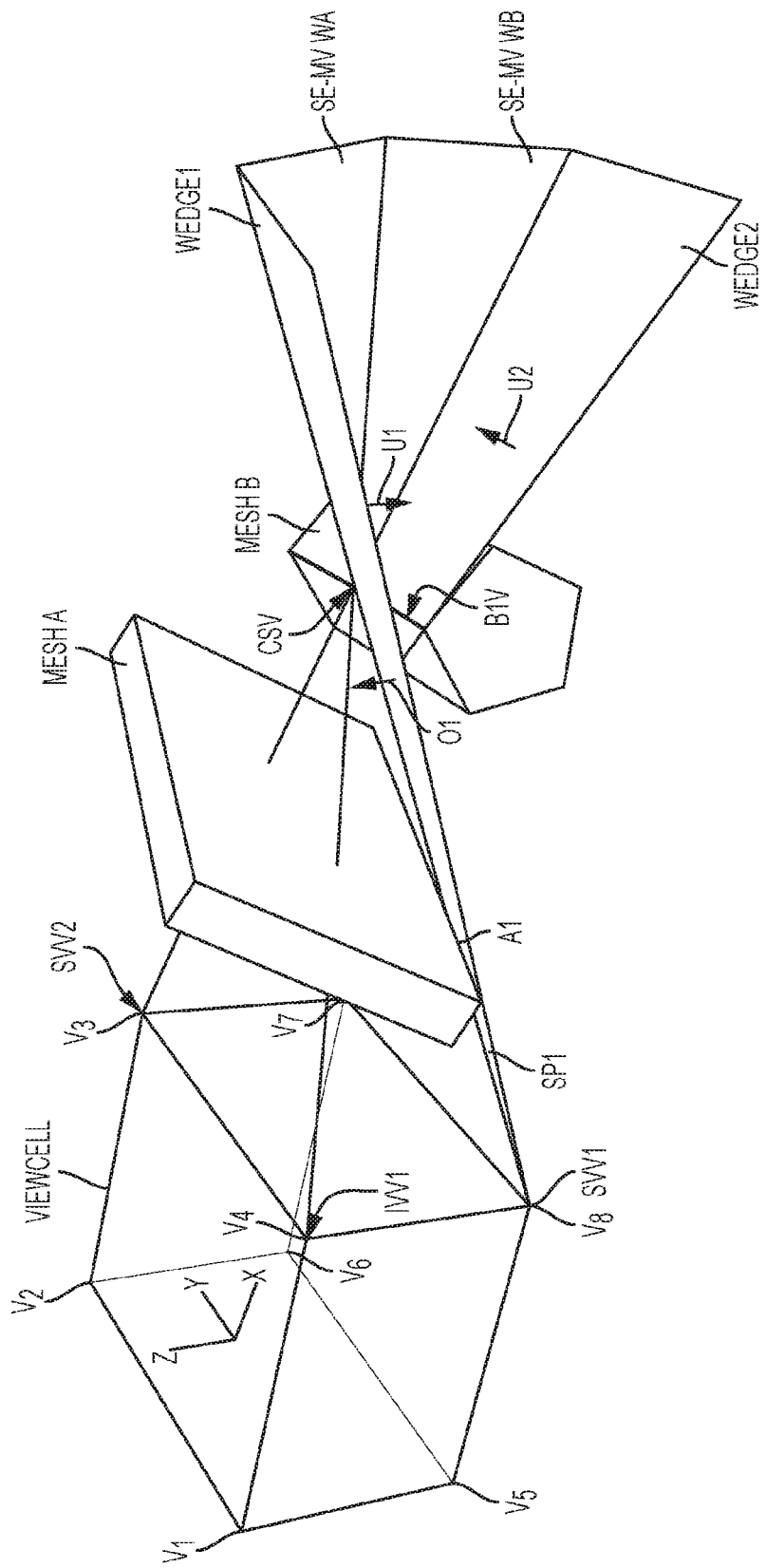
FIG. 11A is an exemplary diagram showing first-order visibility event surfaces (wedges) generated by the present pivot and sweep method in the case of a compound silhouette contour.

FIG. 11A is a diagram showing first-order visibility event surfaces (wedges) generated by the present method in the case of a compound silhouette contour. In this case a SV-ME wedge (WEDGE 1) is incident on (supported by) first-order silhouette edge A1. WEDGE1 intersects a first-order silhouette edge labeled B1. As discussed in FIG. 2, WEDGE1 divides first-order silhouette edge B1 into an occluded side (B1O) and an unoccluded side (B1V). This view is identical to that of FIG. 2.

The intersection of the first-order wedge WEDGE1 with the first-order silhouette edge is a compound silhouette vertex labeled CSV. The compound silhouette vertex corresponds to an inside corner of a compound silhouette contour. Using the terminology of catastrophe theory, the CSV corresponds to a t-vertex of the resulting manifold. Catastrophe theory includes the study of point singularities (e.g., CSVs or T-Vertex) and contour singularities (e.g., a first order silhouette edge) on manifold surfaces (e.g., manifold mesh).

Wedge2 is a first-order visibility event surface (a SV-ME wedge) that is supported by (incident on) the segment B1V, which is the visible portion of the first-order silhouette edge B1.

Thus WEDGE1 and WEDGE2 are both SV-ME wedges that intersect at the point CSV. Since WEDGE1 and WEDGE2 are constructed by the pivot process (FIG. 4A and FIG. 6A) of the pivot-and-sweep method using different supporting viewcell vertices (SVV1 and SVV2, respectively) the two wedges do not join on-edge to form a continuous umbral visibility event surface.

The sweep process (FIG. 5A and FIG. 5B, and FIG. 6B) of the present pivot-and-sweep method is used to construct SE-MV wedges (SE-MV WA and SE-MV WB) which join WEDGE1 and WEDGE2 into a continuous umbral visibility event surface. The wedge SE-MV WA is formed from the supporting SE-MV triangle generated between CSV, SVV1, and the intervening vertex IVV1 on the supporting viewcell silhouette contour (SVSC). The extension of the two edges of this supporting triangle through the point CSV forms the semi-infinite wedge SE-MV WA. Similarly, the wedge SE-MV WB is formed from the supporting SE-MV (swept) triangle generated between CSV, SVV2, and the intervening vertex IVV1 on the supporting viewcell silhouette contour (SVSC). The extension of the two edges of this supporting triangle through the point CSV forms the semi-infinite wedge SE-MV WB.

Figure 11B:
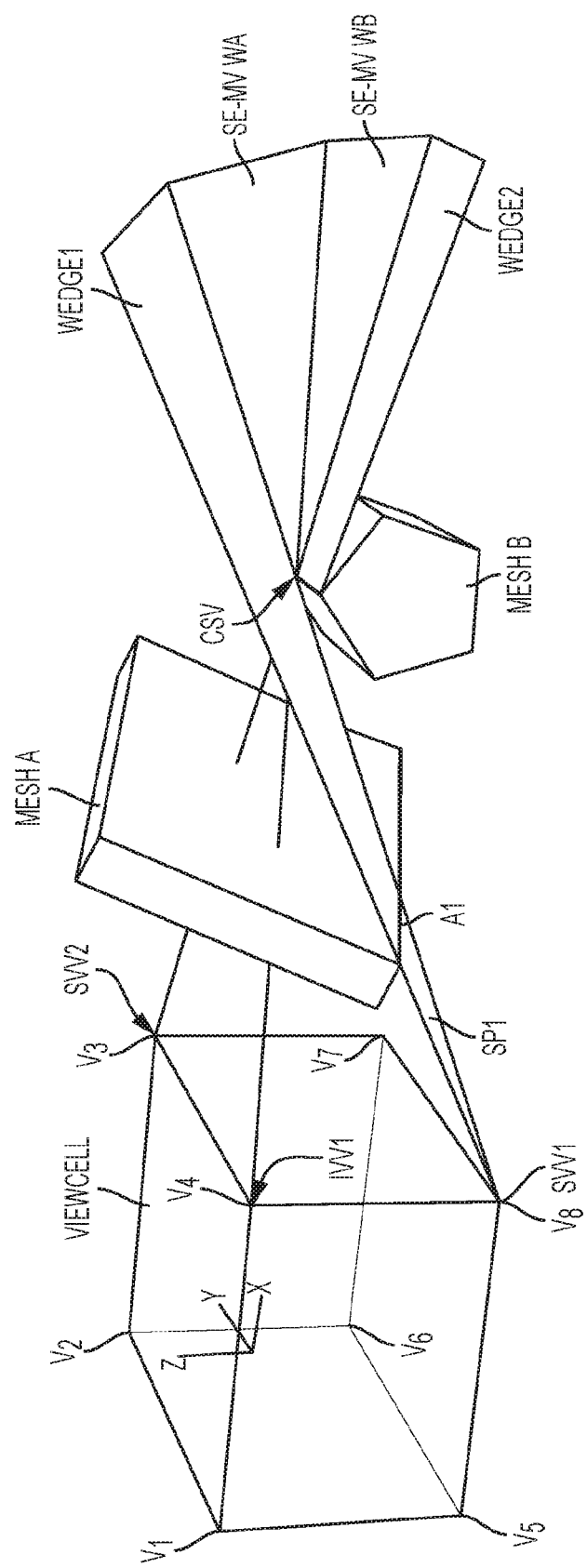
FIG. 11B is a different view of the same structures shown in FIG. 11A.

SE-MV WA and SE-MV WB connect at a common edge. SE-MV WA shares a common edge with WEDGE1. SE-MV WB shares a common edge with WEDGE2. The four connected wedges form part of the continuous first-order umbral visibility event surface incident on the silhouette edges A1 and B1V. The view of FIG. 11A shows the occluded side of WEDGE1 (arrow O1) and the unoccluded (from-viewcell, first-order visible) side of WEDGE2 (arrows U1 and U2). The view of FIG. 11A shows the "contained" (from-viewcell, first-order visible) side of SE-MV WA and SE-MV WB. As illustrated in FIG. 11A the intersection of wedges WEDGE1, SE-MV WA, SE-MV WB, and WEDGE2 forms a continuous event surface with the arrows U1 and U2 indicating the unoccluded side of the even surface. FIG. 11B is a different view of the same structures shown in FIG. 11A. In FIG. 11B, the view is looking up to the occluded side of WEDGE 1 and the unoccluded side of WEDGE2. FIG. 11B also shows the "contained" (from-viewcell, first-order visible) side of SE-MV WA and SE-MV WB.

This concludes a description of a first embodiment. In this description, a process for generating first-order visibility event surfaces is presented. Additional embodiments specify the order of processing the polygons and edges of a mesh to generate the first-order visibility event surfaces. Further embodiments detail precisely how the visibility event surfaces are used to determine occluded polygons and polygon fragments. In the following detailed description of an alternate embodiment, a mesh traversal algorithm is disclosed in which first-order wedge construction and from-viewcell visibility determination are efficiently interleaved in a front-to-back visibility map construction algorithm which tends to have output-sensitive performance.

FIG. 11A shows that the first-order pivoted wedge incident on B1V is labeled WEDGE2. FIG. 11A shows that a continuous umbral event surface is formed by first-order pivoted wedges and swept wedges all of which intersect at a compound silhouette vertex (CSV).

Figure 12A:
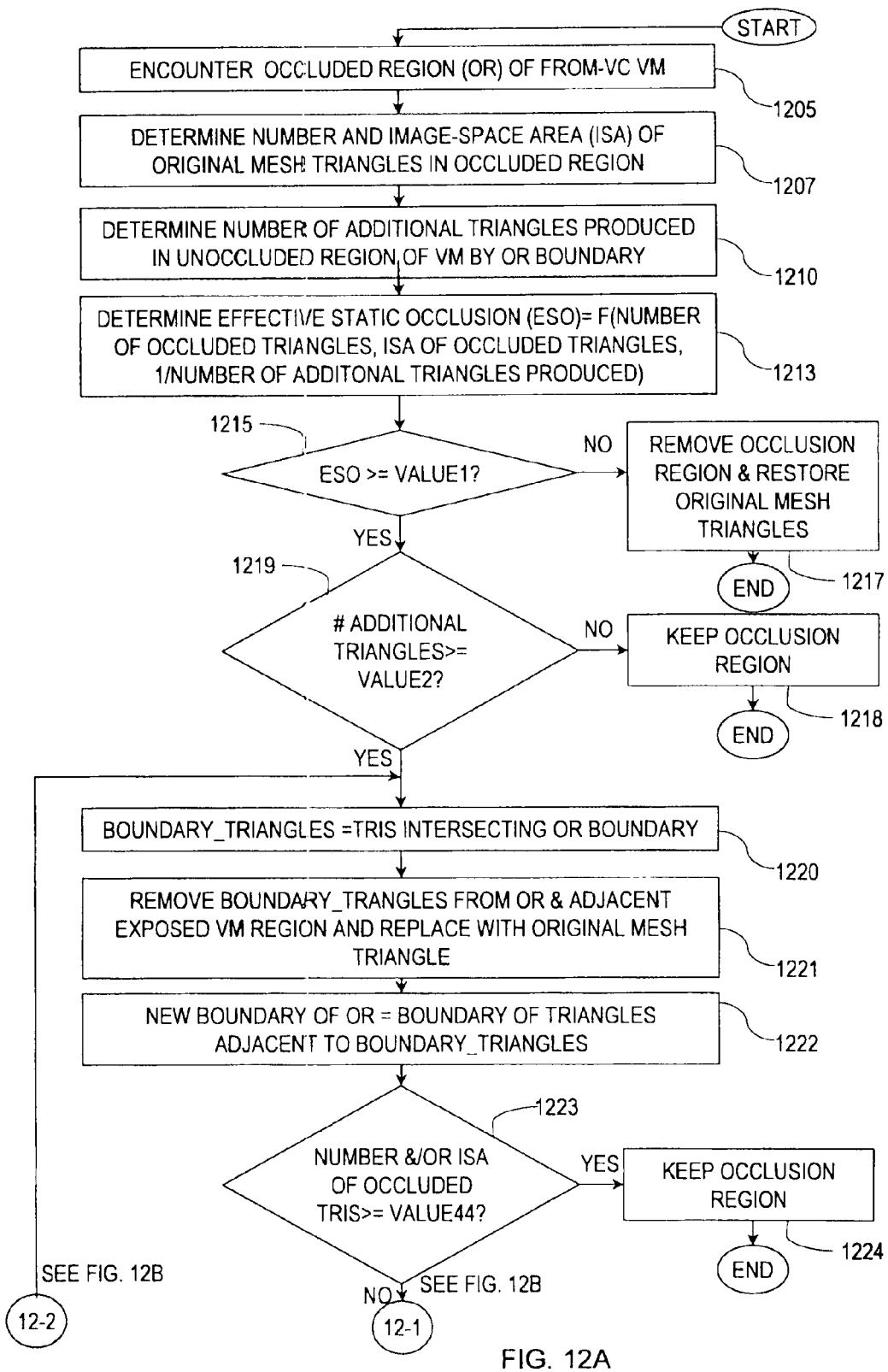
FIG. 12A is an exemplary flowchart showing method of identifying from-viewcell-occluded regions in visibility map having high effective static occlusion (ESO) and the process of conservatively simplifying both the occluded region boundary and the corresponding mesh silhouette contour.
Figure 12B:
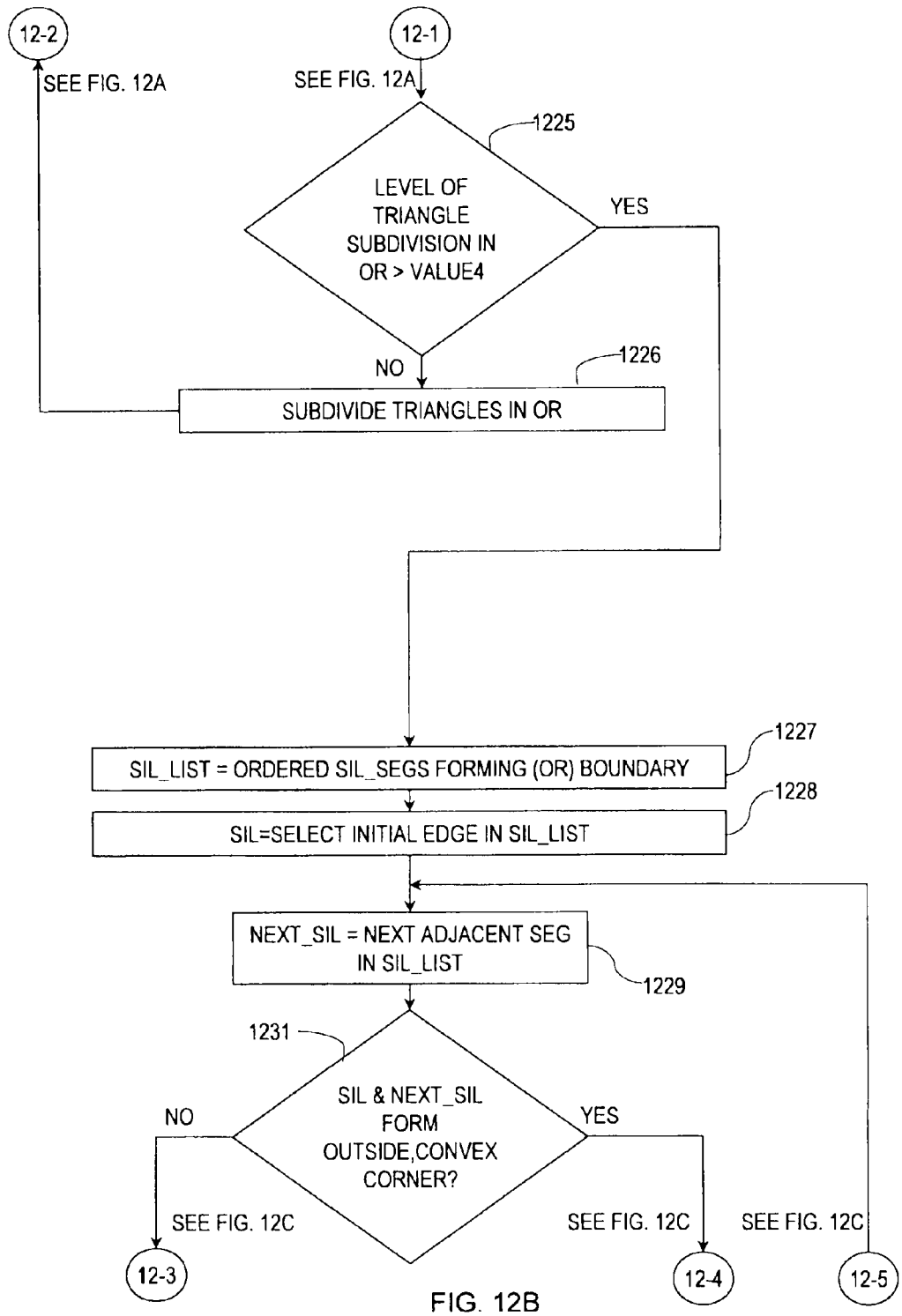
FIG. 12B is a continuation of FIG. 12A.
Figure 12C:
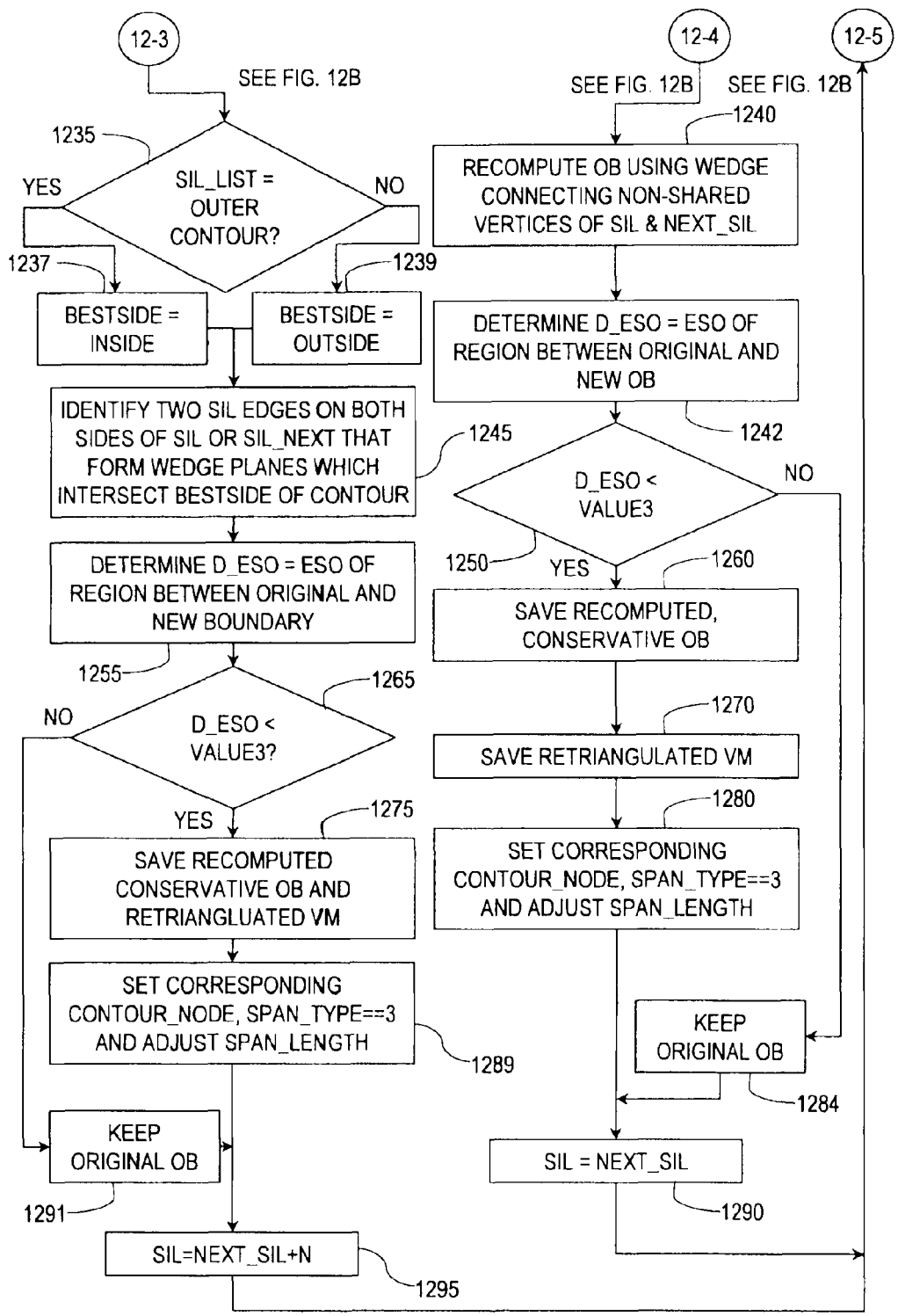
FIG. 12C is a continuation of FIG. 12B.

FIG. 12A-FIG. 12C is an exemplary flowchart showing method of identifying from-viewcell-occluded regions in visibility map having high effective static occlusion (ESO) and the process of conservatively simplifying both the occluded region boundary and the corresponding mesh silhouette contour.

In some embodiments, first-order, conservative linearized umbral event surfaces are constructed using the methods of the exemplary FIG. 1 through FIG. 6 are employed to generate conservative from-region visibility maps using the prior-art approach of discontinuity meshing or using the output-sensitive construction method described in FIG. 20 and related figures of the PCT patent application number PCT/US2011/042309.

In general, a PVS derived from a visibility map computed at a high precision results in less overdraw during runtime rendering, since more occluded polygon area is identified and removed.

However, each OB segment of the occlusion map also results in additional polygons being added to the visibility map/PVS as a consequence of retriangulation of the original triangles intersected by the OB segment. (For one method of retriangluation see M. de Berg, M. van Dreveld et. al in "Computational Geometry Algorithms and Applications, Springer c. 1997, page 45, the entire contents of which are incorporated by reference herein). This additional geometry tends to slow runtime rendering simply by increasing the number of primitives submitted to the initial geometry stages of the graphics pipeline.

In order to reduce the overall cost of runtime rendering, embodiments include a method of balancing the reduced cost of rasterization produced by an occluded region against the increased cost of geometry processing incurred because of the additional geometry introduced by the occluded region.

This method employs a heuristic called effective static occlusion (ESO) eliminate occluded regions which correspond to occluded regions of small area, especially if they introduce large numbers of additional triangles.

In a related method, the ESO is also used to guide the conservative simplification of occlusion boundaries, while attempting to maximize the surface area of the occluded region.

In some embodiments, the process of FIG. 12A-FIG. 12C is conducted as an off-line visibility precomputation. The result is an optimized from-region visibility map and related PVS. A related method of efficiently storing the results of the visibility map by labeling specific edge contours of the mesh polygons as silhouette edges associated with occluded regions having high effective occlusion is presented in conjunction with FIG. 13, FIG. 34 and related figures. In this method, the visibility map/PVS for a viewcell can be efficiently computed from the visibility map/PVS of an adjacent (or containing) viewcell at runtime using the pre-labeled silhouette edges. The method of FIG. 12A-FIG. 12C includes steps to not only simplify occlusion boundaries of the visibility map, but also store this information as the corresponding simplified silhouette contours of the original mesh objects. This process is performed as precomputation to prepare for the actual incremental construction of visibility map/PVS data using the runtime methods of FIG. 20 and related figures.

In some embodiments, process flow starts at step 1205, upon encountering an occluded region (OR) of a visibility map.

Process flow proceeds to step 1207 to determine the number of original mesh triangles completely occluded in this OR. In an alternative embodiment, the number of original mesh triangles that are partially occluded is determined. Also in step 1207, the image-space area of the completely and partially occluded original mesh triangles in this OR is estimated using a viewpoint inside the viewcell for which the visibility map was constructed.

Process flow proceeds to step 1210 to determine the number of additional triangles (in the unoccluded region bordering the current OR) that are produced by retriangulation of the original mesh triangles at the OR boundary.

Process flow proceeds to step 1213, where the measured values determined in step 1207 and 1210 are employed to determine the value of a heuristic variable called the effective static occlusion (ESO) for the entire OR.

In some embodiments the ESO is a variable that is determined to be in some proportion to the image space area (ISA) of the occluded triangles/triangle fragments in the OR. In further embodiments, the ESO heuristic also includes a coefficient of this term which, reflects the runtime cost of rasterization.

According to some embodiments, the ESO is determined to be in some inverse proportion to the number of additional unoccluded triangles produced in the mesh as a result of retriangulation at the OR border. In additional embodiments the ESO heuristic also includes a coefficient of this term, which reflects the runtime cost of geometry processing as well as another coefficient reflecting the storage and transmission cost of the additional triangles. Although using the incremental runtime PVS construction method of FIG. 20 and related figures, the storage/transmission costs of these additional triangles can be eliminated by conducting the retriangulation at runtime.

According to some embodiments, the ESO is represented by the following formula: ESO=F(number of occluded polygons, image space area of occluded polygons, 1/number of new visible polygons added at occlusion boundary). In further embodiments, the ESO can be represented by any desired function.

Other embodiments of the present method are possible which include additional variables in the determination of the "effectiveness" of a particular OR in producing occlusion that actually results in improved runtime rendering performance.

Process flow proceeds from 1213 to decision step 1215 to determine if the ESO is greater than or equal to a specified value, VALUE1. If, in decision step 1215, it is determined that the ESO is not greater than or equal to the value VALUE1, then process flow proceeds to step 1217, where the entire OR is removed from the VM and the original, unretriangulated, triangles of the polygon mesh are restored. In this regard, in embodiments, when the ESO associated with OR is not greater than or equal to VALUE 1, the OR is not an effective occlusion boundary. For example, as the number of new triangles created by the retriangulation process increases, the ESO value decreases indicating that it may not be efficient to keep the OR, which causes the retriangulation process. Process flow terminates at 1217.

Alternate embodiments are possible in which only those original mesh triangles that are partially occluded are restored but the OR is kept. The partially occluded triangles are those which produce additional triangles by retriangluation at the boundary of the OR (the OB). By restoring only these triangles, the number of triangles in the VM is reduced but completely occluded triangles are still removed from the VM/PVS.

If, on the other hand, in decision step 1215 it is determined that the ESO is greater than or equal to the value VALUE1, then process flow proceeds to step 1219 to determine if the additional number of triangles constructed in the unoccluded region bordering the current OR as a result of the OR boundary, exceeds a number VALUE2.

If, in decision step 1219, it is determined that the additional number of triangles constructed is not greater than or equal to VALUE2, then process flow proceeds to step 1218, where the current OR (and the triangles produced by retriangulation on the boundary of the current OR) are kept unmodified. In this regard, if the number of additional triangles is small, it may be more efficient to keep the OR.

If, on the other hand, it is determined in step 1219 that the additional number of triangles constructed is greater than or equal to VALUE2, then process flow proceeds to step 1220.

Steps 1220-1226 implement a method attempting to reduce the number of additional triangles induced on the adjacent unoccluded region by conservatively removing the triangles in the OR and adjacent exposed regions of the VM that intersect the occlusion boundary of the OR. Using this approach, the triangles in the adjacent unoccluded regions that previously were restricted at the OR occlusion boundary are now considered to be completely unoccluded, and the restricted triangles are replaced with the original mesh triangles. This conservatively increases the area of the unoccluded from the corresponding viewcell and reduces the number of triangles by eliminating retriangulation at the occlusion boundary.

Process flow proceeds to step 1220, where the BOUNDARY_TRIANGLES are identified as those triangles intersecting/bordering the occlusion boundary of the VM occlusion region.

Process flow proceeds to step 1221, where the BOUNDARY_TRIANGLES are removed from the OR and the corresponding (retriangulated) boundary triangles are removed from the adjacent exposed region of the VM and replaced with the original, larger, untriangulated mesh triangles. These larger triangles include some surface area that was originally included only in the occluded region, but after the untriangulation step of 1221 the larger original triangles are considered to be completely unoccluded, even though parts of the triangles may be inside the occluded region.

Process flow proceeds to step 1222, where the new boundary between the OR and the adjacent exposed regions is set to the polyline boundary formed by the triangles of the OR that are adjacent to the original mesh triangles identified in step 1221. This step conservatively redefines the boundary of the OR to be inside the originally computed OR. It also potentially reduces the complexity of the boundary and the number of triangles in the OR by conservatively redefining the OR boundary.

Subsequent decision step 1223 is similar to decision step 1215 and in this case determines if the simple, conservative redefinition of the occlusion boundary along the edges of original mesh triangles, as determined in steps 1220-1222, has resulted in an occlusion region that occludes a sufficient number of triangles and/or occludes triangles having a sufficient image-space area.

If, in decision step 1223, it is determined that the number and/or image-space area of the occluded triangles exceeds a predetermined value (e.g. VALUE44), then process flow proceeds to step 1224, where the occlusion region and adjacent exposed regions are retained in their current state.

If, on the other hand, it is determined that the number of, or ISA (image-space surface area) of triangles in the OR do not exceed the predetermined value then process flow proceeds to process 5-1, which starts at decision step 1225 (FIG.

12B) to determine if the level of triangle subdivision in the OR exceeds a certain value (e.g. VALUE4).

If, in decision step 1225, it is determined that the level of subdivision of the triangles in the OR do not exceed the predetermined value, then process flow proceeds to step 1226, where the triangles of the OR are further subdivided (e.g., using midpoint-edge subdivision to create 4 triangles from 1). This procedure, along with the test of 1225, allows very large triangles in the OR, which also extend into adjacent exposed regions, to be progressively subdivided into smaller triangles until the number of triangles and/or ISA of triangles in the occluded region exceed the value VALUE44 (step 1223) or until the level of subdivision exceeds the VALUE4. Process flow proceeds from 1226 to process 12-2, which returns process flow to step 1220 (FIG. 12A).

If, in decision step 1225, it is determined that the level of subdivision of triangles in the OR exceeds a predetermined value, then process flow proceeds to step 1227 to conservatively simplify the ORs occlusion boundary. These simplifications are executed to increase the ESO of the OR.

In step 1227 the in-order list of silhouette edges forming the silhouette contour (from which the occlusion boundary (OB) segments comprising the boundary of the current OR were constructed) is stored as an array SIL_LIST. For any inside-corner silhouette vertex (whether simple or compound) the associated viewcell silhouette edges of the VSVSC are also stored in the SIL_LIST, since they also have corresponding wedges which contribute to the OR boundary.

Process flow proceeds to step 1228 to store the initial segment of the array in the variable SIL.

Process flow proceeds to step 1229 to store the next segment in the SIL_LIST in the variable NEXT_SIL.

Process flow proceeds to decision step, 1231 to determine if SIL and NEXT_SIL form an outside (convex) corner of the silhouette contour.

If, in decision step 1231, it is determined that SIL and NEXT_SIL form an outside (convex) corner of the silhouette contour (and corresponding OR boundary), then process flow proceeds to process 12-4, which starts at step 1240, to construct a SV-ME wedge on a line segment connecting the non-shared vertices of SIL and NEXT_SIL. Using the previously specified method of VM map construction, the wedge is intersected with the mesh polygons to form DM_SEGS which are tested for from-viewcell visibility to determine if they are valid OB_SEGS of the VM. These new conservative OB_SEGS may intersect mesh triangles and other OB_SEGS not intersected by the original OR boundary.

Process flow proceeds to step 1242 the ESO of the region between the new OB and the original OB is determined and stored in the variable D_ESO (indicating the ESO of the difference region between the old and new OBs.). This ESO estimates the "effectiveness" of the occlusion region that has just been removed by the conservative repositioning of the OB.

Process flow proceeds to step 1250 to determine if the D_ESO is less than a predetermined value VALUE3.

If in decision step 1250 it is determined that the D_ESO is less than the predetermined VALUE3, then process flow proceeds to step 1260. If the D_ESO of the difference region is low, then the number of triangles occluded in the difference region is small and/or they have a relatively small surface area. Also a low D_ESO value may indicate that there are many partially occluded mesh triangles in the difference region that will cause additional geometry by retriangulation.

In step 1260, reached because the difference region has a relatively low D_ESO value, the conservative boundary of the OR recomputed in step 1240 is saved as the new OR boundary for the region of the map.

Process flow proceeds to step 1270, where the retriangulated triangles introduced by the new OR boundary are also optionally saved. Again mesh triangles that are partially occluded can be conservatively considered to be unoccluded, thereby reducing the amount of new geometry that would have been produced by retriangluation.

Process flow proceeds to step 1280, where the data for the two silhouette edges SIL and NEXT_SIL, which have been effectively collapsed into a single conservative silhouette edge is removed from the linked list representing the labeled from-viewcell silhouette contour of the mesh object. As discussed in detail, in conjunction with FIG. 13 and related figures of the embodiments, the labeled silhouette edge data is stored as a link list of data structures corresponding to simple silhouette vertices and CSVs. In step 1280, a single node of the linked list (CONTOUR_NODE) is modified to reflect the collapse of the edge.

If in decision step 1250 it is determined that the D_ESO of the difference region is not less than a predetermined value, then process flow proceeds to step 1284, where the original OB is retained since the difference region tends to effectively occlude relatively large numbers of mesh triangles or portions of mesh triangles having a relatively large surface area without introducing too many additional triangles because of retriangulation at the OR boundary.

Process flow proceeds to step 1290, where the SIL is set to NEXT_SIL and process flow proceeds to process 12-5, which returns process flow to step 1229, where the SIL_LIST is effectively incremented by setting NEXT_SIL to the next unprocessed edge in SIL_LIST.

If, in decision step 1231, it is determined that SIL and NEXT_SIL form an inside corner of the silhouette contour corresponding to the boundary of the OR, then process flow proceeds to process 12-3, which starts at step 1235 (FIG. 12C) to determine if the current contour being processed corresponding to the SIL_LIST is an outer contour of a occluded region (OR) or an inside contour of the region.

If, in decision step 1235 it determined that the current contour is an outer contour, then process flow proceeds to step 1237 to set a variable BESTSIDE to a value INSIDE.

If, in decision step 1235 it determined that the current contour is not an outer contour, then is the current contour is an inner contour and process flow proceeds to step 1239 to set a variable BESTSIDE to a value OUTSIDE.

Process flow proceeds step 1245, where two silhouette edges are identified lying on both sides of SIL or SIL_NEXT such that the edges are as close as possible on the contour (in the contour array SIL_LIST) and such that the corresponding wedge planes of the edges intersect to form a line that intersects on the BESTSIDE of the contour; where BESTSIDE is the INSIDE of the contour for outer contours and the OUTSIDE of the contour for inner contours. This insures a conservative simplification of the contour in the region of the inside corner silhouette vertex (either simple or compound). This process may "collapse" more than one edge at a time with the span designated by the variable N.

Process flow proceeds to step 1255, where the ESO of the region between the new OB and the original OB is determined and stored in the variable D_ESO (indicating the ESO of the difference region between the old and new OBs.). This ESO estimates the "effectiveness" of the occlusion region that has just been removed by the conservative repositioning of the OB.

Process flow proceeds to decision step 1265 to determine if the D_ESO is less than a predetermined value VALUE3.

If in decision step 1265 it is determined that the D_ESO is less than the predetermined VALUE3, then process flow proceeds to step 1275. If the D_ESO of the difference region is low then the number of triangles occluded in the difference region is small and/or they have a relatively small surface area. Also a low D_ESO value may indicate that there are many partially occluded mesh triangles in the difference region that will cause additional geometry by retriangulation.

In step 1275, reached because the difference region has a relatively low D_ESO value, the conservative boundary of the OR recomputed in step 1245 is saved as the new OR boundary for the region of the map and the retriangulated triangles introduced by the new OR boundary are also optionally saved. Again, mesh triangles that are partially occluded can be conservatively considered to be unoccluded, thereby reducing the amount of new geometry that would have been produced by retriangluation.

Process flow proceeds to step 1289, the data for the N silhouette edges, which have been effectively collapsed into a conservative span comprising extended silhouette edges, is removed from the linked list representing the labeled from-viewcell silhouette contour of the mesh object and removed from SIL_LIST. As discussed in detail in conjunction with FIG. 13 and related figures, the labeled silhouette edge data is stored as a link list of data structures corresponding to simple silhouette vertices and CSVs. Later in the process flow, in step 1280, a node of the linked list (CONTOUR_NODE) may be modified to indicate the collapsed edge.

If in decision step 1265 it is determined that the D_ESO of the difference region is not less than a predetermined value, then process flow proceeds to step 1291, where the original OB is retained since the difference region tends to effectively occlude relatively large numbers of mesh triangles or portions of mesh triangles having a relatively large surface area without introducing too many additional triangles because of retriangulation at the OR boundary.

Process flow proceeds to step 1295, where the SIL is set to NEXT_SIL+N, N representing the span of edges replaced or collapsed by the conservative simplification process of step 1245. Process flow proceeds to process 12-5, which returns process flow to step 1229, where the SIL_LIST is effectively incremented by setting NEXT_SIL to the next unprocessed edge in SIL_LIST.

The method of FIG. 12 applies to both simple and compound silhouette contours. For compound silhouette contours the inside corner silhouette vertices may be CSVs. The method is applied as a post-process to a completed visibility map. Consequently, the silhouette edges corresponding to OB_SEGS are labeled. As previously described, during the construction of the from-viewcell visibility map a single first-order silhouette edge on a triangle mesh may ultimately be subdivided into multiple visible subsegments. In addition, each of these segments may a support an SV-ME wedge that intersects another silhouette edge to produce a CSV with its associated SE-MV swept wedges. In the present method, the SIL_LIST is comprised of the individual subsegments reflecting the visible complexity of the simple or compound silhouette contour.

Figure 12D:
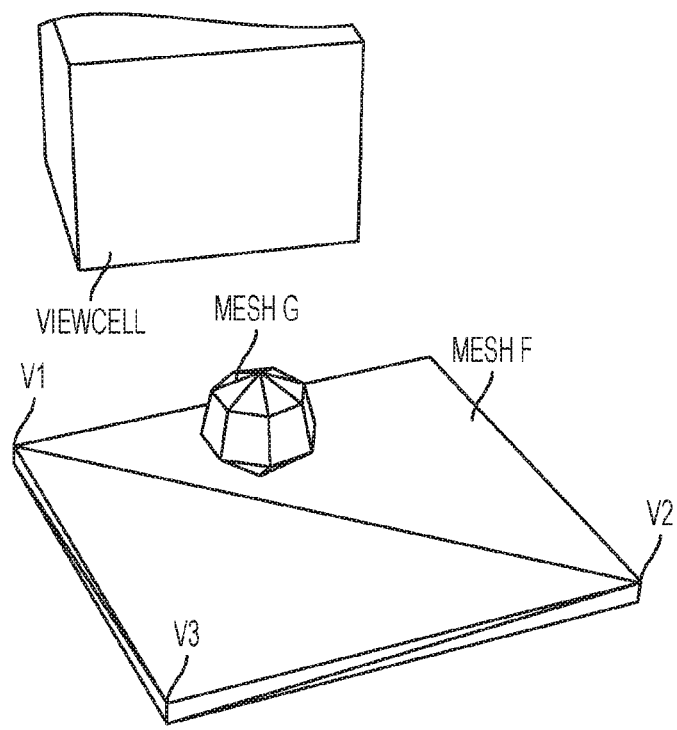
FIG. 12D is a 3D hidden-line diagram showing a viewcell and two polygon meshes.

FIG. 12D is a 3D hidden-line diagram showing a viewcell and two polygon meshes labeled MESH F and MESH G. The diagram is a perspective view, with the mesh objects positioned generally between the viewer and the viewcell.

MESH F is a triangle mesh representing a box-like object having six sides. Each rectangular face of MESH F is modeled as two triangles. There are 12 triangles in MESH F, only 6 are shown, the other 6 are occluded and not shown. One triangle of MESH F is formed by the vertices labeled V1, V2, and V3.

MESH G is a polygon mesh having 21 polygons, some of these polygons are represented as triangles while others are represented as rectangles. Some of these polygons are occluded in the view.

Figure 12E:
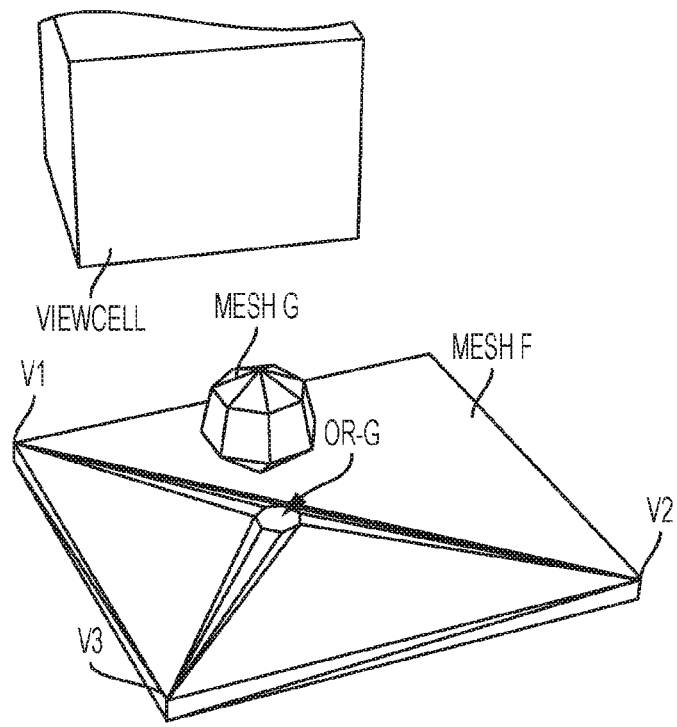
FIG. 12E is a 3D hidden-line diagram showing the same perspective view as FIG. 12D, and including an occlusion region and corresponding occlusion boundary.

FIG. 12E is a 3D hidden-line diagram showing the same perspective view as FIG. 12D. In FIG. 12E a portion of the from-viewcell visibility map, using VIEWCELL as the source, is shown. Wedges constructed on first-order silhouette edges of MESH G intersect MESH F to produce an occlusion region labeled OR-G. The wedges are not shown here. Occlusion region OR-G is bounded by an occlusion boundary consisting of 7 occlusion boundary segments. OR-G is completely inside of the original mesh triangle formed by the vertices V1, V2, and V3.

In one embodiment, the construction of the occlusion boundary segments bounding OR-F is constructed according to the 3D mesh traversal process of FIG. 20A and related figures. Specifically these occlusion boundary segments are added to the intersected polygon in step 2068 of the exemplary flowchart shown in FIG. 20A.

In another step of the 3D mesh traversal process, depicted as step 2083 in the exemplary flowchart of FIG. 20A, the triangles intersecting or containing occlusion boundary segments are re-triangulated into occluded regions and unoccluded regions. FIG. 12E shows the result of this exemplary re-triangulation of original mesh triangle V1-V2-V3 using the occlusion boundary segments of OR-G. During this re-triangulation the original triangle V1-V2-V3 is re-partitioned into 10 new triangles, one for each of the 7 occlusion boundary edges of OR-G, and 3 additional triangles that result because OR-G further partitions triangle V1-V2-V3 into 3 regions defined by vertices of OR-G.

Since occlusion region OR-G is completely inside a single original triangle (V1-V2-V3) of MESH F, it contains no complete triangles. That is, the polygon mesh (MESH G) that induces the occlusion boundary of OR-G on MESH F does not completely occlude even a single mesh polygon of MESH F, using VIEWCELL as source. Thus, the number of mesh triangles completely occluded by OR-G is 0.

Triangle V1-V2-V3 is partially occluded by MESH G. This region of partial occlusion is the area of OR-G. In this example the surface area of OR-G is small relative to the surface area of the containing triangle V1-V2-V3.

In this example OR-G occludes no mesh polygons completely, and occludes a relatively small surface area of only a single polygon. Since the effective static occlusion (ESO) of an occlusion region is in some direct proportion to the number of polygons completely occluded by the occlusion region and the surface are of completely or partially occluded polygons, the ESO of OR-G is not substantially increased by these factors.

The ESO of an occlusion region varies in some indirect proportion to the number of new polygons created by re-triangulation at the corresponding occlusion boundary. In the example of OR-G, re-triangulation at the occlusion boundary results in a single original triangle being partitioned into 10 new triangles.

Thus, in this example, both the direct proportional factors of the ESO (number of polygons completely occluded and surface area of occluded polygons) as well as the inverse proportional factors (e.g. the number of new polygons generated by re-triangulation at the occlusion boundary) will tend to produce a relatively low value for the ESO of OR-G.

As described in the exemplary flowchart of FIGS. 12A-C, in one embodiment, OR-G which has a low ESO, can be removed completely from the visibility map (step 1217). Alternatively, according to the exemplary flowchart of FIGS. 12A-C, or the occlusion boundary of OR-G can be simplified and the ESO for the simplified occlusion boundary redetermined. In one method of simplification the occlusion boundary is made smaller by equating it with the boundary of a connected set of completely occluded original mesh triangles within the occlusion region (steps 1220-1222). This results in redefining any partially occluded polygons as exposed. In this case only completely occluded polygons are eliminated from the from-viewcell visibility map and corresponding PVS. In another embodiment of simplification, the actual occlusion boundary of the occlusion region is conservatively simplified (steps 1223-1295).

A method of determining an ESO, in one embodiment as described employs factors that measure the occlusion. The determination of the ESO also includes in one embodiment factors which reflect the number of new polygons generated by re-partitioning at the corresponding occlusion boundary. The method accommodates embodiments in which the relative importance of these individual factors can be tuned based on coefficients which assign weights to each factor.

Principles of Operation: Efficient Storage of DeltaPVS Information Using Labeled Silhouette Edges and Incremental Runtime Construction of Visibility Map/PVS.

PVS data, especially if derived from high-precision visibility maps, can have high storage costs. As previously described, deltaPVS is a prior-art method of reducing storage costs for PVS data by storing only the difference between the PVS of adjacent viewcells. In the deltaPVS method of Chhugani et. al (2005), the deltaPVS is a list of polygon primitive IDs (called deltaI) stored for each viewcell boundary. Run-length encoding is used to store the deltaI, which is comprised of two components: deltaG+ (newly visible primitives), and deltaG− (newly occluded primitives). Even with this compression, however, the deltaPVS data is large. For a powerplant model of 13 million triangles and 500,000 viewcells, 7 GB is required to store the delta-PVS object IDs.

Embodiments include a method of efficiently storing DeltaPVS using an implicit scheme in which silhouette edges of the model that result in significant exposure or significant occlusion of geometry for a particular viewcell-viewcell transition are identified by comparing the corresponding visibility maps. These dynamically occluding or dynamically exposing silhouette contours are identified and labeled in an offline visibility preprocess. The labeling employs an efficient run length encoding which exploits the definition of first-order silhouette edges to achieve significant algorithmic compression. This run-length labeling method is presented in detail in conjunction with FIG. 13 and related figures.

During runtime, the visibility map/PVS for a viewcell is constructed from the visibility map/PVS of an adjacent viewcell by:

1) Conducting a modified 3D mesh traversal of the adjacent viewcell's visibility map. This fast traversal uses the labeled significantly occluding or significantly exposing silhouette contours to rapidly construct new occlusion boundaries on the newly constructed visibility map. Details are given in conjunction with FIG. 20, FIG. 21, FIG. 22 and related figures.

Using these new occlusion boundaries, the newly occluded triangles are not traversed during the runtime traversal process. Since only traversed triangles are represented in the new PVS, this approach effectively allows the generation of a PVS that has the newly occluded triangles removed Details given in conjunction with FIG. 19, FIG. 20 and related figures. This scheme significantly reduces the cost of deltaG− data storage and transmission, by eliminating the need to explicitly store deltaG− information (e.g. as large lists of newly occluded triangles) in most cases.

2) Adding newly exposed geometry as deltaG+ packets, which may include ID and/or actual geometry, associated with the particular viewcell transition wherein the newly exposed geometry is "attached" to boundaries of the VM associated with new exposure. Because the from-region visibility maps can be computed at viewcell-to-triangle-fragment precision many of the newly visible triangles may be fragments of the original mesh triangles. The present method of incremental construction of a VM from an adjacent VM at runtime accommodates the technique of retriangulating triangles during the runtime traversal/VM construction which avoids having to store triangle fragments in the deltaG+ packets.

In some embodiments, the method uses viewcells that are arranged hierarchically. Relatively large parent viewcells contain smaller child viewcells. The VM/PVS for a large viewcell is constructed from the VM/PVS for an adjacent large viewcell and additional deltaG+ data using the previously described incremental construction method. Since the deltaG+ data is for a viewcell transition between large viewcells tends to be large, the data is naturally clustered, thus reducing the number of disk accesses required to load the deltaG+.

The VM/PVS for child (contained) viewcells is derived from the VM/PVS of the parent (containing) viewcell by conducting the modified 3D mesh traversal at runtime. Because the VM/PVS of the child viewcell is a subset of the VM/PVS of the parent, the runtime 3D mesh traversal method used to construct the child VM from the parent's typically only uses labeled dynamically occluding silhouette contours to construct occlusion boundaries, which bypass the geometry occluded in the transition from parent to child. This allows construction of more precise VM/PVS for runtime display without the need for additional deltaG+ data.

The hierarchical organization of the viewcells also facilitates efficient streaming of deltaPVS data. In some embodiments, only deltaG+ data packets corresponding to the transition between relatively large parent viewcells needs to be transmitted. The VM/PVS for the corresponding child viewcells is constructed from the parent's at runtime using only deltaG− information (generated at runtime from the labeled silhouette information). Streaming only parent deltaG+ information is more efficient since typically the overall time required to seek, access, and transmit a unit of data decreases with increasing size of the packet.

Using the embedded labeled silhouette information and associated deltaPVS data packets, a precision-controlled VM/PVS is efficiently constructed from the VM/PVS of an adjacent (sibling) viewcell (using deltaG+ packets and runtime 3D mesh traversal to bypass the newly occluded triangles). For a parent viewcell to child viewcell transition, deltaG+ packets are not required since the entire VMS/PVS for the child viewcell is derivable by a retraversal of the parent's VM, using the labeled silhouette edge hint information to bypass newly occluded triangles.

According to some embodiments, the runtime process is conducted as a prefetch operation. During interactive walkthrough, the location of the current viewpoint is used to predict likely future viewpoint locations based on the connectivity of the viewcells (which are also navigation cells of the model) as well as current viewpoint velocity and other factors. Using this informed speculative prefetch, the VM/PVS of parent viewcells in the reachable vicinity of the current viewcell (i.e. the viewcell containing a current actual or predicted viewpoint) are incrementally constructed and maintained. The set of viewcells that are reachable in a specified period of time from the current viewcell may be constrained factors including intrinsic navigational constraints of a viewer's motion, including such factors as the maximum actual or predicted viewpoint velocity and acceleration and turning rates and accelerations. The local structure of the modeled environment including obstacles and other collision constraints can also influence the rate at which neighboring viewcells in the reachable vicinity of a viewpoint can be visited. In some embodiments, the construction of the child viewcell VM/PVS is deferred until the viewcell is closer to the child viewcell, since the construction generally does not require streaming of deltaG+ data.

The method realizes an efficient visibility-based codec for streaming delivery of interactive content via local or remote server. The codec exploits the intrinsic dynamic or temporal visibility coherence of interactive walkthroughs to minimize the required bandwidth for on-demand streaming.

Unlike image-based streaming methods, the bandwidth required to stream the visibility event geometry and texture information is relatively independent of display resolution. In fact, the present method tends to increase runtime rendering performance at high resolutions since, at a relatively small CPU, cost of incrementally constructing VMs at runtime, it maintains a very precise PVS that improves both geometry and rasterization GPU performance. Moreover, since the codec can be implemented as a speculative prefetch; its performance is, unlike image-based streaming methods, relatively independent of client-server connection latency.

FIG. 13A, FIG. 13B, and FIG. 13C Data Structures Employed by the Method of Labeled Silhouette Edges As described in the preceding section, embodiments include a method to identify significant dynamically occluding or dynamically exposing mesh silhouette edges and labeling them in an offline preprocess; and later using the labeled silhouette edges to effect incremental VM/PVS construction during runtime.

As described in conjunction with FIG. 12, from-region silhouette contours may also be simplified based on the effective static occlusion of the corresponding occlusion boundary segments in the VM. As shown in FIG. 12, the simplified VM boundary can be stored as a simplified labeled silhouette contour (from which the simplified VM boundary will later be constructed at runtime).

FIG. 13A includes data structures used to label simple and compound silhouette contours.

In some embodiments, a simple silhouette contour of a triangle manifold mesh is a connected sequence of edges comprising a polyline. The polyline may or may not form a cycle.

Assuming that a simple silhouette contour is unoccluded, then using only the definition of first-order, from-viewcell silhouette edge; an entire simple silhouette contour can be efficiently labeled by labeling a single edge of the contour.

Given a single labeled starting edge (or a data structure pointing to this edge) the entire connected first-order silhouette contour can be identified by simply finding the connected edges and determining which connected edge is a first-order silhouette edge. This fact is employed in the present method to significantly reduce the cost of storing labeled silhouette contours by identifying most silhouette contour edges at runtime.

A from-viewcell silhouette contour may be a compound silhouette contour. A compound silhouette contour results when a from-region visibility event surface (e.g., a UBP) intersects a (different) silhouette edge. This intersection is a compound silhouette vertex or CSV.

Each inside corner vertex of a contour, whether simple or compound, can give rise to more than one from-region SE-MV umbral event surface (wedge/UBP) as a result of the sweep process. Consequently, there may be more event surfaces incident on a contour than the number of edges or vertices in the contour.

The data structures used to label silhouette contours are organized, in some embodiments, as arrays of data structures corresponding to actual event surfaces incident on actual silhouette edges and vertices. Because adjacent silhouette edges can be rapidly identified at runtime and because UBPs (and the corresponding OB_SEGS of visibility maps) can be generated at runtime; many of the elements of the array do not actually need to be stored.

The reduced storage cost produced by the intrinsic algorithmic compression realized by identifying/generating contour elements at runtime can be balanced against the runtime cost of generating this information using the contour node information of FIG. 13A, discussed directly. This information is used to speed the generation the unstored data at runtime. FIG. 13A and FIG. 13B show embodiments of data structures used to label silhouette contours.

In some embodiments, a data structure "Contour" is stored for each contour. The data structure contains three fields referring to a specific mesh object, an edge of the mesh, and a vertex of the edge. In storage form, all references are integer indices to specific arrays of elements, though at runtime these may be changed to pointers. The structure "Contour" also contains the field int node_array, which is an index to a specific array of data structures of the type Contour_Node. The "struct Contour" also contains an integer field num_nodes which gives the length of the node_array for the contour.

The data structure "Contour" also contains an integer field, VMinfo, which is an index to a specific element in an array of data structures of type VM_Info.

VM_info (which is described in detail in a later part of this specification) contains information providing the specific mesh and mesh triangle that is intersected by the UBP associate the Contour_Node. By precomputing this information and storing it with the initial silhouette element of a span all of the visibility map OB_SEGS associated with the entire span of silhouette elements encoded by the Contour_Node can be rapidly constructed at runtime if the associated UBPs intersect the same triangle mesh. (This process, which exploits the intrinsic coherence of intersecting polyhedral manifolds, is described in detail in conjunction with FIG. 19 and related figures.)

The data structure "Contour" also contains an integer field "last_contour" which is an index into an array of "Contour" structures indicating a specific "Contour" to which the current "Contour" is connected at its tail end. The data structure "Contour" also contains an integer field "next_contour" which is an index into an array of "Contour" structures indicating a specific "Contour" to which the current "Contour" is connected at the head end.

The data structure "Contour_Node" stores information for individual elements of the contour. As previously indicated, since many of the event surfaces incident on a contour can be generated algorithmically they do not need to be stored explicitly. Thus the array of Contour_Nodes referenced by Contour typically has many fewer elements than the actual silhouette contour has edges and umbral event surfaces.

The data structure "Contour_Node" contains a character type field "node_type" which indicates what type of silhouette contour information is contained in the node. If the node corresponds to an outside corner of a silhouette contour then the value of the field is set to 1. If the node corresponds to a simple inside corner of the silhouette contour then the value of the field is set to 2. If the node corresponds to a compound silhouette vertex (CSV) then the value of the field is set to 3.

The data structure "Contour_Node" also contains a character type field, span_type indicating the type of span corresponding to the node. If the node represents a span of outside corner silhouette edges for the contour then the value is set to 1. If the node represents a span that may contain both outside and inside corners then the value is set to 2. If the node represents a span of silhouette edges that are to be "skipped" in order to simplify the contour (as described in conjunction with FIG. 12 steps 1280 and 1289).

The data structure "Contour_Node" also contains an integer field indicating the length of the span represented. In general this corresponds to the number of umbral event surfaces generated on the silhouette edges and vertices encountered in the span and therefore may be a larger than the number of silhouette vertices in the span.

The data structure "Contour_Node" also contains an integer field, ninfo which is an index to a specific element in an array of data structures which store additional information for the node, depending on the value of the field node_type.

The data structure "OC_Info" may store additional data referenced by a Contour_Node having node_type equal to 1. The character field svsc stores a reference to an index of a specific vertex of the viewcell which supports the umbral visibility event surface (UBP) for corresponding to the first silhouette edge in the span. This optional information could speed the runtime generation of UBPs but increases the storage size. Since a single contour can be used to generate multiple UBPs at runtime corresponding to multiple viewcells, this additional data may be constructed once at runtime rather than being stored as labeled silhouette contour information with the database.

The data structure "IC_Info" may store additional data referenced by a Contour_Node having the node_type equal to 2. The optional character field ic_type is a hint which indicates which type of construction strategy (pivot-and-_sweep or intersection of adjacent SV-ME planes) should be employed to generate SE-MV event surfaces incident on the inside corner at runtime. While this decision can be made at runtime using the previously described heuristics, the runtime test can be avoided using prestored data. Note that this hint data can also be stored for an entire span of silhouette vertices by storing a different value for Contour_Node, span_type (value of 4 indicates pivot-and-sweep for all inside corner silhouette vertices in span vs value of 5 indicates intersection of adjacent SV-ME planes for all inside corner silhouette vertices in span).

The data structure "IC_Info" may contain an optional character array field SVSC[4] indicating hints for the specific viewcell vertices which form the supporting viewcell silhouette contour on which the SE-MV event surfaces of the inside corner silhouette vertex are constructed.

All of the information contained in the IC_Info data structure can be generated at runtime and therefore does not actually have to be stored with the mesh database.

The data structure CSV_Info may store additional data referenced by a Contour_Node having the node_type equal to 3. The integer field "mesh" stores an index to a specific triangle mesh that is intersected by the current UBP in the contour. The integer field "edge" stores an index to a specific edge of the intersected triangle mesh. These two fields are used to define the CSV which is formed at the intersection of the UBP supported by the current element of the silhouette contour and another silhouette edge. Once again, the fields "mesh" and "edge" are optional since in about half the cases (cases in which the current contour is being processed in a direction which causes the associated UBP/VM contour to "walk off" the more distant mesh) the silhouette edge intersected by the UBP to form the CSV is easily determined. In other cases in which the contour is being processed at runtime in a direction that causes the UBPs and corresponding VM OB_SEGS are being constructed to encounter a new mesh The "mesh" and "edge" fields will substantially reduce the runtime costs of incremental construction of a new VM contour.

The data structure CSV_Info may also optionally store the x,y,z values of the CSV in the double array field point[3]. The CSV_Info structure may also contain the optional fields char ic_type and char SVSC[4] as previously described in conjunction with the data structure IC_Info.

Since all of the fields of the CSV_Info are optional not every Contour_Node may link to a CSV_Info data structure, once again reducing storage costs.

The data structure VM_Info stores information about visibility map occlusion boundary segments that are associated with the initial silhouette elements of a Contour data structure. The storage of both the mesh and edge where the UBPs associated with these silhouette elements intersect the VM can be used to rapidly compute the corresponding OB_SEG of the VM at runtime. Once the initial OB_SEG is determined, subsequent OB_SEGs of the VM occlusion boundary polyline corresponding to the silhouette Contour can be rapidly generated at runtime. This is similar to the storage of mesh and edge references in CSV_Info data structures, which is used to accelerate runtime construction of VM data.

The data structures for labeled silhouette contours shown in FIG. 13A and FIG. 13B, and FIG. 13C are also reproduced below.

```
struct Contour
{
int mesh;      // index to mesh
int edge;      // index to edge of mesh
int vertex;    // index to starting vertex of contour
int node_array;    // index to array of Contour_Nodes
```

```
int num_nodes;      // length of coutour_node array
int VMinfo;         // index to VM_Info array
int last_contour;   // index to next connected contour, head connected
int next_contour;   // index to last connected contour, tail connected
char next_edge_type // if ==1 then next edge is next connected silhouette edge
                    // if ==0 then next edge is next previously labeled edge
char contour_type   // if == 1 dynamically occluding, if == 0 dynamically exposing
                    // if ==2 hybrid contour
};
struct Contour_Node
{
char node_type;     // 1 = outside corner, 2=simple inside corner, 3=CSV
char span_type;     // 1= run of outside corners only
                    // 2= run may contain outside and inside corners
                    // 3=skip span_length segments & connect to next vertex-
                    // forming simplified silhouette contour edge
                    // 4= construct SE-MV on all inside corners of run using pivot and sweep
                    // 5= construct all inside corner event surfaces by intersection adjacent SV-ME planes
int span_length;    // number of umbral event surfaces (UBPs) generated on contour until next node
int ninfo;          // if node_type==1 then ninfo is index to OC_Info array
                    // if node_type==2 then ninfo is index to IC_Info array
                    // if node_type==3 then ninfo is index to CSV_Info array
};
Struct VM_Info
{
int mesh;       // index to mesh containing OB_SEG corresponding to first silhouette element in run
int triangle;   // index to triangle containing OB_SEG corresponding to first silhouette element in run
int retriangulate_hint // bitmask indicating if mesh triangles intersected by OB_SEGS for 31 -
                    // Contour_Nodes of Contour should be retriangulated at runtime 0=no, 1=yes
                    // Last Bit indicates VM dynamic boundary type: 0==occluding 1==exposing
float point[3];     // x,y,z value of initial vertex if it is formed by intersection with other OB_SEG
};
struct OC_Info     // information for an outside corner node of
{
char svsc;          // (optional) hint for specific viewcell vertex forming UBP
};
struct IC_Info
{
char ic_type;       //(optional)1= form SE-MVs by pivot and sweep
                    //(optional)2= intersect planes of adjacent SV-MEs
char SVSC[4];       // (optional) hints for specific viewcell edges forming SVSC
};
struct CSV_Info
{
int mesh;    // (optional) index to mesh containing intersected edge
int edge;    // (optional) index to intersected edge
char ic_type;       //(optional)1= hint-form SE-MVs by pivot and sweep
                    //(optional)2= hint- intersect planes of adjacent SV-MEs
char SVSC[4];       // (optional) hints for specific viewcell edges forming SVSC
double point[3];    // (optional) precomputed x,y,z values of vertex of CSV
};
struct tri_seed     // index/pointer to specific triangles of model used to initiate
                    // simplified mesh traversal (FIG. 21) to construct viewcell B visibility
                    //map from viewcell A visibility map
{
int tri_count;      // number of triangles in seed
int* mesh_array;    // sequence of mesh ids
int* tri_array;     // sequence of triangle ids
};
struct DeltaGplussubmesh_attach_polyline
// precomputed list of mesh edges for attaching submesh and original mesh
{
int contour;        // reference to a specific Contour
char attach_type;   // if ==0 free edges of submesh attached to free edges of mainmesh
                    // if ==1, free edges of submesh attached to listed edges of mainmesh
                    // if ==2, free edges of submesh linked to free edges of mainmesh
                    // if == 3, free edges of submesh linked to listed edges of mainmesh
int submesh;        // reference to attaching submesh
Int edgenumber;// number of edges in the attaching polyline
Int* submesh_edgelist;    // ordered list of edges in submesh which attach
int* mainmesh_edgelist;   // ordered list of edges in mainmesh to which attaches
};
struct Triangle
{
int global_id;      // global_id
int vertex[3];      // index of 3 vertices in DeltaGplussubmesh.vertexp array
int edge[3];        // index of 3 edges in DeltaGplussubmesh.edgep array
};
```

```
Struct Edge
{
int global_id;      // global id
int vertex[2];      // index of two vertices in DeltaGplussubmesh.vertexp array
};
struct vertex
{
int global_id;      // global id
float point[3];     // x,y,z value of vertex
};
```

FIG. 13D is a diagram showing data structures for an exemplary embodiment employing deltaG+ data.

In one embodiment, a deltaG+ packet of information may be associated with each viewcell-viewcell transition. The exemplary data structure DeltaGplus_Header includes fields indicating the starting (viewcell_start) and ending viewcell (viewcell_end) as well as a specific face (transition_face) for the associated transition. Another data element, deltaGplus_array, is a reference to an array of DeltaGplus data structures which actually contain or reference the mesh geometry. In some embodiments in which the deltaGplus_array is stored in main memory, it may be accessed through a pointer. In other instances the deltaGplus_array variable may be an index to an array of arrays, e.g. for the disc storage form of the deltaG+ data. Another field deltaGplus_count stores the number of DeltaGplus data structures in the deltaGplus_array. An additional field packet_size indicates the storage and transmission byte size of the associated information.

A DeltaGplus_Header references one or more DeltaGplus data structures, which in turn references the geometry, material, texture information for the corresponding polygon mesh. Exemplary data structures for this information are shown as data structures Triangle, Edge, vertex.

Figure 14A:
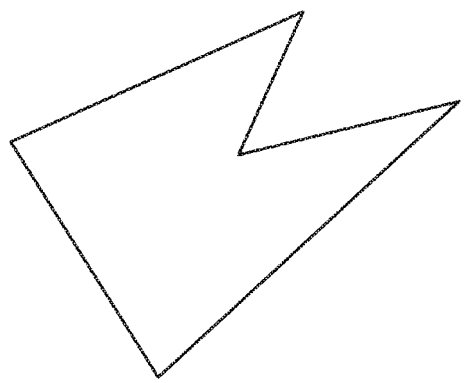
FIG. 14A shows an exemplary simple occluder.
Figure 14B:
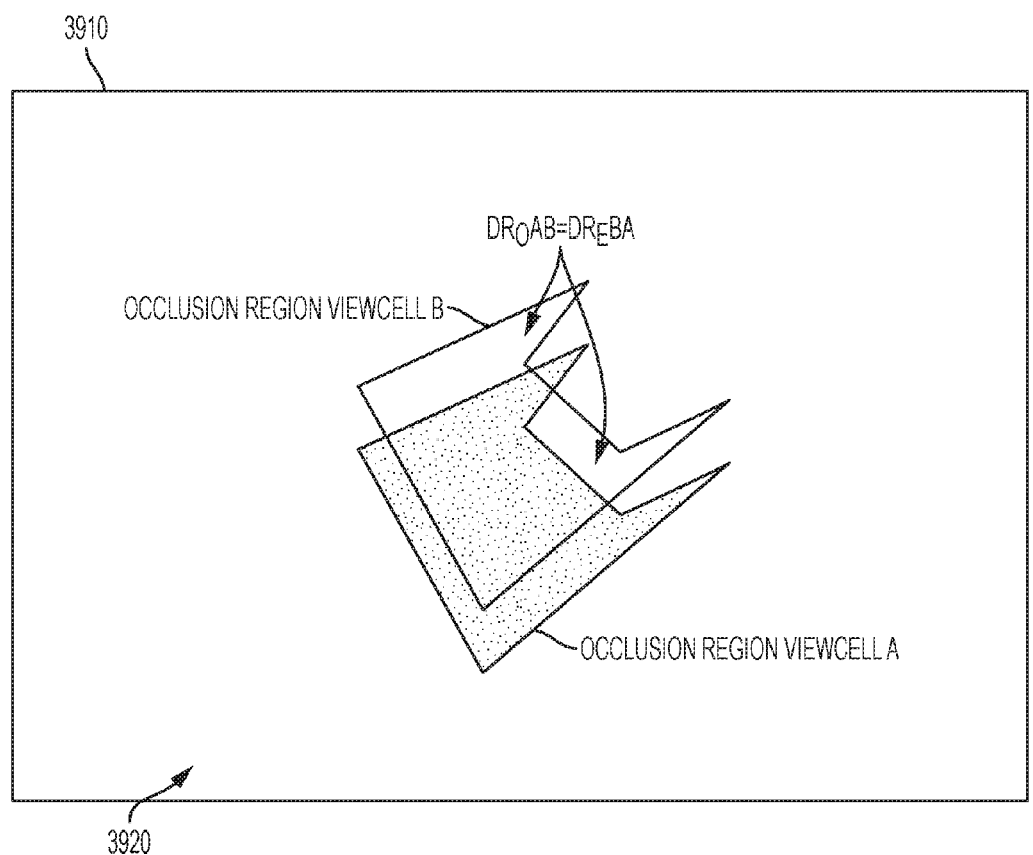
FIG. 14B shows exemplary the delta regions (DR) of occlusion formed by the simple occluder (of FIG. 14A) when viewed from connected viewcells A and B.
Figure 17A:
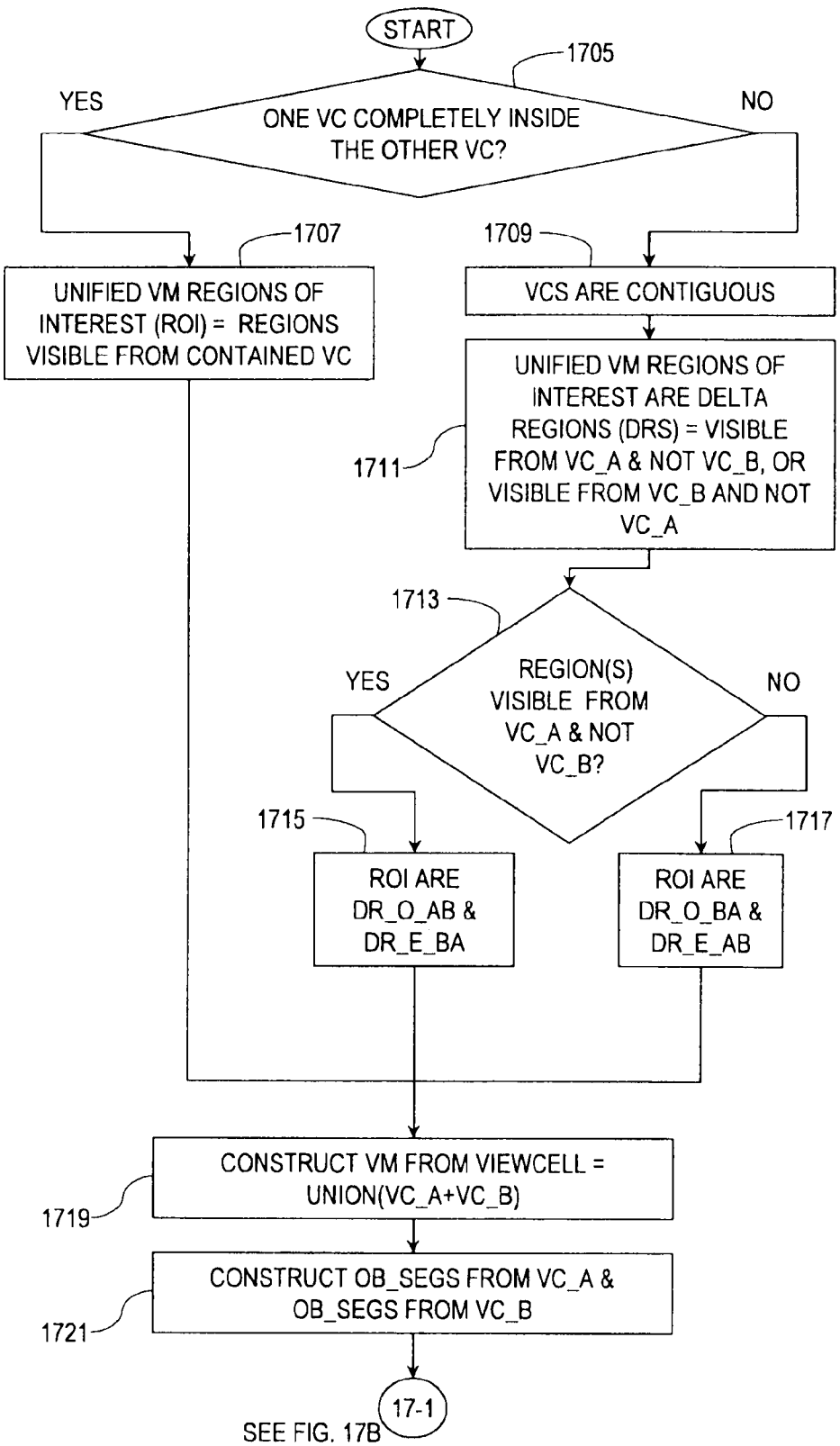
FIG. 17A is an exemplary flowchart showing the method of identifying delta regions of visibility difference for a transition from viewcell A to viewcell B.
Figure 17B:
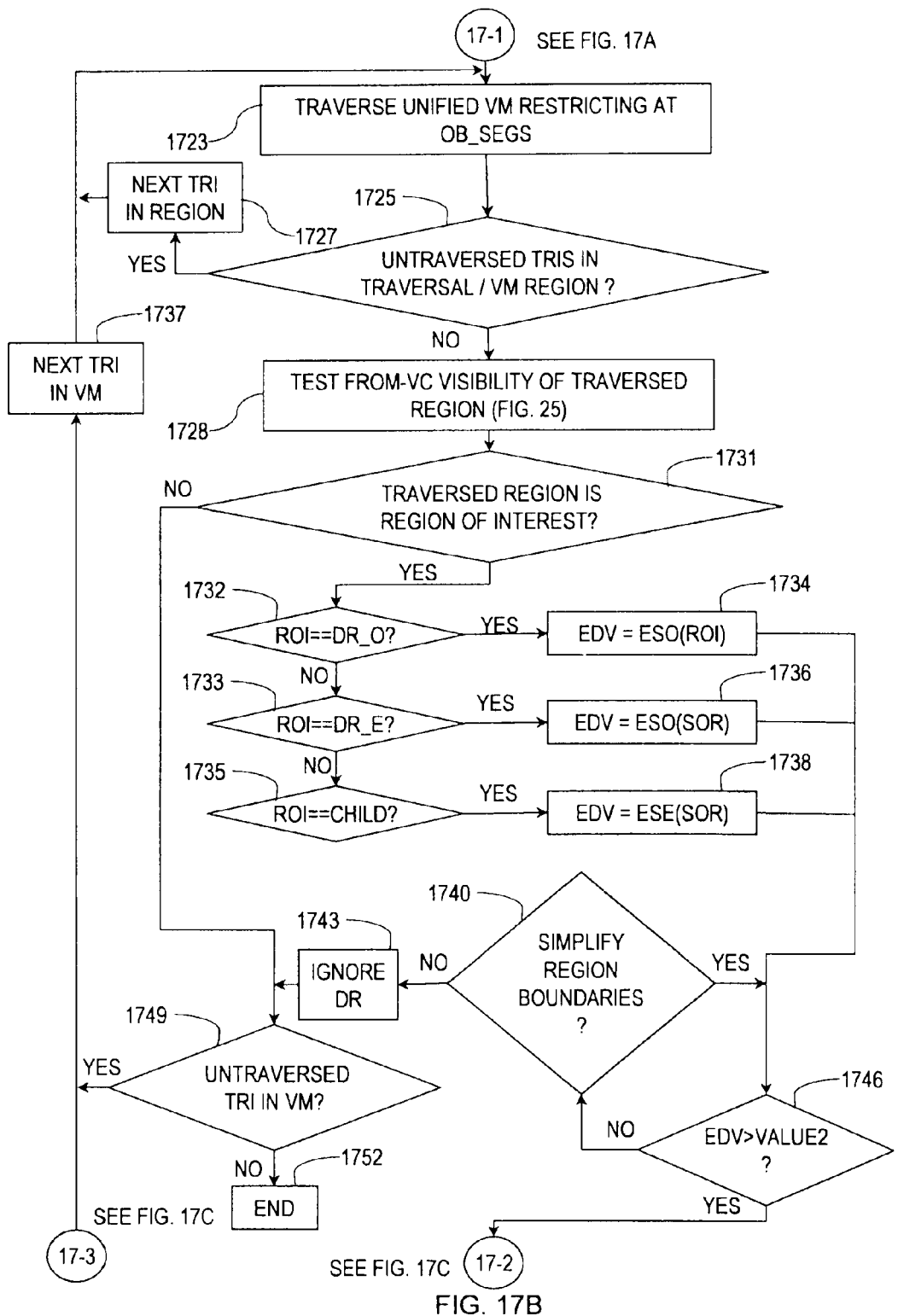
FIG. 17B is an exemplary continuation of FIG. 17A.
Figure 17C:
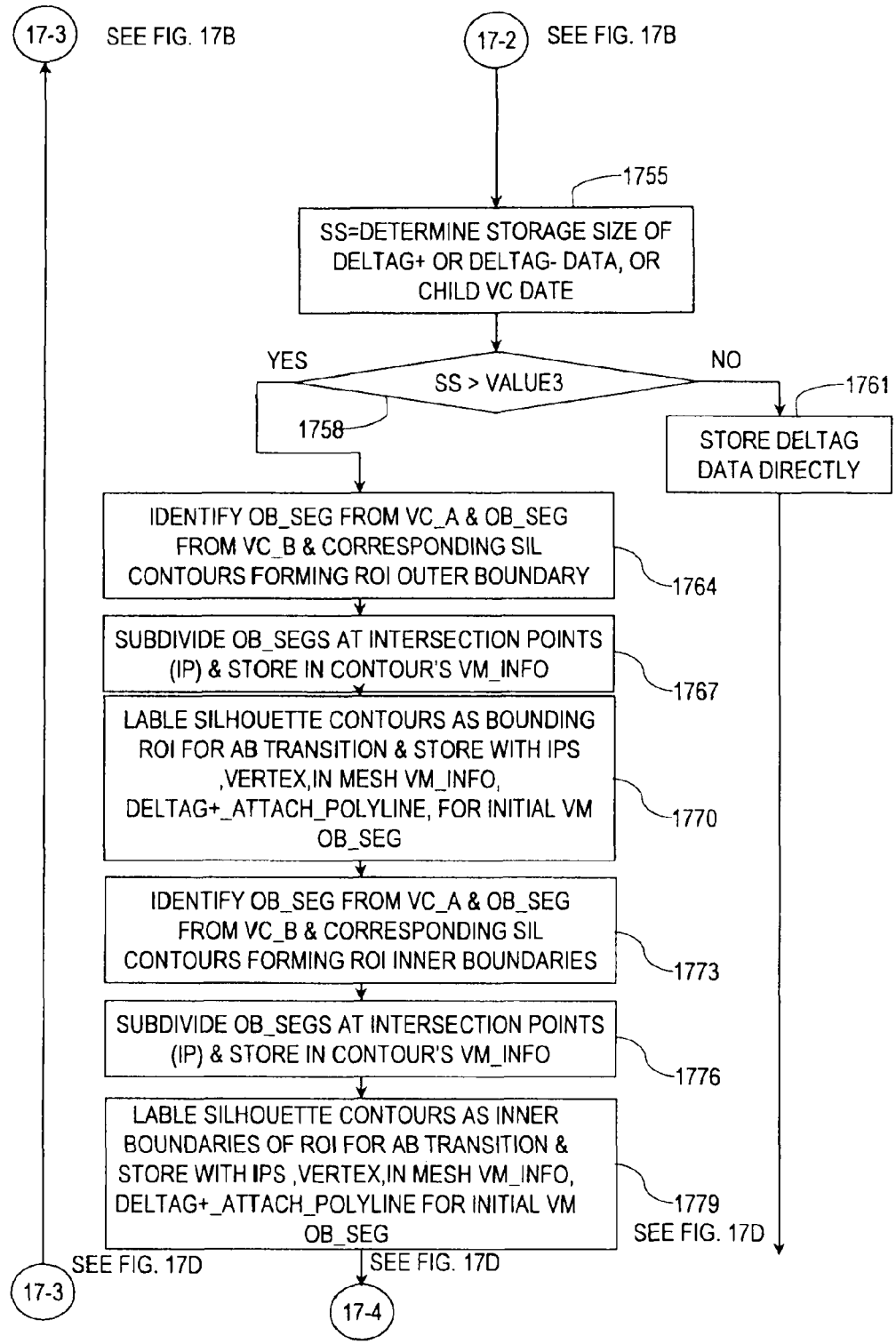
FIG. 17C is an exemplary continuation of FIG. 17B.

FIG. 14A, FIG. 14B show respectively, an example occluder, and the delta regions (DR) of occlusion formed by the simple occluder when viewed from connected viewcells A and B. The flowcharts of FIG. 17A, FIG. 17B show a method of identifying connected regions of manifold triangle meshes that are occluded when viewed from viewcell B but not occluded when viewed from viewcell A. This of course provides the solution to the problem of determining the connected regions of manifold triangle meshes that are exposed when viewed from viewcell A, but not exposed when viewed from viewcell B.

In some embodiments, connected regions of the manifold triangles meshes that are exposed from one viewcell but occluded from a contiguous (or contained) viewcell are called delta regions (DR).

A delta region corresponding to a connected region of a manifold triangle mesh that is occluded when viewed from viewcell B, but not occluded when viewed from viewcell A (i.e., is in the visibility map of viewcell A) is designated DRoAB (delta region of occlusion from A to B).

This is the same as the delta region corresponding to a connected region of a manifold triangle mesh that is exposed when viewed from viewcell A (i.e., is in the visibility map of viewcell A) but occluded when viewed from viewcell B. Such a delta region is designated as DReBA (delta region of exposure from B to A).

Of course DRoAB=DReBA.

Thus, while the method of FIG. 17A and FIG. 17B shows the determination of DRoAB, (the determination of a delta region of occlusion from viewcell A to viewcell B), the method is applied to determine a delta region of exposure by reversing the order of the viewcells being processed.

FIG. 14A shows an example polygon mesh O that acts as an occluder to occlude a larger polygon mesh in FIG. 14B.

FIG. 14B shows a visibility map induced on the surface of a simple mesh labeled 1410. 1410 is a rectangular polygon mesh formed by two triangles, the triangles are not shown to simplify the diagram.

In some embodiments, the shaded hexagonal figure labeled "OCCLUSION REGION VIEWCELL A" is the from-viewcell occlusion region of the simple occluder shown in FIG. 14A generated using viewcell A as the source and using the method of first-order visibility map construction. Note that the occlusion region has one more edge than the occluder O as a result of the SE-MV wedge generated on the only inside corner of the original 5-sided occluder O.

Similarly, the unshaded hexagonal figure labeled "OCCLUSION REGION VIEWCELL B" is the from-viewcell occlusion region of the simple occluder shown in FIG. 14A generated using viewcell B as the source and using the method of first-order visibility map construction.

The portions of the OCCLUSION REGION VIEWCELL B that are outside the OCCLUSION REGION VIEWCELL A are labeled as $DR_OAB$ (delta region of occlusion from A to B) and $DR_EBA$ (delta region of exposure from B to A).

The region labeled 1420 is outside both occlusion regions and since it is inside the region 1410, which is visible from viewcell A and viewcell B, the region 1420 is visible from both viewcell A and viewcell B and is not a delta region.

Figure 15:
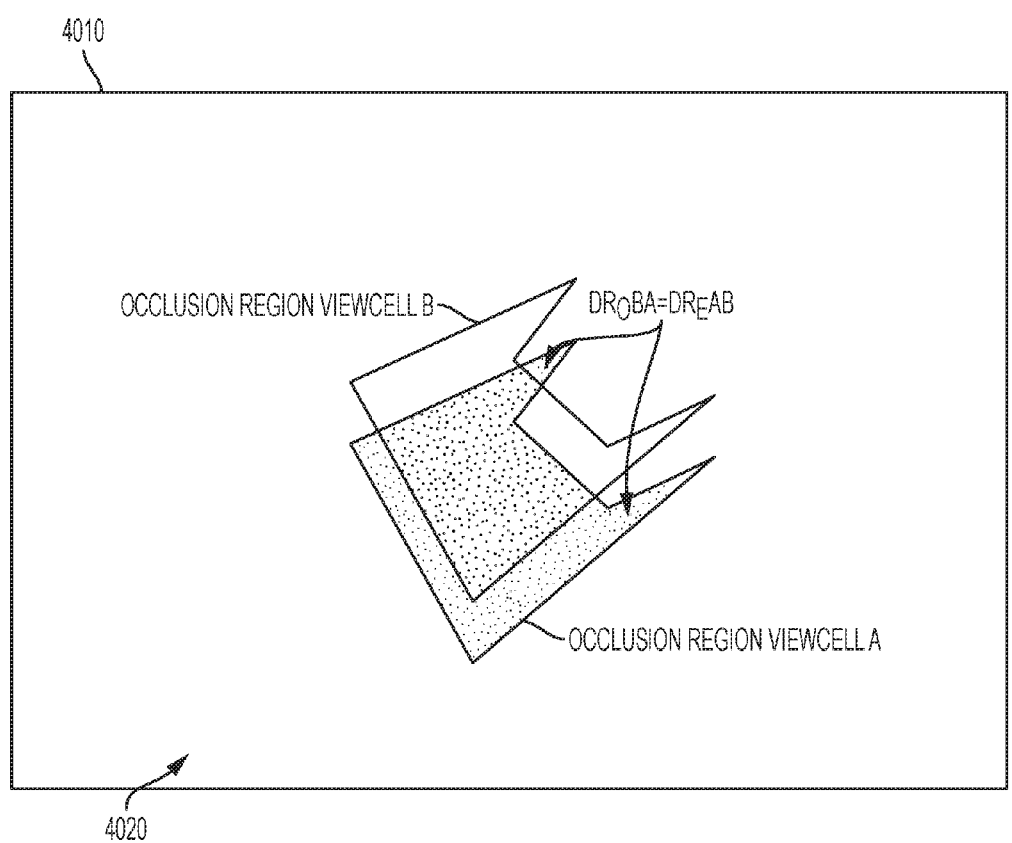
FIG. 15 shows the same unified from-region visibility map as FIG. 14B except that the portions of the OCCLUSION REGION VIEWCELL A that are outside the OCCLUSION REGION VIEWCELL B are labeled as $DR_OBA$ (delta region of occlusion from B to A) and $DR_EAB$ (delta region of exposure from A to B).

FIG. 15 shows the same unified from-region visibility map as FIG. 14B except that the portions of the OCCLUSION REGION VIEWCELL A that are outside the OCCLUSION REGION VIEWCELL B are labeled as $DR_OBA$ (delta region of occlusion from B to A) and $DR_EAB$ (delta region of exposure from A to B). Here, the mesh on which the visibility map boundaries are inscribed is labeled 1510, it is identical to 1410 in FIG. 14. The black portion of Occlusion Region Viewcell A represents the portions of Occlusion Region Viewcell A that are common with Occlusion Region Viewcell B. The region labeled 1520 is outside both occlusion regions and since it is inside the region 1510, which is visible from viewcell A and viewcell B, the region 1520 is visible from both viewcell A and viewcell B and is not a delta region.

Accordingly, in some embodiments, when moving from view region B to view region A, a delta packet would include the difference in visible portions between view region B and view region A (i.e., delta region), which is $DR_EAB$. Therefore, by transmitting delta packets that only include the delta regions, the bandwidth requirements for transmitting graphics information is reduced since the entire set of visible graphic elements for each viewcell need not be retransmitted.

Figure 16A:
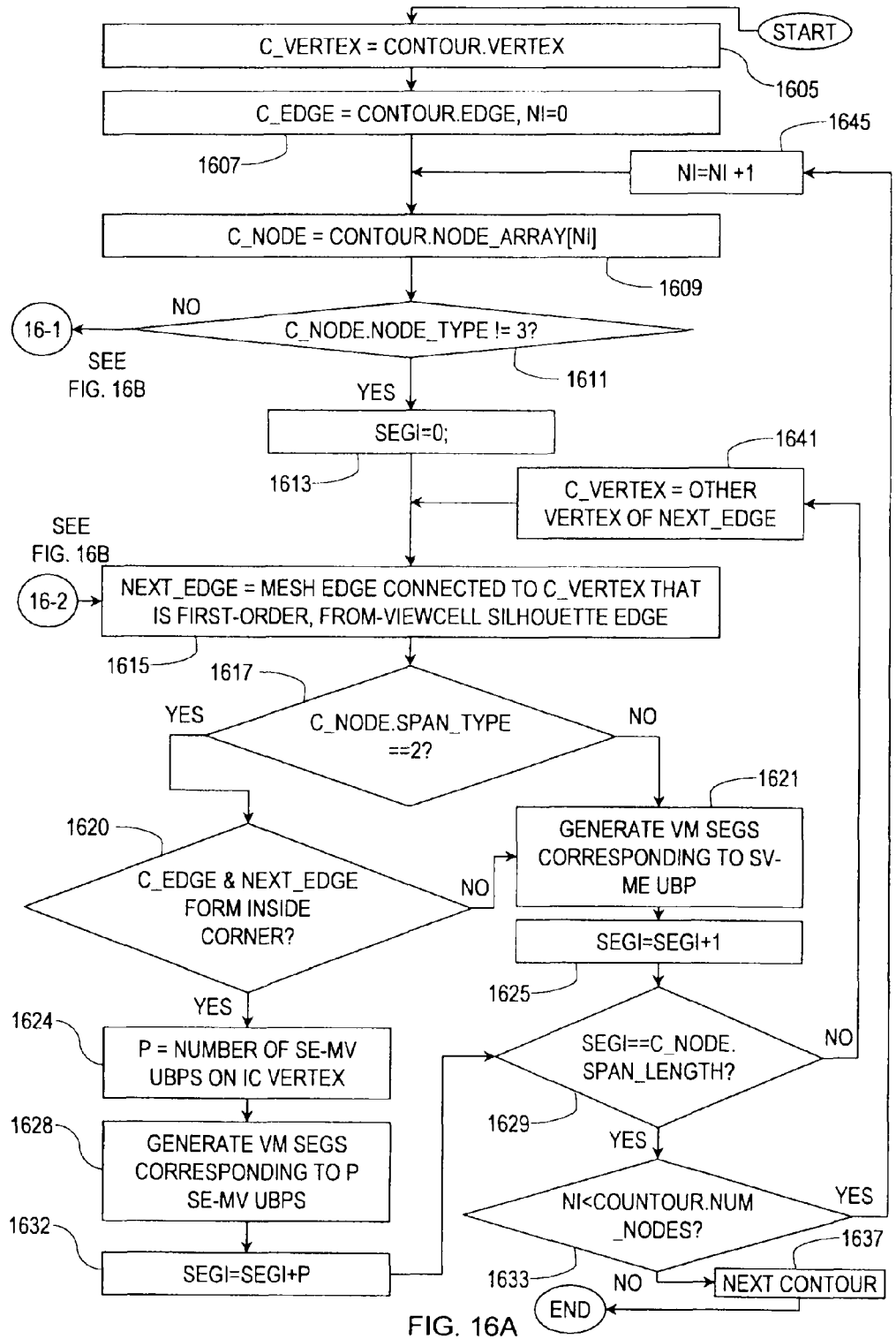
FIG. 16A is an exemplary flowchart showing a method of identifying edges and vertices of a silhouette contour using data structures for labeled silhouette contours.
Figure 16B:
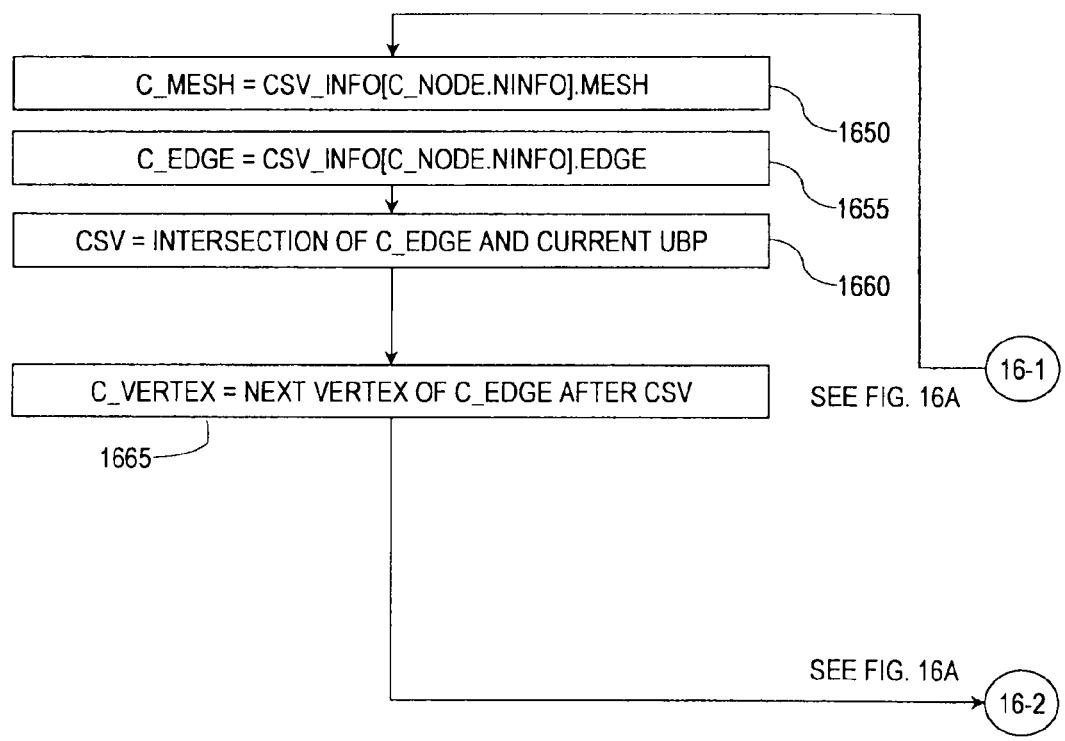
FIG. 16B is a continuation of FIG. 16A.

FIG. 16A, and FIG. 16B Flowchart Showing Method of Identifying Edges and Vertices of a Silhouette Contour Using Data Structures for Labeled Silhouette Contours.

The flowchart of FIG. 16 shows a method of rapidly identifying all of the edges of a simple or compound, from-viewcell silhouette contour given a few edges of the contour that have been labeled using the data structures of FIG. 13.

The method of FIG. 16 exploits the facts that silhouette contours generally form polylines on manifold meshes. Since the meshes are represented as directed graphs with associated connectivity information (using winged-edge or similar data structures) the identification of edges connected to other edges is simplified.

Turning now to FIG. 16A, and using the data structures of FIG. 13 in which data elements are stored in arrays and accessed by indices to these arrays (alternate embodiments may cast these references as runtime pointers). In some embodiments, process flow starts at step 1605, where the current vertex c_vertex is identified using the index contour.vertex from the data structure for the current Contour. This is the edge number of the mesh contour.mesh.

Process flow proceeds to step 1607, where the current edge is similarly accessed using the indeed contour.edge. Also in step 1607 an integer used to update an index into an array of Contour_Node types, ni, is set to 0.

Process flow proceeds to step 1609 to access the current contour node, c_node using the index contour.node_array [ni].

Process flow proceeds to decision step 1611 to determine if the c_node.type is not 3. If the type is not 3, then the current node represents data for a simple contour node and process flow proceeds to step 1613 to set a counter segi to 0.

Process flow proceeds to decision step 1617 to determine if the c_node.span_type is equal to 2. If the c_node.span_type is equal to 2 then the segments of the current contour span may contain both outside corner and inside corner from-viewcell silhouette vertices and process flow proceeds to step 1620.

In decision step 1620 it is determined if the vertex shared by c_edge and next_edge is an inside-corner silhouette vertex using the method of identifying inside corner simple silhouette vertices previously specified.

If, in decision step 1620, it is determined that the two silhouette edges form an inside corner then process flow proceeds to step 1624.

In step 1624, the integer value p is set to equal the number of SE-MV wedges incident on the inside corner vertex as determined by applying the sweep construction of SE-MV wedges (step 1628).

Process flow proceeds to step 1632, where the counter segi, which represents the number of visibility event surfaces constructed for the contour span, is incremented by the number of SE-MV event surfaces incident on the CSV.

Process flow proceeds to decision step 1629 to determine if the value of segi is equal to the span length of the current contour node.

If, in decision step 1629, it is determined that the value of segi is equal to the span length, then the span has been processed and process flow proceeds to decision step 1633.

In decision step 1633, it is determined if the value of the integer variable ni, which is the index of the current contour node for the contour is equal to the number of nodes in the contour.

If in decision step 1633 it is determined that that the current node is the last node of the contour then process flow proceeds to step 1637 in which the next contour is processed. Process flow terminates at step 1637.

If, on the other hand, it is determined in decision step 1633, that the current node is not the last node of the contour then process flow proceeds to step 1645.

In step 1645, the node counter is advanced which is used in step 1609 to access the next node.

If in, decision step 1617 it is determined that the span_type of the current node indicates that no inside-corner nodes exist on the span, then process flow proceeds to step 1621.

Likewise if, in decision step 1620, it is determined that the current silhouette edge and the next silhouette edge do not form an inside corner, then process flow proceeds to step 1621.

Figure 21:
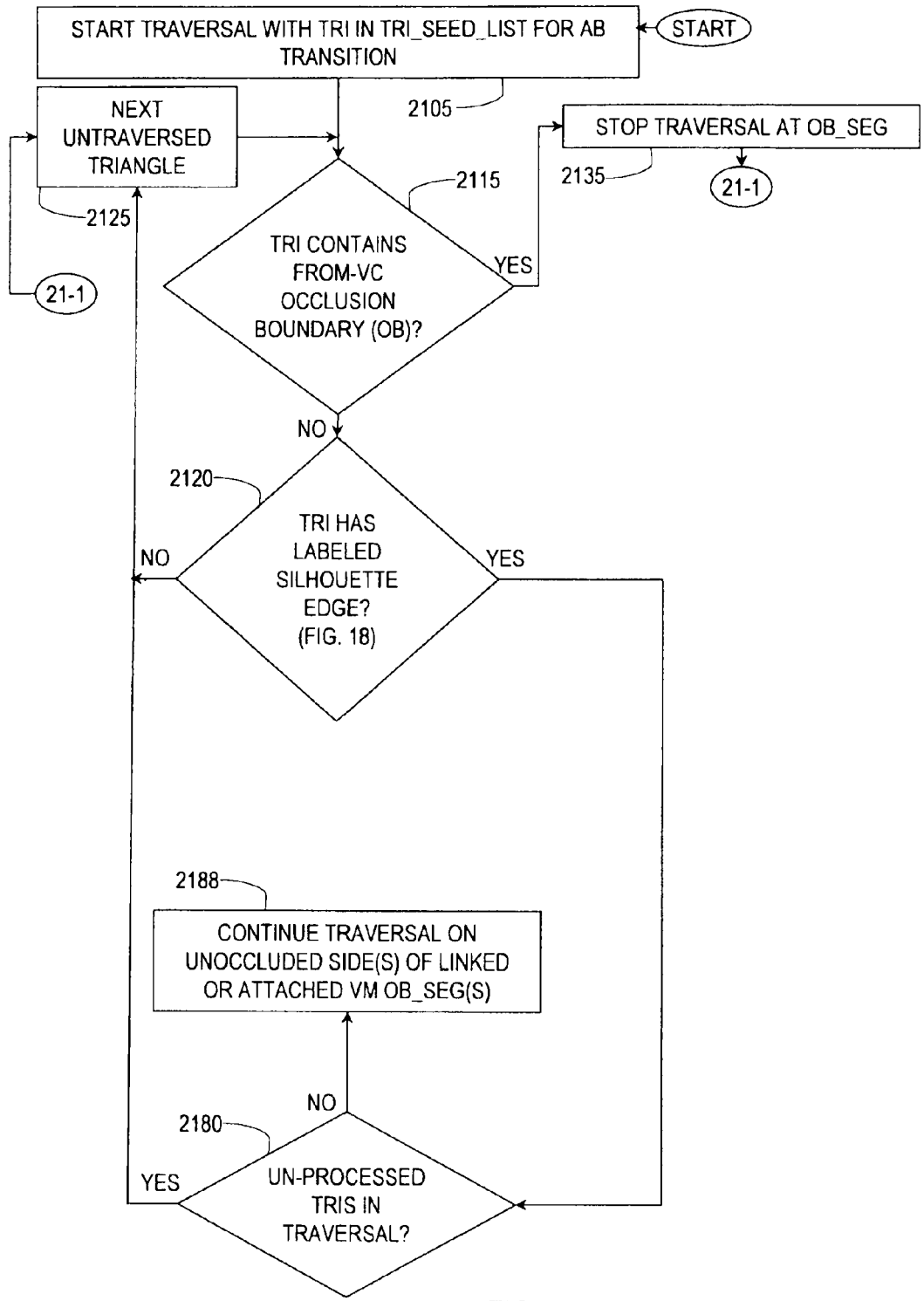
FIG. 21 is the main process of using simplified, hinted, runtime 3D mesh traversal process to construct ROI from pre-stored labeled silhouette contour information and a list of seed triangles for the connected components of the ROI.

In step 1621, the VM segments corresponding to the single SV-ME UBP incident on the current edge are formed (using the method of FIG. 20, FIG. 21 and related figures. Process flow proceeds to step 1625, to increment the variable segi by 1, consistent with the single umbral visibility event surface constructed on the silhouette edge.

Process flow proceeds from step 1625 to decision step 1629, which was already described.

If, in decision step 1621, it is determined that the type of node is type 3, consistent with a compound silhouette vertex (CSV), then process flow continues to process 16-1, which starts at step 1650 (FIG. 16B).

Process flow proceeds to step 1650 to reference additional data in a CSV_Info node using an array index stored in cnode.ninfo. This information gives the mesh number of the more distant mesh containing the CSV.

Process flow proceeds to step 1655 to access the edge number of the edge intersected by the current UBP (wherein the intersection is the current CSV) is accessed through the CSV_Info.

Process flow proceeds to 1660 to calculate the CSV as the intersection of the current UBP and the C_EDGE. Alternately, this value may be precalculated and stored in the floating point CSV_Info.point[3] field of the corresponding CSV_Info structure.

Process flow proceeds step 1665 the C_Vertex is set to the index of the next vertex after the (on the unoccluded side) of the CSV, and process flow proceeds to process 16-2, which returns process flow to step 1615.

Overall, the method of FIG. 16A allows multiple edges of a silhouette contour to be identified using only a few labeled edges. Consequently, this labeling scheme uses very little storage. The method exploits the natural coherence of silhouette contours to facilitate the rapid runtime generation of VM segments from a few labeled silhouette edges and associated hint information. This runtime incremental construction of VM/PVS using the labeled silhouette edges is discussed in detail in conjunction with FIG. 20 and FIG. 21. FIG. 17A, FIG. 17B, FIG. 17C, and FIG. 17D Comprise a Flowchart Showing a Method of Identifying VM Regions of Interest (ROI) In a Unified Visibility Map Representing a Transition From One Viewcell to a Related Viewcell and A Method for Labeling the Silhouette Contours Corresponding to the Occlusion Boundaries of Those ROI Having a High Effective Occlusion.

Figure 17D:
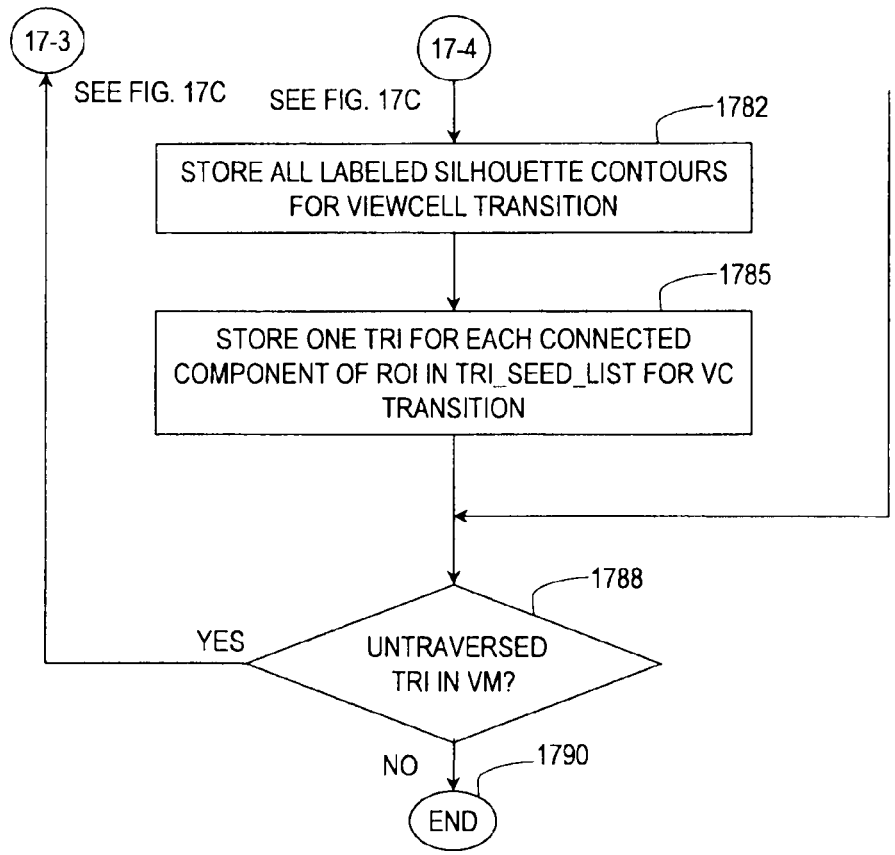
FIG. 17D is an exemplary continuation of FIG. 17C.

The flowchart of FIG. 17A, FIG. 17B, and FIG. 17D show an embodiment of a method of identifying connected regions of manifold triangle meshes, called regions of interest or ROI, that reflect a change in visibility during a viewcell transition (e.g., from VC A to VC B).

This flowchart also shows a method of identifying the silhouette contour(s) corresponding to the occlusion boundary (OB) or boundaries which define a ROI. Further, this flowchart shows a method of labeling these silhouette contours (using the Contour data structure and associated data structures of FIG. 13) and storing additional associated information with the contours (e.g. VM_Info data of FIG. 13A).

According to some embodiments, the method of FIG. 17A-FIG. 17D is conducted as an offline or precomputation process. The method can identify the deltaG+ and deltaG− components of the delta-PVS data, which can be used during a runtime process to incrementally construct a new PVS from an existing one. Alternatively, the method of FIG. 17A-FIG. 17D can identify and label silhouette contours corresponding to the boundaries of ROI. This labeled silhouette contour information can be later used to construct deltaG+ and deltaG− data at runtime. This approach can require considerably less storage/transmission resources than explicitly storing/transmitting the deltaG+ and deltaG− packets.

If one of the viewcells is completely contained in the other, then the ROI corresponds to the regions visible only from the contained viewcell. The labeled silhouette contours corresponding to these type of ROI are used, in some embodiments, to construct the VM of the child viewcell from the VM of the parent at runtime (using a hinted, simplified 3D mesh traversal), thereby avoiding in select cases the explicit storage of deltaG− information).

If the two viewcells share a face and one is not contained within the other (a relationship termed "contiguous"), then the ROI correspond to delta regions (DR). For a viewcell transition from VC A to VC B (called an AB transition), the DR are of two types. One type of delta region, $DR_OAB$ (delta region of occlusion from A to B) contains mesh triangle fragments visible from viewcell A but not B. The $DR_OAB$ are also $DR_EBA$ (delta region of exposure from B to A). Likewise, $DR_EAB=DR_OBA$. The $DR_OAB$ corresponds to deltaG− data for the AB transition, while the $DR_EAB$ corresponds to deltaG+ data for the AB transition. The labeled silhouette contours corresponding to the boundaries of these ROI can be used to construct the deltaG+ and or deltaG− data at runtime (also using a hinted, simplified 3D mesh traversal), thereby avoiding, in select cases, the explicit storage of deltaG+ and deltaG− polygon fragment information.

Turning now to FIG. 17A-FIG. 17D, in the first phase of the process, the type of ROI to be identified for a particular viewcell transition are specified. The ROI are specific regions of particular unified visibility map representing the viewcell transition. A unified visibility map for an AB transition is a visibility map containing the mesh triangle fragments visible from viewcell A and viewcell B, and the OB_SEGS of the from-viewcell VM for each of the viewcells.

In some embodiments, process flow starts at step, 1705, to determine if the viewcells for which the delta-visibility information for particular viewcell transition is to be determined have a parent-child (containing-contained) relationship.

If in decision step 1705, it is determined that the viewcells for which the delta visibility information is to be determined have a parent-child relationship, then process flow proceeds to step 1707.

In step 1707, the ROI to be identified are regions visible from the contained (child) viewcell for the specific viewcell transition. Since the VM for a child viewcell is always a subset of the parent viewcell, the child VM is constructed, in some embodiments, using explicit deltaG− information computed for the transition. However, if the child viewcell is significantly smaller than the parent viewcell then the corresponding deltaG− information will be relatively large. Alternatively, in the present method the regions of interest (ROI) for such a transition can be set to those regions visible only from the child viewcell. By identifying the seed triangles and boundaries of these regions, the VM/PVS of the child viewcell can often be determined from the VM of the parent using much less information by conducting the simplified hinted 3D mesh traversal on the unified visibility map starting with the seed triangles.

If, in decision step 1705, it is determined that the viewcells for which the delta visibility information is to be determined do not have a parent-child relationship, then process flow proceeds to step 1709.

Step 1709 indicates that the two viewcells are contiguous (the viewcells share a face and one is not contained within the other). Parent-child, and contiguous relationships are two special arrangements of two viewcells in which the transition from one viewcell to another occurs in a volume of space that is completely contained in the union of the two viewcells. Using these two arrangements of viewcells, the ROI, as constructed later in the process, are guaranteed to completely and conservatively reflect the newly visible and newly exposed regions (e.g., since there are no "gaps" between the related viewcells, no transiently visible geometry is missed).

Process flow proceeds to step 1711 to indicate that the ROI are delta-regions of visibility (DR).

Process flow proceeds to decision step 1713 to enumerate the various types of DR. If in decision step 1713, it is determined that the DR to be identified are visible from VC A and not visible from viewcell B then, process flow proceeds to step 1715.

In step 1715, the ROI to be identified are $DR_OAB$ and $DR_EBA$.

If in decision step 1713, it is determined that the DR to be identified are visible from VC B and not visible from viewcell A, then process flow proceeds to step 1717.

In step 1717, the ROI to be identified are $DR_EAB$ and $DR_OBA$.

In some embodiments, the steps 1705 through 1717 only enumerate the types of ROI that are to be identified for a particular viewcell transition, depending on the relationship between the transitioning viewcells and the desired use of the delta-visibility information. For a particular transition between contiguous viewcells A and B in the AB direction, both $DR_OAB$ and $DR_EAB$ ROI types are typically identified. Together, these two types of ROI completely describe the visibility change (delta-VM/delta-PVS) for the viewcell transition.

Beginning in step 1719, the actual identification of these ROI regions in the unified visibility map commences.

In step 1719, the VM for a viewcell comprising the union of viewcell A and viewcell B is determined (e.g. using any of the previously described methods of from-viewcell VM construction). Any superset of this VM can also be used as the starting VM on which the OB_SEGS corresponding to the from-viewcell visibility map of both viewcells for the transition is later constructed (step 1721). This fact allows the determination of delta-visibility information (either explicit deltaG packets or corresponding labeled contour data) to be solved using an efficient hierarchical decomposition of the from-region visibility problem. In this hierarchical approach, the triangle fragments visible from any viewcell containing both viewcell A and viewcell B can be used as the VM on which the unified VM for viewcell A and viewcell B is constructed. (This fact can also be used to reduce delta-PVS storage requirements since the delta-PVS data for many viewcell transitions can ultimately be generated from the data for a single unified visibility map corresponding to a viewcell containing the other viewcells).

Process flow proceeds to step 1721, where the OB_SEGs corresponding the from-viewcell visibility map determined from viewcell A and the OB_SEGs corresponding the from-viewcell visibility map determined from viewcell B are constructed on the triangle fragments visible from the viewcell (A+B). The set of triangle fragments visible from viewcell (A+B) together with the OB_SEGs from viewcell A and the OB_SEGs from viewcell B is called the unified visibility map for viewcell A and B. The construction of these OB_SEGS, in some embodiments, employs the previously described 3D/2D mesh traversal method (FIG. 20 and related figures) for from-viewcell VM construction.

Of course, if viewcell A is a parent of viewcell B then the visibility map from viewcell (A+B) constructed in step 1719 already contains of all of the mesh triangle fragments visible from viewcell A as well as the OB_SEGS corresponding to the from-viewcell A silhouette contours. The OB_SEGs corresponding to viewcell B are added in step 1721. In the case where the two viewcells are contiguous, and/or the starting VM being used is the superset of VM(A+B) then both sets of OB_SEGS must generally be constructed in step 1721.

Process flow proceeds from step 1721 to process 17-1, which starts at step 1723 (FIG. 17B). In step 1723, the unified visibility map is traversed to define the VM regions formed by the arrangement of OB_SEGs from both viewcell A and viewcell B. In this traversal, a triangle is selected and traversal proceeds to the boundary formed by the OB_SEGs. In this step, the traversal of the 3D mesh occurs as a breadth-first traversal of an already constructed unified visibility map. Traversal proceeds to silhouette contours and the corresponding occlusion boundaries where traversal is restricted. This simple method of traversal insures that all triangles/fragments of a particular ROI are traversed to the boundaries of the ROI, even if the ROI has interior holes or spans multiple separate triangle meshes. (The previous construction of the VM may ultimately "fuse" parts of separate triangle meshes into a single ROI with interior holes corresponding to unoccluded regions of more distant triangle mesh triangles visible through holes in a closer triangle mesh bounded by interior silhouette contours.)

Process flow proceeds to step 1725 to determine if any untraversed triangles remain in the current traversal/VM region (i.e., untraversed triangles connected to the current triangle wherein the connection does not require crossing an occlusion boundary). If in step 1725, it is determined that untraversed triangles exist in the current traversal, then process flow proceeds to step 1727, next triangle in the traversal.

If, on the other hand, it is determined in decision step 1725 that no triangles remain in the current traversal then process flow proceeds to step 1728 as all triangles of the current VM region have been traversed.

In step 1728, it is determined if the unified VM region identified in the traversal steps 1723 and 1725 is visible from viewcell A, viewcell B, or both. In some embodiments, this is determined using the simplified point-in-polyhedron test of FIG. 25. In the case of a parent-child related viewcell transition, this test can be simplified somewhat since all of the traversed regions are visible from the parent viewcell.

Alternate embodiments are possible in which the visibility of a single point in the VM region is first determined (step 1728 and 1731)) before a traversal is initiated in the region (step 1723). This approach allows VM regions that are not ROI to be identified without a full traversal of the region.

Process flow proceeds to decision step 1731 to determine if the traversed region of the VM corresponds to a region of interest (ROI) previously established in the earlier steps 1705-1717 for the specific viewcell transition. This is determined by comparing the result of step 1728 (e.g. visible from A, from B, from both, or from neither; the latter only being possible if the VM being used is a superset of VM(A+B)); with the definition of the ROI determined in the earlier steps 1705-1717.

If, in decision step 1731, it is determined that the traversed region of the unified VM is not an ROI, then process flow proceeds to decision step 1749 to determine if there are any untraversed triangles in the VM.

If, in decision step 1749 it is determined that any untraversed triangles remain in the unified visibility map, then process flow proceeds to step 1737, where the next triangle in the unified VM (belonging a new VM region) is selected for processing.

If, in decision step 1749, it is determined that no untraversed triangles remain in the unified VM (no more unified VM regions to process) then process flow proceeds to step 1752. Process flow terminates at 1752.

If, in decision step 1731, it is determined that the traversed region of the VM is an ROI, then process flow proceeds to step 1732.

In decision step 1732, it is determined if the current ROI is a delta region of occlusion (DR_O) for the viewcell transition. If the ROI is a $DR_O$, then process flow proceeds to step 1734.

In step 1734, the effective static occlusion of the ROI is determined using the metrics previously described for an occluded region. The value of a variable called the effective dynamic visibility (EDV) is set to the ESO of the ROI.

If, in decision step 1732, it is determined that the current ROI is not a $DR_O$, then process flow proceeds to step 1733.

In decision step 1733, it is determined if the current ROI is a delta region of occlusion (DR_E) for the viewcell transition. If the ROI is a $DR_E$, then process flow proceeds to step 1736.

In step 1736, the effective static occlusion (ESO) of the occluded regions surrounding the current ROI (called the surrounding occluded regions or SOR) is determined using the metrics and previously described for an occluded region. The value of the variable called the effective dynamic visibility is set to the aggregate ESO of the SOR.

If, in decision step 1733, it is determined that the ROI is not a delta region of exposure, then process flow proceeds to step 1735.

In decision step 1735, it is determined if the current ROI corresponds to region visible from a child viewcell for the specific parent-to-child viewcell transition. If the ROI is a child region, then process flow proceeds to step 1738.

In step 1738, the effective static occlusion (ESO) of the occluded regions surrounding the current ROI (called the surrounding occluded regions or SOR) is determined using the metrics and previously described for an occluded region. The value of the variable called the effective dynamic visibility is set to the aggregate ESO of the SOR. Note that the identical processing occurs for the case of a $DR_E$ and a child ROI but they are differentiated here for the sake of exposition.

Following steps 1734, 1736, or 1738, process flow proceeds to step 1746.

In decision step 1746, it is determined if the EDV (a measure of the "effectiveness" or efficiency of the current ROI in representing delta visibility for the specific viewcell transition) for a ROI is greater than a predetermined value (e.g. VALUE2).

If, in decision step 1746, it is determined that the EDV for a ROI is not greater than a predetermined value (VALUE2), then process flow proceeds to step 1740.

In decision step 1740 it is determined if the boundary of the current region of interest (and the corresponding silhouette contour) can be significantly simplified (e.g. using the method of FIG. 12, in which the ESO is used as a metric to direct the conservative simplification of the boundary). If the ROI is a $DR_O$ then the method of FIG. 12 can be applied directly to the region. If the ROI is a $DR_E$ or Child region then the method of FIG. 12 is applied to occluded regions surrounding the current ROI (the SOR). The SOR may be defined as the occlusion regions immediately adjacent to the ROI. Optionally the SOR may include other occlusion regions connected to this set of SOR. This approach allows the conservative simplification process to spread into adjacent areas in order to ultimately achieve a sufficiently simplified ROI.

If, in decision step 1740, it is determined that the boundary can be simplified, then the EDV of the new conservative representation of the region bounded by the simplified occlusion boundary is determined in decision step 1746.

If, on the other hand, it is determined that the boundary of the current ROI cannot be simplified to achieve a target EDV value, then process flow proceeds to step 1743.

In step 1743, the current ROI is determined to have a low EDV and therefore, is ignored as a significant component of delta-visibility for the current viewcell transition. In this step if the ROI corresponds to a $DR_EAB$ then the corresponding mesh triangles inside the region are conservatively included in the VM for viewcell A. The original triangles are included without the new triangles that would have been induced by the boundary segments of the DR. If the current ROI corresponds to a $DR_OAB$ then the corresponding mesh triangles of the region are conservatively included in the VM for viewcell B. The original triangles are included without the new triangles that would have been induced by the boundary segments of the DR.

If the unified visibility map ROI corresponds to a parent-child viewcell transition and the EDV of the region is low, then the geometry of the surrounding occluded regions is conservatively included in the ROI, and the EDV of the expanded region can be recomputed. As with the case of a $DR_E$, the SOR region may be optionally extended into adjacent areas beyond the immediately bordering SOR. This approach can identify extreme cases in which the parent and child VM do not differ significantly. In such cases the child ROI is removed completely.

Steps 1746, 1740, and 1743 together allow the ESV of the region to be determined and if the value of the ESV is too low, attempts can be made to conservatively simplify the boundary and thereby increase the ESV. If the ESV remains below a predetermined value then the ROI is not considered to correspond to a significant region of delta-visibility for the viewcell transition and the viewcell transition can be ignored.

Using the ESV (obtained from the ESO) as metric of the effectiveness of an ROI significantly reduces the storage and compute times required for the method. This is true because in many cases small regions of occlusion or exposure would otherwise induce large numbers of new triangles surrounding the ROI because of retriangulation at the ROI boundary. These regions tend to have a low ESO and therefore would not be considered effective occluding (or exposing) regions using the present method. Instead, for example, the newly visible set of primitives for a specific AB transition are simply conservatively to the VM/PVS for viewcell A.

If, in decision step 1746, it is determined that the EDO of the current ROI exceeds a predetermined value (e.g. VALUE2), then process flow proceeds to process 17-2, which starts at step 1755.

In step 1755, the storage size of the deltaG+ and/or deltaG− (which may be deltaI-information comprising pointer or index information referencing actual newly occluded polygons), or child viewcell data (if the viewcell transition is parent-to-child) is estimated and the value of the variable SS is set in some direct proportion to this storage size. ROI containing many triangles/triangle fragments tend to have a high storage cost for the corresponding deltaG+ or deltaG− packets. The alternate storage format used by the present method replaces explicit storage of the deltaG packets with labeling of the silhouette contour/VM boundaries that define the corresponding ROI. The actual deltaG information is generated only when needed using a simplified 3D mesh traversal which employs the unified VM region boundaries generated from the labeled silhouette contour information for the specific viewcell transition.

Process flow proceeds to step 1758, where the value of SS is compared to a predetermined value (e.g. VALUE3). If, in decision step 1758 it is determined that the value of SS is not greater than VALUE3, then process flow proceeds to step 1761.

In step 1761, the deltaG data for the ROI is stored directly and process flow proceeds to decision step 1788.

Decision step 1788 is identical to the previously described step 1749.

If, in decision step 1758 it is determined that the value of SS is greater than the predetermined value VALUE3, then process flow proceeds to step 1764.

Steps 1764 through 1785 are steps to identify the silhouette contours corresponding to the OB_SEGS that form the boundaries (both outer boundaries and inner boundaries, since the ROI may contain holes) of the ROI. In these steps the corresponding silhouette contours (which are edges and vertices of the original triangle mesh plus some additional edges corresponding to SE-MV wedges at inside corner simple and compound silhouette vertices) are labeled and seed triangles, one for each connected component of a ROI is identified and stored.

Beginning at step 1764, the OB_SEGS from viewcell A and the OB_SEGS from viewcell B forming the outer boundary of the ROI and the silhouette contours corresponding to these OB_SEGS are identified.

Process flow proceeds to step 1767, where the OB_SEGS bounding the ROI are intersected with each other and the intersection points are designated as IP(S) and stored with the corresponding VM_INFO data structure for the corresponding silhouette contour (data structure given in FIG. 13A).

Process flow proceeds to step 1770, where the silhouette contours corresponding to the outer boundary of the ROI are labeled and stored with the mesh, (including optionally DeltaGplus_attach_polyline info) using the data structures previously described in conjunction with FIG. 13A and FIG. 13B and FIG. 13C.

Process flow proceeds to step 1773, where the OB_SEGS from viewcell A and the OB_SEGS from viewcell B forming the inner boundaries of the ROI and the silhouette contours corresponding to these OB_SEGS are identified.

Process flow proceeds to step 1776, where the OB_SEGS forming the inner boundaries of the ROI are intersected with each other and the intersection points are designated as IP(S) and stored with the corresponding VM_INFO data structure for the corresponding silhouette contour (data structure given in FIG. 13A).

Process flow proceeds to step 1779, where the silhouette contours corresponding to the inner boundaries of the ROI are labeled and stored with the mesh using the data structures previously described in conjunction with FIG. 13A and FIG. 13B and FIG. 13C.

Process flow proceeds from step 1779 to process 17-4, which starts at step 1782 (FIG. D). In step 1782, all of the (possibly simplified) outer and inner silhouette contours corresponding to the for the ROI corresponding the a specific viewcell transition are labeled and the labeled associated with the specific viewcell transition.

Process flow proceeds to step 1785, where one triangle for each connected component of the ROI is stored in TRI_SEED_LIST for the specific viewcell transition.

Subsequently, process flow proceeds to step 1788 and 1790 (if no untraversed triangles exist in the VM). In some embodiments, these steps are identical to the previously described steps 1749 and 1752 respectively. If there are untraversed triangle sin the VM, process flow proceeds to process 17-3, which starts at step The ROI corresponding to the parent-to-child viewcell transition is not a delta region in the sense that the seed triangles for this type of ROI are visible from both viewcells for the parent-to-child viewcell transition. Using this type of ROI, the VM/PVS for a child viewcell can be efficiently constructed from the parent VM using the outer and inner boundaries of the ROI constructed from the corresponding labeled silhouette contours. This construction uses the hinted, simplified 3D mesh traversal method of FIG. 20, and FIG. 21.

In contrast the ROI corresponding to the transition between contiguous viewcells are delta regions (DR) of visibility. Using this type of ROI, the deltaG+ and deltaG− can be efficiently constructed from the mesh triangle/fragments visible from the viewcell A+B, together with the outer and inner boundaries of the ROI constructed from the corresponding labeled silhouette contours. This construction also uses the hinted, simplified 3D mesh traversal method of FIG. 20 and FIG. 21

Figure 18A:
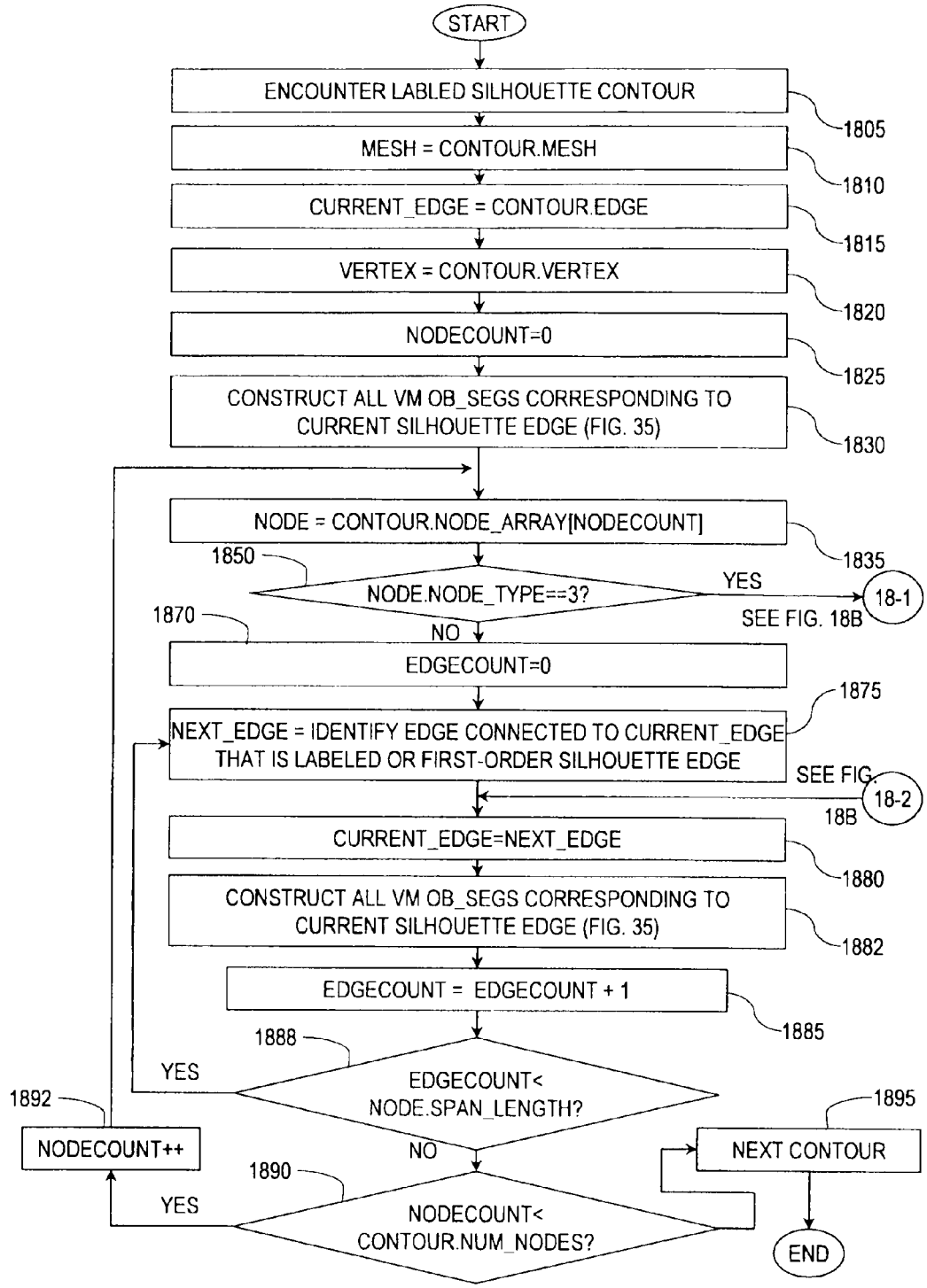
FIG. 18A is an exemplary flowchart showing a method of rapid runtime construction of visibility map occlusion boundary segments using labeled silhouette contour information for a single contour.
Figure 18B:
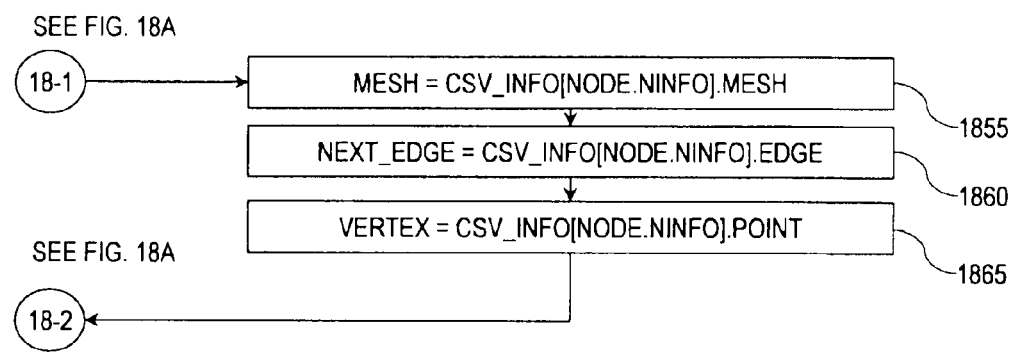
FIG. 18B is a continuation of FIG. 18A.

FIG. 18A and FIG. 18B Method of Rapid Runtime Construction of Visibility Map Occlusion Boundary Segments Using Labeled Silhouette Contour Information for a Single Contour.

As previously described, the effective delta regions (DR)s for a viewcell transition (e.g. A to B) are identified and the corresponding silhouette contours generating the DR occlusion boundaries are established (using the method of FIG. 17) and labeled using the data structures of FIG. 13A and FIG. 13B. This labeling is conducted as an offline process.

Once the labeled silhouette contour information is stored (as data associated with the triangle mesh) this data can be used at runtime to incrementally construct a visibility map corresponding to a specific viewcell from the known visibility map of a connected or containing viewcell.

FIG. 18A and FIG. 18B is a flowchart showing a method of constructing the visibility map corresponding to a specific viewcell from the known visibility map corresponding to a connected or containing viewcell using the previously stored labeled silhouette contour information for the specific viewcell transition.

In some embodiments, process flow starts at step 1805, a labeled silhouette contour (previously generated and stored for the specific viewcell transition being considered) is identified using the data structures associated with mesh for storing the labeled silhouette contour in formation (FIG. 13A and FIG. 13B) using labeling methods of FIG. 12 and FIG. 17A and FIG. 17B.

Process flow proceeds to step 1810 to set the current manifold triangle mesh (MESH) to the particular mesh referenced by the Contour.mesh field of the Contour data structure of FIG. 13A.

Process flow proceeds to step 1815 to set the CURRENT_EDGE (a manifold triangle mesh edge) to the particular edge referenced by the Contour.edge field of the Contour data structure of FIG. 13A.

Process flow proceeds to step 1820 to set the VERTEX (a manifold triangle mesh vertex) to the particular edge referenced by the Contour.vertex field of the Contour data structure of FIG. 13A.

Process flow proceeds to step 1825 to set a variable NODECOUNT to 0.

Process flow proceeds to step 1830, where all of the visibility map occlusion boundary segments (VM OB_SEGS) corresponding to the CURRENT_EDGE are constructed. These VM OB_SEGS are constructed using the process shown in FIG. 19 and discussed in detail in conjunction with that figure.

Process flow proceeds to step 1835, to set the variable NODE to reference the particular Contour_Node data structure referenced by the first node of the current contour.

Process flow proceeds to step 1850 to determine if the NODE.node_type of the current Contour_Node data structure (FIG. 13A) is type 3. If the node_type is type 3, then the node corresponds to compound silhouette vertex and processing proceeds to process 18-1, which starts at step 1855 in FIG. 18B.

In step 1855, the MESH variable (initialized in step 1810) is now set to the particular mesh referenced by the CSV_INFO[NODE.NINFO].mesh referenced by the current node, which being a node_type 3 is a compound silhouette vertex (CSV) node Process flow proceeds to step 1860, where the variable NEXT_EDGE (indicating the next edge in the silhouette contour polyline) is set to the edge referenced by the CSV_INFO[NODE.NINFO].edge field of the CSV_Info data structure referenced by the current contour node.

Process flow proceeds to step 1865, to set the variable VERTEX to the vertex referenced by CSV_INFO[NODE.NINFO].point field of the CSV_Info data structure referenced by the current contour node.

The effect of steps 1855, 1860, and 1865 is to connect together two polylines on the surface of one or more manifold triangle meshes at a single point, the compound silhouette vertex. Having set the current MESH, NEXT_EDGE, and VERTEX variables to reflect this fusion into a compound silhouette contour, process flow proceeds to process 18-2, which returns process flow to step 1880 (FIG. 18A).

If, in decision step 1850, it is determined that the NODE_TYPE is not 3 (i.e., the node does not correspond to a compound silhouette vertex), then process flow proceeds to step 1870.

In step 1870, the value of a variable EDGECOUNT is initialized to zero.

Process flow proceeds to step 1875 to set the variable NEXT_EDGE to reference the edge of the manifold triangle mesh that is connected to the current edge and that is also a (first-order, from-viewcell) silhouette edge. This edge can be easily identified based on the connectivity of the manifold mesh and on the definition of a first-order silhouette edge (see FIG. 3). Alternatively, the NEXT_EDGE is identified as the edge connected to the current edge wherein the connected edge is already labeled as a labeled silhouette contour edge. This definition of the NEXT_EDGE is used in cases in which the silhouette contour does not shift or migrate (as a result of "retraction of the silhouette edge previously described) substantially. This situation is established during the preprocessing and stored in the struct Contour data structure next_edge_type field. If the next_edge_type has value of 0, then the NEXT_EDGE is identified as the next connected edge that has been previously labeled. If, on the other hand, the next_edge_type value is 1 then the NEXT_EDGE is identified as the next connected edge that is a (first-order) silhouette edge.

Process flow proceeds step 1880, to set the CURRENT_EDGE to the NEXT_EDGE.

Process flow proceeds to step 1880, where the visibility map occlusion boundary segments (VM OB_SEGS) that result from the intersection of the umbral visibility event surface(s) that are supported by the current edge with the manifold triangle meshes. These elements of the visibility map derived from the current edge of the labeled silhouette contour are constructed using a method shown in a flowchart of FIG. 19 and discussed in detail in conjunction with that figure.

Once the VM OB_SEGS generated by the current silhouette edge are constructed (using the method shown in the flowchart of FIG. 19), then process flow proceeds to step 1885.

In step 1885, the variable EDGECOUNT is incremented.

Process flow proceeds to step 1888 to determine if the EDGECOUNT is less than the span_length for the current node (NODE.span_length) as specified in the Contour_Node data structure of FIG. 13A.

If, in decision step 1888, it is determined that the EDGECOUNT is less than the span_length, then process flow returns to step 1875, where then next edge is identified.

If, on the other hand, it is determined in decision step 1888 that the EDGECOUNT is not less than the span_length, then process flow proceeds to decision step 1890.

In decision step 1890 it is determined if the NODECOUNT is less than the number of nodes in the contour, given by the data field CONTOUR.num_nodes, where CONTOUR is a reference to the current labeled silhouette contour being processed and the data structure Contour shown in FIG. 13A is employed.

If, in decision step 1890 it is determined that the NODECOUNT is less than the CONTOUR.num_nodes, then process flow proceeds to step 1892.

In step 1892, the NODECOUNT is incremented and processing returns to step 1835, where the next node is selected and processing continues.

If, on the other hand, in decision step 1890 it is determined that the NODECOUNT is not less than the CONTOUR.num_nodes, then process flow proceeds to step 1895.

Step 1895 indicates that the labeled silhouette contour has been processed and that processing should proceed to the next labeled silhouette contour. Process flow terminates at step 1895.

The overall control of processing all of the labeled silhouette contours for a specific viewcell transition is controlled by the process shown in the flowchart of FIG. 20, and discussed in detail in conjunction with that figure.

Figure 19A:
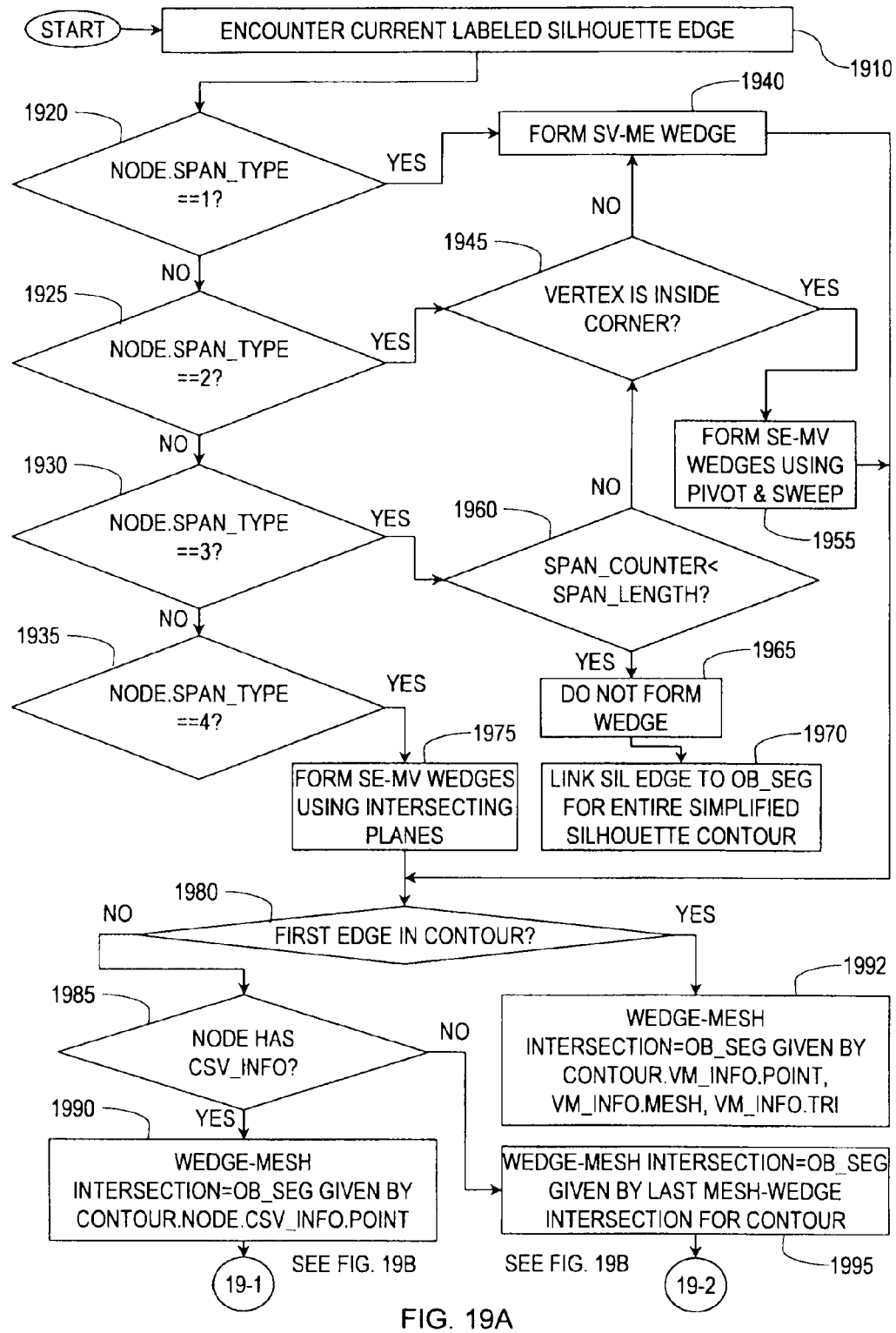
FIG. 19A is an exemplary flowchart showing a method of constructing visibility map occlusion boundary segments derived from a single silhouette edge of a labeled silhouette contour.
Figure 19B:
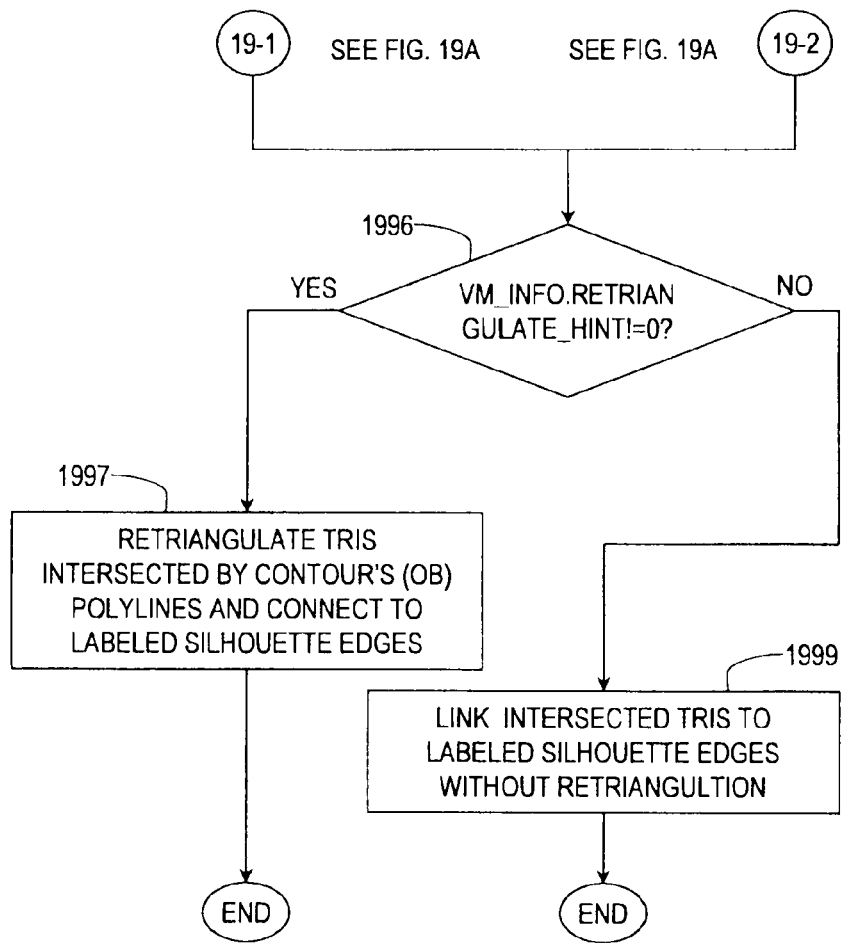
FIG. 19B is a continuation of FIG. 19A.

FIG. 19A and FIG. 19B Flowchart Showing a Method of Constructing Visibility Map Occlusion Boundary Segments Derived From a Single Silhouette Edge of a Labeled Silhouette Contour.

FIG. 18 is a flowchart for identifying the individual edges of a labeled silhouette contour given a small amount of data stored for the entire contour using the data structures of FIG. 13A. FIG. 19 is a flowchart for a process of constructing VM OB_SEGS derived from a single edge of the labeled silhouette contour.

By calling the process of FIG. 19 during the processing of a silhouette contour (FIG. 18, step 1882) the process of FIG. 18 effectively results in the construction of all VM_OBSEGs for an entire labeled silhouette contour.

In some embodiments, process flow starts at step 1910 upon encountering an edge of a labeled silhouette. This corresponds to step 1882 of the calling process of FIG. 18.

Process flow proceeds to decision step 1920 to determine if the span_type of the current labeled silhouette contour node (NODE, passed from the calling process) and specified in the Contour_Node.node_type data field specified in FIG. 13a is equal to the value of 1.

If, in decision step 1920, it is determined that the span_type of the current labeled silhouette contour node is equal to a value of 1 (indicating that the silhouette edge forms an outside corner on the labeled silhouette contour using the Contour_Node.node_type data field of FIG. 13A), then process flow proceeds to step 1940.

In step 1940, a SV-ME wedge is constructed using the pivot process previously described in conjunction with FIG. 4.

Process flow proceeds to step 1980 to determine if the current silhouette edge for which the wedge has been constructed is the first edge in the contour.

If, in decision step 1980, it is determined that the silhouette edge is the first edge in the contour, then process flow proceeds to step 1992.

In step 1992, the pre-stored wedge-mesh triangle intersection information is obtained from the CONTOUR.VMinfo.point, CONTOUR.VMinfo.mesh, and CONTOUR.VMinfo.tri data fields as specified in the data structures of FIG. 13A. This point corresponds to the precomputed and pre-stored intersection of the wedge with a specific mesh triangle wherein the intersection is the initial OB_SEG of the chain of VM OB_SEGS comprising the VM boundary associated with the labeled silhouette contour. This information was previously precomputed and stored during the offline process of identifying silhouette contours for a specific viewcell transition that produce visibility delta regions having a minimum effective dynamic occlusion value (step 1781 of FIG. 17). Thus, if the edge is the first edge in the labeled silhouette contour the step 1992 generates the first OB_SEG of the corresponding VM boundary.

If, on the other hand, it is determined in decision step 1980 that the silhouette edge being processed is not the first edge in the contour, then process flow proceeds to step 1985.

In decision step 1985, it is determined if the current node has CSV_Info associated with it, that is does the current silhouette edge support a wedge that intersects another visible silhouette edge. If so, then the Contour_Node.node_type value will be equal to 3 (FIG. 13A) and the Contour_Node.ninfo value will be the index into an array of CSV_Info data structures (FIG. 13B). In one embodiment CSV_Info data is not stored with a labeled silhouette contour but instead the initial point of each contour is defined at a CSV and therefore the corresponding data is stored in the Contour.mesh, Contour.triangle, and Contour.vertex fields.

If, in decision step 1985, it is determined that the current node has associated CSV_Info data, then process flow proceeds to step 1990.

In step 1990, the initial VM OB_SEG data is read from the CSV_Info[Contour_Node.inifo].mesh, CSV_Info[Contour_Node.inifo].edge, and CSV_Info[Contour_Node.inifo].point data structures.

If, on the other hand, it is determined in decision step 1985, that the current node does not have associated CSV_Info, then process flow proceeds to step 1995.

In step 1995, the VM OB_SEG corresponding to the current silhouette edge is constructed using VM OB_SEG mesh, triangle, and point intersection data from the last silhouette edge in the contour. Since the VM OB_SEGs form a polyline on the surface of a manifold triangle mesh the construction of a OB_SEG from an adjacent one is a straightforward piecewise construction of a polyline on a polyhedron.

Following either step 1990 or step 1995, process flow proceeds to process 19-1 and process 19-2, which starts at decision step 1996 in FIG. 19B. In decision step 1996, it is determined if the VM_INFO.RETRIANGULATE_HINT field is not equal to zero. This is a field of the VM_INFO data structure of FIG. 13A and is set to a value of 1 during the runtime construction of the visibility map if it is determined that the effective dynamic occlusion of the bordering visibility map region would be increased by retriangulating at the occlusion boundary.

If, in decision step 1996, it is determined that the value of VM_INFO.RETRIANGULATION_HINT is not equal to zero, then process flow proceeds to step 1997.

In step 1997, the triangles bordering the corresponding occlusion boundary are retriangulated at the boundary.

If, on the other hand, it is determined in decision step 1996 that the value of VM_INFO.RETRIANGULATION_HINT is equal to zero, then process flow proceeds to step 1999.

In step 1999, the triangles bordering the corresponding occlusion boundary are not retriangulated at the boundary. In this case, the triangles comprising the silhouette contour are "linked" to the partially occluded triangles without retriangulation. Process flow terminates at step 1999.

If, in decision step 1920, it is determined that the NODE.span_type is not equal to a value of 1 then process flow proceeds to step 1925.

In decision step 1925, it is determined if the NODE.span_type is equal to a value of 2, then process flow proceeds to step 1945. If the node_type is equal to a value of 2, then the contour may contain both outside and inside corner silhouette vertices. Consequently, process flow subsequently continues to 1945 to determine if the current silhouette edge is involved in an outside corner or inside corner with the next silhouette edge of the contour.

If, in decision step 1945, it is determined that the current edge and next edge of the silhouette contour form an outside corner, then process flow proceeds to step 1940, as previously described.

If, on the other hand, it is determined in decision step 1945, that the current edge and the next edge of the silhouette contour form an inside corner, then process flow proceeds to step 1955.

In step 1955, the SE-MV wedges incident on the inside corner silhouette vertex are formed using the sweep process previously described in conjunction with FIGS. 5A and 5B. Subsequently, process flow proceeds to step 1980, as previously described.

If, in decision step 1925, it is determined that the NODE.span_type is not equal to a value of 2, then process flow proceeds to step 1930.

In decision step 1930, it is determined if the value of NODE.span_type is equal to 3. If in decision step 1930 it is determined that the value of NODE.span_type is equal to 3, then process flow proceeds to step 1960. In this case, the span_type indicates that the contour should be simplified by skipping a subset of the edges of the contour during umbral wedge/VM OB_SEG construction. This information is precomputed and prestored in the corresponding Contour_Node.span_type and Contour_Node.span_length data structures during the identification of the differential effective static occlusion (also called the effective dynamic occlusion) of the DRs and simplification of the silhouette contour as shown in steps 1275 and 1289 of FIG. 12C.

In step 1960, the NODE.span_length is compared to a variable SPAN_COUNTER (which is initialized to zero before the contour is encountered) to determine between which vertices of the silhouette contour the simplified umbral visibility event surface and corresponding VM OB_SEG should be constructed. If, in decision step 1960 it is determined that the SPAN_COUNTER is less than the NODE.span_length, then process flow proceeds to step 1965, which indicates that a wedge is not formed on the current edge.

Process flow then proceeds to step 1970 in which the current silhouette edge is linked directly to the single OB_SEG for the entire silhouette contour, which is ultimately constructed in step 1940 or 1945 when the decision step 1960 directs processing toward steps 1945 or 1940.

If, in decision step 1930 it is determined that the NODE.span_type is not equal to a value of 3, then process flow proceeds to step 1935.

In decision step 1935, it is determined if the NODE.span_type is equal to a value of 3.

If, in decision step 1935, it is determined that the NODE.span_type is equal to a value of 3, then process flow proceeds to step 1975. In this case, the span_type indicates that umbral event surfaces incident on inside corner silhouette vertices of the contour should not be constructed using the sweep process, but should be constructed using the simpler method of intersecting the planes of the adjacent SV-ME wedges.

Consequently, in step 1975, the SE-MV wedges (and the corresponding VM OB_SEGs) are constructed using the intersection of the planes of the adjacent SV-ME wedges and process flow proceeds to step 1980 as previously described. FIG. 20 is a flowchart showing a process controlling the runtime process of constructing visibility map ROI using ROI boundaries constructed from pre-stored labeled silhouette contours wherein the ROI boundaries define delimit a simplified, hinted, runtime 3D mesh traversal process which traverses the ROI.

As previously described in conjunction with FIG. 17A-FIG. 17D, delta visibility data for a specific viewcell transition can be described as regions of interest (ROI) in a unified visibility map containing mesh triangle fragments visible from both viewcells and also containing the from-viewcell occlusion boundaries corresponding to both of the viewcells.

The type of delta visibility data depends on the construction of the corresponding ROI, which depends on the relationship of the two viewcells for which the viewcell transition is described.

If one of the viewcells is completely contained in the other, then the ROI can correspond to the regions visible only from the contained viewcell. The labeled silhouette contours corresponding to these type of ROI can be used to construct the VM of the child viewcell from the VM of the parent at runtime (using a hinted, simplified 3D mesh traversal), thereby avoiding in select cases the explicit storage of deltaG− information.

If the two viewcells share a face and one is not contained within the other (a relationship termed "contiguous") then the ROI correspond to delta regions (DR). For a viewcell transition from VC A to VC B (called an AB transition) the DR are of two types. One type of delta region, $DR_OAB$ (delta region of occlusion from A to B) contains mesh triangle fragments visible from viewcell A but not B. The $DR_OAB$ is also a $DR_EBA$ (delta region of exposure from B to A). Likewise $DR_EAB=DR_OBA$. The $DR_OAB$ corresponds to deltaG− data for the AB transition while the $DR_EAB$ corresponds to deltaG+ data for the AB transition. The labeled silhouette contours corresponding to the boundaries of these ROI can be used to construct the deltaG+ and or deltaG− data at runtime (also using a hinted, simplified 3D mesh traversal), thereby avoiding in select cases the explicit storage of deltaG+ and deltaG− polygon fragment information.

In some embodiments, process flow starts at step 2005, where the list of all labeled silhouette contours for the specific viewcell transition is accessed as an array LAB_CON_LIST.

Process flow proceeds to step 2010, where each of the labeled contours in the LAB_CON_LIST is subjected to further processing.

In a first step in the processing of a labeled silhouette contour in the LAB_CON_LIST, process flow proceeds to step 2015, where the edges of the labeled silhouette contour are identified using the process shown in the flowchart of FIG. 18, and the edges are stored in the LAB_SIL_EDGE_LIST.

Process flow proceeds to step 2020, where the edges of the LAB_SIL_EDGE_LIST are subjected to further processing.

In a first step, in the processing of edges in the LAB_SIL_EDGE_LIST, process flow proceeds to step 2025, where the VM OB_SEG corresponding to an edge of the LAB_SIL_EDGE_LIST is constructed using the process shown in the flowchart of FIG. 19.

Process flow proceeds to decision step 2030 to determine if the LAB_SIL_EDGE_LIST is empty. If there are more edges in the LAB_SIL_EDGE_LIST to process, then next unprocessed edge is selected and processing returns to step 2020.

If, in decision step 2030, there are no more edges in the LAB_SIL_EDGE_LIST to process, then process flow proceeds to step 2035.

In decision step 2035, it is determined if there are any more labeled contours to process in the LAB_CON_LIST. If, in decision step 2035, it is determined that there are more labeled contours to process in the LAB_CON_LIST then the next unprocessed contour in selected and process flow returns to step 2010.

If, on the other hand, in decision step 2035, it is determined that there are no more labeled contours to process in the LAB_CON_LIST, then process flow proceeds to step 2040.

In step 2040, the triangle seed list, which is a precomputed list of references to one triangle for each of the delta regions corresponding to a specific viewcell transition (precomputed and stored in step 1785 of FIG. 17D) is set to an array called TRI_SEED_LIST. In this case the triangle seed list contains one triangle from each VM region that is unoccluded from viewcell A (the containing viewcell) and unoccluded from viewcell B. One seed triangle is chosen from each VM region of VM A that is visible from viewcell A and viewcell B such that initiating the traversal on the set of seed triangles insures that the relevant (labeled) silhouette contours for the AB transition is encountered during the runtime simplified 3D mesh traversal of FIG. 21. This selection of seed triangles insures that the VM of viewcell B is constructed from the VM of viewcell A by the traversal process that "shunts" around geometry that becomes in the AB transition using the labeled silhouette contour information.

Process flow proceeds to step 2045, where the triangles of the TRI_SEED_LIST are subjected to processing.

Process flow proceeds to step 2050, where a triangle of the TRI_SEED_LIST is used to initiate a simplified manifold mesh traversal as shown in the flowchart of FIG. 21 and discussed in detail in conjunction with that figure. This traversal identifies all of the triangles visible from viewcell B by initiating traversal on a small subset of triangles (those in the TRI_SEED_LIST) visible from viewcell A.

Process flow proceeds to decision step 2060 to determine if there are any more unprocessed triangles in the TRI_SEED_LIST.

If, in decision step 2060, there are unprocessed triangles in the TRI_SEED_LIST then the next unprocessed triangle in the TRI_SEED_LIST is selected and process flow returns to step 2045.

If, on the other hand, in decision step 2060, it is determined that there no more unprocessed triangles in the TRI_SEED_LIST, then process flow proceeds to step 2065.

Step 2065 indicates that the specific ROI corresponding to the delta visibility information required has been constructed by the simplified runtime traversal. As previously discussed this delta visibility information may actually be the set of triangles/fragments visible from a child viewcell when the corresponding viewcell transition corresponds is a parent-to-child transition. Alternatively this ROI information may correspond to deltaG+ and deltaG− data for a viewcell transition between contiguous viewcells, thereby allowing the option of generating deltaG packets when needed instead of storing all deltaG packets for every viewcell transition. Process flow terminates at step 2055.

FIG. 21 Is the Main Process of Using Simplified, hinted, runtime 3D mesh traversal process to construct ROI from pre-stored labeled silhouette contour information and a list of seed triangles for the connected components of the ROI.

FIG. 21 is a flowchart showing an embodiment of the directed runtime 3D traversal process that is called in step 2050 of the controlling process shown in FIG. 20.

The process shown in the flowchart of FIG. 21 is similar to the general 3D mesh traversal process of FIG. 20A of the PCT patent application number PCT/US2011/042309. The process of FIG. 20A of the PCT patent application number PCT/US2011/042309 is generally conducted as an offline preprocess in order to construct visibility maps for the purpose of precomputing and storing PVS and labeled silhouette contour data.

In contrast, the 3D mesh traversal process of FIG. 21 is conducted at runtime and is employed generate ROI of unified visibility maps for specific viewcell transitions. These ROI describe changes in visibility that occur as a result of these specific viewcell transitions.

In one type of viewcell transition, from a parent viewcell to a contained child viewcell, the ROI contain only those triangle/fragments visible from the child viewcell. This type of ROI can be generated from the simplified, hinted, 3D mesh traversal process of FIG. 21 when the seed triangles supplied are a set of triangles comprising one triangle from each connected component of those ROI containing triangles visible from the child viewcell.

Using these seed triangles and the related ROI boundaries generated at from the labeled silhouette contours, causes the simplified, hinted 3D mesh traversal process to bypass or "shunt" polygons or polygon fragments that become newly occluded during a specific viewcell transition (e.g. viewcell A to viewcell B wherein viewcell B is contained within viewcell A). This allows the removal of newly occluded polygons and/or polygon fragments without explicitly storing the list of polygons to be removed. This can be more efficient than using explicit lists of polygons to be removed, if the list of polygons to be removed is large relative to the total number of visible polygons.

The hinted traversal method can also be used to directly generate both deltaG− and deltaG+ packets for a viewcell transition between two contiguous viewcells wherein one viewcell is not contained within the other but the two viewcells have a common face. In this case the starting VM must contain all the polygon or polygon fragments visible from the combined viewcell A+B. In addition the starting VM must contain the relevant occlusion boundaries for viewcell A and for viewcell B. (These can be generated from labeled silhouette edges.) Such a visibility map is called a unified visibility map. The unified visibility map for two connected viewcells contains all of the polygon fragments visible from viewcell A and visible from viewcell B (or visible from the Boolean sum viewcell A+B). In addition the unified visibility map contains the from-viewcell occlusion boundaries corresponding to both viewcell A and viewcell B.

To generate a deltaG+ packet for A-to-B transition (also called an AB transition) the corresponding unified VM is traversed using a seed triangle for each connected component of a VM region that is occluded from A but visible from B. This type of region is called a $DR_EAB$. Traversal is initiated using these seed triangles and proceeds to the occlusion boundary corresponding to viewcell A or viewcell B. The viewcell A boundary is encountered on the occluded side while the viewcell A boundary is encountered on the exposed side. This corresponds the DReAB regions shown in light gray in FIG. 40.

Table I summarizes the set of seed triangles needed to initiate the hinted runtime traversal for generating deltaG+ and deltaG− packets for contiguous viewcells and shows the side of the occlusion boundary encountered.

TABLE I

Generation of DeltaG+ and DeltaG− Submesh Data from Unified Visibility Map For Viewcell A and Viewcell B Using Method of FIG. 20 and FIG. 21

| Seed | Mesh Traversed | Occlusion Boundary Encountered |
|---|---|---|
| Triangles Occluded from A But Not Occluded from B | DRoBA = deltaG− BA DReAB = deltaG+ AB | Occluded Side of A Boundary & Exposed Side of B Boundary |
| Triangles Occluded from B But Not Occluded from A | DRoAB = deltaG− AB DReBA = deltaG+ BA | Occluded Side of B Boundary & Exposed Side of A Boundary |

This method allows both deltaG+ and deltaG− packets to be generated from a unified VM and the corresponding VM occlusion boundary contours for the viewcell transition (which can be generated from labeled silhouette contours). Using this method the deltaG+ and deltaG− packets for each viewcell transition do not need to be stored explicitly for every viewcell transition. Rather they can be generated by the hinted traversal method at any time before the packets are needed.

Also the runtime 3D traversal method of generating delta-visibility information can be more efficient in a distributed client-server implementation. In regions of high spatio-temporal visibility coherence the same labeled contour information can frequently be used for several specific viewcell transitions in the same region. The use of runtime 3D mesh traversal based on the labeled silhouette information can thereby allow incremental visibility map/PVS computation with less transmitted data than would be required using direct deltaG− lists of polygons to remove for each viewcell transition.

Turning now to FIG. 21, in a first step of the simplified, runtime traversal, process flow starts at step 2105, where the traversal is initiated at a specific triangle in the TRI_SEED_LIST for the specific viewcell transition.

Process flow proceeds to decision step 2115 to determine if the traversed triangle contains a from-viewcell occlusion boundary. These boundaries would have been constructed in step 2020 of FIG. 20.

If, in decision step 2115 it is determined that the traversed triangle contains a from-viewcell occlusion boundary, then process flow proceeds to step 2135.

Process flow proceeds to step 2135, where traversal is interrupted at the occlusion boundary. In further embodiments, process flow proceeds from 2135 to process 21-1, which returns the process flow to step 2125.

If, on the other hand, it is determined in decision step 2115 that the current traversed triangle does not contain an occlusion boundary, then process flow proceeds to step 2120.

In decision step 2120 it is determined if the currently traversed triangle has a silhouette edge corresponding to a labeled silhouette edge for the specific viewcell transition being considered. These labeled silhouette edges correspond to inner boundaries of the corresponding ROI of the unified VM.

If, in decision step 2120, it is determined that the currently traversed triangle does not have a silhouette edge, then process flow proceeds to step 2125.

In step 2125, the next (connected) un-traversed triangle in the mesh is selected and submitted to step 2115 and subsequent steps for processing.

If, on the other hand, it is determined in decision step 2120 that the current triangle dos contain a labeled silhouette edge for the current viewcell transition, then process flow proceeds to step 2180.

In decision step 2180 it is determined if any un-processed (un-traversed) triangles exist in the current "traversal", where a traversal is defined here as the set of mesh polygons connected by non-labeled-silhouette edges and on the unoccluded side of occlusion boundaries for the specific viewcell transition as constructed in step 2025 of FIG. 20.

If, in decision step 2180, it is determined that there are un-traversed triangles in the current traversal, then process flow proceeds to step 2125, where the next triangle in the traversal is selected for processing as previously described.

If, on the other hand it is determined in decision step 2180 that no un-traversed triangles exist in the current traversal, then process flow proceeds to step 2188.

In step 2188 the traversal is continued on the unoccluded sides of the occlusion boundary segment(s) constructed in step 2025 of FIG. 20; wherein said occlusion boundary corresponds to the labeled silhouette edge encountered in step 2120. This continuation may involve continuing the traversal on triangles that were retriangulated (i.e. trimmed exactly at the occlusion boundary) or it may involve continuing the traversal on the unoccluded side of triangles that were not retriangulated at the boundary. Process flow terminates at step 2188.

Figure 22:
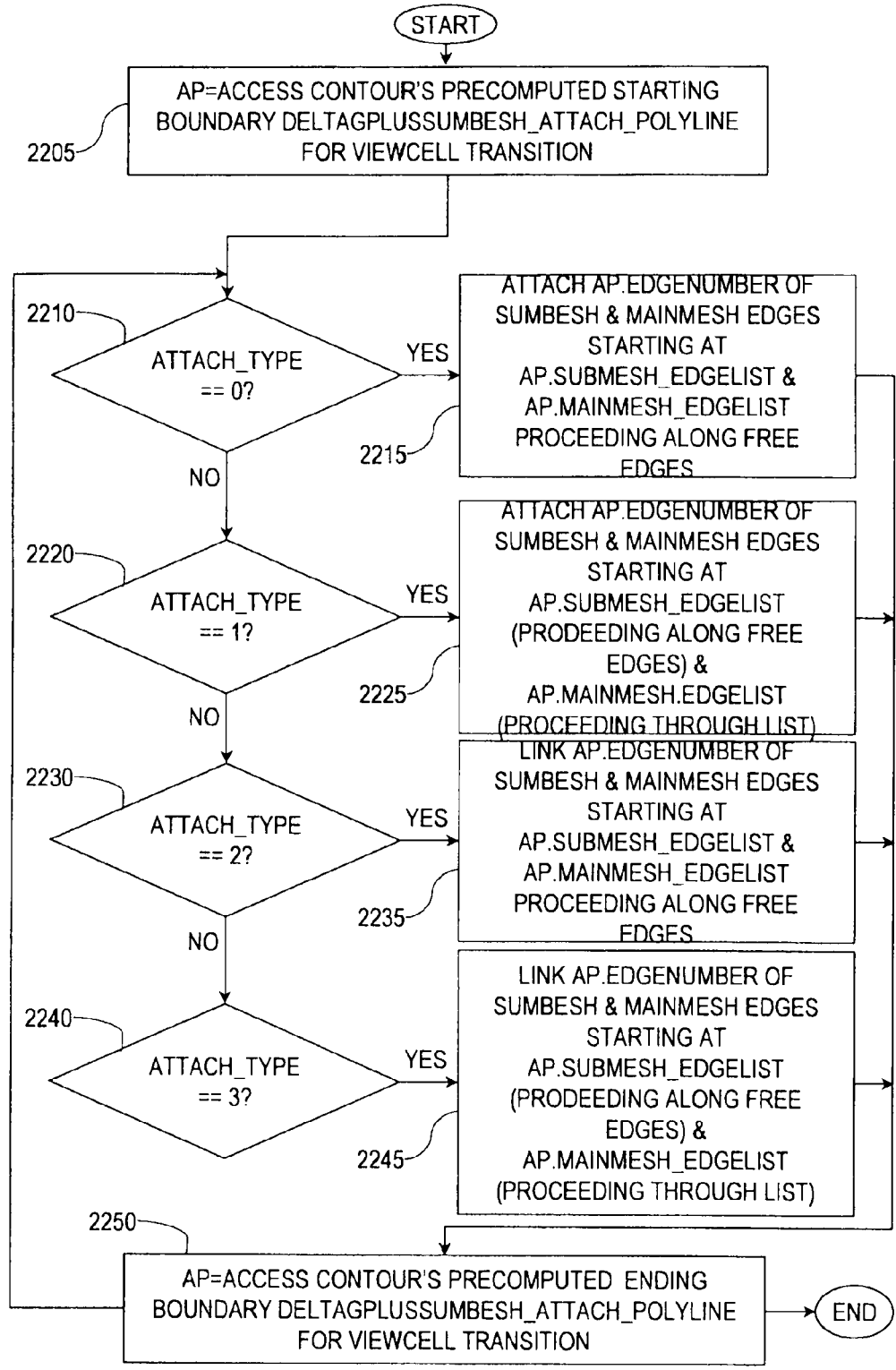
FIG. 22 is an exemplary flowchart showing a method of attaching a deltaG+submesh corresponding to newly exposed mesh elements for a specific viewcell transition to the corresponding labeled silhouette contour's starting boundary.

FIG. 22 Method of Attaching a DeltaG+submesh Corresponding to Newly Exposed Mesh Elements For a Specific Viewcell Transition to the Corresponding Labeled Silhouette Contour's Starting Boundary.

For any viewcell transition the polyline corresponding to the attachment curve of a newly exposed submesh can be determined and stored during the offline process of constructing the from-viewcell visibility maps and the corresponding delta-regions of visibility (FIG. 17). These polylines can be stored using the DeltaGplussumbesh_attach_polyline data structure of FIG. 13B. This data can be stored and used later during the runtime process of incremental visibility map/PVS construction described in FIG. 20 and FIG. 21. Specifically, in order to use the runtime method of determining newly occluded mesh elements by "shunting" during runtime 3D mesh traversal, any newly exposed mesh elements are connected to previously exposed elements at the attachment polyline in order to insure that a connected manifold is present for the runtime traversal.

Note that in some embodiments, the method of FIG. 22 is used when the method of FIG. 20 and FIG. 21 are used to compute newly occluded geometry at runtime by shunting.

In some embodiments, process flow proceeds to step, 2205, where the DeltaGplussumbesh_attach_polyline data structure associated with the labeled silhouette edge (starting) for the specific viewcell transition is accessed and referenced by the variable AP.

Process flow proceeds to decision step 2210, where it is determined if the attachment type corresponds to 0. If in decision step 2210, it is determined that the attachment type corresponds to 0, then process flow proceeds to step 2215.

In step 2215, the edges of the deltaG+submesh (here simply called submesh) are directly connected to the corresponding edges of the main mesh. This connection is made between AP.edgenumber of edges starting at the single edges listed in AP.submesh_edgelist and AP.mainmesh_edgelist and proceeding along the free edges (edges having only one component polygon) of the corresponding meshes. In this mode only a single edge for each edgelist needs to be prestored.

Process flow proceeds to decision step 2220, to determine if the attachment type corresponds to 1. If, in decision step 2220, it is determined that the attachment type corresponds to 1, then process flow proceeds to step 2225.

In step 2225, the edges of the deltaG+submesh (here simply called submesh) are directly connected to the corresponding edges of the main mesh. This connection is made between AP.edgenumber of edges starting at the first edges listed in AP.submesh_edgelist and AP.mainmesh_edgelist and proceeding through the entire list of edges in sequence.

Process flow proceeds to decision step 2230 to determine if the attachment type corresponds to 2. If, in decision step 2230, it is determined that the attachment type corresponds to 2, then process flow proceeds to step 2235.

In step 2235, the edges of the deltaG+submesh (here simply called submesh) are "linked" to the corresponding edges of the main mesh wherein a linkage may be a one-to-many mapping from one polyline segment to another polyline. These links are identified during preprocessing such that they present a conservative representation of the corresponding mesh during runtime 3D traversal. This linkage is made between AP.edgenumber of edges starting at the single edges listed in AP.submesh_edgelist and AP.mainmesh_edgelist and proceeding along the free edges (edges having only one component polygon) of the corresponding meshes. In this mode only a single edge for each edgelist needs to be prestored.

Process flow proceeds to decision step 2240 to determine if the attachment type corresponds to 3. If, in decision step 2230, it is determined that the attachment type corresponds to 3, then process flow proceeds to step 2245.

In step 2245, the edges of the deltaG+submesh (here simply called submesh) are "linked" to the corresponding edges of the main mesh, wherein a linkage may be a one-to-many mapping from one polyline segment to another polyline. These links are identified during preprocessing such that they present a conservative representation of the corresponding mesh during runtime 3D traversal. This linkage is made between AP.edgenumber of edges starting at the first edges listed in AP.submesh_edgelist and AP.mainmesh_edgelist and proceeding through the entire list of edges in sequence.

In any case, process flow proceeds to step 2250 for the next viewcell transition. In step 2250, the starting boundary for the next viewcell transition may be derived from the ending boundary of the current viewcell transition, and processing proceeds to decision step 2210 for the next viewcell transition. Process flow terminates at step 2250.

In addition to using deltaG+ geometry packets for newly exposed polygons, some newly exposed surfaces are reconstructed, in some embodiments, procedurally at runtime without the need for explicit deltaG+ polygons. This method, in some embodiments, is employed to generate newly visible portions of a single large polygon (or tessellated surface), a floor or ceiling for example in newly exposed delta regions. In this case, the silhouette contour is specially labeled with a label that instructs the runtime process to procedurally generate the newly exposed portion of the surface in the entire delta region.

Figure 23:
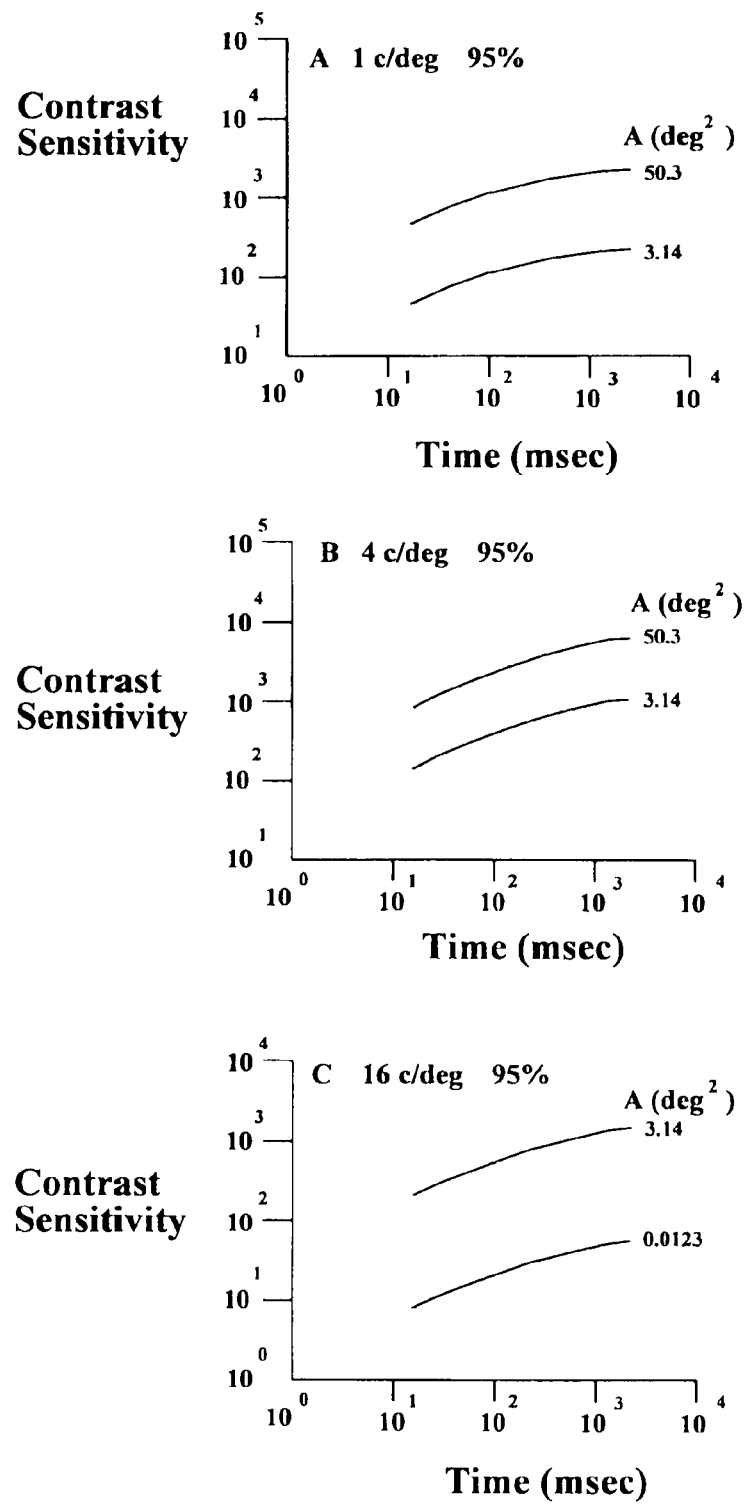
FIG. 23 is an exemplary diagram showing the effect of exposure time on ability of human subjects to resolve spatial detail.

FIG. 23 is a diagram showing the effect of exposure time on ability of human subjects to resolve spatial detail.

FIG. 23 is data reproduced by a study of human visual performance (Luntinen, O., et. al. (1995). Modeling the Increase of Contrast Sensitivity with Gating Area and Exposure time. Vision Res. Vol. 35, No. 16, pp. 2339-2346. Elsevier Science Ltd.).

This study shows the pronounced effect of exposure time on contrast sensitivity, particularly for high spatial frequencies up to 1000 ms.

FIG. 23 shows four graphs (A through C) in which contrast sensitivity is plotted as a function of exposure time from 0 to 10 seconds. In each graph the relationship is plotted for different total exposure areas of the viewed surface (a grating pattern). Each graph represents the relationship for one of four spatial frequencies as indicated. This study shows that contrast sensitivity is decreased by low exposure time and low exposure area. Note that the increase in contrast sensitivity with increasing spatial frequency in this case is because the measured low frequencies are below the "peak" spatial frequency on the spatial contrast sensitivity curve under the employed experimental conditions. From this data is clear that the ability of the human visual system to resolve high spatial frequency data is a function of exposure time even beyond 1000 ms. This would allow the use of a low level-of-detail delta visibility information to be used initially and subsequently replaced with a relatively higher level-of-detail delta visibility information as exposure time of the corresponding deltaG+submesh data increased.

Figure 24A:
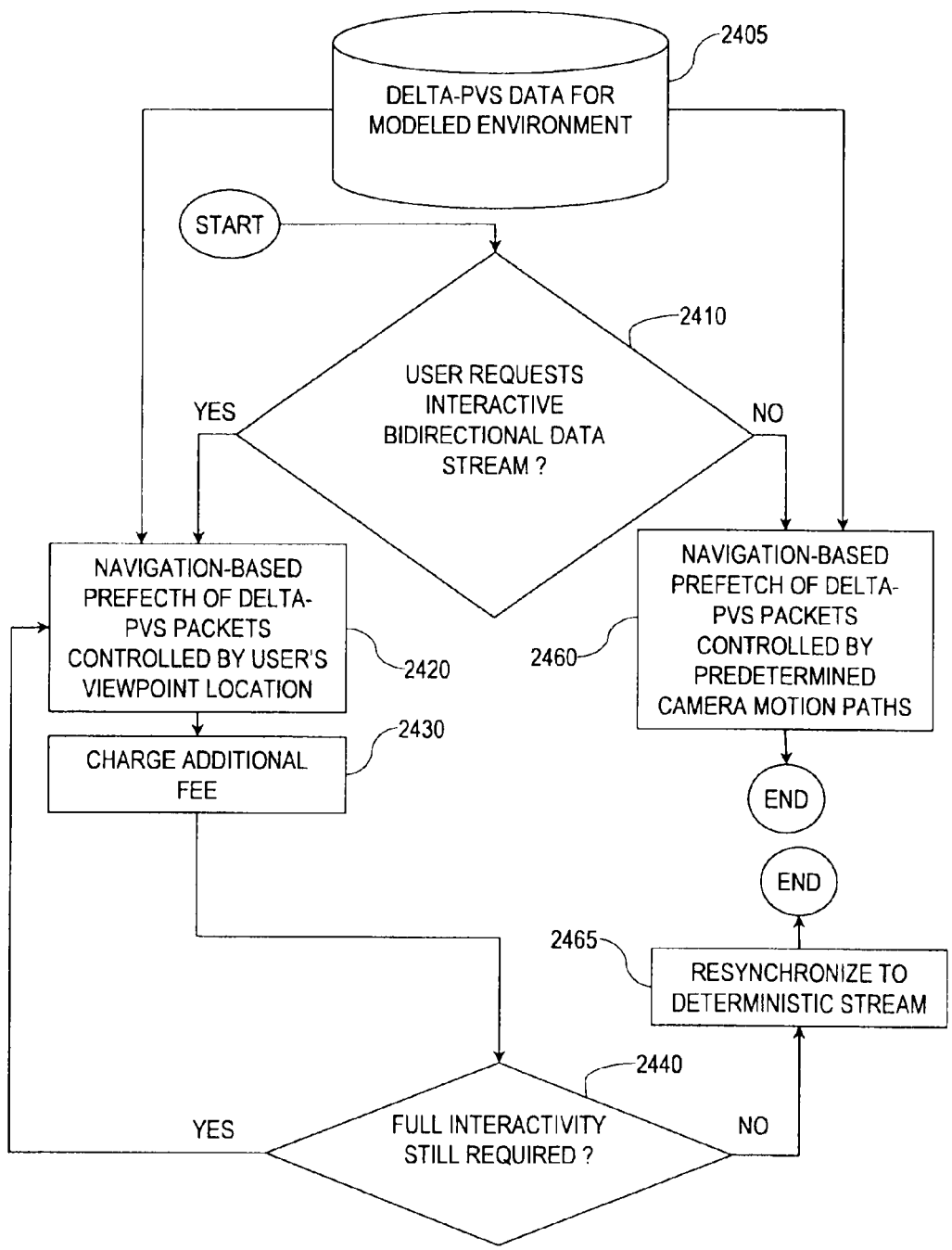
FIG. 24A is an exemplary flow diagram illustrating a method of controlling a content stream of visibility event data packets containing renderable data.

FIG. 24A is an exemplary flowchart illustrating a method of controlling a content stream of visibility event data packets containing renderable data. In one embodiment, these data packets are comprised of data sent from a server unit to a client unit as detailed in the co-pending PCT patent application number PCT/US2011/042309. In this method, the pre-computed and pre-stored data packets comprise delta-PVS packets (visibility event packets) of renderable data. In this method, the client unit may be on the same physical device as the server unit (e.g., in FIG. 47 of the co-pending PCT patent application number PCT/US2011/042309). Alternatively, this method also supports configurations in which the client unit is on a different physical device than the server unit and in a different location (e.g., in FIG. 46 of the co-pending PCT patent application number PCT/US2011/042309).

Turning now to FIG. 24A, the data store labeled 2405, according to some embodiments, comprises a single data store for delta-PVS data, also called visibility event data, representing changes in the potentially visible set of graphic elements at viewcell-viewcell boundaries or transitions in the modeled environment of the game. This data store may include data that has been processed using the from-region visibility precomputation method specified in the co-pending PCT patent application number PCT/US2011/042309. This data store may include data that has been processed using the algorithmic compression methods also detailed in the co-pending PCT patent application number PCT/US2011/042309.

In decision step 2410, it determined if a user has requested an interactive data stream. This request can be input to the system by user interaction with the client unit. In one embodiment, any interaction with a controlling device (e.g., a wired or wireless game controller) is interpreted, in step 2410, as a request for an interactive data stream of packets. Other implementations are possible including the use of specific button combinations to request the initiation of an interactive data stream. In some embodiments, the data stream is bi-directional, where data is transmitted from the server to the client and from the client to the server.

If, in decision step 2410, it is determined that the user requests an interactive experience then process flow proceeds to step 2420.

In step 2420, the visibility event data stream is provided to the client unit from the data store 2405 using navigation-based prefetch which is controlled by a camera position that is under interactive control of the user. This prefetch process, as detailed in the co-pending PCT patent application number PCT/US2011/042309, current position of the camera viewpoint is used to predict possible future locations of the viewpoint and delta-PVS data corresponding to viewcell boundaries that are likely to be penetrated by the viewpoint in a predetermined period of time in the future are fetched from the data store 2405. For example, based on a current viewcell and history of viewcell transitions, a future viewcell transition is predicted. The prediction of a future viewpoint or camera location given a present location can utilize prior-art methods of dead reckoning or other prior-art methods of navigation prediction, including the method of Chim et. al. (Jimmy Chim, Rynson W. H. Lau, Hong Va Leong, and Antonio Si, CyberWalk: A Web-Based Distributed Virtual Walkthrough Environment, iEEE TRANSACTIONS ON MULTIMEDIA, VOL. 5, NO. 4, DECEMBER 2003, the entire contents of which are incorporated herein by reference). Alternatively, navigation prediction can employ the method of the exemplary flowchart shown in FIG. 28, and discussed in conjunction with that figure.

In step 2420, the viewpoint position that is used to control the navigation-based prefetch process is determined by user input. This viewpoint may be the user's viewpoint in the modeled environment, a camera viewpoint following the user's movement in the modeled environment, or a camera viewpoint following some other user or non-player character in the modeled environment. In this case, the data stream delivers a fully interactive, game-like experience to the user of the client unit. As an example, when a user is playing an interactive game and moves a game controller left or right, the display of the user's current viewpoint on a monitor/screen pans left or right, respectively.

The actual reading of the fetched data from the data store may be performed by a decoder process located on the same physical device as the client display unit (e.g., if the data stream is fetched from a local disc). Alternatively, the actual reading of the fetched data from the data store of delta-PVS data may be performed by a decoder process that is on a different physical device than the client display unit (e.g., the prefetching process may be located on a remote server unit which also contains the data store 2405).

In step 2420, the prefetched data represents, in some embodiments, a bidirectional data stream containing delta-PVS renderable data prefetched from the server process to the client process, and user input data supplied to the server process to control the prefetch of data.

If, in decision step 2410, it is determined that there is no request by the user, for an interactive, bidirectional data stream, then process flow proceeds to step 2460.

In step 2460, the viewpoint position that is used to control the navigation-based prefetch process is controlled using a predetermined camera motion path. In this case, the data stream supplied to the client decoder unit delivers a video-like experience which does not require active interactive input by the user of the client unit.

In the context of the present specification, a camera motion path includes data which specifies a sequence of locations of a virtual camera. In computer graphics, a camera is actually a virtual camera which is generally specified by a viewpoint location (corresponding to the camera location and center of projection) as well as a viewport, and typically a view direction vector. A camera may be positioned at the user's virtual eyepoint location in the modeled environment, in which case the camera is said to provide a first-person perspective. In this case the cameral viewpoint is the same as the user viewpoint.

Alternatively, the camera may be located at a point other than the user's viewpoint. The camera may define a view volume which includes an avatar representing the character, or a vehicle being controlled by the user. In this case the camera is providing a third-person perspective.

While this predetermined stream can use data from the same data store as the fully interactive, bidirectional data steam, the predetermined stream can optionally employ packet optimizations that exploit the deterministic structure of the stream. Some of these optimizations have been described in U.S. Pat. No. 6,057,847, the entire contents of which are incorporated herein by reference, for the transmission of renderable data packets representing a fixed camera path. Other optimizations for navigation-based prefetch of visibility event data using both a predetermined camera path and direction, and an interactively controlled camera are described in later sections of this specification.

A principle advantage of using a deterministic data stream controlled by a fixed, predetermined camera path is that the same exact stream can be broadcast to multiple users simultaneously. This uses considerably less bandwidth than if each user in a large digital network (e.g., broadband cable, satellite or other network) is provided a unique bidirectional, fully interactive data stream. In some embodiments, a deterministic data stream includes a predetermined sequence of data packets corresponding to a viewcell transition.

Even though the unidirectional, deterministic data streamed controlled by a prescribed camera motion path can be efficiently broadcast simultaneously to multiple users of the supporting network, a deterministic unidirectional data stream can still support significant, if not full, interactive input from each user according to some embodiments.

This limited interactivity provided by the deterministic data stream is a consequence of multiple features of the visibility event streaming method. First, each deterministic data stream is comprised of delta-PVS or visibility event packets representing a camera motion path through a region of space within the modeled database formed by a specific connected sequence of viewcells embedded in the model. In contrast, a conventional camera motion path (e.g., for a computer animated video) is formed by a space curve embedded in the model. Consequently, as long as the user navigation is confined to the region of space defined by the connected viewcell sequence defining the motion path, then the user is free to interactively change viewpoint location (i.e., navigate within) the portion of the modeled environment that has already been streamed to the client unit. This navigation can be limited by any memory limitations of the client unit that limit the amount of cached data that can be stored on the client. This navigation can also be intentionally limited by caching restrictions placed on the client unit by the server-provider or content owner. This type of limited interactive camera motion is available from the unidirectional, deterministic data stream even though it is being simultaneously supplied (broadcast) to multiple users.

In addition, the visibility event packets precomputed using the methods of PCT patent application number PCT/US2011/042309 can allow the incremental and progressive construction of PVS data representing all graphic elements visible from specific viewcells wherein the viewing direction within the viewcell is unrestricted (i.e., omnidirectional). That is, the resulting potentially visible sets allow omnidirectional viewing within the corresponding viewcell. When such visibility event packets are employed using a predetermined camera path, a user still can retain full control of viewing direction even as receiving a broadcast deterministic visibility event data stream determined by a predetermined camera path.

Another type of user interactivity that can be delivered using the unidirectional, deterministic data stream involves control of avatars, characters, vehicles and other objects that are within the regions of the model visible from the connected viewcells for which the corresponding delta-PVS data has been transmitted to the client unit and cached.

Full interactivity, in which the user is free to move throughout the modeled environment, uses the full bidirectional data stream as shown in steps 2410 and 2420. In this case the user has requested a unique data stream different from the deterministic broadcast stream. When this selection is made, the digital service provider can elect to add an additional fee reflecting the use of server resources required to prefetch the unique stream and the dedicated bandwidth required to deliver it to the user. In addition, the content owner may charge an additional fee for the fully interactive stream that reflects the increased functionality of the content when used as a game experience instead of a more passive video-like product. In some embodiments, this fee is charged to a user's subscription account associated with a server that delivers content to the user's client unit.

Step 2430 shows the method of increasing fees when the bidirectional stream is selected by the user in step 2410. This increased fee can be in the form of a fixed pay-per-play fee or an hourly rate. Alternatively, digital service providers and or content owners can allow the user to gain access to the interactive content for a monthly or other period fee.

Process flow proceeds to decision step 2440, where it is determined if the user continues to require the interactivity supplied by the bidirectional data stream. If, in step 2440, full interactivity is still required, then processing returns to step 2420, in which the non-deterministic, navigation-based prefetch of delta-PVS packets is controlled by the user's location continues. In some embodiments, the subsequent step 2430 is executed each time the user requests full interactivity. In alternative embodiments, the additional fee is charged only for the first request or for specific requests for interactivity, as determined by the service provider and/or content owner.

When the user fails to supply input for a predetermined period, or when the user sends an active signal to end the fully interactive bidirectional stream, then the stream reverts to one or more deterministic data streams in some embodiments.

If, in decision step 2440, it is determined that full interactivity is not requested or required by the user, then process flow proceeds to step 2465. In step 2465, the data stream is transitioned to a deterministic, unidirectional data stream.

This transition can occur by having the server or client process take control of the camera viewpoint and moving it so that it to a viewcell belonging to a viewcell of a viewcell path corresponding to a deterministic data stream. In some embodiments, precomputed and prestored PVS data, corresponding to the complete PVS of certain viewcells in one or more deterministic viewcell paths can be sent by the server to exactly re-synchronize the previously bidirectional data stream to one or more deterministic, unidirectional data streams corresponding to different "storylines" or outcome paths for the streamed content.

This resynchronization can optionally be conducted to create a seamless transition from a fully interactive experience to one or more deterministic data streams (corresponding to "storylines") that are actually being broadcast to multiple other client units by the service provider. This method allows efficient use of available bandwidth by granting a unique stream only to those users that actually desire the unique stream. Further, this efficient use of available bandwidth decreases network congestion. Either the deterministic or the non-deterministic data streams can be recorded, for example on a hard disc, for later use. As previously described, the method includes, in some embodiment, a technique of intentionally limiting the amount of delta-PVS data that is cached on the client unit to prevent piracy and resale of used content.

Figure 24B:
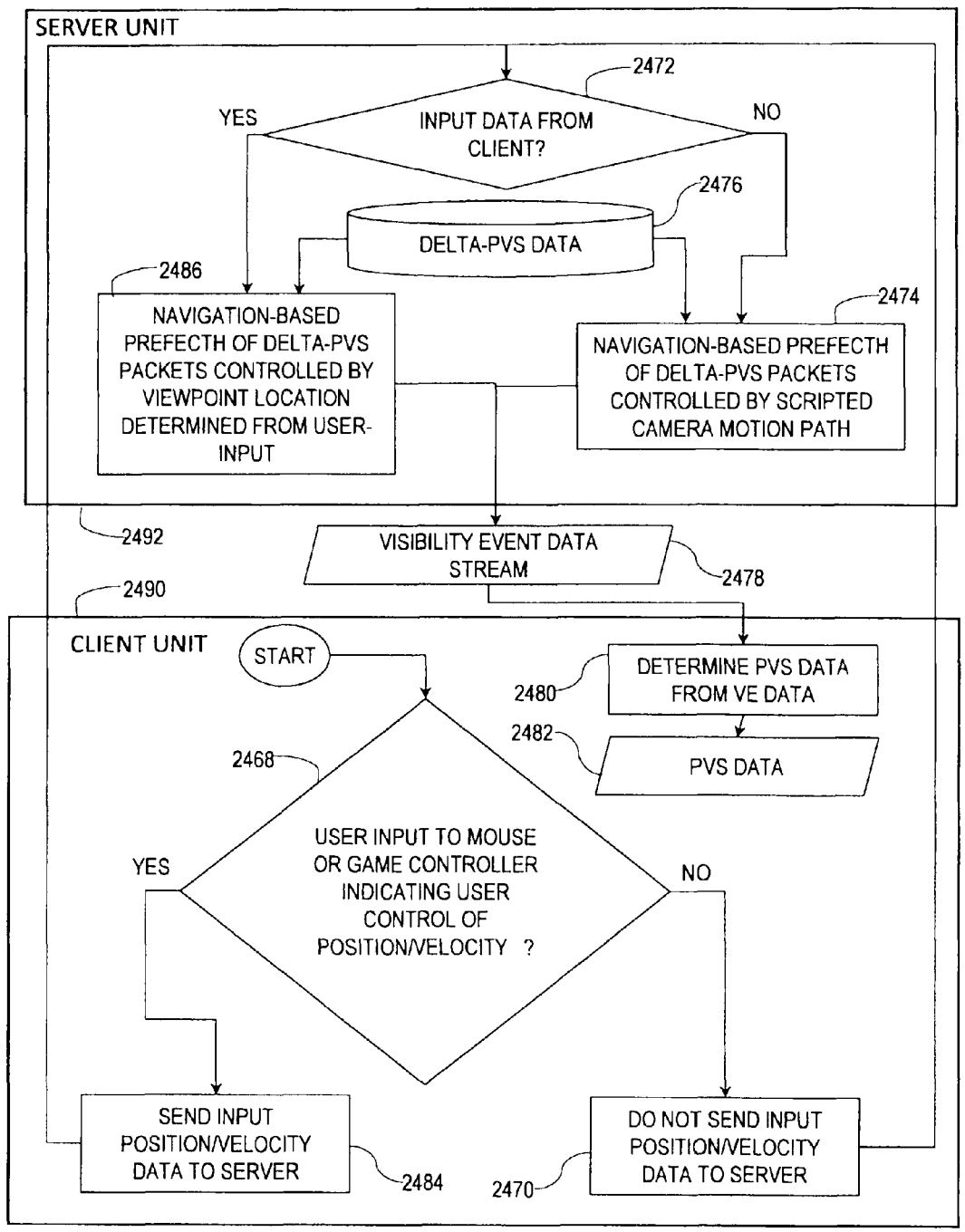
FIG. 24B is an exemplary block diagram/flowchart showing further details of the method of controlling a visibility event data stream using bidirectional communications between a client unit a and the server unit.

FIG. 24B is an exemplary flow diagram further showing details of the method of controlling a visibility event data stream using bidirectional communications between the client unit (labeled 2490) and the server unit (labeled 2492).

The cyclic process, in one exemplary embodiment, starts at decision step 2468. In decision step 2468 it is determined if the user has supplied input to the client unit producing control or the viewpoint position and/or velocity (e.g., joystick input) or an intention to provide such control (e.g., button push signaling intention to begin user control of navigation).

If, in decision step 2468 it is determined that no input to the controller has been made by a user indicating user control of viewpoint/camera navigation, then process flow proceeds to step 2470.

In step 2470, no data controlling viewpoint position/ velocity is sent to the server. Alternative embodiments can use a positive indication by the user that the user wishes to relinquish control of viewpoint/camera navigation.

Process flow proceeds to decision step 2472, conducted on the server unit. In decision step 2472 it is determined if data has been received indicating user control of viewpoint/ camera navigation. In some embodiments, the criteria for determining no input data from the client includes such parameters as no input over a specified period of time. Also, as previously indicated, the user's desire to relinquish control of viewpoint/camera navigation is indicated by a positive signal (e.g., specific controller button push) in some embodiments.

If, in decision step 2472, it is determined that no input data from the client unit is received (or input data indicating the desire to terminate control of viewpoint/camera navigation), then process flow proceeds to step 2474.

In step 2474, the navigation of the viewpoint/camera is driven by a predetermined camera motion path and the visibility event data packets (data store 2476) are read to the client unit using a navigation-based prefetch that is driven by the predetermined viewpoint/camera motion path. The resulting visibility event data stream, 2478, in this case will provide the client unit with graphics information that when rendered produces a scripted image sequence that does not support full interactivity (e.g., will not allow unrestricted viewpoint/camera motion, but may allow a more prescribed interactivity, e.g. full or limited control of view direction vector) during viewing. In an alternative embodiment, instead of a determination stream being provided, the current viewpoint remains stationary until a user input is detected.

The visibility event packets are sent to the client unit and decoded in step 2480 to produce PVS data, stored in data store 2482. In exemplary embodiments, this decoding is performed using the methods specified in the co-pending PCT patent application number PCT/US2011/042309.

If, in decision step 2468, it is determined that the user has entered an input indicating user control of viewpoint/camera navigation then process flow proceeds to step 2484.

In step 2484, this input data is sent to the server unit. As an example, the input data includes a current position and velocity of a user.

If, in decision step 2472, it is determined that input data from the client unit is received then, process flow proceeds to step 2486.

In step 2486, the navigation of the viewpoint/camera is determined by user input and the visibility event data packets (data store 2476) are read to the client unit using a navigation-based prefetch that is driven by the user-controlled viewpoint/camera. The resulting visibility event data stream, 2478, in this case provides the client unit with graphics information that, when rendered, produces an unscripted image sequence which supports full viewer motion within the limits of the navigable space of the modeled environment and within any restrictions imposed on the cache size of the visibility event and PVS data stored on the client unit by the server unit.

Using the method of FIG. 24A and FIG. 24B to control the streaming of delta-PVS packets, previously specified in the co-pending PCT patent application number PCT/US2011/ 042309, a deterministic, broadcast delta-PVS data stream can be used to efficiently broadcast content that appears to be a high-definition computer animated program, but with an important advantage: at any time the viewer can choose to use a game controller linked to the decoder device and become a character in the story. The instant that the user chooses to participate, the packet stream switches from a deterministic broadcast stream to a fully interactive, bidirectional connection with the service provider, which can be provided as premium, on-demand type content. The streaming interactive media (SIM) delivered by the delta-PVS codec specified in the co-pending PCT patent application number PCT/US2011/042309 has seamlessly switched from a television program to a game. At any time, in some embodiments, the user can choose to resynchronize with one of the passive, scripted story lines of the program, which enhances the user's experience with the content.

The method of encoding visibility-event-based, delta-PVS data packets described in the co-pending PCT patent application number PCT/US2011/042309, allows existing game content to be converted to data capable of supporting the type of flexible, streaming interactive media (SIM). Of course, native SIM content can also be developed using existing game development tools for the target game engine together with the method of encoding the information produced by these development tools described in the co-pending PCT patent application number PCT/US2011/ 042309. As discussed in conjunction with FIG. 26, the client unit can incorporate a client-decoder process that is integrated into a game engine.

This SIM method of content delivery enables publishers to leverage the "freemium" model of content delivery in which scripted, deterministic SIM content is delivered free to large audiences using a unidirectional, broadcast data stream. This exposes the content to broad audiences and allows viewers to instantly become players by purchasing the premium, bidirectional, fully interactive content.

Content streamed using the methods detailed in the co-pending PCT patent application number PCT/US2011/ 042309 can optionally be rendered and composited over conventional video on the client unit.

As developed more fully in conjunction with FIG. 46, in the exemplary flow diagram of FIG. 24B, step 2420, or FIG. 24B, STEP 2486, the user's location may be the user's virtual location in a modeled environment, or the actual location of the user/client unit in a real environment on which the modeled environment is based. Modeled environments based on actual environments can be constructed from data acquired using LIDAR (Light Detection and Ranging) or other ranging modalities, from conventional 3D modeling, or a combination of both acquisition and hand modeling. The method of LIDAR is disclosed in the publication "Airborne and Terrestrial Laser Scanning, Vosselman, G., Hans-Gerd, M., Eds. CRC Press 2010, ISBN 9781439827987", incorporated herein by reference. If the modeled environment is based on an actual environment then the streamed visibility event information includes, in some embodiments, a virtual, interactive representation of the real environment that is streamed to the client unit, based on the client unit's location in the real environment.

FIG. 25A is a diagram illustrating a top orthographic view of a modeled environment including two buildings a motorcycle and a billboard, hidden line view.

Figure 25B:
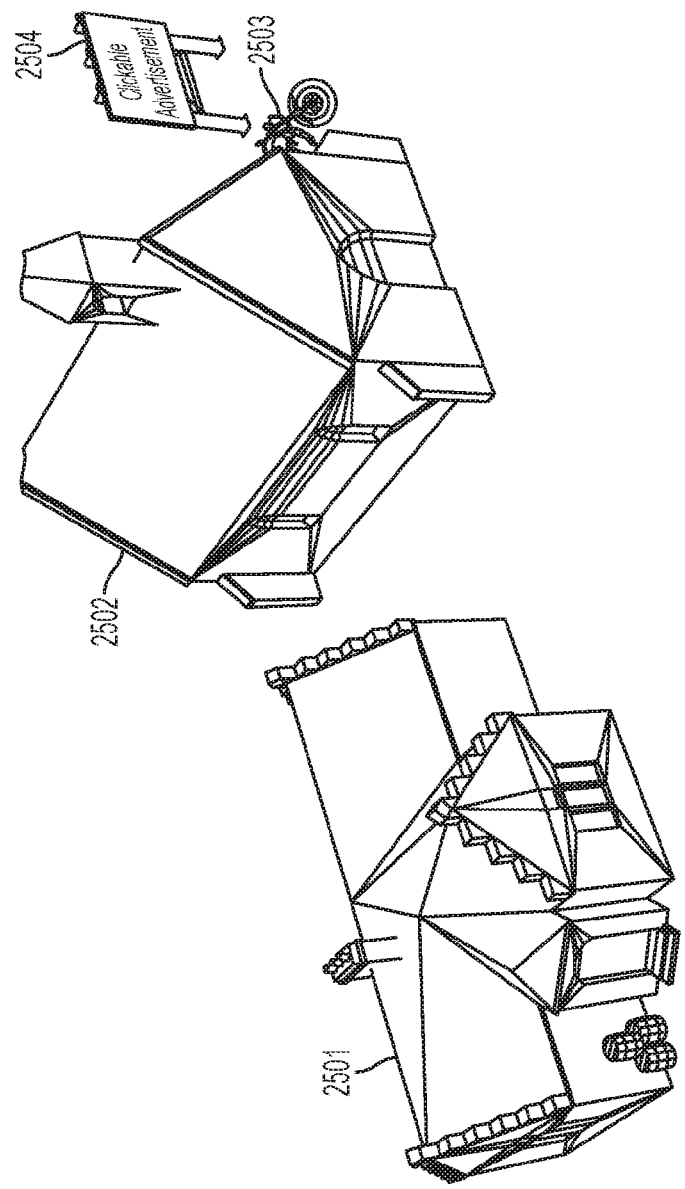
FIG. 25B is an exemplary diagram of the same modeled environment illustrated in FIG. 25A but in perspective view.

FIG. 25A illustrates a modeled 3D environment. Hidden line view is shown in the figure. In some embodiments, the models are rendered using advanced shading and illumination methods. FIG. 25A illustrates 3D models of a house (2501) a chapel (2502) a motorcycle (2503) and a billboard (2504). FIG. 25B is a diagram of the same modeled environment illustrated in FIG. 25A in perspective view.

Figure 26A:
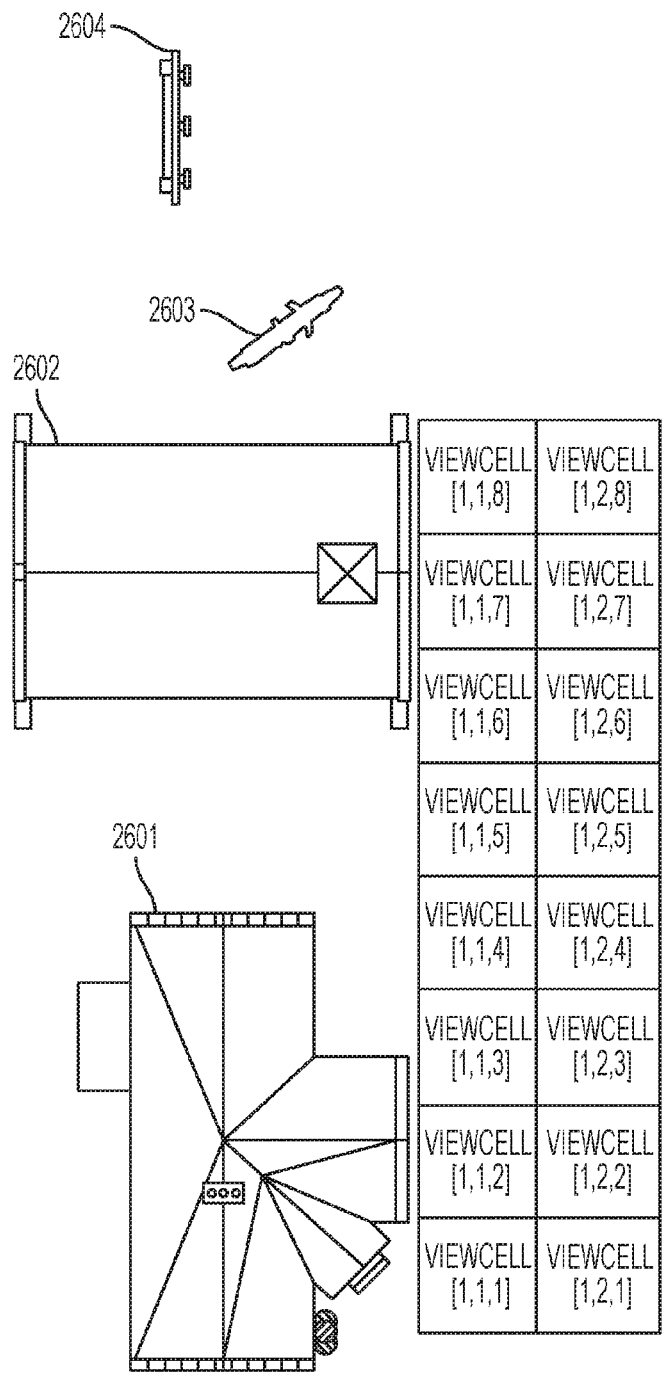
FIG. 26A is an exemplary diagram illustrating a top orthographic view of the same modeled environment of FIG. 25A and FIG. 25B, and including an array of viewcells.

FIG. 26A is a diagram illustrating a top orthographic view of the same modeled environment of FIG. 25A and FIG. 25B, and including an array of viewcells.

Figure 26B:
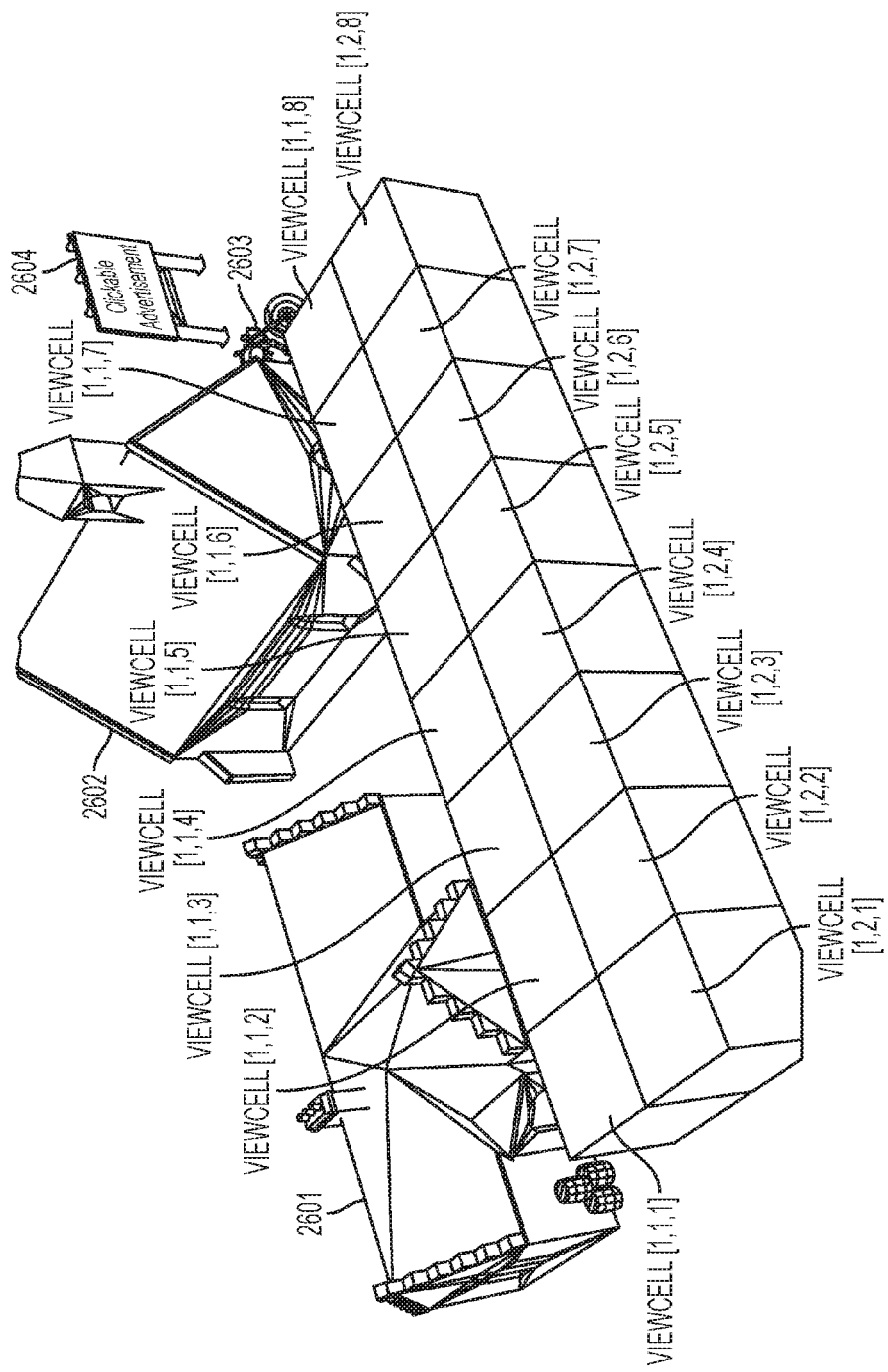
FIG. 26B is an exemplary diagram illustrating the same modeled environment of FIG. 26A but in perspective view.

FIG. 26B is a diagram illustrating the same modeled environment of FIG. 26A but in perspective view.

Figure 26C:
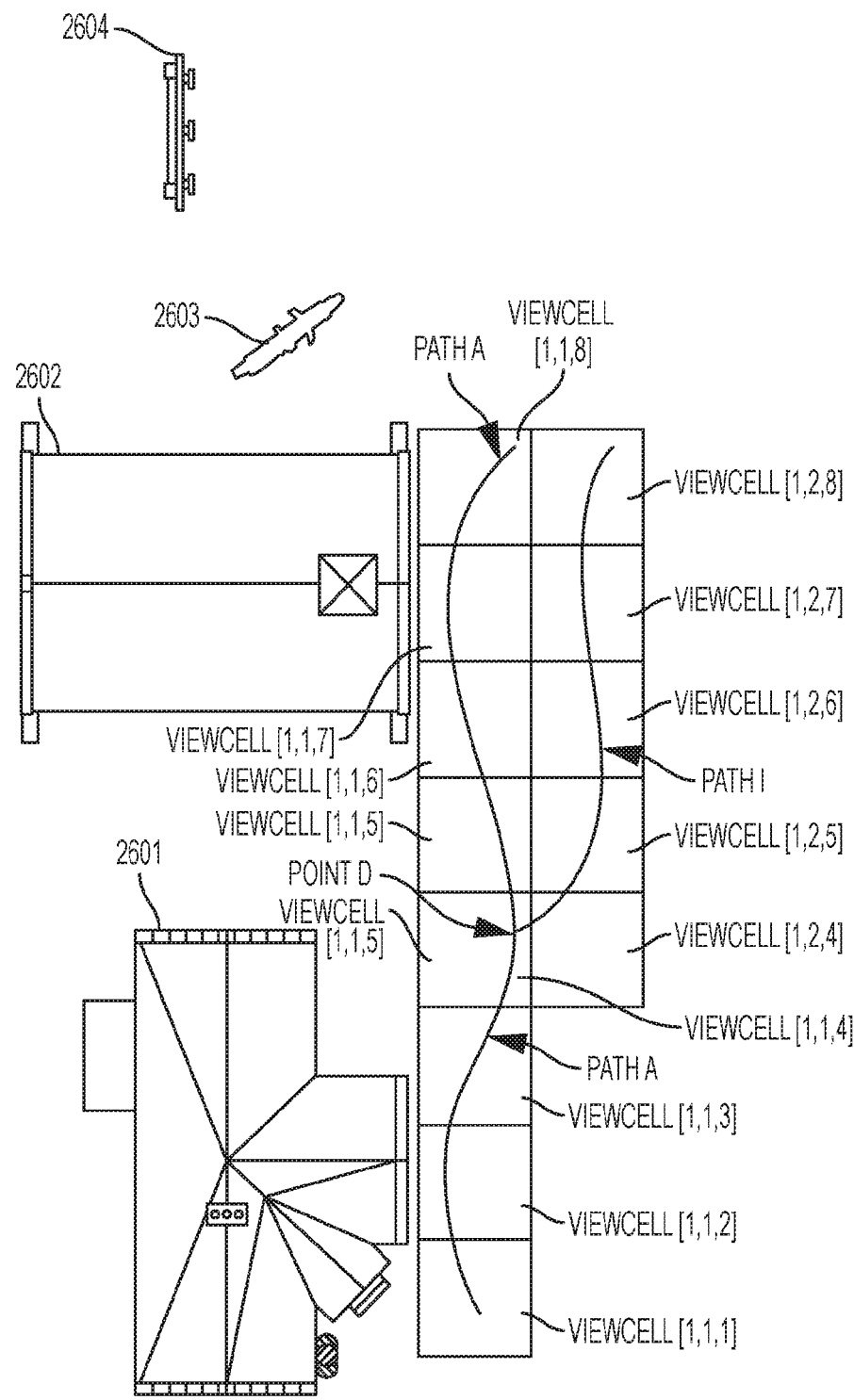
FIG. 26C is an exemplary diagram illustrating a top orthographic view of the same modeled environment of FIG. 26A and including two exemplary camera/viewpoint motion paths, with one scripted camera/viewpoint motion path changing to a camera/viewpoint motion path under interactive control of a client-user.

FIG. 26C is a diagram illustrating a top orthographic view of the same modeled environment of FIG. 26A and including two exemplary camera/viewpoint motion paths, with one scripted camera/viewpoint motion path changing to a camera/viewpoint motion path under interactive control of a client-user.

FIG. 26C shows the same view as FIG. 26A and including two camera/viewpoint motion paths. The camera/viewpoint motion paths are showed as curved lines inside, but very near the top boundaries of the viewcells. A first camera/viewpoint motion path is labeled PATH A, and in one embodiment corresponds to a prescribed camera/viewpoint motion path. A second camera/viewpoint motion path is labeled PATH I, and corresponds to a camera/viewpoint motion path that is under interactive control of a client-user.

A visibility event decoder-server process using navigation-based prefetched driven by the exemplary prescripted camera/viewpoint motion path PATH A, results in the streaming of seven visibility event packets corresponding to the viewcell-viewcell transition boundaries between:

viewcell [1,1,1] and viewcell [1,1,2]
viewcell [1,1,2] and viewcell [1,1,3]
viewcell [1,1,3] and viewcell [1,1,4]
viewcell [1,1,4] and viewcell [1,1,5]
viewcell [1,1,5] and viewcell [1,1,6]
viewcell [1,1,6] and viewcell [1,1,7]
viewcell [1,1,7] and viewcell [1,1,8]

In exemplary embodiments, for a prescripted camera/viewpoint motion path such as PATH A, only visibility event packets corresponding to viewcell-viewcell boundaries that are actually penetrated by the motion path are delivered. In FIG. 26C, only the viewcells having boundaries corresponding to visibility event packets delivered during the visibility event content stream are shown. Thus, viewcell [1,2,1] and viewcell [1,2,2] (as shown in FIG. 26A) are not shown in FIG. 26C, since the prescripted camera/viewpoint motion path PATH A does not penetrate these viewcells.

In the exemplary embodiment of FIG. 26C, the camera/viewpoint motion path labeled PATH I, corresponds to a camera/viewpoint motion path that comes under interactive control of a client-user at the point labeled POINT D. In the example of FIG. 26C, the visibility event content streaming being received by the decoder-client process being used by the client-user corresponds to the visibility event packets prefetched by crossing the viewcell boundaries penetrated by PATH A until POINT D is encountered. In this example, at POINT D, the client-user chooses to receive an interactive visibility event packet stream that is prefetched based on the client-user's inputs into a controlling device such as a mouse or game controller. As described in conjunction with the method of FIG. 24A and FIG. 24B (as well as the later FIG. 35A and FIG. 35B), in some embodiments, the decoder-server process delivering the visibility event packets to a specific decoder-client process rapidly transitions from prefetching visibility event packets corresponding to a pre-scripted camera/viewpoint motion path to prefetching visibility event packets corresponding to a camera/viewpoint motion path that is being controlled by the client-user.

Figure 26D:
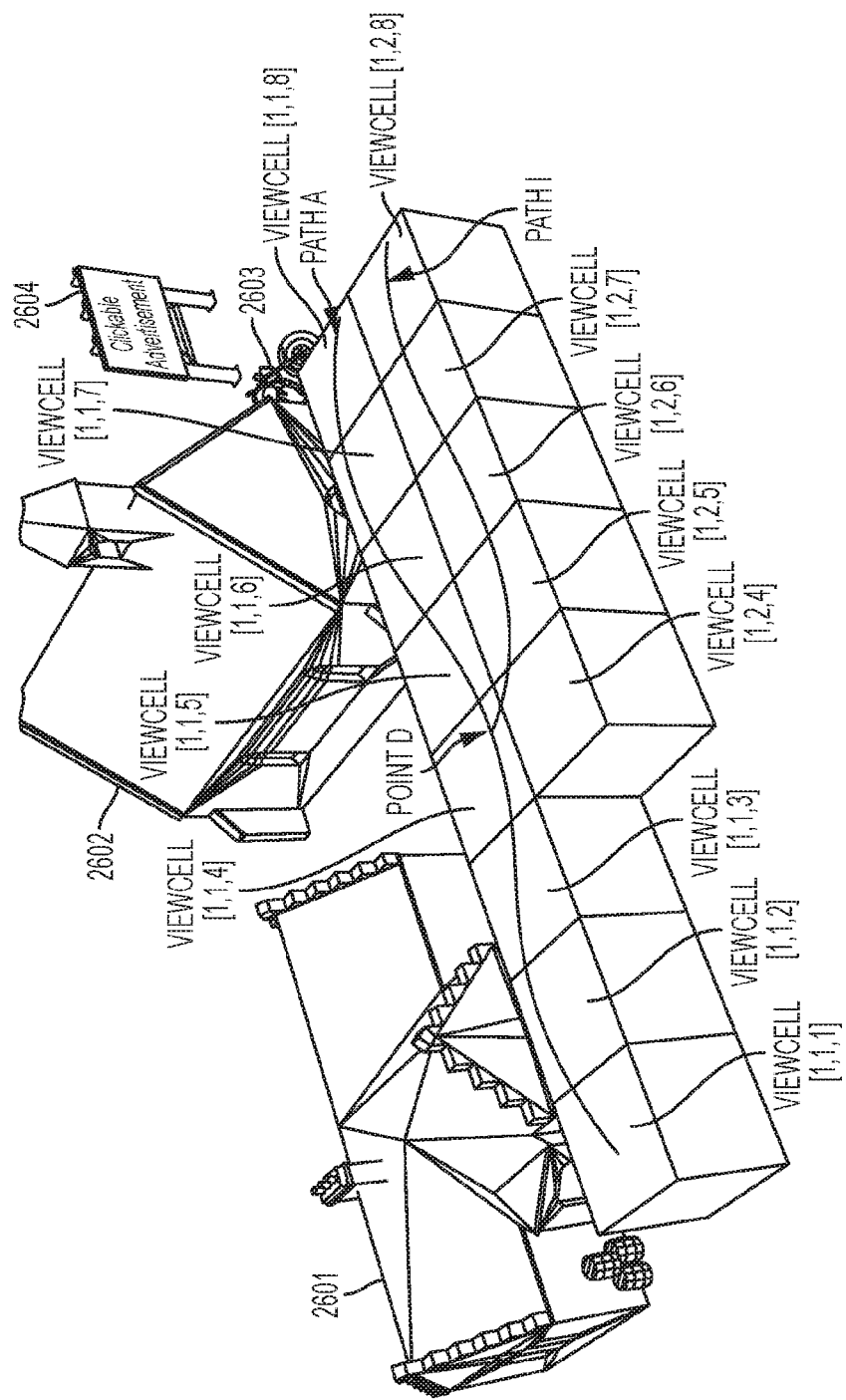
FIG. 26D is an exemplary diagram illustrating a perspective view of the same modeled environment of FIG. 26C and including two exemplary camera/viewpoint motion paths, with one scripted camera/viewpoint motion path changing to a camera/viewpoint motion path under interactive control of a client-user.

In the example of FIG. 26A, FIG. 26B, FIG. 26C and FIG. 26D, the viewcells correspond to navigation cells the viewcells shown in FIG. 26A and FIG. 26B are the only viewcells that exist in the region of the two camera/viewpoint motion paths shown in FIG. 26C and FIG. 26D. In this example the array of viewcells in the vicinity of the modeled objects corresponds to predefined path (e.g., narrow street) or region in which navigation is relatively restricted.

Consequently, in the example shown in FIG. 26C, for the interactive camera/viewpoint motion path PATH I, taken by the client-user, only the additional visibility event packets corresponding to the boundaries between the set of viewcells: viewcell [1,1,5]; viewcell [1,1,6]; viewcell [1,1,7]; viewcell [1,1,8]; and between this set of viewcells and their neighbors: [1,2,5]; viewcell [1,2,6]; viewcell [1,2,7]; viewcell [1,2,8] would, in some embodiments be prefetched during the interactive visibility event data stream corresponding to PATH I.

FIG. 26D is a diagram illustrating a perspective view of the same modeled environment of FIG. 26C and including two exemplary camera/viewpoint motion paths, with one scripted camera/viewpoint motion path changing to a camera/viewpoint motion path under interactive control of a client-user.

FIG. 26D illustrates the same objects as FIG. 26C, but from a perspective view.

Figure 26E:
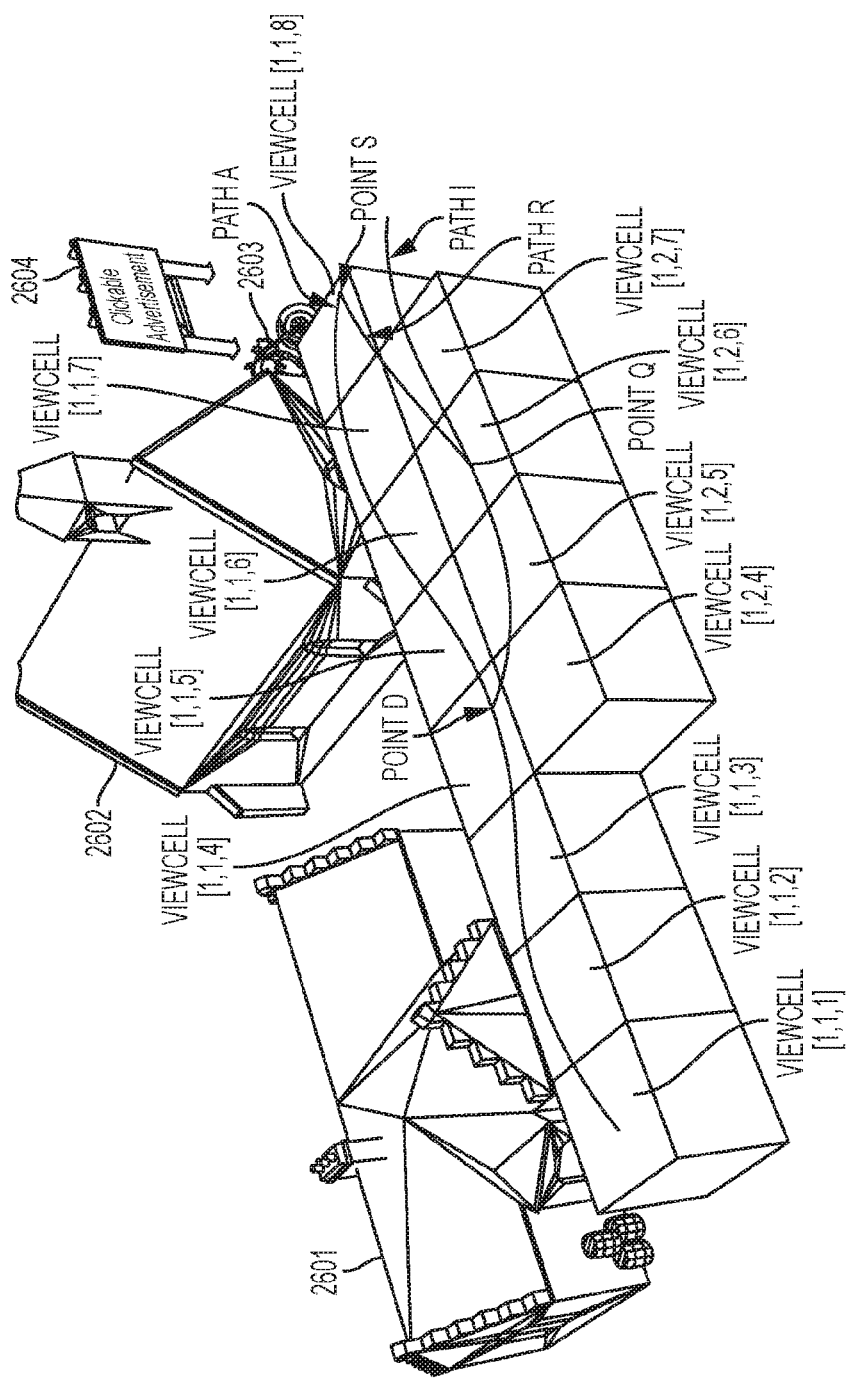
FIG. 26E is an exemplary diagram illustrating the same perspective view of the same modeled environment of FIG. 26D and including three exemplary camera/viewpoint motion paths, with one scripted camera/viewpoint motion path changing to a camera/viewpoint motion path under interactive control of a client-user, and a third camera/viewpoint motion path effecting a resynchronization from the interactive motion path to the prescripted motion path.

FIG. 26E is a diagram illustrating the same perspective view of the same modeled environment of FIG. 26D and including three exemplary camera/viewpoint motion paths, with one scripted camera/viewpoint motion path changing to a camera/viewpoint motion path under interactive control of a client-user, and a third camera/viewpoint motion path effecting a resynchronization from the interactive motion path to the prescripted motion path.

FIG. 26E illustrates the same objects as FIG. 26D and adds a third camera/viewpoint motion path labeled PATH R. PATH R begins at the point labeled POINT Q. In this exemplary embodiment, POINT Q corresponds to a point in space and time that the client-user navigating PATH I chooses to relinquish interactive control of the camera/viewpoint and rejoin the prescripted camera/viewpoint motion path. As described in conjunction with FIG. 15A and FIG. 15B, this decoder-client-user decision can be signaled to the corresponding decoder-server process either as an active signal or as a default behavior if interactive control is not received from the corresponding decoder-client process after a specified period of time.

The camera/viewpoint motion PATH R, in some embodiments, is determined at runtime as a trajectory that intersect the prescripted camera/viewpoint motion path at an instant in time when the prescripted camera/viewpoint is located at the intersected point of the prescripted camera/viewpoint motion path. In the example of FIG. 26E, the point of resynchronization with PATH A occurs at the labeled point POINT S. In such embodiments, the determined trajectory effects a seamless resynchronization with one or more prescripted camera/viewpoint motion paths that comprise a broadcast visibility event based streaming interactive media (SIM) programming. As illustrated in FIG. 26E, in some embodiments, at the instant a user decides to switch from the interactive stream to the deterministic stream (i.e., point Q), the Path R follows a natural progression back to the deterministic stream. For example, at point Q, the user is currently located in viewcell [1,2,6], and the closest portion of the deterministic stream is located in viewcell [1,1,6]. Instead of immediately jumping from viewcell [1,2,6] to viewcell [1,1,6], the user rejoins the deterministic stream at viewcell [1,1,2] via viewcell [1,2,7].

The motion path labeled PATH R, connecting the fully interactive motion path with the prescripted motion path is, itself, a scripted motion path (e.g., in some embodiments, determined at runtime). In the example of FIG. 26E, the scripted motion path PATH R will not penetrate Viewcell [1,2,8]. Consequently this viewcell is not shown in FIG. 26E. This is consistent with the general principle of operation that a transition from an interactive camera/viewpoint motion path to a prescripted path decreases the size of the visibility event data that must be prefetched and cached, and thus allowing faster navigation, less bandwidth consumption or both.

Method of Delivering Interactive Content as Un-Encoded Data and Performing Encoding on Client Unit Prior to Using Content and Method of Using Distributed Computing to Compute Visibility Event Data on Client Work Units FIG. 27 is an exemplary flow diagram showing a method of delivering interactive content as un-encoded data and performing encoding on a client unit prior to using content.

Data store 2705 is un-encoded game content which may include geometry, texture, material, lighting and other data representing the modeled environment. In step 2710, un-encoded game data is subject to the method of encoding described in the co-pending PCT patent application number PCT/US2011/042309. This encoding produces delta-PVS packets, also called visibility event packets. In some embodiments, the encoded data is stored in data store 2720.

In some embodiments, these packets include geometry and/or texture information that conservatively becomes newly visible during a corresponding viewcell transition between viewcells having a contiguous or a contained relationship. According to some embodiments, the phrase "conservatively becomes visible" includes all graphics elements that become visible for a viewcell transition, and may also include graphics elements that do not actually become visible for the viewcell transition (depending on the precision of the PVS/delta-PVS determination). The methods described in the co-pending PCT patent application number PCT/US2011/042309, a subset of which are also described in FIG. 1 through FIG. 14 of the present specification, enable a precision-controlled determination of PVS/delta-PVS. Alternatively, in some embodiments, as described in the co-pending PCT patent application number PCT/US2011/042309, the visibility event data is stored in an algorithmically compressed format as an intermediate representation using labeled silhouette edges. Newly occluded geometry and texture information may also be stored in 2720.

In some embodiments, the step 2710 is executed on the client unit. This implementation allows generation of all or part of the delta-PVS data directly on the client unit before it is required. This implementation may be useful when the client unit has a limited or no connection to a server unit. It can also be employed when a high-precision visibility precomputation is employed during the encoding process of the co-pending PCT patent application number PCT/US2011/042309. In this case, the size of the delta-PVS data, stored in data store 2720, may be too large to practically store on distributable media and load directly into the client unit.

In one embodiment, the delta-PVS visibility event packets computed on a client unit is sent to a server unit for later use by other users. In exemplary flow diagram of FIG. 27 this optional transmission of the visibility event packet(s) determined on a client unit to a server unit is shown as step 2725.

In step 2730, conducted on a server unit, the visibility event packet/work unit is received by the server unit and the data is stored in data store 2735. In some embodiments, step 2730 also sends a proof of work data token to the client unit that determined a corresponding delta-PVS data packet and transmitted it to the client. This data is labeled 2743. This proof of work information acts as compensation to the operator-owner of the client unit for computing a specific visibility event (delta-PVS) PACKET. This proof of work information packet can later be used as currency in a manner similar to bitcoins (e.g., in this case allowing the user of the client unit to use the proof of work currency to purchase visibility event based content or other goods or services). In exemplary embodiments, each visibility event packet for each game or SIM application is given a serial number which simplifies the distribution of work units between servers and clients.

As an example, prior to release of a game on the market (or during a beta release), the precomputed delta-PVS data for each possible viewcell to viewcell transition in a modeled environment of the newly released game may not exist. Accordingly, in some embodiments, users are sent work packets during the pre-release or pre-purchase period and the delta-PVS data may be computed on the user's client device and transmitted to the server. As compensation for computing the delta-PVS data, the user receives a proof of work token redeemable for a discount on the game or for other products or services. Therefore, the user has incentive to pre-purchase the game and consequently receive the work packets.

In a subsequent step 2740, the server unit determines additional delta-PVS packets that must be computed, and sends instructions to determine these packets to the client unit. In some embodiments, the data that is required by the client unit in order to compute the visibility event packet data is included with work unit instructions sent to the client unit as the data labeled 2742 rather than supplied by the entire game database 2705. In some embodiments, work packets are made available until the visibility event packets corresponding to each navigable viewcell boundaries/transitions of a game are completed.

FIG. 27B is a diagram illustrating an exemplary embodiment of a data structure including work instructions for visibility event precomputation work to be completed by a client unit.

Figure 27A:
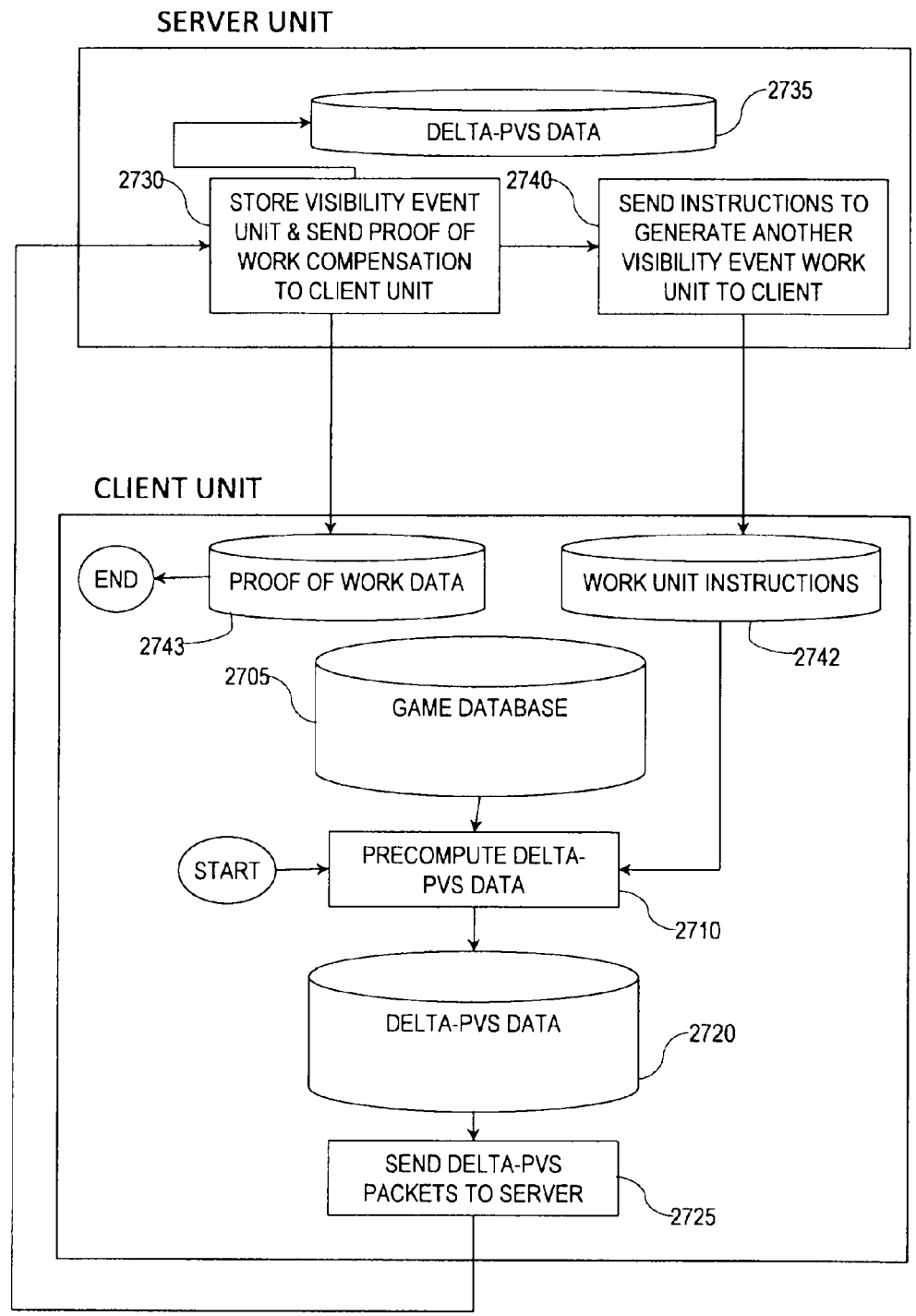
FIG. 27A is an exemplary block diagram/flowchart showing a method of delivering interactive content as un-encoded data and performing visibility event encoding on a client unit.

FIG. 27B is a diagram illustrating an exemplary embodiment of a data structure including work instructions for visibility event precomputation work to be completed by a client unit. In some embodiments, the data structure of FIG. 27B is used to convey visibility precomputation work as indicated by data labeled 2742 in FIG. 27A.

The data structure of FIG. 27B includes a field indicating the client-user's identifier or subscriber ID. As each client-user may control more than one client device a unique client device field is also included. This device identifier may, in some embodiments include IP data or other unique device data identifying a client unit or IP address. In some embodiments, a third field identifies the game or SIM content for which the visibility precomputation is to be performed. In some embodiments, another field contains an unique identifier for a specific viewcell in the navigable space of the game or SIM. In some embodiments the viewcell identifier is determined from the indices of a three dimensional array of viewcells in the modeled environment. In some embodiments, another field includes a unique identifier for a specific boundary of the viewcell. This viewcell boundary information includes, in some embodiments, a reference to a specific face of the viewcell corresponding to a specific visibility packet. Another field includes parameters of the viewcell. In some embodiments these parameters include the dimensions of the viewcell and location of the viewcell. In some embodiments another field includes viewcell boundary parameters. Viewcell boundary parameters include, in some embodiments, information indicating neighboring viewcells on each face of the viewcell.

In some embodiments the visibility event precomputation work instructions include the graphical object information (e.g. polygon and polygon mesh connectivity information) required to perform from-viewcell visibility precomputation. In some embodiments this information includes texture vertex information.

FIG. 27C is a diagram illustrating an exemplary embodiment of a data structure including completed work data for visibility event precomputation, completed by a client unit and sent to a server unit.

FIG. 27C is a diagram illustrating an exemplary embodiment of a data structure including completed work data for visibility event precomputation, completed by a client unit and sent to a server unit. In some embodiments, the data structure of FIG. 27C is used to convey completed visibility precomputation work from a client unit to a server unit as sent by process 2725 of FIG. 27A and received by process 2730 and stored in data store 2735 of FIG. 27A.

The data structure of FIG. 27C includes a field indicating the client-user's identifier or subscriber ID. As each client-user may control more than one client device a unique client device field is also included. This device identifier may, in some embodiments include IP data or other unique device data identifying a client unit or IP address. In some embodiments, a third field identifies the game or SIM content for which the visibility precomputation is to be performed. In some embodiments, another field contains an unique identifier for a specific viewcell in the navigable space of the game or SIM. In some embodiments the viewcell identifier is determined from the indices of a three dimensional array of viewcells in the modeled environment. In some embodiments, another field includes a unique identifier for a specific boundary of the viewcell. This viewcell boundary information includes, in some embodiments, a reference to a specific face of the viewcell corresponding to a specific visibility packet.

In some embodiments the completed work packet includes PVS or visibility event information which may include the DeltaGplussubmesh information described in FIG. 13.

FIG. 27D is a diagram illustrating an exemplary embodiment of a data structure including information describing a proof-of-work token corresponding to a specific completed work packet for visibility event precomputation, completed by a client unit.

FIG. 27D is a diagram illustrating an exemplary embodiment of a data structure including information describing a proof-of-work token corresponding to a specific completed work packet for visibility event precomputation, completed by a client unit. In some embodiments, the data structure of FIG. 27C is used to convey a token of proof of completed visibility precomputation work performed by a client unit. In some embodiments this proof-of-work token is sent by the server unit to the client unit in step 2730 of FIG. 27A and stored by the client unit in data store 2743.

The data structure of FIG. 27D includes a field indicating the client-user's identifier or subscriber ID. As each client-user may control more than one client device a unique client device field is also included. This device identifier may, in some embodiments include IP data or other unique device data identifying a client unit or IP address. In some embodiments, a third field identifies the game or SIM content for which the visibility precomputation is to be performed. In some embodiments, another field contains an unique identifier for a specific viewcell in the navigable space of the game or SIM. In some embodiments the viewcell identifier is determined from the indices of a three dimensional array of viewcells in the modeled environment. In some embodiments, another field includes a unique identifier for a specific boundary of the viewcell. This viewcell boundary information includes, in some embodiments, a reference to a specific face of the viewcell corresponding to a specific visibility packet.

In some embodiments the time and date of completion of the work is stored in another field. In some embodiments the monetary value of the token is stored.

The fields define a unique proof-of-work token corresponding to a specific visibility event precomputation. As described in conjunction with FIG. 27A these tokens can be used by a client-user for goods and services in return for the visibility precomputation work provided.

In some embodiments the proof-of-work token is a reusable proof-of-work currency, such as bitcoin, that can be exchanged for goods and services provided by a number of vendors.

Figure 28A:
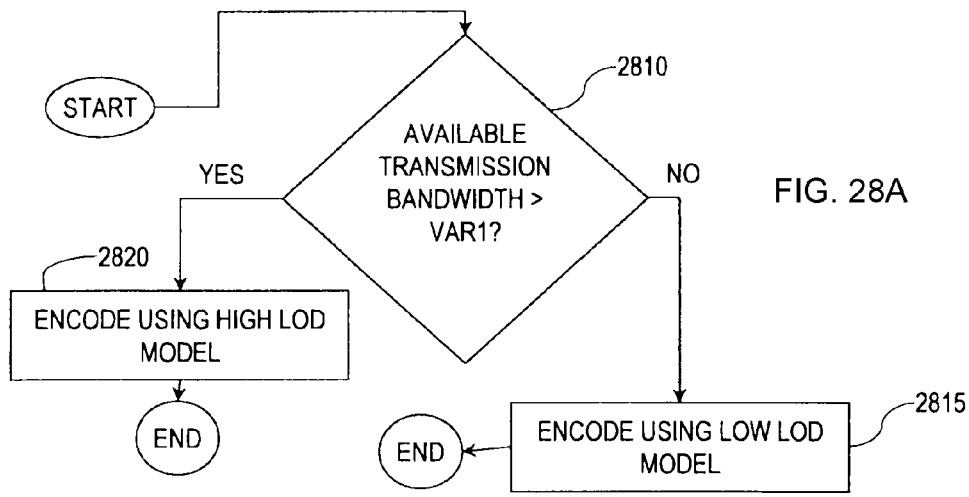
FIG. 28A, is an exemplary flow diagram showing methods of encoding visibility event packets at a relative level-of-detail that is a function of the available transmission bandwidth between a server and a client unit.
Figure 28B:
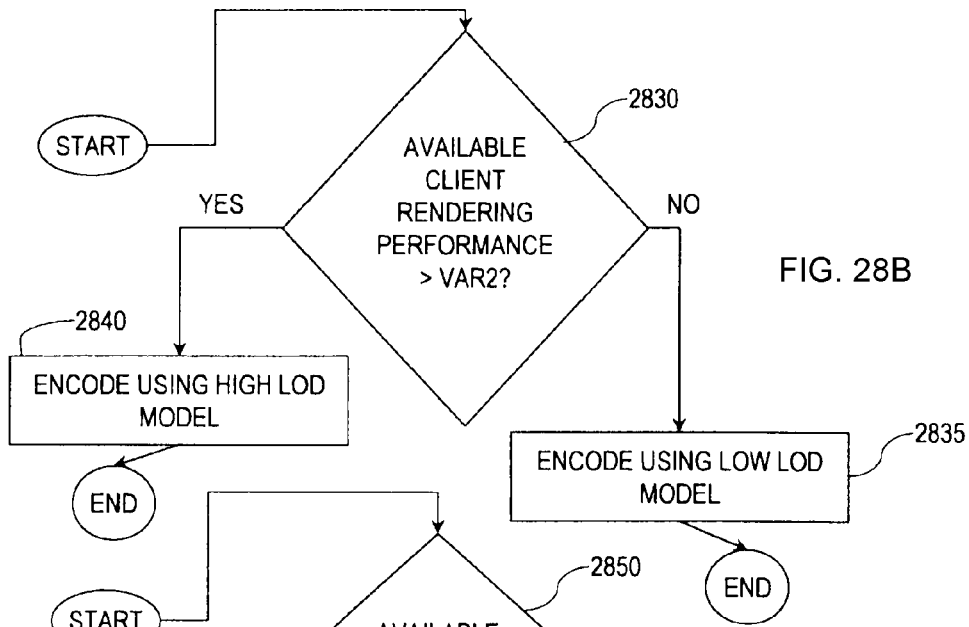
FIG. 28B, is an exemplary flow diagram showing methods of encoding visibility event packets at a relative level-of-detail that is a function of the rendering performance of the client unit.
Figure 28C:
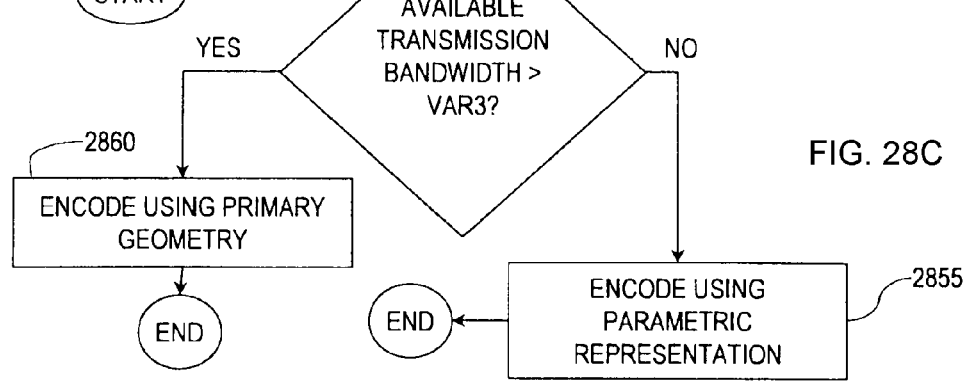
FIG. 28C, is an exemplary flow diagram showing methods of encoding visibility event packets as direct geometric representation or parametric representation depending upon the available transmission bandwidth between a server and a client unit.

Method of Encoding Interactive Content at Different Levels of Detail Based on the Available Transmission Bandwidth and Client Graphics Performance FIG. 28A, FIG. 28B and FIG. 28C are exemplary flow diagrams showing how the encoding process described in the co-pending PCT patent application number PCT/US2011/042309 employs geometry and/or texture information at specific levels of detail wherein the level of detail is in some proportion to the maximum available transmission bandwidth and/or the available rendering performance of the client unit.

The method of the co-pending PCT patent application number PCT/US2011/042309 specifies techniques in which relatively lower level-of detail visibility event packets are dynamically selected for transmission during periods when late packet arrival may occur. The methods of FIG. 28A, FIG. 28B, and FIG. 28C are static methods of encoding visibility event packets at a relative level-of-detail that reflects the maximum available transmission bandwidth or the maximum client rendering performance. The previously described method of encoding visibility event packets having a lower level-of-detail and selecting these packets for transmission during periods of potential late packet arrival are employed, in some embodiments, together with the methods of FIG. 28A-28C.

In decision step 2810 of the exemplary flow diagram of FIG. 28A, it is determined if the maximum available transmission bandwidth is greater than a predetermined value, in this case VAR1. If, in decision step 2810, it is determined that the available transmission bandwidth exceeds a predetermined value, then process flow proceeds to step 2820. In step 2820 encoding is conducted using a high level of detail model. The level-of-detail of the model is determined by factors which include, in some embodiments, the geometric level-of-detail, texture resolution, and lighting detail.

If, on the other hand, it is determined in decision step 2810 that the available transmission bandwidth is not greater than a predetermined value, then process flow proceeds to step 2815. In step 2815, the encoding process described in the co-pending PCT patent application number PCT/US2011/042309 is conducted using a lower level of detail model.

In the exemplary flow diagram of FIG. 28B, in decision step 2830, it is determined if the maximum available client rendering performance is greater than a predetermined value VAR2. If in decision step 2830 it is determined that the maximum available client rendering performance is greater that the predetermined value VAR2, then process flow proceeds to step 2840 in which the visibility event packets are encoded at a high level-of-detail. If, on the other hand, it is determined in decision step 2830 that the available client rendering performance is not greater than the predetermined value VAR2, then process flow proceeds to step 2835. In step 2835, the encoding process described in the co-pending PCT patent application number PCT/US2011/042309 is conducted using a lower level-of-detail model. Once again, the level-of-detail of the model is determined by factors which may include, in some embodiments, the geometric level-of-detail, texture resolution, and lighting detail.

According to some embodiments, multiple encodings are conducted and stored for the same modeled environment. The appropriately encoded visibility event data can be statically selected for real-time prefetch-decoding based on the maximum available transmission bandwidth and/or the client rendering performance. In addition, the level-of-detail, in some embodiments, is further adaptively selected to prevent late packet arrival based on the methods described in the co-pending PCT patent application number PCT/US2011/042309.

Various parametric representations of geometric models are possible in some embodiments. These parametric representations include curved surfaces represented by Bezier and other higher-order surfaces. Parametric surfaces are a type of procedural surface. Procedural surfaces also include, in some embodiments, procedurally defined models such as extrusions (with or without beveling), surfaces of revolution and other, more complex procedural models.

These procedurally defined models can generally be described using a small amount of information that comprises the parameters of the procedure. At runtime, relatively large amounts of information comprising surface geometry, e.g. polygons, can be generated from the small amount of parametric information and the corresponding procedural generation processes. As an example, parametric information can include control vertices for a rational b-spline surface, from which many polygons can be generated at runtime. (Examples of graphics information being efficiently stored as parametric models include Autodesk Corporation's 3D Studio Max product, and Parametric Technology Corporation's Pro-Engineer product and as described, in the case of spline-based surfaces in the publication "Geometric Modeling with Splines, Cohen, E., Riesenfeld, R., Elber, G. 2001, A. K. Peters, the entire contents of which are incorporated by reference.)

In decision step 2850, of the exemplary flow diagram FIG. 28C, it is determined if the maximum available transmission bandwidth is greater than a predetermined value, in this case VAR3. If, in decision step 2810, it is determined that the available transmission bandwidth exceeds a predetermined value, then process flow proceeds to step 2860. In step 2860 encoding is conducted using the primary, non-procedural representation.

If, on the other hand, it is determined in decision step 2850 that the available transmission bandwidth is not greater than a predetermined value then process flow proceeds to step 2855. In step 2855, the encoding process described in the co-pending PCT patent application number PCT/US2011/042309 is conducted using a parametric representation.

In addition, in some embodiments the selection of visibility event packets encoded with primary geometry vs. visibility event packets encoded with parametric representation of geometry is also made adaptively during runtime to prevent late packet arrival based on the methods described in the co-pending PCT patent application number PCT/US2011/042309, as well as methods discussed in conjunction with FIG. 42A and FIG. 42B of the current specification.

Figure 29:
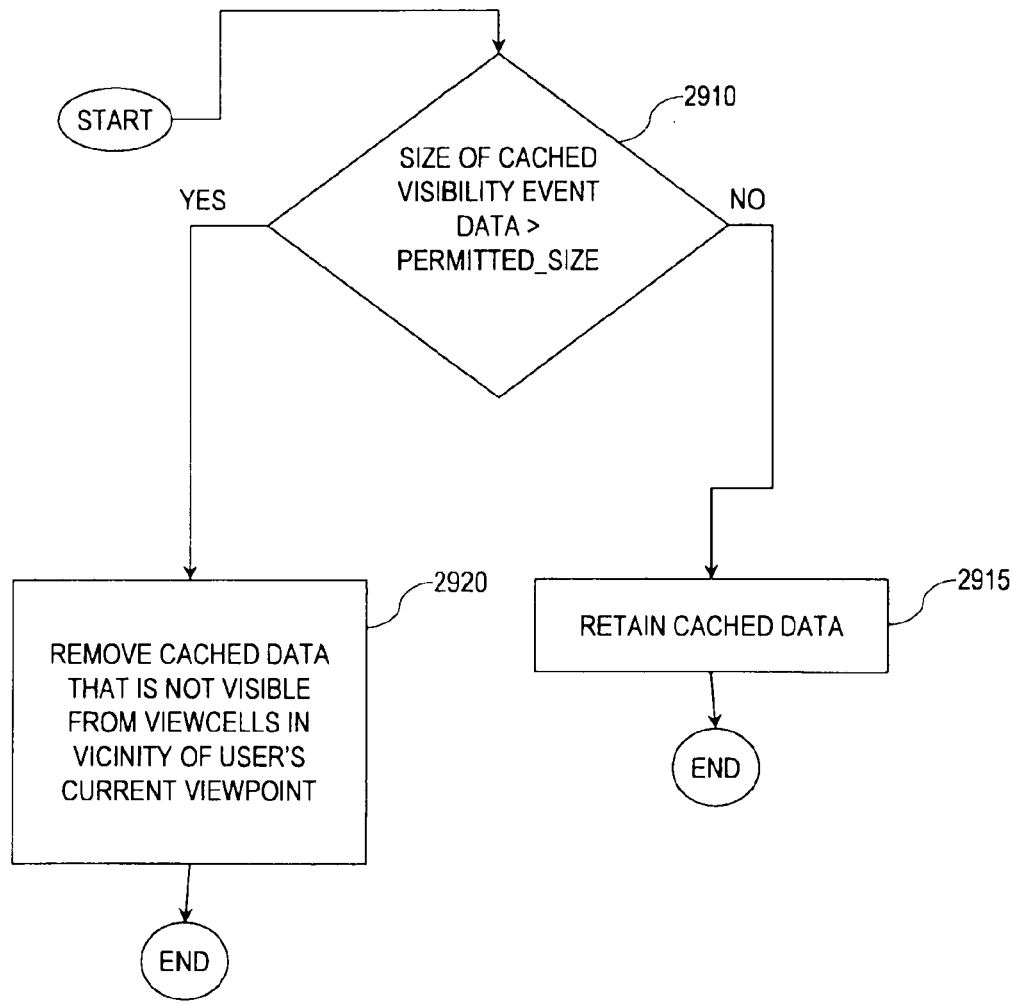
FIG. 29 is an exemplary flow diagram showing a method of controlling the amount of cached visibility event and PVS data that may be stored on a client unit.

FIG. 29 Method of Removing Cached Visibility Event Data on Client Unit if the Size of the Cached Data Exceeds a Permitted Value.

Exemplary flow diagram of FIG. 29 shows a method of controlling the amount of cached visibility event and PVS data that may be stored on a client unit. In exemplary flow diagram of FIG. 29, in decision step 2910, it is determined if the size of the cached data on the client unit exceeds a predetermined value, in this case PERMITTED_SIZE. The cached data may be un-decoded visibility event data, decoded visibility event data (i.e., delta-PVS data), PVS data or a combination of all three.

If, in decision step 2910, it is determined that the size of the cached data on the client unit exceeds the PERMITTED_SIZE, then process flow proceeds to step 2920.

In step 2920, cached data representing PVS data that is not visible from the vicinity of the of the user's viewpoint, or delta-PVS data that is not readily reachable from the user's current viewpoint (e.g., corresponding to viewcell transition boundaries that are not in the vicinity of the viewcell containing the user's current viewpoint location) are removed from the cache.

This removal process results in a cache that is, at any time, generally much smaller than the entire model. This prevents unauthorized duplication (e.g., copying or piracy) of the content, since only a small fraction of the data is stored on the client at any one time. If in step 2910, if it is determined that the cache size is not greater than the PERMITTED_SIZE, then process flow proceeds to step 2915, in which no cached elements are removed.

Method of Streaming Advertising and Targeted Advertising During Low Bandwidth Requirement Periods of a Streaming Interactive Media Data Stream.

Figure 30:
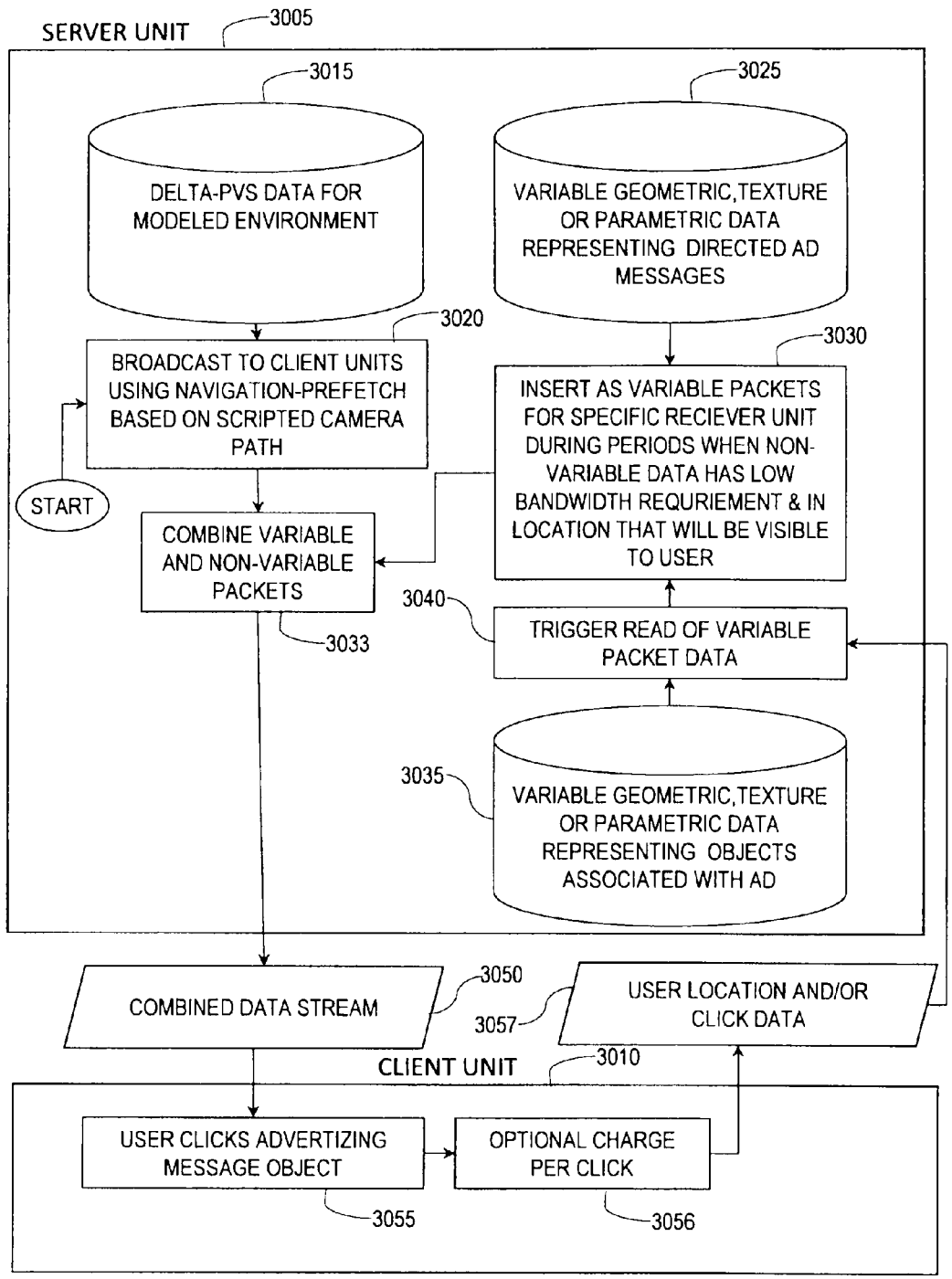
FIG. 30 is an exemplary flow diagram illustrating a method of streaming visibility event packets including geometry information, texture information, or instructions to generate geometry or texture information, wherein the visibility event information represents advertising and targeted advertising during low bandwidth requirement periods of a broadcast streaming interactive media data stream.

FIG. 30 is an exemplary flow diagram illustrating a method of streaming visibility event packets including geometry information, texture information, or instructions to generate geometry or texture information, wherein the visibility event information represents advertising and targeted advertising during low bandwidth requirement periods of a streaming interactive media data stream.

A server unit is labeled 3005. A specific client unit is labeled 3010. In some embodiments, the server unit is connected to multiple client units.

In some embodiments, the non-variable visibility event data includes the majority of the content of the modeled environment including buildings, vehicles, avatars, and other content that do not represent advertising, cash store, or messaging objects that are unique to a particular client-user.

In contrast, the variable visibility event data (stored in data store 3025 of this exemplary embodiment) represents advertising, cash store, messaging or other objects that are unique to a particular client-user.

Both non-variable and variable visibility event data is prefetched to client units based on camera/viewpoint movements which may either be determined by a prescribed camera motion path or may be driven by interactive user control of camera/viewpoint motion.

Cash store objects include objects or representations of objects in the modeled environment that can be selected by a client-user, and wherein the selection of the cash store object makes the object available for use by the client-user. In some embodiments, the selection of the cash store object results in a monetary charge to the client-user. Examples of cash store items include modeled apparel, weapons, accessories, vehicles, real estate, and any other types of objects that can be represented in a modeled environment.

Messaging objects include objects or representation of objects in the modeled environment that convey a message to the client-user. Examples of messaging objects include billboards, engravings or markings on avatars, vehicles, or apparel, flying logos or any other types of objects that can be represented in the modeled environment. In some embodiments, the messaging object can be interacted with by the client-user to send a return message.

Advertising objects also include objects or representation of objects in the modeled environment that convey an advertisement to the client-user. Examples of advertising objects include billboards, engravings or markings on avatars, vehicles, or apparel, flying logos or any other types of objects that can be represented in the modeled environment. In some embodiments the messaging object can be interacted with by the client-user and the interaction is recorded as a user click of a clickable advertisement.

In the exemplary embodiment of FIG. 30, the visibility event packets are streamed based on a scripted, predetermined camera path, in which case the same non-variable visibility event data stream is broadcast to a plurality of connected client units. Data store 3015 stores non-variable delta-PVS or visibility event packets. In this exemplary embodiment the non-variable visibility event packets include geometry and texture information that is prefetched based on a prescripted camera path. The resulting visibility event data stream is called a streaming interactive media (SIM) data stream. In exemplary embodiments, a SIM data stream is delivered, in nominal operating mode, as a visibility event data stream that is driven by a prescripted camera motion path. (As illustrated in the exemplary embodiments of FIG. 24A and FIG. 24B, as well as FIG. 35A and FIG. 35B, the non-interactive SIM stream can transition to a fully interactive SIM stream under user control.) In further embodiments, this non-variable visibility event data stream is driven by a predetermined scripted camera motion path in which case the resulting SIM allows limited interactivity, as previously described in conjunction with FIG. 24A and FIG. 24B. In this case, the scripted sequence of non-variable visibility event packets is broadcasted to multiple client units simultaneously according to some embodiments.

In step 3020, the non-variable packets including the streaming interactive programming are delivered to client units as non-variable visibility event packets. In the exemplary embodiment of FIG. 30 embodiments, the non-variable visibility event packets are streamed based on a scripted, predetermined camera path, in which case the same non-variable visibility event data stream is broadcast to a plurality of connected client units. In alternative embodiments, non-variable visibility event packets are dynamically prefetched to a specific client unit using navigation-based prefetch in which the camera/viewer motion is interactively controlled by the client user using a mouse, game controller or other device.

A second data store 3025 stores variable data representing directed advertising messages that are streamed to individual, specific client units during the broadcast or non-broadcast delivery of the non-variable visibility event data in some embodiments. According to some embodiments, the directed advertising data is sent as variable packets that are added to the data stream during periods when the bandwidth requirement for sending the non-variable data is low.

In step 3030, the geometric or texture information for an object representing a specific advertising message that will be visible to the user is placed in one or more variable packets that are combined with the broadcast, non-variable packets in step 3033.

Alternate embodiments of the method insert variable packet data, in the step 3030, wherein the variable packet data represents renderable graphics objects or instructions for generating renderable graphics objects that comprise instant messages sent from one user to another user.

In some embodiments, the visibility event data of 3025 is actual geometric and/or texture information. In alternate embodiments, the data is instructions for generating the actual geometric and/or texture information on the client unit. In one embodiment, the data of 3025 includes parameters for the parametric construction of the objects representing the geometric and/or texture information that is the object representing the advertising message. In one embodiment, this parametric information includes references to specific glyphs as well as parameters that describe the extrusion and/or beveling of the glyph outlines to generate 3D logos or engravings representing the advertising message. In further embodiments, other parametric construction techniques are employed to generate billboards, neon signage, scoreboard and other representations with a custom advertising message.

In some embodiments, the data of store 3015 is, in step 3030, associated with a geometric transformation matrix that places the associated object in a location that will likely become visible to the user in a predetermined amount of time, using on the navigation-based prefetch methods described in the co-pending PCT patent application number PCT/US2011/042309 and further improved in the present specification. In one embodiment, the transformation matrix transforms the variable object to a location that is not visible from the current viewcell, but is visible from a viewcell that will soon be penetrated by the camera/viewpoint. The transformation matrix is derived using the prior-art method of matrix concatenation as described in the publication "Introduction to Computer Graphics, Foley, J., Van Dam, Addison Wesley, 1990" incorporated herein by reference, wherein the transformation matrix locates the variable object in a viewcell or navigation cell that is not yet visible to the user but is part of the visibility event cache.

In step 3030, the data representing the advertising object is streamed as a variable packet during periods when the number and size of variable packets being sent is low. In this exemplary embodiment, the variable packets are sent during periods of time when the bandwidth requirement for streaming non-variable packets is low. Even in exemplary implementations such as this, in which the non-variable packets represent prescripted visibility event packets that are broadcast simultaneously to multiple clients, each variable packet is sent only to a specific receiver/client unit during these periods of low bandwidth requirement in some embodiments. The variable packets are sent to one or more specifically targeted receiver units using a packet addressing protocol such as TCP/IP or any other desired routing scheme.

The method of adding variable non-broadcast packets to the data stream during periods of low bandwidth requirement for the non-variable, broadcast packets makes optimal use of the available bandwidth and tends to minimize cases in which the client's cache of visibility event data is outrun by the camera/viewpoint location, which would otherwise correspond to late packet arrival and visibility errors during the client rendering.

In step 3030, the objects representing the advertising messages are specifically located in a part of the modeled environment such that the objects are likely to be visible to the user in a predetermined amount of time. Also, in step 3030 the scheduling of the variable packet transmission is made so that the objects arrive substantially before they become visible, thereby preventing visibility errors caused by late packet arrival.

Exemplary embodiments can also include the method of adaptively using lower level-of-detail visibility event packets to prevent anticipated late packet arrival which is further discussed in conjunction with the method of FIG. 42A and FIG. 42B. As an example, if an object is expected to become visible at time t1, a packet at the current level of detail is scheduled to arrive at the client device at a time prior to time t1 (e.g., time t0). However, if it is determined that the packet at the current level of detail cannot arrive at time t0, than a packet at a lower level of detail is sent to the client device at time t0.

In subsequent step 3033, the non-variable visibility event packets are combined with the variable visibility event packets into a combined data stream indicated as data 3050.

The data stream 3050 is the combined data stream of the broadcast (non-variable) and variable packets that is sent to a specific client unit, indicated by the rectangle 3010.

In step 3055, conducted on a specific client unit, the user may choose to interact with a specific object representing an advertising message. The data representing the time and location (and other information indicating, the object interacted with) is sent from the specific receiver to the server unit. This data transmitted back to the server unit is shown as data labeled 3057.

In step 3040, conducted on the server unit, the user click data received from the client unit data stream indicated by 3057 is used to trigger the read of specific geometric or texture (or parametric) data representing an object associated with the clicked advertisement (AD). In this case, in some embodiments, the represented object includes additional information about the clicked advertisement including a representation of the advertised product or additional product literature or ordering information. In alternative embodiments, the represented object is a click-to-order icon. In some embodiments, a click-to-order icon is displayed on an object in the modeled environment. Upon selection of a click-to-order icon, an order form pops up permitting the user to order a product corresponding to the selected object If the advertised object is a virtual object that may be worn, driven, flown, navigated, or carried by the user's avatar during the remainder of the streaming interactive program then the click may result in a charge to the user as shown in step 3056.

Method of Streaming Advertising and Targeted Advertising During Low Bandwidth Requirement Periods of a Fully Interactive Bidirectional Data Stream.

As previously described, FIG. 30 shows an exemplary embodiment in of the method of inserting variable visibility event data packets into a data stream of non-variable visibility event packets wherein the non-variable visibility event packets represent the majority of modeled objects and the variable visibility event data packets represent advertising, cash store, or messaging objects. In the exemplary embodiment of FIG. 30, both the non-variable and variable visibility event data packets are nominally prefetched based on camera/viewpoint movement determined by a prescribed camera path, corresponding to an animated programming with limited interactivity.

Figure 31:
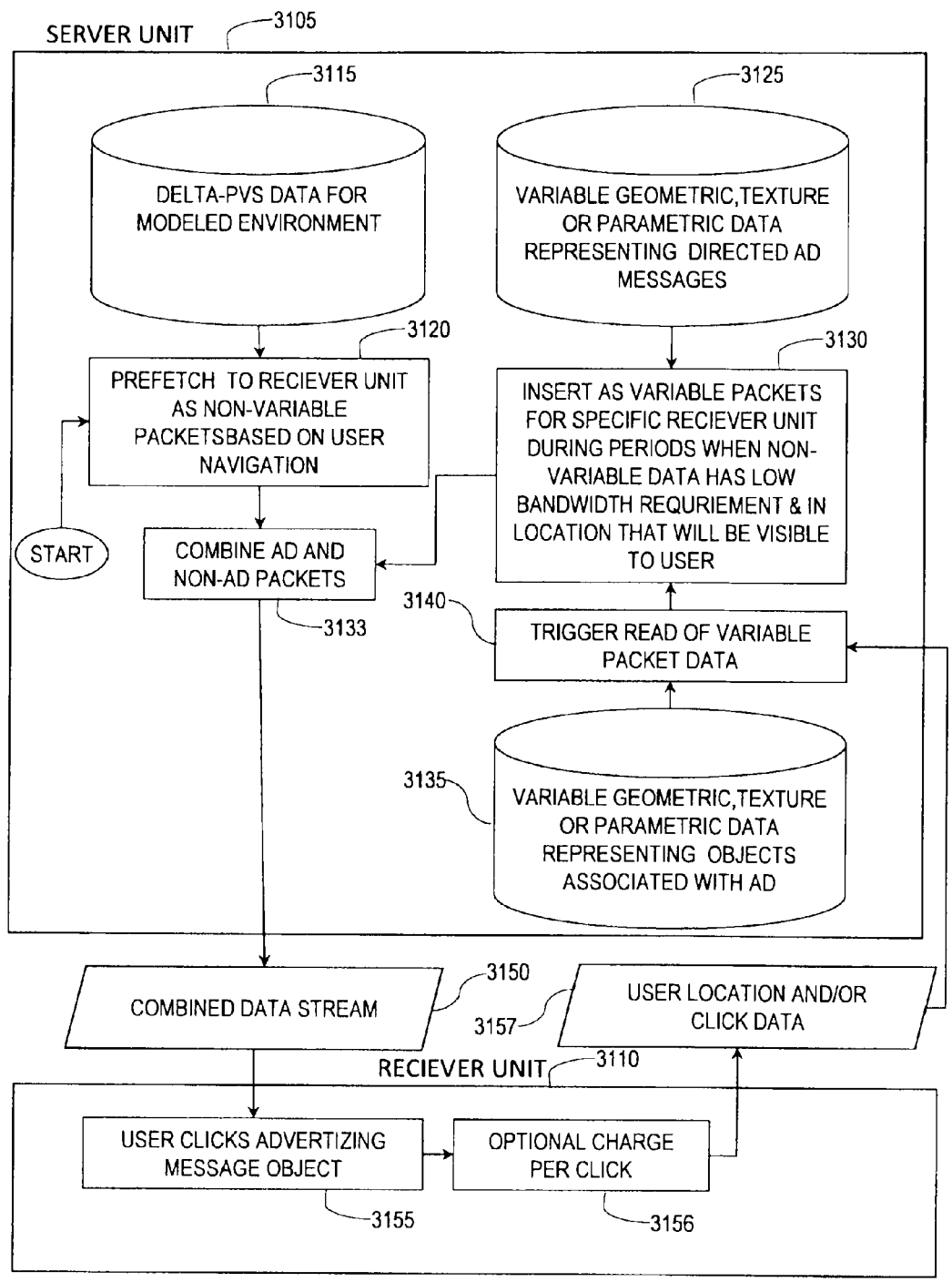
FIG. 31 is an exemplary flow diagram illustrating a method of streaming visibility event packets including geometry information, texture information, or instructions to generate geometry or texture information, wherein the visibility event information represents advertising and targeted advertising during low bandwidth requirement periods of a fully interactive visibility event data stream.

In some embodiments, the method of FIG. 30 is applied during the streaming of visibility event data is prefetched based on camera/viewpoint movement that is under interactive control of a client-user. Such an exemplary embodiment is illustrated in the exemplary flow diagram of FIG. 31. In the data store 3115, the delta-PVS or visibility event data for the entire environment is represented in some embodiments. In step 3120, the non-variable visibility event packets are prefetched based on the user's viewpoint location which is under interactive control of the user using the navigation-based prefetch method described in the co-pending PCT patent application number PCT/US2011/042309.

In step 3120, the non-variable packets that include the streaming interactive programming are delivered to client units as non-variable visibility event packets. In this case, the non-variable visibility event packets are dynamically prefetched to a specific client unit using navigation-based prefetch in which the camera/viewer motion is interactively controlled by the client user using a mouse, game controller or other device. In this case, the non-variable visibility event data packets are streamed as unique data stream to a specific client/user (e.g., game-like content with significant interactivity).

A second data store 3125 stores variable data representing directed advertising messages (or cash store items, or messaging objects) that are streamed to individual, specific client units during the non-broadcast delivery of the non-variable visibility event data according to some embodiments. The directed advertising data is sent as variable packets that are added to the data stream during periods when the bandwidth requirement for sending the non-variable data is low. The determination of current and predicted bandwidth requirements relative to the available bandwidth are made using information including the size of visibility event packets to be prefetched and the viewpoint velocity. Therefore, for example, when the number of visibility event packets that are scheduled for prefetched delivery in a given time are below a predetermined threshold, it is predicted that a user's bandwidth requirement is low permitting the transmission of advertising data to the user. In one exemplary embodiment, in step 3130 the geometric or texture information for an object representing a specific advertising message that will be visible to the user is placed in one or more variable packets that are combined with the, non-variable packets in step 3133.

In some embodiments, the visibility event data of 3125 is actual geometric and/or texture information. In alternative embodiments, the data is instructions for generating the actual geometric and/or texture information on the client unit. In one embodiment, the data in the second data store 3125 includes parameters for the parametric construction of the objects representing the geometric and/or texture information that is the object representing the advertising message. In one embodiment, this parametric information includes references to specific glyphs as well as parameters that describe the extrusion and/or beveling of the glyph outlines to generate 3D logos or engravings representing the advertising message. In further embodiments, other parametric construction techniques are employed to generate billboards, neon signage, scoreboard and other representations with a custom advertising message.

In some embodiments, the data of store 3130 is associated with a geometric transformation matrix that places the associated object in a location that will likely become visible to the user in a predetermined amount of time, using on the navigation-based prefetch methods specified in the co-pending PCT patent application number PCT/US2011/042309 and further described, in additional embodiments, in the present specification.

In step 3130, the data representing the advertising object is streamed as a variable packet during periods when the number and size of variable packets being sent is low. In this exemplary embodiment, the variable packets are sent during periods of time when the bandwidth requirement for streaming non-variable packets is low. Even in implementations in which the non-variable packets represent prescripted visibility event packets that are broadcast simultaneously to multiple clients (e.g., exemplary embodiment of FIG. 30), each variable packet can potentially be sent to a specific receiver/client unit during these low-bandwidth requirement periods. The variable packets are sent to one or more specifically targeted receiver units using a packet addressing protocol such as TCP/IP or any other desired routing scheme in some embodiments.

The method of adding variable non-broadcast packets to the data stream during periods of low bandwidth requirement for the non-variable, packets makes optimal use of the available bandwidth and tends to minimize cases in which the client's cache of visibility event data is outrun by the camera location, which would otherwise correspond to late packet arrival and visibility errors during the client rendering.

In step 3130, in some embodiments the objects representing the advertising messages are specifically located in a predetermined area of the modeled environment such that the objects are likely to be visible to the user in a predetermined amount of time. Also, in step 3130, the scheduling of the variable packet transmission is made so that the objects arrive substantially before they will become visible, thereby preventing visibility errors caused by late packet arrival.

In subsequent step 3133, the non-variable visibility event packets are combined with the variable visibility event packets into a combined data stream indicated as data 3150.

The data stream 3150 is the combined data stream of the non-variable and variable packets that is sent to a specific client unit, indicated by the rectangle 3110.

In step 3155, conducted on a specific client unit, the user may choose to interact with a specific object representing an advertising message. The data representing the time and location (i.e. the. object interacted with) is sent from the specific receiver to the server unit. This data transmitted back to the server unit is shown as data labeled 3157.

In step 3140, conducted on the server unit, the user click data received from the client unit data stream indicated by 3157 is used, in some embodiments, to trigger the read of specific geometric or texture (or parametric) data representing an object associated with the clicked advertisement (AD). In this case, the represented object includes additional information about the clicked advertisement including a representation of the advertised product or additional product literature or ordering information in some embodiments. In alternative embodiments, the represented object is a click-to-order icon.

If the advertised object is a virtual object that may be worn, driven, flown, navigated, or carried by the user's avatar during the remainder of the streaming interactive program then the click may result in a charge to the user as shown in step 3156.

Method of Recording User's Clicks of Advertising Objects on a Visibility Event Server and Sending Record of Clicks to a Website Server which Causes Advertising Urls to be Displayed when User Subsequently Enters Website.

Figure 32A:
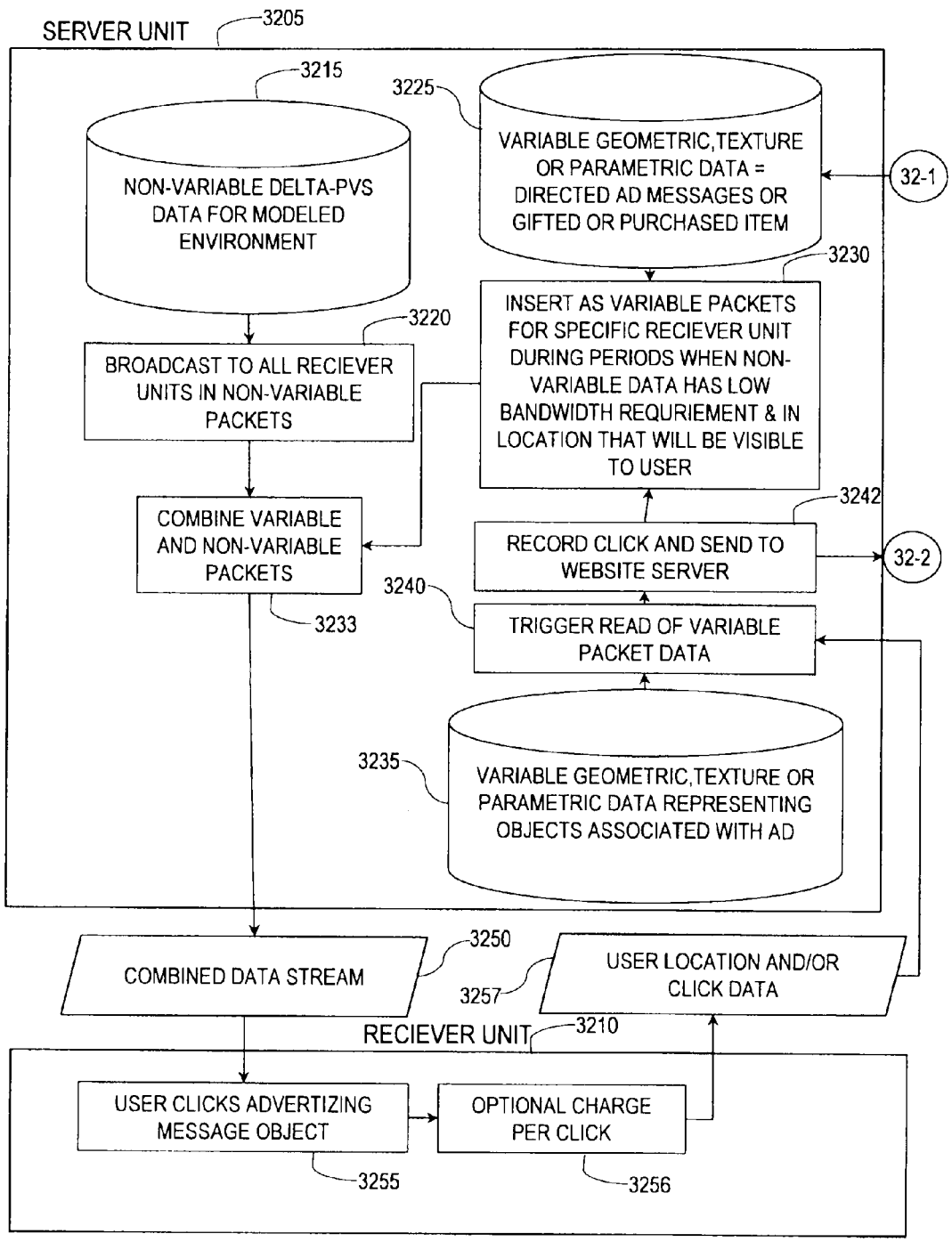
FIG. 32A is an exemplary block diagram/flowchart showing a method of streaming geometry or texture information, or instructions to generate geometry or texture information where the information or instructions represent advertising and targeted advertising during low bandwidth requirement periods of a streaming interactive media data stream, and showing exemplary bidirectional transmission of advertising/cash store information to/from a separate website server.
Figure 32B:
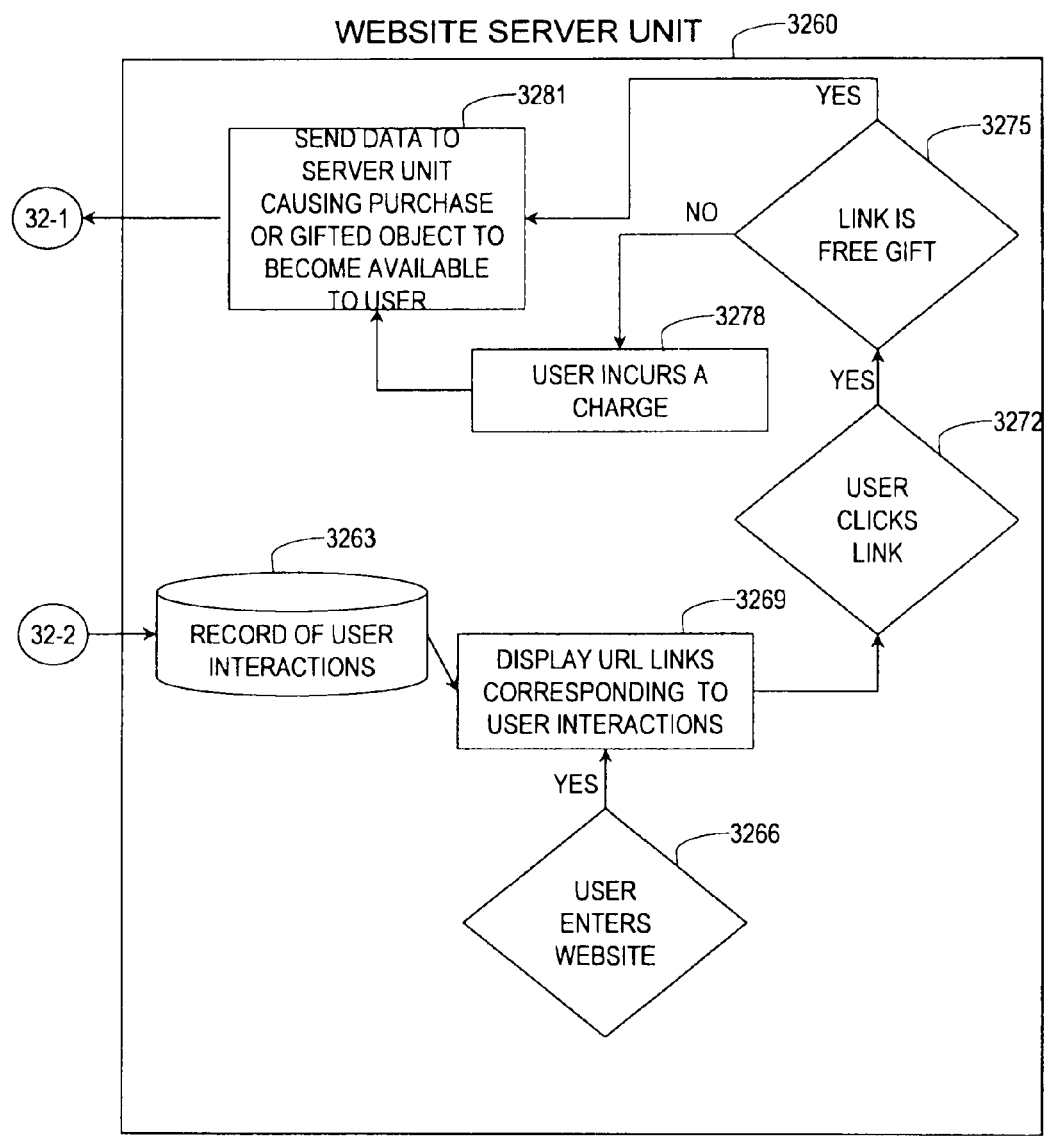
FIG. 32B is a continuation of FIG. 32A.

FIG. 32A and FIG. 32B is a block diagram/flowchart showing a method of streaming geometry or texture information, or instructions to generate geometry or texture information where the information or instructions represent advertising and targeted advertising during low bandwidth requirement periods of a streaming interactive media data stream.

A server unit is labeled 3205. A specific client unit is labeled 3210. In some embodiments, the server unit is connected to multiple client units. According to some embodiments, data representing a streaming interactive media stream is broadcast to all connected client units as non-variable packets.

Data store 3215 stores non-variable delta-PVS or visibility event packets including the streaming interactive media (SIM) in which navigation-based prefetch of the visibility event packets is driven by a prescripted camera path. A second data store 3225 stores variable data representing directed advertising messages that can be streamed to individual, specific client units during the broadcast of the non-variable data. The directed advertising data is sent as variable packets that added to the data stream during periods when the bandwidth requirement for sending the non-variable data is low.

This data store 3225 may also store variable data representing objects that are purchased by the user or gifted to the user in return for clicking on an advertising url associated with an advertising object. In some embodiments, the advertising object, the purchased object, or the gifted object is transmitted from a website server, labeled 3260 in FIG. 32B. Alternatively, the data representing these objects may be prestored on the server unit 3205, with data from website server (3260) to the server unit (3205) used to trigger the insertion of specific variable packets stored in 3225 to the visibility event stream using step 3230.

Alternatively, the data from website server 3260 to server unit 3205 may represent parameters for the construction of a gifted object, purchased object, or advertising object; with the parametric data used to actually construct the object using a parametric modeling method executed on the server unit 3205.

In some embodiments, as described later, the data received from the website server 3260 was ultimately triggered by an earlier interaction with an advertising object that was recorded by the server unit 3205 in step 3242 and which sends a record of the interaction to the website server 3260 which stores a record of the interaction in data store 3263.

In step 3220 the non-variable packets representing the streaming interactive programming is broadcast to all receiver/client units.

In step 3230 the geometric or texture information for an object representing a specific advertising message, gifted object, or purchased object that will be visible to the user is placed in one or more variable packets that are combined with the broadcast, non-variable packets in step 3233.

In some embodiments, the data of 3225 is an actual geometric texture information. In alternative embodiments, the data includes instructions for generating the actual geometric and/or texture information on the client unit. In one implementation the data of 3225 includes parameters for the parametric construction of the objects representing the geometric and/or texture information that is the object representing the advertising message. In one implementation this parametric information includes references to specific glyphs as well as parameters that describe the extrusion of the glyph outlines to generate 3D logos or engravings representing the advertising message. In additional embodiments, other parametric construction techniques are employed to generate billboards, neon signage, scoreboard and other representations with a custom advertising message, purchased object, or gifted object.

In some embodiments, the data of store 3230 is associated with a geometric transformation matrix that places the associated object in a location that will likely become visible to the user in a predetermined amount of time, based on the navigational prefetch feedback scheme described previously and in the co-pending PCT patent application number PCT/US2011/042309.

In step 3230, the data representing the advertising, gifted, or purchased object (hereafter called the variable object) is placed in a variable packet, which is combined with non-variable packets by sending the variable packets during periods when the number and size of variable packets being sent is low. In this regard, the variable packets are sent during low bandwidth periods for the variable periods. In some embodiments, each variable packet is sent only to a specific receiver/client unit during these ebb periods. The variable packets are sent to one or more specifically targeted receiver units using a packet addressing protocol such as TCP/IP or other routing scheme.

The method of adding variable non-broadcast packets to the data stream during periods of low bandwidth requirement for the non-variable, broadcast packets makes optimal use of the available bandwidth and minimizes cases in which the client's cache of visibility event data is outrun by the camera location.

In step 3230, the variable objects are specifically located in a part of the modeled environment such that the objects are likely to be visible to the user in a predetermined amount of time. Also in step 3230 the scheduling of the variable packet transmission is made so the objects arrived substantially before they will become visible, thereby preventing visibility errors.

The data stream 3250 is the combined data stream of the broadcast (non-variable) and variable packets that is sent to a specific client unit, indicated by the rectangle 3210.

In step 3255, conducted on a specific receiver or client unit (labeled 3210), the user may choose to interact with a specific variable object representing an advertising message. The data representing the time and location (e.g., object interacted with) is sent from the specific receiver to the server unit.

In one implementation, the variable object is accented (e.g., by illumination or other means) for a period of time. A user interaction with the stream during this period of time (e.g., by a user click of a single button) is registered as a interaction with the specific variable object (e.g., advertising object). This allows multiple users to interact with such advertising objects during a single broadcast visibility event stream since it does not require that individual users control the camera path. Once the user has control of the SIM camera path outside the viewcells corresponding to the client-side visibility event cache, then that user would only need a unique bidirectional visibility event data stream that no longer corresponds to the broadcast stream.

In step 3256, in some embodiments, there is a monetary charge to the advertiser sponsoring associated with the clickable advertising object clicked in step 3255

In step 3240, the user click data received from the client unit data stream indicated by 3257 is used to trigger the read of specific geometric or texture (or parametric) data representing an object associated with the clicked advertisement (AD). In this case, the represented object can include additional information about the clicked advertisement including a representation of the advertised product or additional product literature or ordering information. In alternative embodiments, the represented object may be a click-to-order icon.

In subsequent step 3242, process flow proceeds to process 32-1 in FIG. 32B, where the data representing a specific click event corresponding to the interaction of the user with an advertising object is sent to a website server unit labeled 3260 in FIG. 32B.

The website server unit 3260 stores a record of the specific user's interaction with an advertising object in data store 3263.

In a subsequent step 3269, conducted by the website server 3260, a url link corresponding to the advertised object that was earlier interacted with during the visibility event data stream (the record of this previous interaction having been stored in 3263) is displayed when the corresponding user visits the website of the website server unit as shown in decision step.

The overall effect is to record and save, for each user, the user's interactions with the advertising or other variable objects during viewing of a SIM/game visibility event data stream and make them available to the user upon visiting the website.

In decision step 3272, the user may choose to click one or more of the url links displayed in step 3269. This may cause a monetary charge to the advertiser can then be made in the customary manner.

In one implementation, clicking on an advertiser's url in step 3272 can cause the user to gain access to a specific variable object during later viewing of a particular SIM/game visibility event data stream. If in decision step 3275, it is determined that the variable object for which the user gains access is a "free gift," then process flow proceeds to step 3281.

In step 3281 data corresponding to the specific variable object for which the user has gained access by the clicking step 3272 is sent to the visibility event server unit 3205. In some embodiments, this data may includes parameters for constructing the specific variable object or data identifying the variable object that has been pre-stored on the server unit 3205, or actual data representing the variable object, or a combination of all three types of information. Process flow proceeds from 3281 to process 32-1, which returns process flow to step 3225 in FIG. 32A.

If, in decision step 3275, it is determined that the object corresponding to the url link displayed in step 3269 and clicked in step 3272 is not a free gift but a chargeable item, then process flow proceeds to step 3278, in which the user is charged for the purchase of this "cash store" variable object.

Method of Streaming Advertising and Targeted Advertising During Low Bandwidth Requirement Periods of a Fully Interactive Bidirectional Data Stream.

FIG. 32A and FIG. 32B specifies the method of inserting variable data packets into a data stream on non-variable visibility event packets wherein the non-variable visibility event packets represent a navigation-based prefetch of visibility event packets driven by a prescribed camera path, corresponding to an animated programming with limited interactivity.

According to some embodiments, the method of FIG. 32A and FIG. 32B is also applied to a fully interactive visibility event data stream as shown in FIG. 2. In the data store 215, the delta-PVS or visibility event data for the entire environment is represented. In step 220, the visibility event packets are prefetched based on the user's viewpoint location, which is under interactive control of the user using the navigation-based prefetch method described in the co-pending PCT patent application number PCT/US2011/042309.

In step 233, the data stream based on navigational prefetch is combined with the data packets representing targeted, clickable advertising objects and other variable objects in the manner described in conjunction with FIG. 32A and FIG. 32B.

Figure 33A:
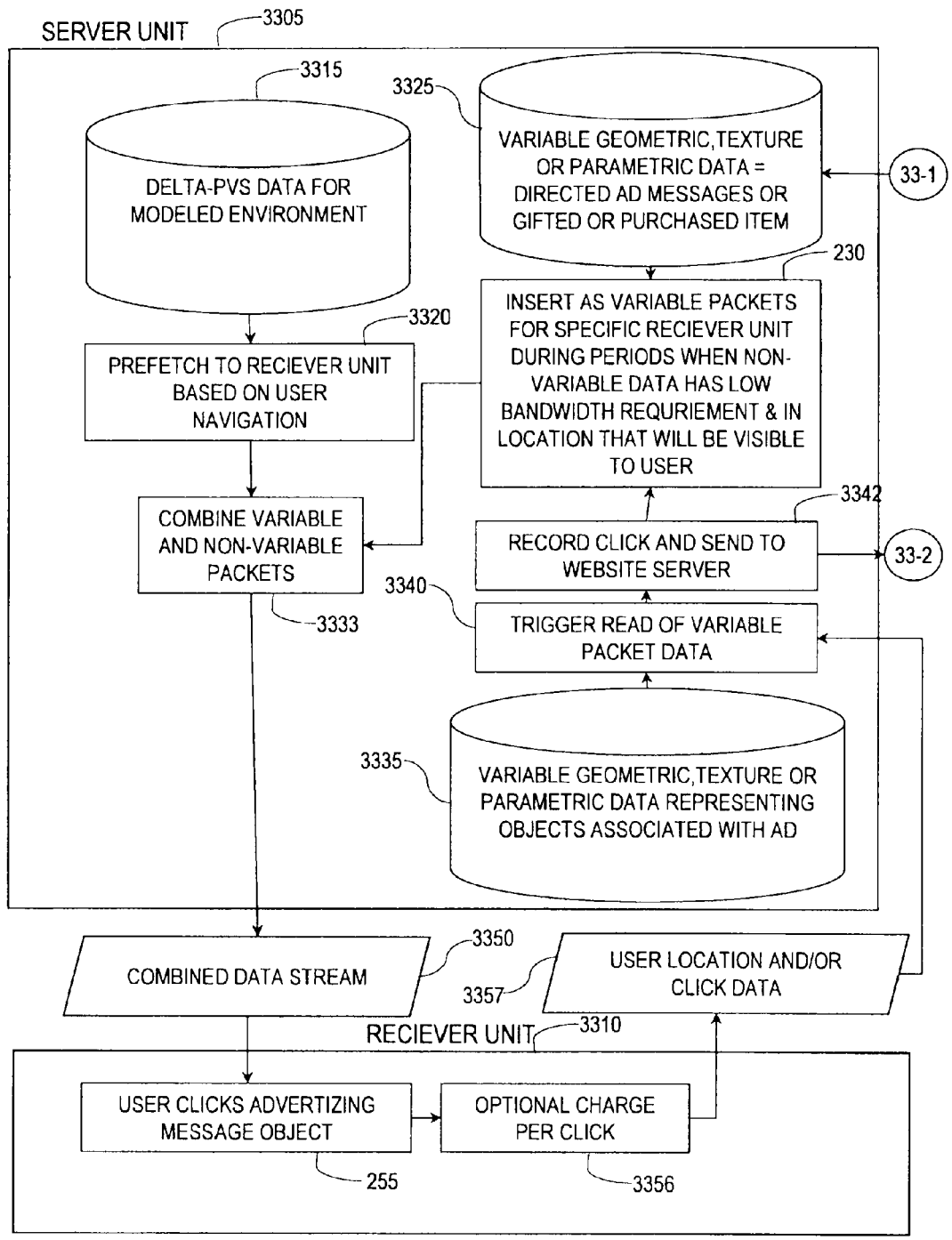
FIG. 33A is an exemplary block diagram/flowchart showing a method of streaming geometry or texture information, or instructions to generate geometry or texture information, wherein the information or instructions represent advertising and targeted advertising during low bandwidth requirement periods of a streaming visibility event data using a navigation-based prefetch of visibility event data that is driven by viewpoint motion that is under interactive control of a client-user, and showing exemplary bidirectional transmission of advertising/cash store information to/from a separate website server.
Figure 33B:
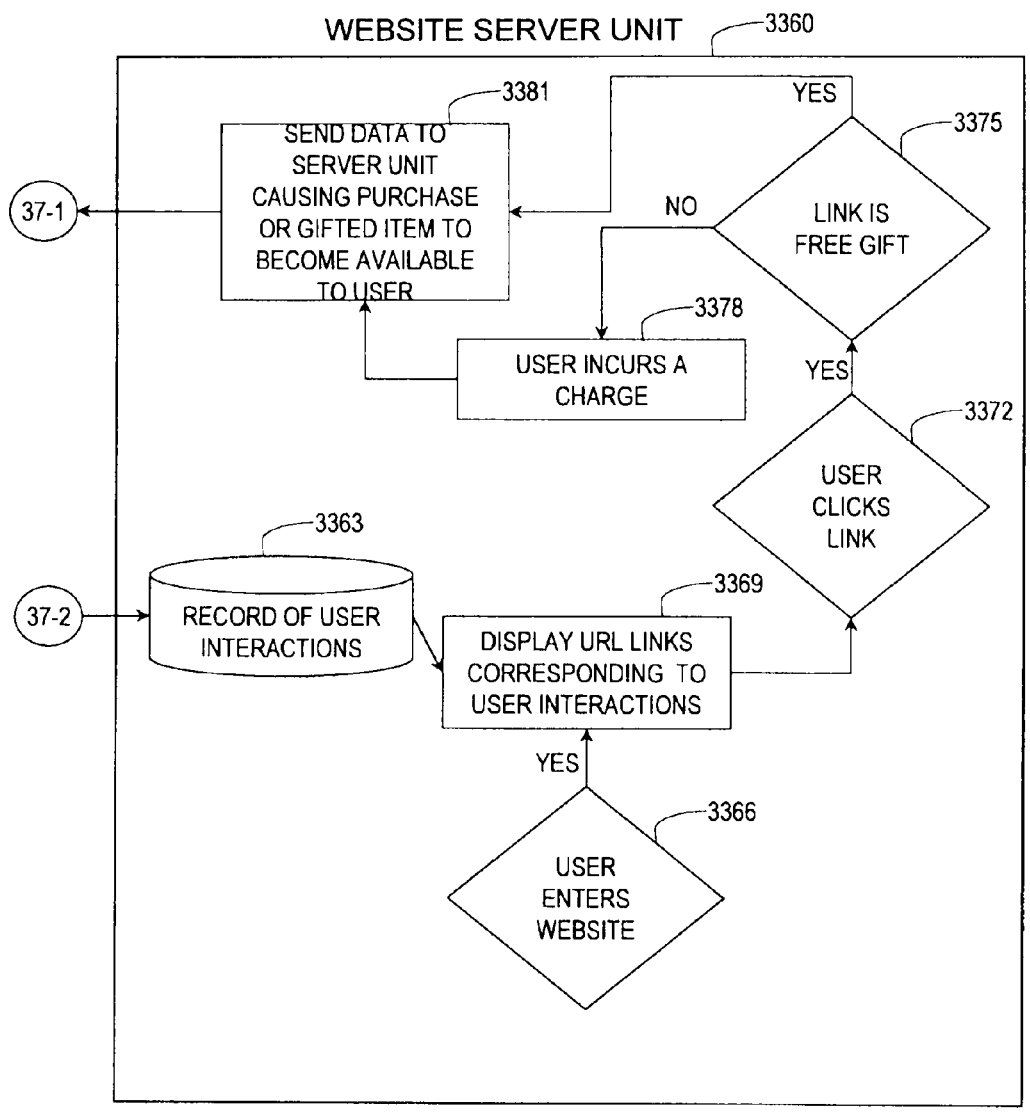
FIG. 33B is a continuation of FIG. 33A.

FIG. 33A and FIG. 33B is a block diagram/flowchart showing a method of streaming geometry or texture information, or instructions to generate geometry or texture information, wherein the information or instructions represent advertising and targeted advertising during low bandwidth requirement periods of a streaming visibility event data using a navigation-based prefetch of visibility event data that is driven by viewpoint motion that is under interactive control of a client-user.

A server unit is labeled 3305. A specific client unit is labeled 3310. In some embodiments, the server unit is connected to multiple client units. Data representing a streaming interactive media stream is broadcast to all connected client units as non-variable packets.

Data store 3315 stores non-variable delta-PVS or visibility event packets including the streaming interactive media (SIM) in which navigation-based prefetch of the visibility event packets is driven by a prescripted camera path. A second data store 3325 stores variable data representing directed advertising messages that can be streamed to individual, specific client units during the broadcast of the non-variable data. The directed advertising data is sent as variable packets that added to the data stream during periods when the bandwidth requirement for sending the non-variable data is low.

In some embodiments, this data store 3325 also stores variable data representing objects that are purchased by the user or gifted to the user in return for clicking on an advertising url associated with an advertising object. In some embodiments, the advertising object, the purchased object, or the gifted object is transmitted from a website server, labeled 3360 in FIG. 33B. In alternative embodiments, the data representing these objects is prestored on the server unit 3305, with data from website server (3360) to the server unit (3305) used to trigger the insertion of specific variable packets stored in 3325 to the visibility event stream using step 3330.

In alternative embodiments, the data from website server 260 to server unit 3305 represents parameters for the construction of a gifted object, purchased object, or advertising object; with the parametric data used to actually construct the object using a parametric modeling method executed on the server unit 3305.

As disclosed below, the data received from the website server 3360 was ultimately triggered by an earlier interaction with an advertising object that was recorded by the server unit 3305 in step 3342 and which sends a record of the interaction to the website server 3360 which stores a record of the interaction in data store 3363.

In step 3320, the non-variable packets representing the streaming interactive programming is broadcast to all receiver/client units.

In step 3330, the geometric or texture information for an object representing a specific advertising message, gifted object, or purchased object that will be visible to the user is placed in one or more variable packets that are combined with the broadcast, non-variable packets in step 3333.

In some embodiments, the data of 3325 is actual geometric texture information. In alternative embodiments, the data may be instructions for generating the actual geometric and/or texture information on the client unit. In one implementation, the data of 3325 includes parameters for the parametric construction of the objects representing the geometric and/or texture information that is the object representing the advertising message. In one implementation, this parametric information includes references to specific glyphs as well as parameters that describe the extrusion of the glyph outlines to generate 3D logos or engravings representing the advertising message. In additional embodiments, other parametric construction techniques are employed to generate billboards, neon signage, scoreboard and other representations with a custom advertising message, purchased object, or gifted object.

In some embodiments, the data of store 3330 is associated with a geometric transformation matrix that places the associated object in a location that will likely become visible to the user in a predetermined amount of time, based on the navigational prefetch feedback scheme described previously and in the co-pending PCT patent application number PCT/US2011/042309.

In step 3330, the data representing the advertising, gifted, or purchased object (hereafter called the variable object) is placed in a variable packet which is combined with non-variable packets by sending the variable packets during periods when the number and size of variable packets being sent is low. In this regard, the variable packets are sent during low bandwidth periods for the variable periods. In some embodiments, each variable packet may be sent only to a specific receiver/client unit during these ebb periods. The variable packets are sent to one or more specifically targeted receiver units using a packet addressing protocol such as TCP/IP or other routing scheme.

The method of adding variable non-broadcast packets to the data stream during periods of low bandwidth requirement for the non-variable, broadcast packets makes optimal use of the available bandwidth and tends to minimize cases in which the client's cache of visibility event data is outrun by the camera location.

In step 3330, the variable objects are specifically located in a part of the modeled environment such that the objects are likely to be visible to the user in a predetermined amount of time. Also, in step 3330 the scheduling of the variable packet transmission is made so the objects arrived substantially before they will become visible, thereby preventing visibility errors.

The data stream 3350 is the combined data stream of the broadcast (non-variable) and variable packets that is sent to a specific client unit, indicated by the rectangle 3310.

In step 3355, conducted on a specific receiver or client unit (labeled 3310), the user may choose to interact with a specific variable object representing an advertising message. The data representing the time and location (e.g. object interacted with) is sent from the specific receiver to the server unit.

In one implementation, the variable object is accented (e.g., by illumination or other means) for a period of time.

A user interaction with the stream during this period of time (e.g., by a user click of a single button) is registered as a interaction with the specific variable object (e.g., advertising object). This allows multiple users to interact with such advertising objects during a single broadcast visibility event stream since it does not require that individual users control the camera path. Once the user has control of the SIM camera path outside the viewcells corresponding to the client-side visibility event cache, then that user would only need a unique bidirectional visibility event data stream that no longer corresponds to the broadcast stream.

In step 3356, there may be a monetary charge to the advertiser sponsoring the clickable advertising object clicked in step 3355.

In step 3340, the user click data received from the client unit data stream indicated by 3357 is used to trigger the read of specific geometric or texture (or parametric) data representing an object associated with the clicked advertisement (AD). In this case, the represented object can include additional information about the clicked advertisement including a representation of the advertized product or additional product literature or ordering information. In alternative embodiments, the represented object is a click-to-order icon.

In subsequent step 33433, the data representing a specific click event corresponding to the interaction of the user with an advertising object is sent to a website server unit labeled 3360 via process 33-2 in FIG. 33B.

In some embodiments, the website server unit 3360 stores a record of the specific user's interaction with an advertising object in data store 3363.

In a subsequent step 3369, conducted by the website server 3360, a url link corresponding to the advertised object that was earlier interacted with during the visibility event data stream (the record of this previous interaction having been stored in 3363) is displayed when the corresponding user visits the website of the website server unit as shown in decision step.

The overall effect is to record an save, for each user, the user's interactions with the advertising or other variable objects during viewing of a SIM/game visibility event data stream and make them available to the user upon visiting the website.

In decision step 3372, the user may choose to click one or more of the url links displayed in step 3369. This may cause a monetary charge to the advertiser (e.g. pay per click model).

In one implementation, clicking on an advertiser's url in step 3372 causes the user to gain access to a specific variable object during later viewing of a particular SIM/game visibility event data stream. If, in decision step 3375, it is determined that the variable object for which the user will gain access is a "free gift" then process flow proceeds to step 3381.

In step 3381, data corresponding to the specific variable object for which the user has gained access by the clicking step 3372 is sent to the visibility event server unit 3305 via process 33-1 in FIG. 33A. In some embodiments, this data includes parameters for constructing the specific variable object or data identifying the variable object which has been pre-stored on the server unit 3305, or actual data representing the variable object, or a combination of all three types of information.

If, in decision step 3375, it is determined that the object corresponding to the url link displayed in step 3369 and clicked in step 3372 is not a free gift but a chargeable item, then process flow proceeds to step 3378, in which the user is charged for the purchase of this "cash store" variable object.

Figure 34:
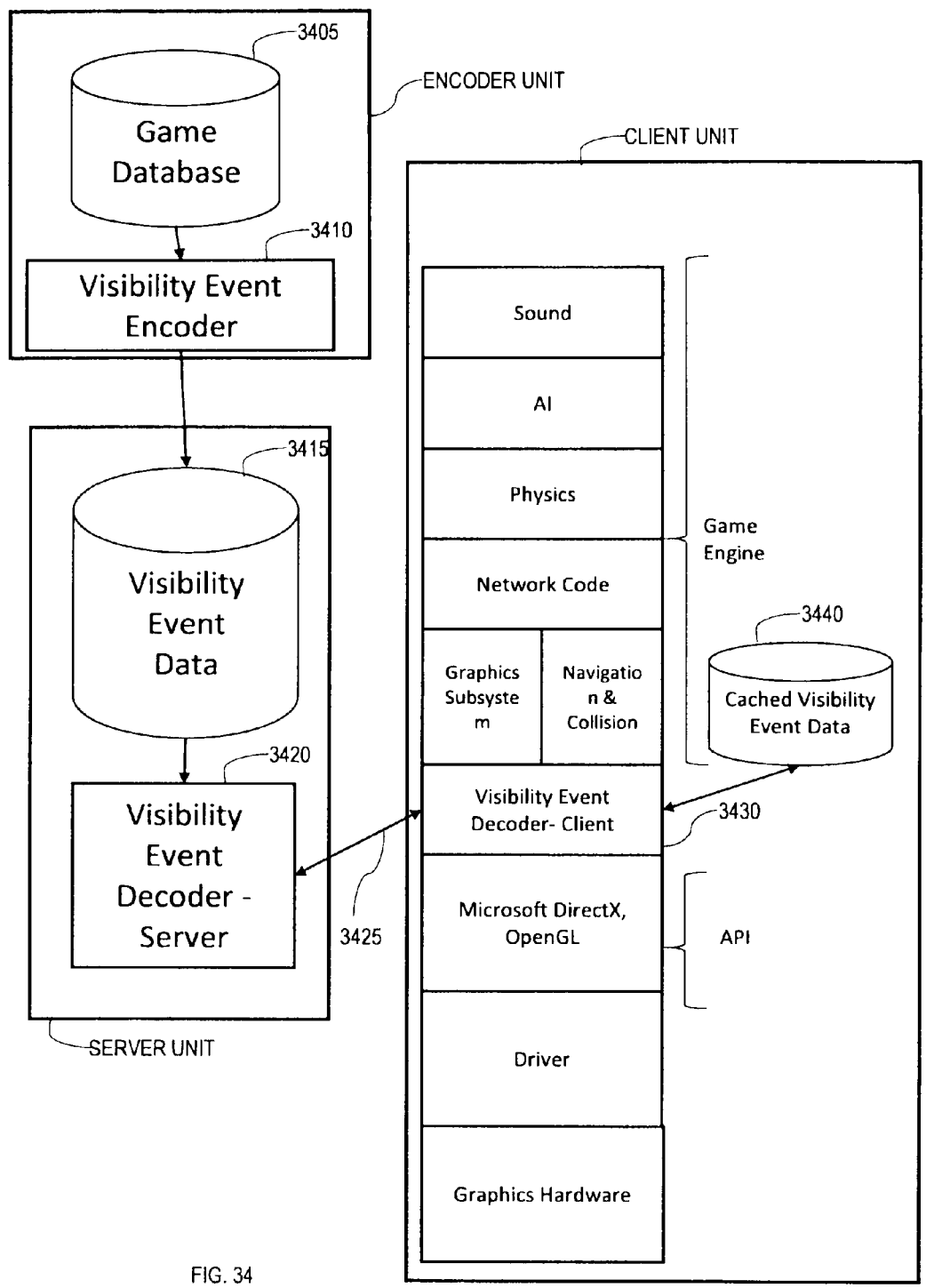
FIG. 34 is an exemplary block diagram/flow diagram showing one embodiment of the visibility event codec integrated into game engine software modules.

Embodiment with Separate Server and Client Components for Delivering Visibility Event Data Stream with Decoder-Server and Decoder-Client Modules Integrated into Game Engine Modules FIG. 34 is an exemplary flow diagram showing one embodiment of the visibility event codec. In step 3410, a conventional game database representing the geometric, texture, material, lighting, animation and other data including sound is processed by the encoder step 3410.

In one embodiment, the encoding process runs as an off-line precomputation and generates the visibility event data. In one embodiment, the encoding process is performed on a separate computing device, labeled ENCODER UNIT in FIG. 34. The visibility event packets, which may be represented using the intermediate representation of labeled silhouette contours as described in the co-pending PCT patent application number PCT/US2011/042309, is stored in data store 3415. In one embodiment, the data store 3415 is stored on the same physical device as a visibility event decoder/server unit labeled SERVER UNIT. This device serves the visibility event data packets to a client unit labeled CLIENT UNIT. Additional embodiments include data store 3415 located on multiple physically distributed server units.

During runtime processing a server process labeled 3420 reads the visibility event packets stored in data store 3415 in some embodiments. This reading employs navigation-based prefetch of visibility event packets based either on pre-scripted (e.g., predetermined) camera motion or on the camera motion controlled by client/user input using such devices as a mouse, joystick or game controller.

The navigation-based prefetch employs methods specified in the co-pending PCT patent application number PCT/US2011/042309 as well as methods specified in the present application.

In exemplary embodiments, depending on the run-time state of the visibility event client process (labeled 3430), the visibility event client process may read visibility event data from store 3415 at different levels of geometric detail according the method of varying level-of-detail as a function of exposure time described in U.S. Pat. No. 6,028,608, the entire contents of which are incorporated herein by reference, and contours as described in the co-pending PCT patent application number PCT/US2011/042309.

In addition, depending on the connection latency between the visibility event decoder of the client unit the visibility event decoder of the server unit, the visibility event decoder of the server unit may actually perform all or part of an algorithmic decompression of packets (i.e., by generating the delta-PVS data from labeled silhouette contours as described in the co-pending PCT patent application number PCT/US2011/042309. This results in smaller packets which have a faster arrival time to the decoder-client unit.

The visibility event decoder-client process module is labeled 3430. In exemplary embodiments, the decoder-client process module is implemented on a client unit labeled CLIENT UNIT in FIG. 34. This process module receives the visibility event data stream from the visibility event decoder-server process via the bidirectional data stream labeled 3425. This bidirectional data stream includes the user's current viewpoint location in the modeled environment that is sent from the client to the server unit to support the navigation-based prefetch of visibility event data (3415). In alternate embodiments, the visibility event data stream 3425 is a unidirectional data stream from the server unit which conveys a streaming interactive media driven by scripted camera motion to the client unit.

In some embodiments, the visibility event decoder-client is implemented as software which outputs cached visibility event data stored in store 3440. This data may be compressed visibility event packets and or decompressed delta-PVS or direct-PVS/visibility map data. In further embodiments, the visibility event decoder-client is implemented as hardware or a hardware/software combination.

FIG. 34 shows, in some embodiments, that the decoder-client software process is integrated into existing game engine components for graphics, navigation and collision detection, networking, physics, and other existing game engine components. In embodiments, game engine components are implemented as hardware, software, or a combination of hardware and software.

As with existing game engines, the interface to the graphics hardware is through a standard API such as directx or OpenGL, interfacing with a graphics driver. In some embodiments, the graphics hardware is a graphics processor such as NVIDIA's GeForce model.

Figure 35A:
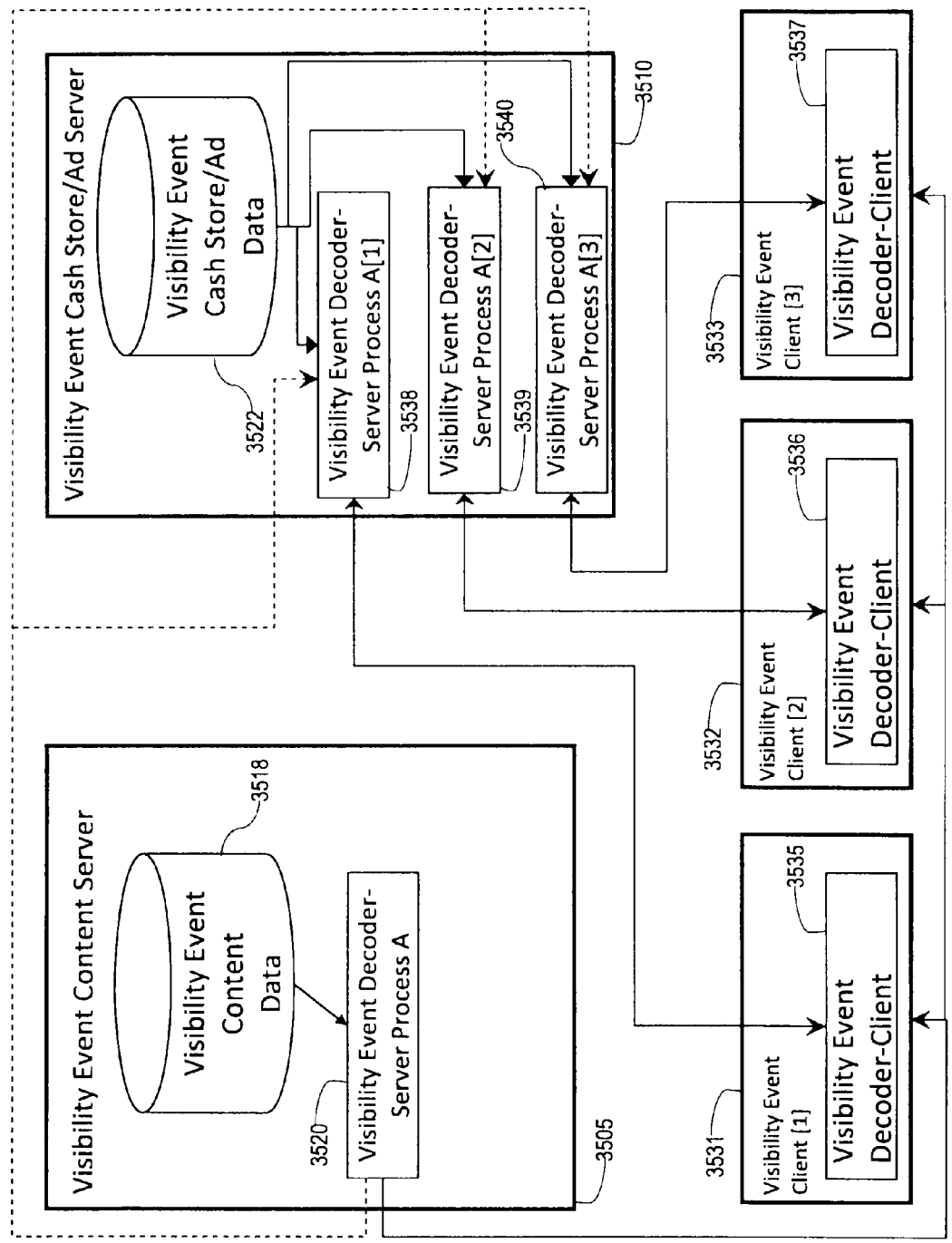
FIG. 35A is an exemplary block diagram/flowchart showing a visibility event content server and a separate visibility event advertising or cash store server delivering broadcast SIM content and unique, targeted advertising or cash store objects to a plurality of client units.

FIG. 35A Exemplary embodiment illustrating a visibility event content server delivering pre-scripted visibility event content to multiple client units and a separate visibility event advertising server simultaneously delivering unique advertising, cash store, or messaging content to each of the client units.

FIG. 35A is an exemplary block diagram/flowchart showing a visibility event content server and a separate visibility event advertising or cash store server. The visibility event content server is labeled 3505.

Data store 3518 stores visibility event data representing most of the objects in the modeled environment. This corresponds to non-variable visibility event packets which are delivered to client units using navigation-based prefetch.

In the exemplary embodiment of FIG. 35A, the visibility event content data stored in data store 3518 is prefetched to three client units by the visibility event decoder-server process labeled 3520. In this embodiment, the prefetch is driven by a prescripted camera motion path and the visibility event data stream is broadcast to the three client units.

Thus, in the exemplary embodiment FIG. 35A, the visibility event server is delivering SIM content (e.g., SIM program A prefetched by process 3520) having limited interactivity and being, in some embodiments, simultaneously broadcast to the three client units.

A separate visibility event ad server/cash store server is labeled 3510. In some embodiments, the ad server may also deliver visibility event based messaging objects such as text messages.

The data store 3522 of the visibility event ad server stores variable visibility event data. In the exemplary embodiment of FIG. 35, the visibility event ad server labeled 3510 streams unique variable visibility event packets representing advertising objects to each of the three client units. In this exemplary embodiment, each client unit is receiving the same visibility event based SIM program, but each client also receives unique advertising objects that are seamlessly integrated into the SIM content as variable visibility event packets. Criteria used to determine specific advertising objects prefetched to an individual client-user can include client-user age, gender, prior-advertising clicks as well as other demographic criteria used to drive targeted advertising. The advertising visibility event packets delivered to Visibility Event Client [1], labeled 3531, is streamed by ad server decoder-server process 3536 to decoder-client process 3535.

Decoder server process 3538 is shown to be connected to decoder-client process 3535 with a bidirectional communication connection. In some embodiments only the visibility event-based unique advertising objects are delivered over this connection. In some embodiments, a network connection between the client unit 3531 and the server process 3538 is used to deliver information indicating that a client-user has interacted with a clickable advertising object or cash store object. The information transmitted from the client to the server in this example is represented by the double arrowed communication between the decoder-client and the decoder-server.

The advertising objects uniquely delivered to visibility event client [1] are selected, in some embodiments, based on known demographic information describing the specific client user. In other embodiments the advertising objects selected for delivery to a specific client-user are determined based on selection clicks of other advertising objects previously sent to the client-user.

In order to deliver unique, variable, advertising visibility event packets into a modeled environment before they will become visible to a client-user, the advertising decoder-server process has knowledge of the current camera/viewpoint position. In the exemplary embodiment of FIG. 35A this information is delivered from the visibility event content decoder-server (process 3520) to the visibility event advertising decoder-server processes 3538, 3539, and 3540 through the communication connections indicated by the respective stippled connection lines from the content decoder-server to the advertising decoder-server. In some embodiments information describing the location of the camera/viewpoint is delivered directly from the decoder-client the corresponding advertising decoder-server through a direct connection.

In the exemplary embodiment of FIG. 35A, while all three visibility event clients receives the exact same visibility event-based SIM content from server 3505, each receives a unique set of advertising objects during the SIM program from the visibility event advertising server 3510. The advertising objects received by decoder-client 3535 are sent by decoder-server process 3538. The advertising objects received by decoder-client 3536 are sent by decoder-server process 3539. The advertising objects received by decoder-client 3537 are sent by decoder-server process 3540. In some embodiments a single visibility event-based advertising server can deliver unique advertising, cash store, or messaging content to a several client units receiving the same broadcast visibility event content.

Figure 35B:
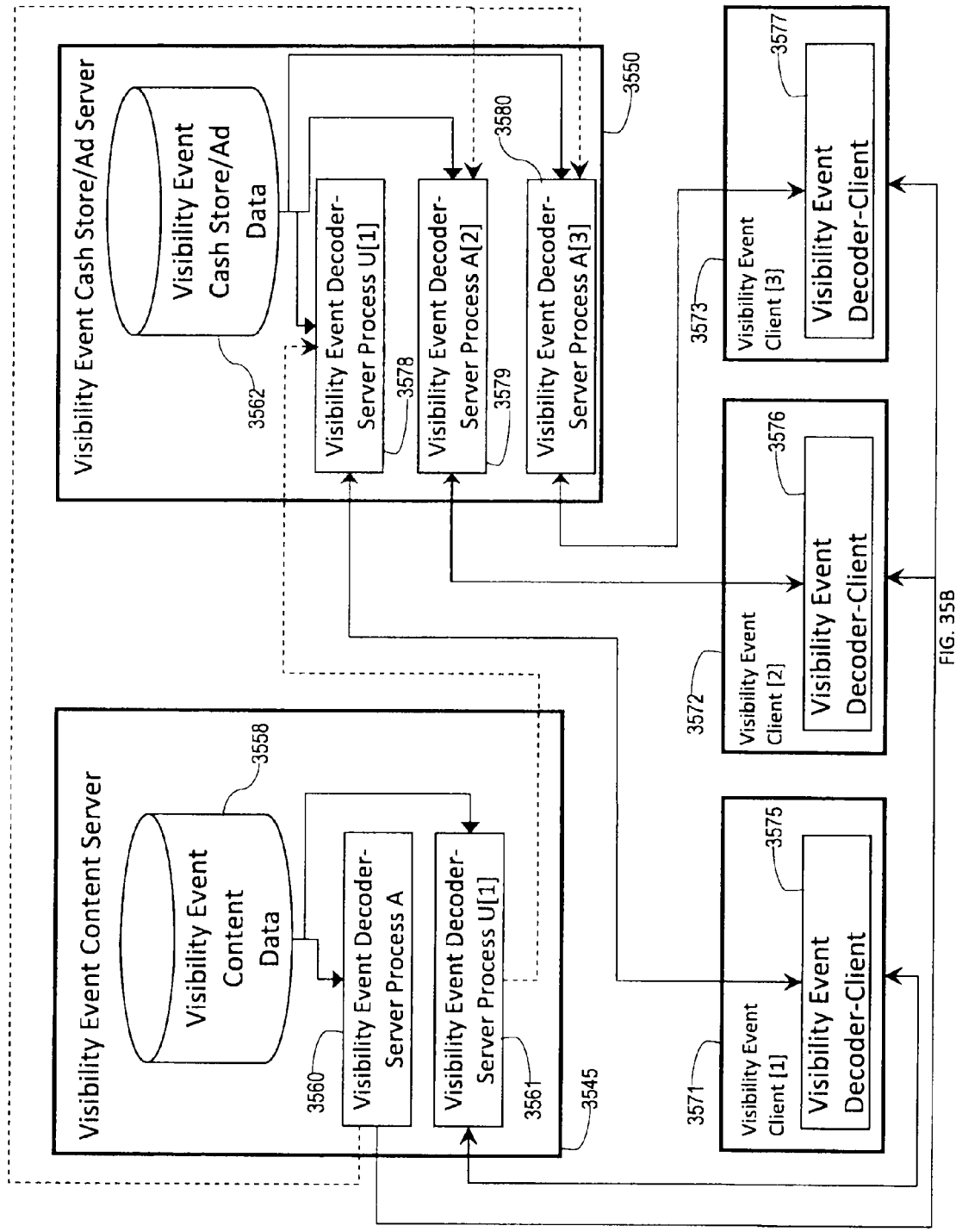
FIG. 35B is an exemplary block diagram/flowchart illustrating the same visibility event content server represented in FIG. 35A, but in a different state of operation in which one of the client units has selected to receive a fully interactive content stream and still receives targeted advertising objects or cash store objects.

FIG. 35B Exemplary embodiment illustrating a visibility event content server delivering pre-scripted visibility event content to a set of multiple client units, and allowing one of the client units to select a fully interactive visibility event stream, and also illustrating a separate visibility event advertising server simultaneously delivering unique advertising, cash store, or messaging content to each of the client units.

FIG. 35B is an exemplary block diagram/flowchart illustrating the same visibility event content server represented in FIG. 35A, and also illustrating the same separate visibility event advertising or cash store server represented in FIG. 35A. In FIG. 35B, the visibility event content server is labeled 3545. It is the same server as 3505 in FIG. 35A, but in a different state of operation.

Data store 3558 stores visibility event data representing most of the objects in the modeled environment. This corresponds to non-variable visibility event packets which are delivered to client units using navigation-based prefetch.

In the exemplary embodiment of FIG. 35B, visibility event content data stored in data store 3558 is prefetched to visibility event client [2] (labeled 3572 and being the same as the visibility event client [2], labeled 3532 in FIG. 35A) and is simultaneously prefetched to visibility event client [3] (labeled 3573 and being the same as the visibility event client [3], labeled 3533 in FIG. 35A). In the exemplary embodiment of FIG. 35B, the visibility event data stream being simultaneously broadcast to visibility event client [2] and visibility event client [3] is a visibility event data stream driven by a prescripted camera motion path and delivered by visibility event decoder-server process labeled 3560.

In the exemplary embodiment of FIG. 35B, the visibility event client [1] (labeled 3571 and being the same client unit labeled 3531 in FIG. 35A, but in a different state of operation) which was previously (in FIG. 35A) receiving the same prescripted visibility event stream as visibility event client [2] and visibility event client [3] is not receiving a unique visibility event content stream from the new server process labeled 3561.

The visibility event stream now being received by visibility event client [1] as shown in FIG. 35B is a fully interactive visibility event data stream in which the navigation-based prefetch is driven by controller input provided by the client-user of visibility event client [1] which is sent to the visibility event decoder-process U[1] labeled 3561.

The visibility event cash store/advertising server labeled 3550 (and being the same visibility event cash store/advertising server labeled 3510 in FIG. 35A, but in a different state of operation) continues to deliver a unique variable visibility event stream including advertising (or cash store, or messaging information) to each of the client units.

In FIG. 35B the unique visibility event advertising data stream delivered to visibility event client [1] is sent by visibility event decoder-server process U[1] labeled 3578 in FIG. 12B. For any given client unit, the visibility data stream from the visibility event content server and the visibility event data stream from the visibility event advertising server are both being prefetched using the same camera/viewpoint motions. In FIG. 35B the camera/viewpoint for visibility event client [1] has changed from being driven by a prescripted motion path to being driven by interactive client-user input controlling camera/viewpoint motion. Consequently, in FIG. 35B the visibility event advertising server process delivering unique content to visibility event client [1] (the process decoder-server process U[1]), receives the controller input information generated by the client-user for visibility event client [1]. In some embodiments this information is received by the advertising server-decoder process (e.g. 3561 of FIG. 35B) from the corresponding content sever-decoder process (e.g. 3578 of FIG. 35B) as shown by the unidirectional dashed connector between these two processes. In other embodiments the navigational input information is sent directly from the client unit to the visibility event advertising server, e.g. using the bidirectional communication link between decoder-client process 3575 and decoder-server process 3578.

Thus the state of visibility event client [1] changes from receiving a broadcast SIM stream (in FIG. 35A) to receiving a unique interactive visibility event stream (in FIG. 35B). Simultaneously, the corresponding visibility event based advertising stream also seamlessly transitions to the new interactive visibility event stream by receiving the interactive camera/viewpoint motions driving the new interactive visibility event stream instead of the prescripted camera/viewpoint motion data of the SIM stream that was previously being delivered.

In some embodiments, if a client-user sends the content server an indication that the client-user chooses to transition from receiving a broadcast, non-unique SIM visibility event stream (driven by prescripted camera motion) to a fully interactive visibility event stream (driven by client-user navigational input), then the visibility event content server records this indication and causes a monetary charge to result to the client-user making the transition.

Because the content server must commit additional connection bandwidth and compute resources (i.e. a unique content visibility event decoder-server process) to each decoder-client process that is receiving a unique visibility event stream, the monetary charge made for a unique interactive visibility event content stream can be used to pay for these additional resources. In such embodiments the client-user pays for the additional feature of enhanced interactivity.

Figure 35C:
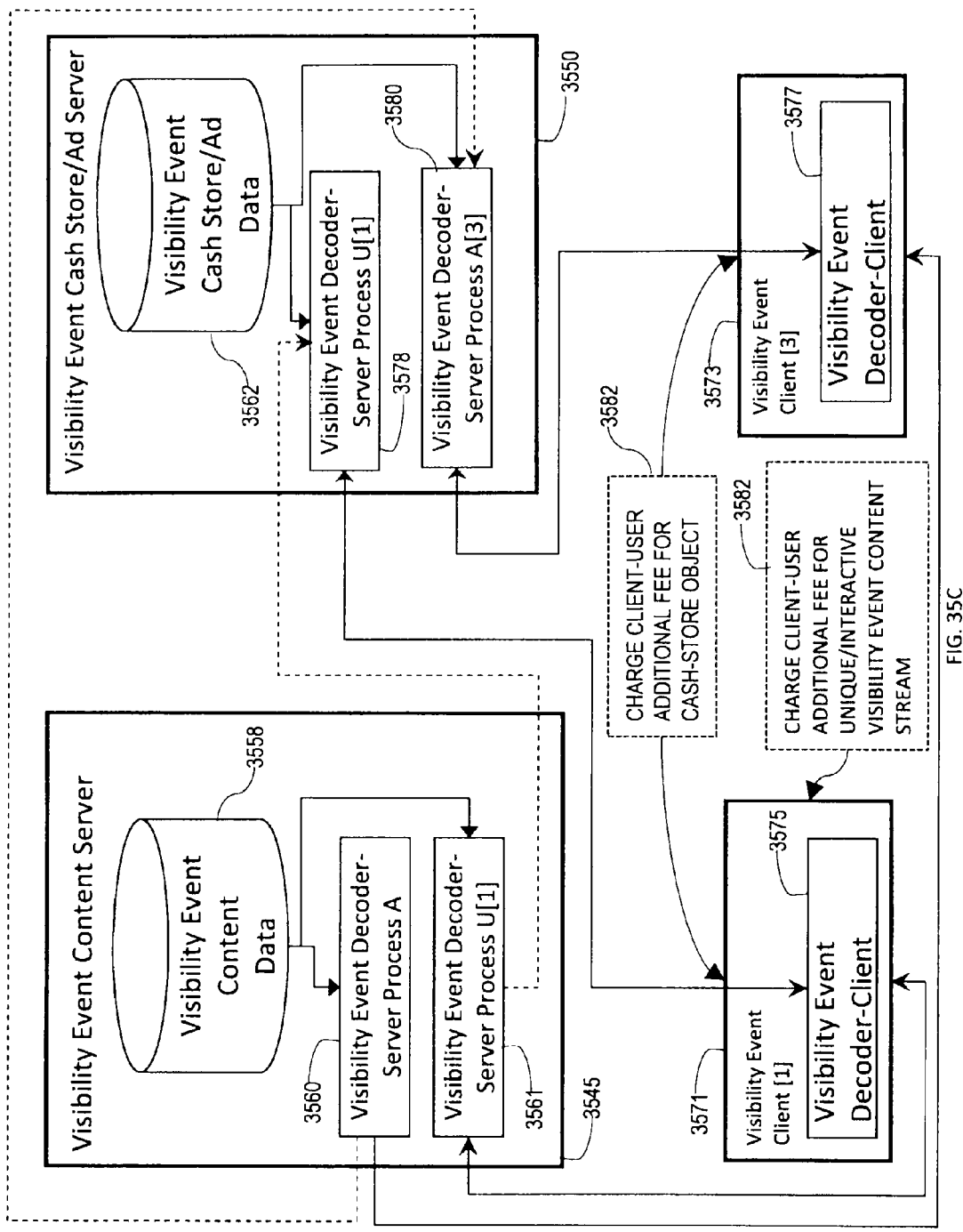
FIG. 35C is an exemplary block diagram/flowchart shows the method of charging the user of Visibility Event Client [1]

FIG. 35C is a block diagram/flow diagram showing the visibility event content server illustrated in FIG. 35B, the separate visibility event cash store/advertising server illustrated in FIG. 35B and two of the visibility event decoder-client process shown in FIG. 35B.

FIG. 35C illustrates the same visibility event content server and separate visibility event cash store/advertising server as FIG. 35B. FIG. 35C also includes two of the visibility event client units illustrated in FIG. 35B, but does not include Visibility Event Client [2] for clarity.

FIG. 35C shows the method of charging the user of Visibility Event Client [1] (labeled 3571) an additional or incremental fee for receiving the unique, interactive visibility event content stream from the visibility event decoder-server process U[1] running, in the exemplary embodiment, on visibility event content server labeled 3545. The step of charging the user for this additional interactivity is labeled 2482. As described in FIG. 24A (step 2430), this charge is a monetary charge or other assessment applied to the specific client-user requesting a unique visibility event data stream for which the prefetch is driven by client-user supplied navigational input. As described, in some embodiments the unique visibility event packet stream enables a much less restricted navigation of the modeled environment than is possible when receiving a broadcast visibility event packet stream for which prefetch is driven by a prescripted camera/viewpoint motion path. The incremental charge incurred for receiving the unique visibility event stream, in some embodiments, reflects the value of the additional navigational freedom enabled by the unique stream.

FIG. 35C also illustrates the method of charging a client-user an additional fee for delivering a cash store object that can later be used (for example worn, carried, or operated) during a broadcast visibility event stream (e.g. SIM content A driven by a prescripted camera/viewpoint, as delivered, in the exemplary embodiment of FIG. 35C, by decoder-server process A, and as received by decoder-client process 3577; or during the delivery of a unique visibility event content stream, driven by client-user controlled camera/viewpoint motion control as delivered, in the exemplary embodiment of FIG. 35C, by decoder-server process U[1], labeled 3561, and as received by decoder-client process 3575. The step of charging an additional fee for the delivery of a cash store object is labeled 3582 and can be implemented in the case of a passive SIM or a fully interactive unique visibility event datastream.

Methods of Navigation-Based Prefetch for Visibility Event Data

The methods of streaming visibility event data from a server unit to a client unit, as specified in the co-pending PCT patent application number PCT/US2011/042309 and as further specified in the present application, employ navigation-based prefetch and integrated caching to prevent late arrival of visibility event packets.

Methods of adaptively selecting lower level-of-detail packets (smaller size packets) for delivery during periods of predicted late packet arrival and/or high viewpoint velocity are specified in the co-pending PCT patent application number PCT/US2011/042309. These methods work in conjunction with navigation-based prefetch that is driven either by prescripted camera motion or by a client/user's interactive control of camera/viewpoint movements in the modeled environment.

Embodiments include specific techniques for prefetching visibility event packets based on viewpoint navigation in a modeled environment.

As described in the co-pending PCT patent application number PCT/US2011/042309, the bandwidth requirement for streaming of visibility event data is a function of the spatiotemporal visibility coherence of the visualization. Spatiotemporal visibility coherence is determined by the spatial visibility coherence of a modeled environment (e.g., the inverse of the rate of change of visibility per unit distance), together with the velocity of the viewpoint. Bandwidth requirement is also related to the level-of-detail at which the geometry and texture information is represented in the visibility event packets sent. As specified in the methods of PCT patent application number PCT/US2011/042309, the level-of-detail of visibility event packets selected for transmission can be dynamically selected to prevent late packet arrival as specified in the co-pending PCT patent application number PCT/US2011/042309.

In some embodiments, prefetch is a general method of data delivery which hides latency or improves hit rate by pre-sending data to a client unit before it is actually needed by the client unit. In the context of visibility event data streaming, prefetch intrinsically decreases the probability of late packet arrival, which would otherwise cause noticeable visibility errors during the streamed visualization.

In general, regardless of the application, prefetch actually increases the amount of data streamed, since inevitably more data is delivered to a client unit than will actually be used.

The amount of additional data that is streamed by a prefetch implementation (i.e., the bandwidth requirement of the prefetch implementation) is determined, in part, by the precision with which the prefetch algorithm predicts future data accesses. The precision of future data accesses (i.e., hit rate) is a function of the intrinsic predictability of future data access given knowledge of the current data being accessed.

The following exemplary equations illustrate principles of operation and provide tools for estimating the bandwidth requirements for one embodiment of the methods of visibility event streaming driven by navigation-based prefetch. In additional embodiments, the principles of operation and bandwidth requirement estimates are governed by other theoretical models and equations.

In some embodiments, the bandwidth requirement for navigation-based prefetch of visibility event data is determined by the general parameters as specified in Equation 1.

$$\text{Bandwidth Requirement} = B = v * G_v \qquad \text{Equation 1}$$

where
v=viewpoint velocity
$G_v$=Visibility Gradient (Change of visibility per unit distance)

The inverse of the product of viewpoint velocity and visibility gradient reflects the coherence of visibility over time and is called the temporal visibility coherence, as shown in equation 2.

$$\text{Temporal Visibility Coherence} = V_{TC} = 1/(v*G_v) \qquad \text{Equation 2}$$

Temporal visibility coherence reflects the average visible lifetime of graphical elements during a visualization and can be expressed in units of time.

The bandwidth requirement is also proportional to the level-of-detail of the visibility event data being delivered, as shown in Equation 3.

$$B = D_P/V_{TC} \qquad \text{Equation 3}$$

where
$D_p$=Level-of-Detail of Visibility Event Packet Data

As described in the methods of FIGS. 42A and 42B, as well as FIG. 48A and FIG. 50A of PCT patent application number PCT/US2011/042309 the level of detail can be adaptively lowered during periods of low temporal visibility coherence in order to decrease bandwidth requirements and prevent late packet arrival while maintaining a perceptually lossless visibility event data stream in which the low level-of-detail substitutions cannot be easily perceived by the user's visual system. The reduced performance of the human visual system for surfaces having low exposure time is discussed in conjunction with FIG. 23 of the present application. Additionally, the reduced performance of the human visual system for rapidly moving targets is discussed in conjunction with FIG. 51 of the PCT patent application number PCT/US2011/042309. Both low exposure time and rapid image-space velocity of visual targets are encountered during periods of low temporal visibility coherence.

For any integrated prefetch-cache scheme, the amount of data sent is generally greater than the amount that will be accessed. The average cache size is influenced by the ratio the amount of data sent to the amount of data accessed at a given cache hit rate. This ratio is strongly influenced by the predictability of the data access, which for navigation-based prefetch is determined by the predictability of the navigation. Consequently, a highly predictable navigation will reduce the bandwidth requirements as shown in equation 4.

$$B = D_P/(V_{TC} * P_N) \qquad \text{Equation 4}$$

where
B=Bandwidth Requirement
$D_P$=Level-of-Detail of Visibility Event Packet Data
$V_{TC}$=Temporal Visibility Coherence
$P_N$=Predictability of Navigation The predictability of navigation can be increased by imposing constraints on navigation, e.g. restricting navigation to a pathway in the modeled environment that is defined a-priori or that is imposed during navigation.

Note that the predictability of navigation is also intrinsically influenced by the maximum velocity and acceleration that is part of the underlying navigational model of the game or SIM. Consequently the $P_N$ and the $V_{TC}$ are not strictly independent, although factors like navigational constraints can influence $P_N$ without directly influencing $V_{TC}$.

In the next section, specific methods of delivering visibility event packets by navigation-based prefetch are disclosed. These methods increase cache hit rate and minimize bandwidth requirement by prefetching visibility event data packets using a packet priority or packet streaming rate that reflects the probability that the viewcell corresponding to packet will be the next viewcell penetrated by the viewer.

FIG. 36A is an exemplary flowchart showing a method of determining the probability that a viewcell will be penetrated by a viewer based on most probable movement (MPM).

FIG. 36A is an exemplary flowchart showing a method of adjusting the rate of data streaming for visibility event packets to reflect the probability that the viewcell corresponding to the packet will be the next viewcell penetrated by the viewer.

FIG. 36A Method of Determining the Probability That a Viewcell Will Be Penetrated By a Viewer Using Most Probable Movement The motion of a viewpoint in a 3 dimensional space is determined, in some embodiments, by the velocity and acceleration of the viewpoint along each axis of the space.

The following equations are employed, in some embodiments, in motion models for games and other walkthough type applications:

$$X = X_0 + V_X * dT // X \text{ position} \quad (5)$$

$$V_X = V_{X0} + A_X * dT // V_X = X \text{ velocity} \quad (6)$$

$$A_X = A_{X0} + J_X * dT // A_X = X \text{ acceleration} \quad (7)$$

$$Y = Y_0 + V_Y * dT // Y \text{ position} \quad (8)$$

$$V_Y = V_{Y0} + A_Y * dT // V_Y = Y \text{ velocity} \quad (9)$$

$$A_Y = A_{Y0} + J_Y * dT // A_Y = Y \text{ acceleration} \quad (10)$$

$$Z = Z_0 + V_Z * dT // Z \text{ position} \quad (11)$$

$$V_Z = V_{Z0} + A_Z * dT // V_Z = Z \text{ velocity} \quad (12)$$

$$A_Z = A_{Z0} + J_Z * dT // A_Z = Z \text{ acceleration} \quad (13)$$

Where $J_N$ is the "jerk" or first derivative of acceleration in the direction N.

In most game applications the velocity, acceleration and even the jerk) are limited to a specific range of values which constrain the viewpoint motion.

The value dT is the timestep used in the calculation. The ping time (i.e., round-trip-time) between the visibility event server and client units effectively represents a minimum value of the timestep that can be realistically employed to estimate a future value of a navigational parameter from a current value. This is because if the server unit is determining a future value of a navigational parameter using a "current" value received from a client unit, the current value is at least dT time units old, where dT is the ping time between the server and the client. In alternative embodiments, if the determination of the navigational parameter is made by the client and sent to the server, the result used by the server unit is still at least dT units later than the client's actual value.

Thus, the ping time or latency between the client and the server creates an uncertainty in position, velocity, and acceleration which can decrease the accuracy of the navigation prediction algorithm.

In some embodiments, given current values for position, velocity, and acceleration a future value of position can be computed assuming that velocity and/or acceleration remains constant. This is the basis of dead reckoning navigational predictions used in multiplayer games to predict a future position of a player from a previously known position. In such applications, predictions are used to reduce the frequency at which actual player states are transmitted across the network, thereby reducing the network traffic. The basic method of simple navigation-prediction by dead-reckoning is described in the publication "Simplified Aerial Navigation by Dead Reckoning, McMullen, J. Charles Griffin & Co. 1933" incorporated herein by reference.

In the present embodiment directed to navigation-based prefetch, navigation prediction is not used solely as a substitute for receiving actual position, velocity, and acceleration data from a client unit (which typically consumes a small amount of bandwidth), but primarily to predict the probability of a viewcell being penetrated in the future given current values of the navigational parameters. Increasing the precision of this prediction decreases the amount of data that is prefetched, since a highly predictable navigation generally uses a smaller cache to insure a high hit rate (low incidence of late packet arrival).

FIG. 36A is an exemplary flow diagram showing techniques for determining the probability that a viewcell will be penetrated, given a current viewpoint position and current states of velocity and acceleration vectors.

In the following discussion, in some embodiments, it is assumed that viewcells are located in the navigable space of the modeled environment. The method accommodates embodiments in which viewcells are equivalent to navigation cells. It also accommodates embodiments in which the viewcells are contained within navigation cells and vice versa.

In some embodiments, viewcells are restricted to the empty navigable space of the environment (i.e. regions that do not contain objects). In other embodiments viewcells may contain modeled objects, in which case the modeled objects contained in the viewcell are considered to be part of the potentially visible set for the corresponding viewcell. Navigation cells, in some embodiments, are located in the navigable space of the environment. In some embodiments, such as those embodiments in which collision detection employs voxel representation, navigation cells are also restricted to the empty navigable space of the modeled environment or can include the boundary between empty or occupied space. In some embodiments navigation cells may contain modeled objects and the collision detection algorithm within a navigation cell uses the modeled objects within the navigation cell.

Consequently, in some embodiments, viewcells and navigation cells, are equivalent.

In step 3605 the viewcell containing the viewer's current viewpoint is determined. The viewcell containing the current viewpoint is identified using the reference variable C_VIEWCELL.

In step 3610, the viewcells adjacent to C_VIEWCELL are identified. In exemplary embodiments, a viewcell is a parallelepiped having six faces. A parallelepiped is a box-like structure which may have a cube-like or rectangular shape. Other convex viewcell arrangements are possible. Adjacent viewcells, in some embodiment, include those viewcells sharing a face with C_VIEWCELL. For example, a C_VIEWCELL that is surrounded by viewcells that are all the same size as C_VIEWCELL has 6 adjacent face-connected neighbors. If the neighboring viewcells are smaller than this number may be greater. Adjacent viewcells are identified using the set of viewcell data structures, from which contains cell adjacent information. Alternate embodiments consider viewcells to be adjacent if they share a face or part of an edge. Using this definition of adjacency, for example, a viewcell surrounded by viewcells of the same size has 18 adjacent neighbors. If vertex connected neighbors are also considered to be connected if they share a vertex, then a viewcell surrounded by viewcells of the same size has 26 adjacent neighbors.

In subsequent decision step 3615, it is determined, for an a adjacent viewcell, if the visibility event packet corresponding to the viewcell-to-viewcell transition between C_VIEWCELL and the adjacent viewcell has already been fetched. If, in decision step 3615, the visibility event packet for the adjacent viewcell has already been fetched, then process flow proceeds to step 3620, in which the next adjacent viewcell is processed.

If, in decision step 3615, it is determined that the visibility event packet corresponding to the viewcell-to-viewcell transition between C_VIEWCELL and the adjacent viewcell has not already been fetched, then processing process flow proceeds to step 3625.

In step 3625, the time until the current viewpoint penetrates the boundary between C_VIEWCELL and the adjacent viewcell is estimated. This time period is a prediction based on the current viewpoint location, velocity and possible acceleration vectors. This prediction employs, in some embodiments, a variety of methods which have different computational costs and which lead to solutions having different degrees of precision.

In one embodiment, the estimation of viewpoint penetration time determined in step 3625 is made assuming constant velocity vector over time. This is a simple dead reckoning linear solution. Alternative embodiments employ an assumption of constant acceleration, in which the viewpoint motion path is described by a quadratic space curve, or a piecewise linear approximation to the space curve.

The aforementioned techniques in which constant velocity or acceleration are assumed lead to a single solution for an estimated penetration time. Alternate embodiments employ more refined predictions which do not assume that velocity or acceleration are constant during the prediction period. In one embodiment, the prediction employs a set of values for initial viewpoint position, velocity, and acceleration that are possible during the prediction period. In this technique, the set of values used follows a distribution curve reflecting the probability that a specific value of initial position, velocity, and acceleration occurs during the prediction period. This distribution reflects the motion constraints imposed by the maximum and minimum values of velocity and acceleration. Additionally, the distribution can be weighted by such factors as the predicted intentionality of the user based on statistics gathered from many user's navigating the same viewcell.

Using a distribution of possible navigational parameters during prediction in a Monte Carlo simulation of possible viewpoint motion curves produces a variety of results for predicted penetration time between C_VIEWCELL and the adjacent viewcell.

In step 3620 the relative probability that a specific viewcell adjacent to C_VIEWCELL is penetrated is determined using both the number of viewpoint motion curves that intersect the adjacent viewcell and the estimated time to penetration of these space curves. This probability is computed, in some embodiments, for each of the adjacent viewcells for which the corresponding visibility event packet has not yet been fetched, and the probabilities are compared to determine a relative probability that a specific adjacent viewcell will be the next viewcell penetrated. Conducting a Monte Carlo-type prediction of a viewpoint motion at runtime can incur a high computational cost. The present method includes embodiments in which these predictions are determined offline, and the results stored in a look-up table for a given set of initial position, velocity and acceleration values. Exemplary data for one embodiment of such a look-up table for a single viewcell/navcell is given in FIG. 36B and discussed in connection with that figure. This table reflects the probability of penetration of adjacent viewcells given a starting viewcell and the initial parameter values. Since the arrangement of adjacent viewcells around a starting viewcell defines a finite number of patterns that recur frequently in the viewcell adjacency graph of the model, a limited number of tables need to be precomputed and stored. In subsequent step 3625, the visibility event packets corresponding to adjacent viewcell penetrations are fetched using a priority or streaming rate that is proportional to the estimated probability that the corresponding adjacent viewcell will be penetrated.

The method accommodates prefetch of visibility event packets corresponding to non-adjacent viewcell transitions by using a specific adjacent viewcell as a starting point, determining the relative probability of penetrating the viewcells adjacent to the specific adjacent viewcell and then multiplying the probabilities.

In one embodiment, each visibility event packet is completely streamed to the client, but the order of packets streamed is selected to be proportional to the packet's relative probability of penetration. In some embodiments, the priority or order of packets streamed are weighted to be proportional to the size of the individual packet.

Other embodiments are possible in which data from multiple packets are streamed simultaneously by selecting subpackets or bytes from each packet and assigning a streaming rate to each substream that is proportional to the relative probability of penetration of the corresponding viewcell. In some embodiments, the streaming rate for a visibility event packet is weighted to be proportional to the size of the visibility event packet. For example, an equation determining the bandwidth to be assigned to streaming a subpacket is Equation 14:

$$B_S = P_S(S_S + I_S) + H \qquad \text{Equation 14}$$

where
$B_S$=Bandwidth for streaming subpacket S
$P_S$=Probability of Penetration of Viewcell Boundary for Subpacket s
$S_S$=Size of subpacket S
$I_S$=Visual Importance of subpacket S (salience)
H=Size of subpacket header In step 3630 cached visibility event packets and corresponding PVS data corresponding to viewcells having a low probability of penetration are selected for replacement if cache replacement is required to control cache size.

FIG. 36B is an exemplary sub-table representing a look-up table for the probability of penetration of viewcell's neighboring face-connected viewcells for a limited set of relative viewpoint velocities.

As previously indicated, the probability that a specific neighboring viewcell of a viewcell containing an actual or predicted viewpoint position will be penetrated is a function of several parameters. The probability of penetration (POP) of a neighboring viewcell is determined by factors including the current position of the actual or predicted viewpoint in the starting viewcell, the velocity vector, intrinsic restrictions to navigation at the viewcell boundaries, navigational decisions made by the same user or multiple other users navigating the starting viewcell and many other factors.

In one embodiment, the aggregate effect of these factors is determined (including, in some embodiments, as data mined from many navigational experiences of many client users) is compiled into a multidimensional look-up table.

An exemplary sub-table for such a navigation-prediction table is displayed as FIG. 36B. In FIG. 36B the relative POP of the six faces of viewcell VC[0][223][22] is expressed as a function of the velocity vector of the actual or predicted camera/viewpoint on entry to viewcell VC[0][223][22]. In some embodiments, sub-tables for the camera/viewpoint position are also included.

The use of look-up tables, in some embodiments, requires less cpu resources than other methods of navigation-prediction, but may have more storage requirements.

Method of Adaptively Imposing Navigational Constraints to Prevent Late Packet Arrival The parameter $P_N$ of Equation 4, predictability of navigation, reflects the fact that from any given viewcell, the number of reachable adjacent viewcells may be limited. These navigation constraints can be caused by objects in the environment which restrict navigation on the basis of collision, e.g. with walls, curbs, guardrails etc.

FIG. 37 is an exemplary flowchart showing a method of adaptively imposing navigational constraints during periods of possible late packet arrival.

In decision step 3705, it is determined if, given the current states of the client visibility event cache and the current viewpoint position, velocity, and acceleration vectors, as well as the arrangement of the viewcell adjacency graph for the currently occupied viewcell, late packet arrival is possible.

Late packet arrival is predicted if a probability-weighted and packet-size-weighted navigation model (Equation 14) using dead-reckoning (Equations 5-13) or probabilistic dead reckoning indicates that a visibility event packet will arrive at a client unit after the viewpoint crosses the viewcell boundary corresponding to that visibility event packet.

If, in decision step 3705, it is determined that late packet arrival is not possible, then process flow proceeds to step 3710, in which the nominal prefetch mode is continued.

If, in decision step 3705, it is determined that late packet arrival is predicted, then process flow proceeds to step 3715.

In step 3715, the system imposes a navigational constraint at one or more of the current view's boundaries with adjacent viewcells. In one embodiment, this constraint causes one or more viewcell boundaries to act as collision objects that prevent the viewpoint from penetrating an adjacent viewcell.

According to Equation 1, causing such a restriction to navigation lowers the bandwidth requirement for prefetch. By closing off navigation between the current viewcell and one or more adjacent viewcells, the available transmission bandwidth can be dedicated to the non-restricted packets corresponding to the remaining non-restricted viewcell boundaries. This presents the advantage of decreasing the bandwidth requirement and tends to prevent late packet arrival for the unrestricted viewcell boundaries.

In some embodiments, viewcell boundaries chosen for restriction are those for which restriction produces the greatest reduction in the probability of late packet arrival, and also tends to cause the least disruption of intended navigation.

In some embodiments, boundaries having the following characteristics are good candidates for adaptively imposing navigational restriction:
1. Corresponding visibility event packet has large packet size and only a relatively small amount of the packet information has already been sent. This corresponds to a high time to complete packet transmission.
2. Corresponding visibility event packet has high time to complete packet transmission but low relative probability of penetration.

The imposition of navigational restriction at viewcell boundaries which do not corresponding to natural collision surfaces in the modeled environment tends to increase the precision of the navigation-prediction algorithm, and thereby increase the hit rate of the navigation-based prefetch algorithm, which can prevent late packet arrival. However, the imposition of such navigational constraints can also reduce the freedom of movement of a client-user, which diminishes the level of interactivity and immersion in the modeled environment. The method of selecting boundaries with low relative probability of penetration for navigation restriction tends to decrease the frequency with which the viewer tends to encounter one of these seemingly arbitrary navigational restrictions.

An optional technique to minimize the arbitrariness of the imposed navigational restrictions and thereby make navigation more predictable to the client-user is cause the imposed navigational constraint to be represented to the user. This representation includes, in some embodiments, a translucent boundary which indicates the navigational restriction. This optional step is shown as step 3720.

Method of Navigation-Based Prefetch of Visibility Event Data in which Viewcells/Navigation Cells on a Defined Roadway or Other Path are Assigned Weights Giving a Higher Probability of Penetrations than Cells not on Path.

The bandwidth requirements for navigation-based prefetch of visibility event (VE) packets is determined, in some embodiments, by several factors including the size of visibility event packets. The size of a visibility event packet is a function of the visibility coherence at the corresponding visibility event boundary as well as the precision of the corresponding PVSs. As previously described, VE packets or subpackets are also encoded at a plurality of levels-of-detail, with the lower level-of-detail packets having a smaller size.

In addition to the size of the VE packets, bandwidth requirement for VE prefetch is also determined by the velocity of navigation (i.e. number of visibility event boundaries actually crossed by a viewpoint/camera position in a given time period) as well as the predictability of navigation.

A more predictable, restricted navigation path, e.g. navigation constrained to a roadway or a footpath, will require maintenance of a smaller visibility event cache, since the number of VE boundaries potentially reachable in a specific period of time is limited by such navigational constraints.

As previously discussed, FIG. 37 is a flowchart showing a method of adaptively decreasing bandwidth requirement by imposing a restriction on navigation.

FIG. 38 is an exemplary flow diagram showing an alternate method of decreasing bandwidth requirement for VE packet streaming by preferentially prefetching VE packets that correspond to viewcells/navigation cells that are on a roadway or other path, if the actual viewpoint is located on or near the path.

Turning now to FIG. 38, in decision step 3805 it is determined if the viewpoint (which may also include a predicted viewpoint location) is on or near a road or other defined path. Exemplary embodiments are possible in which the path is a footpath, flyway, waterway or other navigation path.

If, in decision step 3805 it is determined that the viewpoint is on or near a defined path, then processing proceeds to step 3815. In step 3815, viewcells in the vicinity of the current viewpoint and located on the same path as the current viewpoint are assigned a relatively higher probability of penetration that viewcells that are not on the same path. By increasing the relative probability of penetration of viewcells on the path, the prefetch method of FIG. 36, step 3625 will tend to preferentially prefetch VE packets for path viewcells by dedicating a higher streaming rate or priority order than VE packets corresponding to non-path viewcells.

By preferentially prefetching VE packets corresponding to path viewcells, the method of FIG. 38 allows a higher viewpoint velocity if the viewpoint navigation is restricted to the path, since at any given available streaming bandwidth more of the available streaming is dedicated to delivering VE packets corresponding to path viewcells.

In many common instances, users naturally tend to follow defined paths through a modeled environment. The method of FIG. 38 will tend to allow higher navigational velocities on such paths.

If, in decision step 3805, it is determined that the viewpoint is not on a defined path, then processing proceeds to step 3820. In this case, the predictability of navigation is lower, since the degrees of freedom in moving to adjacent viewcells is increased. This situation generally requires the maintenance of a larger VE cache which, in turn, requires more bandwidth. If the required bandwidth exceeds the available bandwidth then late packet arrival may occur as the actual viewpoint location outruns the viewcells corresponding to cached VE packets. In this case, the velocity of viewpoint motion can be reduced (as described in conjunction with the method shown in exemplary flow diagram 48B the co-pending application.)

In optional step 3820, a visual indication of off-path regions is displayed to the user which indicates that a lower maximum viewpoint velocity may occur in these regions. In one exemplary embodiment the off-path regions contain shrubs or other objects which naturally tend to reduce navigational velocity. The display of these types of objects in off-path areas will signal the user that velocities may be limited in these regions.

Method of Imposing Navigational Constraints to Prevent Late Packet Arrival in which the Navigational Constraint is Accompanied by a Visual Indication of Loss of Stealth The method of imposing navigational constraints to prevent late packet arrival described in the exemplary flowchart of FIG. 10 admits any restriction to navigation including those caused by collision or other impediment to navigational progress.

Method of Restricting Navigation During Loss of Stealth Status Coincident with Decreased Visibility Coherence FIG. 39A is an exemplary flow diagram showing a method of imposing navigational constraints to prevent late packet arrival wherein the imposed navigational constraint is accompanied by a visual indication of loss of stealth, and the navigational constraint is caused as a result of this loss of stealth. According to some embodiments, stealth refers to a vehicle's or avatar's ability to travel undetected in the modeled environment. The method of imposing navigational constraints is most applicable to game or SIM streaming for entertainment purposes. However, the imposition of navigational constraints can also be used during visibility event streaming for real-world tactical visualization, and autonomous navigation.

Imposed navigational constraints should not interrupt the continuity or interactivity of the experience delivered by visibility event data stream in an arbitrary or unpredictable way. The method of the exemplary flowchart allows the user to predict locations in which navigational velocity may be restricted (e.g., by display of such navigational restrictions in step 3820 of FIG. 38, which can occur before the navigational restriction).

In some embodiments, the method of exemplary flow diagram FIG. 39A, the predictability of navigational constraints, is not tied to existing restrictions previously displayed in the environment, but a navigational model in which a stealth status of the user or user operated vehicle or avatar is tied to the user's movements in the environment.

In one example embodiment, stealth is compromised with sustained rapid movement in an environment. In this regard, sustained rapid movement increases the likelihood of late packet arrival since the bandwidth required for the client device associated with the vehicle or avatar has increased.

Other examples are possible in which stealth is also compromised when a viewer movement into a region causes the viewer to become exposed to more reflected light from surfaces in the environment. Since the amount of surface area that the viewer is exposed to is a function of the size of the PVS, the rate of change of exposed surface area inversely correlates with local visibility coherence of the model.

Both rapid motion and a high rate of exposure of new surfaces can contribute to low temporal visibility coherence which can threaten late arrival of visibility event packets. By restricting navigation under these conditions using a navigational model linked to stealth, late packet arrival can be prevented in a way that is logical and predictable to the user.

Turning now to FIG. 39A, in decision step 3905 it is determined if late packet arrival is predicted. If late packet arrival is not predicted, then process flow proceeds to step 3910. In step 3910, an indication that the display is not compromised is displayed. In exemplary embodiments, this indication of stealth can include displaying an avatar or vehicle as translucent, transparent or otherwise difficult to see. An indicator gauge indicating level of stealth can also be displayed. Embodiments employing other displayed indications of compromised stealth are possible.

If, in decision step 3905, it is determined that late packet arrival is predicted then process flow proceeds to step 3913. In step 3913 an indication that stealth status is compromised is displayed. As previously described, this indication can include, in various embodiments, a change in translucency, transparency, stealth gauge or other representation to the user that stealth status is compromised.

In step 3915, navigation is restricted. This restriction may include an imposed limitation of navigation caused by detection by an enemy or adversary, for example. In one exemplary embodiment, a loss of stealth results in consequences of detection which rapidly restricts navigation by engaging the player in an attack or other hindrance. For example, loss of stealth may trigger an AI attack which impedes forward progress. Other embodiments are possible in which the velocity of the user's avatar or vehicle is automatically slowed in order to prevent detection.

In step 3920, the cause of the navigational restriction is displayed. Exemplary embodiments this cause may include engaging enemies, traps, stasis fields linked to the stealth model or other possible restrictions.

FIG. 39B and FIG. 39C are exemplary diagrams showing, respectively a stealth meter and a spatiotemporal coherence meter that gives a client-user an indication of the probability of late visibility event packet arrival.

The methods of FIG. 37, FIG. 38, FIG. 39A, and FIG. 43, in some embodiments, result in a client-user experiencing limited navigation during periods of low spatiotemporal visibility coherence. This limited navigation may take the form or reduced velocity (e.g. FIG. 38 and FIG. 39A) and/or actual restrictions which prevent movement into certain areas of the modeled environment (e.g. FIG. 37 and FIG. 39A). The predetermined and adaptive imposition of limits on user navigation, according to the described methods, reduce the probability of late visibility event packet arrival. By preventing late packet arrival, these methods prevent the visually disruptive effect of missing graphical objects which can suddenly "pop" or appear in the scene some time later than when they actually should have become exposed.

In some embodiments, these methods of adaptively imposing navigational limits are only implemented if the methods of sending low level-of-detail packets (e.g. FIG. 42A and FIG. 43), or small visibility event packets (e.g. FIG. 44) do not prevent the late packet arrival. Although these methods of imposing navigational limits can prevent the visual disruption caused by late packet arrival, the resulting limitation of user camera/control can disrupt a client user's sense of control and immersion.

One method of preserving the sense of control and predictability during imposed limits on navigation is to display an indicator to the client user that such limits are or soon will be experienced by the user.

As described in step 3910, for FIG. 39A, one circumstance in which navigational limits may logically imposed is in a stealth game or training application in which high velocities in certain areas of the modeled environment (e.g. terrain which creates noise when traversed, or which is occupied by motion detectors) results in loss of stealth. In some embodiments, this loss of stealth results in detection which produces consequences that limit navigation (e.g., attacks).

In some embodiments, the stealth level of a user avatar or vehicle is set to be a function of the probability of late packet arrival which is determined, in some embodiments, as a function of the spatiotemporal visibility coherence of the visibility event data stream and/or the state of the visibility event cache of the decoder-client process. A gauge reflecting the probability of late packet arrival is displayed as a gauge or other indicator of stealth status.

FIG. 39B is an exemplary diagram showing an indicator of stealth status.

In other types of games, such as Assassin's Creed (Ubisoft Inc.), the user's camera/viewpoint moves in an alternate space-time in which the navigation of the user avatar is subject to maintaining a type of "synchronization" which allows the space-time translocation to continue.

In one embodiment of the method of FIG. 39A, the ability of a user to navigate without limits is dependent on a navigational model is set to be an inverse function of the rate of exposure of the avatar or vehicle to new surfaces in the modeled environment. In this navigational model, high user velocities in regions of low spatial visibility coherence intrinsically compromise "synchronization" or other parameter describing the ability to navigate unrestricted in a space-time region. In this embodiment, the underlying navigational model is set to have the same performance characteristics as the visibility event delivery codec, namely the performance of both are a function of the spatiotemporal visibility coherence of the visualization.

FIG. 39C is an exemplary diagram showing a "spatiotemporal coherence" gauge which the user can use to predict or prevent late packet arrival and/or imposed limits of navigation by manually controlling velocity in a way that prevents low readings of the "spatiotemporal coherence" gauge (i.e. prevents actual low spatiotemporal visibility coherence). Using this visual indicator, the user can predictably navigate in the environment in a way that avoids late packet arrival and also avoids imposed limits of navigation.

FIG. 40A is a top orthographic view of a modeled environment showing the viewcells corresponding to cached visibility event packets for a first current camera/viewpoint location.

FIG. 40A illustrates objects of modeled environment that are potentially visible from a first current camera/viewpoint location labeled VP1. VP1 is a camera/viewpoint location on a camera/viewpoint motion trajectory that is under interactive control of a client-user. The dark arrow labeled VECTOR 1 is the camera/viewpoint velocity vector corresponding to VP1.

The viewcells which contain viewcell-viewcell transitions that correspond to visibility event packets currently cached by the decoder-client process are shown in FIG. 40A for the camera/viewpoint location labeled VP1. The prefetch of visibility event packets is determined by the current camera/viewpoint position as well as velocity and, in some embodiments, acceleration vectors using simple dead reckoning methods of navigation prediction or, in some embodiments, using the method of navigation prediction described in conjunction with FIG. 36A and FIG. 36B. In the exemplary case illustrated in FIG. 40A, viewcells in the second column of the viewcell matrix other than Viewcell [1, 2, 1] and Viewcell [1, 2, 2] are not shown since the navigation prediction used in this example has determined that the probability that Viewcell [1, 2, 3] and beyond will be penetrated in a specified time in the future is low. The visibility event packets corresponding to the undisplayed viewcells have not been sent by the decoder-sever, and are consequently not represented in the visibility event cache corresponding to client viewpoint position VP1.

Given the set of potentially visible sets (PVSs) that can be assembled from the visibility event packets (including delta-PVS data and, in some embodiments, labeled silhouette contour information) cached for the exemplary camera/viewpoint location VP1, only graphical objects 4001 and 4002 are potentially visible. That is, for the viewcells shown in FIG. 40A, only objects 4001 and 4002 are potentially visible.

FIG. 40C is a perspective view of the same objects illustrated in FIG. 40A.

FIG. 40B is a top orthographic view of a modeled environment showing the viewcells corresponding to cached visibility event packets for a second current camera/viewpoint location.

FIG. 40B illustrates objects of the modeled environment that are potentially visible from a second current camera/viewpoint location labeled VP2. VP2 is a camera/viewpoint location on a camera/viewpoint motion trajectory that is under interactive control of a client-user. The dark arrow labeled VECTOR 2 is the camera/viewpoint velocity vector corresponding to VP2.

The viewcells which contain viewcell-viewcell transitions that correspond to visibility event packets currently cached by the decoder-client process are shown in FIG. 40B for the camera/viewpoint location labeled VP2. The prefetch of visibility event packets is determined by the current camera/viewpoint position as well as velocity and, in some embodiments, acceleration vectors using simple dead reckoning methods of navigation prediction or, in some embodiments, using the method of navigation prediction described in conjunction with FIG. 36A and FIG. 36B. In the exemplary case illustrated in FIG. 40B, viewcells in the second column of the viewcell matrix other than Viewcell [1, 2, 4] and Viewcell [1, 2, 5] are not shown since the navigation prediction used in this example has determined that the probability that Viewcell [1, 2, 6] and beyond will be penetrated in a specified time in the future is low. Moreover the visibility event packets associated with Viewcell [1, 2, 1] and Viewcell [1, 2, 2] which were cached for the earlier camera/viewpoint location VP1 are no longer present in the cache for VP2. In this exemplary case, the previously cached visibility event packets Viewcell [1, 2, 1] and Viewcell [1, 2, 2] have been replaced using a cache replacement method. In some embodiments, a cache replacement method such as LRU (least recently used) or another replacement method which determines the currently cached visibility event packets having corresponding viewcell transitions that are least likely to be penetrated in a specified time given the position and velocity vectors of the current camera/viewpoint location. The method, in some embodiments, employs prior-art techniques of cache replacement, as described in the exemplary publication "Web Caching and its Applications, Nagaraj, S. 2004 Kluwer Academic Publishers, ISBN 1-420-8050-6", incorporated herein by reference. The cached visibility event packets corresponding to VP2 include information that, in some embodiments, is used to construct the PVSs for one or more of the viewcells shown in FIG. 40B. These PVSs corresponding to the visibility event cache for VP2 include objects 4003 and 4004. As shown by their absence in FIG. 40A, objects 4003 and 4004 are not included in the PVSs corresponding to the visibility event cache for VP1.

Object 4003 is a motorcycle which, in some embodiments, corresponds to a cash store object that can be purchased and used by a client-user. In some embodiments, the exemplary motorcycle object 4003 is purchased by clicking on the object using a cursor or crosshair, or otherwise selecting the object. In some embodiments, the purchased cash store object is then made available for use during the game or SIM program (e.g. the motorcycle becomes available to ride).

As the motorcycle object 4003 is not visible from the viewcells corresponding to the visibility event cache of viewpoint location VP1, but becomes visible from the viewcells corresponding to the visibility event cache of a later viewpoint location VP2, the graphical object 4003 is delivered to the client-decoder process by a client-server process after the time corresponding to VP1 and at or before a time corresponding to VP2. The client-server process delivering this cash store item is, in some embodiments, a decoder-server process that is operating on a separate server device than the corresponding decoder-server process that is delivering the non-cash store items (e.g., 4001 and 4002), as shown in the FIG. 35A separate decoder-sever processes (3538,3539,3540) delivering unique cash store variable visibility event packets to the corresponding decoder-client processes during a broadcast of the same visibility event content delivered from a separate decoder-server process 3520 to all decoder-client processes.

Object 4004 is a billboard containing a variable message which, in some embodiments, corresponds to an advertising object that can be selected by a client-user. In some embodiments, the exemplary billboard object 4004 is selected by clicking on the object using a cursor or crosshair, or otherwise selecting the object. In some embodiments selecting the advertising objects also makes available a cash store object purchased cash store for use during the game or SIM program.

As the billboard object 4004 is not visible from the viewcells corresponding to the visibility event cache of viewpoint location VP1, but becomes visible from the viewcells corresponding to the visibility event cache of a later viewpoint location VP2, the graphical object 4004 is delivered to the client-decoder process by a client-server process after the time corresponding to VP1 and at or before a time corresponding to VP2. The client-server process delivering this advertising object is, in some embodiments, a decoder-server process that is operating on a separate server device than the corresponding decoder-server process that is delivering the non-advertising content objects (e.g. 4001 and 4002). As shown in the FIG. 35A, separate decoder-sever processes (3538,3539,3540) delivering unique advertising variable visibility event packets to the corresponding decoder-client processes during a broadcast of the same visibility event content delivered from a separate decoder-server process 3520 to all decoder-client processes.

The delivery of variable, advertising, cash-store, or messaging objects, as visibility event packets makes very efficient use of transmission bandwidth and rendering resources, since, in some embodiments, these variable objects are delivered to specific decoder-client units only just before they will become visible to a specific client-user. This is more efficient than existing methods of in-game advertising delivery, in which advertising objects, which are not customized for, or targeted to an individual client-unit, are distributed a-priori throughout the modeled environment and rendered without the benefit of a highly precise PVS maintained by visibility event streaming.

FIG. 40D is a perspective view of the same objects illustrated in FIG. 40B.

FIG. 40E is the same perspective view shown in FIG. 40D, and including a hatched ground region indicating a region of decreased navigability.

As described in conjunction with FIG. 37, FIG. 38, FIG. 39A, and FIG. 38B, in some embodiments, the maximum velocity of navigation is restricted in certain viewcells/navigation cells that are not on specified navigational paths (also called preferred navigational paths). See step 3810 of FIG. 38.

In FIG. 40E, a region of the navigable space of the modeled environment in which the maximum velocity of navigation is decreased is shown as the hatched region labeled 4005. In some embodiments such a region would correspond to a ground region that, in some embodiments, includes shrubs, mud or other modeled hindrances that would logically decrease the maximum velocity of navigation. The display of these modeled hindrances is described in step 3820 of the process illustrated in FIG. 38.

As illustrated in FIG. 40E, the number of viewcells for which visibility event data is cached is greater in the column of viewcells that do not include the hatched hindrance region labeled 4005. For example, visibility event data for viewcell [1,1,7] is cached, whereas visibility event data for viewcell [1, 2, 6] is not cached even though viewcell [1, 2, 6] is closer to VP2 than viewcell [1,1,7]. This exemplary cache state is effected, in some embodiments, by the process illustrated in step 3815 of FIG. 38, in which, during the conduct of a navigation prediction algorithm, predicted penetration of a viewcell is assigned a higher probability if the viewcell is on a preferred path. In the example of FIG. 40E, those viewcells not including a hindrance region are included in the preferred path.

FIG. 40F is the same perspective view of the same modeled environment illustrated in FIG. 40E, but without the region of impeded navigability shown in FIG. 40E.

As illustrated in the exemplary embodiment illustrated in FIG. 40E, and according to the method of FIG. 38; the state of visibility event cache for the current viewpoint VP2, as reflected in the displayed viewcells of FIG. 40E, illustrates that there are more cached viewcells in the region of unrestricted navigation than in the region of restricted navigation. (See step 3815)

FIG. 40F shows the cache state in which there are no relative impediments or hindrances to navigation. In this example, the intrinsic relative probability weights applied to determine the probability of penetration of each viewcell is the same, and the probability of penetration for any cell is determined only by the current viewpoint position and velocity vectors.

Compared to the example of restricted navigation illustrated for FIG. 40E, the number of visibility event packets corresponding to viewcells in column viewcell [1, 2, N] is increased, reflecting the lack of navigational hindrance in this column.

Conversely, the number of visibility event packets corresponding to viewcells in column viewcell [1, 1, N] is decreased, reflecting the additional packets that are added to column viewcell [1, 2, N]. Clearly, the removal of the navigational hindrance and the attendant decrease in the weights of probability of penetration for column viewcell [1, 2, N] can increase the probability of late packet arrival when navigating in column viewcell [1. 1, N]. Of course, predicted late packet arrival can be prevented (and/or actual late packet arrival mitigated) by the previously described method of down-modulating level-of-detail under these conditions as described in conjunction with FIG. 30C.

The method of assigning lower weights to relative probability of penetration for viewcell boundaries in navigationally hindered regions can be applied, in some embodiments, at runtime in the case of predicted late packet arrival; as shown in the step 1515 in the exemplary flowcharts of FIG. 42A and FIG. 43. The relative restriction of navigation at runtime would, in one example, correspond to the change in cache state illustrated in the figure sequence moving from FIG. 40F back to FIG. 40E, which shows that navigation in the preferred path column viewcell [1, 1, N] is enhanced by placing the relative navigational restriction on column viewcell [1, 2, N]. Consequently, the chance of late packet arrival is decreased in column viewcell [1, 1, N] and/or the allowable maximum velocity in this preferred path region can be increased.

FIG. 41 shows data structures which store visibility event sub-packets using the DeltaGplussubmesh exemplary data structure specified in PCT patent application number PCT/US2011/042309 and described in FIG. 31C of that application, and illustrated in FIG. 41 of the present application. In this exemplary embodiment, a DeltaGplussubmesh data structure references the set of triangles that become visible during the corresponding.

The two dimensional array of indices to an array of DeltaGplussubmesh data structures for a specific viewcell transition (i.e., a specific visibility event) is shown in FIG. 41 as DeltaGplussubmesh_subpackets[M][N] (where M=10 and N=5 in this example). In this 2D array, the first index dimension refers to one of 10 sub-packets including the visibility event packet. The second index dimension references a specific version of each sub-packet, wherein the version is encoded at one of 5 levels-of-detail in this exemplary embodiment. In the sub-packet data storage scheme of FIG. 41, all sub-packets having the same M index represent the same geometric objects. All sub-packets having the same N index represent a version of a visibility event packet at a level-of-detail N.

Method of Using Subpackets at a Plurality of Levels-of-Detail to Prevent Late Packet Arrival The co-pending PCT patent application number PCT/US2011/042309 specifies a set of methods in which visibility event packets are encoded at multiple levels-of-detail and in which low level-of-detail packets are sent during periods of threatened late packet arrival.

In this method, each visibility event packet contains all of the data for the corresponding viewcell transition at a specific level-of-detail. For each viewcell transition, multiple visibility event packets are used, each corresponding to the complete data for the viewcell transition, encoded at a specific level-of-detail.

FIG. 42A is an exemplary flow diagram showing a variation of this method in which each visibility event packet is divided into sub-packets, with each sub-packet including a specific subset of the graphic elements (e.g., polygons and texture elements) that become visible during the corresponding viewcell transition. In present method, the sub-packets are encoded at multiple levels-of-detail according to some embodiments. Using sub-packets encoded at multiple levels-of-detail allows a faster adaptive switching between levels-of-detail during periods of projected late packet arrival during prefetching and demand fetching of visibility event packets.

Turning now to FIG. 42A, in decision step 4205, it is determined if the streaming of visibility event data employs sub-packets. If, in decision step 4205, it is determined that the streaming of visibility event packets does not employ sub-packets, then process flow proceeds to step 4207. In step 4207, the adaptive modulation of level-of-detail for visibility event packets employs the methods of FIG. 48, FIG. 49, FIG. 50, and FIG. 51 of the co-pending PCT patent application number PCT/US2011/042309 in which the next visibility packet selected for sending is one having a lower level-of-detail.

If, in decision step 4205 it is determined that the streaming of visibility event data employs sub-packets, then process flow proceeds to step 4210.

In one embodiment of the method of prefetch streaming of visibility event packets using sub-packets, each sub-packet is completely streamed to the client before the next sub-packet is streamed and the order of sub-packet streaming is selected to reflect the probability that the corresponding visibility event boundary will be penetrated. In this embodiment, the order of the sub-packets can also be selected to reflect the size of the overall visibility event packet, with sub-packets from larger visibility event packets being weighted to be selected more frequently.

In another embodiment, data from several sub-packets are streamed simultaneously, with the streaming rate for a specific sub-packet selected to be proportional to the probability that the corresponding visibility event boundary will be penetrated. In this embodiment, the data rate for sub-packet streaming is selected to be proportional to the overall size of the corresponding visibility event packet (e.g., the sub-packet is 50% of the visibility event packet).

In decision step 4210, it is determined if late packet arrival is predicted. If in decision step 4210 it is determined that late packet arrival is not predicted, then process flow proceeds to step 4220.

In step 4220 sub-packets are streamed at the currently selected level-of-detail.

If, in decision step 4210, it is determined that late packet arrival is predicted, then process flow proceeds to step 4215.

In step 4215, the next sub-packet transmitted is selected to have a level-of-detail version (e.g. N value in the 2D index array of FIG. 41) having a lower level-of-detail than the currently selected level-of-detail.

The use of sub-packets allows a more rapid switch to a lower level-of-detail packet which tends to reduce the occurrence of late packet arrival. In addition, since the sub-packets previously transmitted at a higher level-of-detail can be used by the client in this method, the overall time-to-transmit a complete set of sub-packets for a given visibility event packet is reduced. This also reduces the probability of late packet arrival.

In step 4215, the switch to a lower level-of-detail sub-packet can be made for the current subpacket being transmitted or for the next subpacket to be transmitted. If the time to finish transmitting the current subpacket at the current level-of-detail is less than the time required to transmit the entirety of the corresponding subpacket at a lower level-of-detail, then the transmission of the current subpacket at the current level-of detail should be continued; and the switch to a lower level-of-detail subpacket made for the next sub-packet scheduled to be transmitted. Otherwise, the transmission of the current subpacket should be abandoned and the transmission of the corresponding lower level-of-detail packet started immediately. Another advantage of employing visibility event sub-packets, and/or otherwise streaming data from multiple visibility event packets at the same time, at a rate proportional to the probability of penetration, is that as the viewpoint moves through the set of viewcells/navigation cells, the probability of penetration for viewcell boundaries changes. These changes can often make the previously determined prefetch solution less precise. Using smaller sub-packets or other finer packets of smaller granularity allows earlier, less precise prefetch solutions to be adjusted more rapidly based on more current navigational state data. The finer granularity of these adjustments allows the dynamic maintenance of a visibility event cache that more accurately reflects the current navigational parameters. This more precise visibility event cache decreases the change of late packet arrival and tends to reduce the bandwidth required to maintain the cache.

Method of Completing a PVS by Determining a Sequence of Viewcell Boundaries and Corresponding Visibility Event Packets Having a Minimum Total Time to Transmit FIG. 42B is an exemplary flow diagram showing a method of mitigating actual late packet arrival by dedicating all available visibility event streaming and processing resources to complete the PVS of the current viewcell in the shortest possible time.

The methods of visibility event data prefetch and caching described in the co-pending PCT patent application number PCT/US2011/042309 and in the present embodiments use predictive methods which decrease the incidence of late packet arrival, which occurs when a viewpoint enters a viewcell before the visibility event packets required to construct a complete PVS for the viewcell have arrived.

If the predictive methods result in late packet arrival, then the viewpoint enters a viewcell before all of the visibility event data needed to complete the PVS for that viewcell has arrived. This corresponds to a case of actual late packet arrival. In this case, the relative probability of penetration for the current viewcell is set to 1.0, indicating certain penetration. In this case, the current method adapts, in some embodiments, to actual late packet arrival by shifting completely to a demand-fetch mode and dedicating all available visibility event streaming bandwidth to complete the current viewcell PVS. If the PVS of at least one adjacent viewcell (e.g., the last viewcell occupied by the viewpoint) is complete, then this demand streaming corresponds to completing the visibility event packet corresponding to the boundary between the last viewcell occupied and the current viewcell.

However, under conditions of low spatiotemporal visibility coherence it is possible that the PVS for the last viewcell occupied is also incomplete. Under these circumstances, in order to complete the PVS for the current viewcell, the PVS for the last viewcell occupied must also be completed.

In some cases, it may be faster to complete the PVS of an adjacent viewcell other than the last viewcell occupied and then transmit a visibility event packet from this adjacent viewcell to the current viewcell. This can occur because earlier simultaneous (e.g., multiplexed) streaming of visibility event packet or sub-packet data to multiple adjacent viewcells results in a situation in which the state of visibility event packet transmission completeness combined with the state of adjacent and current viewcell PVS completeness can make it faster to use visibility event packets from an adjacent viewcell other than the last viewcell occupied by the viewpoint.

In one technique, processing determines which adjacent viewcell should be used to result in the most rapid completion of the current viewcell PVS. This determination is made by examining the state of completeness of adjacent viewcell's PVSs and the size of the untransmitted portion of the visibility event packets corresponding to their boundaries with the current viewcell.

Under conditions of very low spatiotemporal visibility coherence, it is possible that a number of previously occupied viewcells are left with incomplete PVSs. In this case, the preceding technique is applied recursively, working from the current viewcell backwards to determine the sequence of visibility event packets must be transmitted to form a chain of completed PVSs and visibility event packets having the lowest total time to transmit and which allows the PVS of the current viewcell to be completed the fastest.

Turning now to FIG. 42B, in decision step 4230 it is determined if there has been actual late packet arrival defined as an incomplete PVS for the viewcell currently occupied by the viewpoint.

If, in decision step 4230, it is determined that actual late packet arrival has not occurred then process flow proceeds to step 4260. In step 420, the previously described method of streaming visibility event data for adjacent viewcells at a rate that is proportional to the probability that the viewcell will be penetrated is maintained.

If, in decision step 4230, it is determined that actual late packet arrival has occurred for the currently occupied viewcell, then process flow proceeds to step 4235.

In step 4235 all available transmission bandwidth and processing is dedicated to completing the PVS of the current viewcell. Streaming of visibility event data to viewcells that may be penetrated in the future is suspended.

In step 4240, the size of un-transmitted visibility event packets for adjacent viewcells is determined.

In step 4245, the completeness state of the PVS for adjacent viewcells is determined. As previously described, in situations of low spatiotemporal visibility coherence the PVS of previously occupied viewcells and other adjacent viewcells may also be incomplete.

In step 4250, both the state of PVS completeness and the size of untransmitted visibility event packets for adjacent viewcells is used to estimate the time to transmit a visibility event packet that would complete the PVS of the viewcell currently occupied by the viewpoint.

An illustration of the application of the method is shown in the exemplary FIGS. 40C and 40D. For example, during the movement of a camera/viewpoint position from VP1 shown in FIG. 40C to position VP2, shown in FIG. 40D, the visibility event packets required to construct a complete PVS for the viewcell [1, 2, 5] may not have been received by the decoder-client process in their entirety. Consequently, any movement of the camera/viewpoint into this cell for the current cache state could result in visibility errors caused by late visibility event packet arrival. If the camera/viewpoint suddenly penetrates viewcell [1, 2, 5] during this incomplete cache state then, using the method of FIG. 42B, step 4240 the size of the untransmitted portion of the visibility event packets for adjacent viewcells (VE packet corresponding to transition from viewcell [1, 1, 5] to viewcell [1, 2, 5]; and VE packet corresponding to transition from viewcell [1, 2, 4] to viewcell [1, 2, 5]) and the completeness of the PVS for these adjacent viewcells (in this example viewcell [1, 1, 5] and viewcell [1, 2, 4] (in step 4245) to determine which visibility event packet to use to complete the uncompleted PVS (e.g. viewcell [1, 2, 5]). In the example of FIGS. 40C-40D, the viewpoint motion vector VECTOR2, together with the fact that viewcell [1, 1, 5] is located in a region of unhindered navigation (and thus, in some embodiments, is assigned a higher weight for probability of penetration) will, in some embodiments, tend to result in a PVS for viewcell [1, 1, 5] that is more complete than the PVS for viewcell [1, 2, 4]. In this case the step 4250 of FIG. 42B will determine that the visibility event packet corresponding to the transition from viewcell [1, 1, 5] to viewcell [1, 2, 5] should be used to complete the incomplete PVS for viewcell [1, 2, 5] if the untransmitted portion of this VE packet is not too large.

According to some embodiments, the process of FIG. 42B is applied recursively in the case that the PVS of an adjacent viewcell is incomplete.

In one alternate embodiment, the visibility event encoding includes complete PVS packets for some viewcells in the set of encoded viewcells. These complete PVS sets may be streamed if the time to transmit the complete PVS and use it as a starting set to complete the PVS of the currently occupied viewcell using related visibility event packets is faster than using the existing set of partially complete PVSs.

FIG. 43 Block Diagram/Flowchart Showing Server Process Sending Reduced Level of Detail Delta Visibility Information In Case of Predicted Late Packet Arrival and Rendering Such Reduced Level of Detail Information Using A Blurring Filter or Obscuring Objects The block diagram/flowchart of FIG. 43 shows additional detail, in another embodiment, of the client-server process of delivering delta visibility information. In some embodiments, these steps are if the client and server are implemented in different physical devices connected by a network connection, or if the client and server processes are implemented on the same physical device.

In FIG. 43, the block diagram separates the client and server functions into different processes, without regard to whether these processes are executed on different physical devices.

The block labeled 4302 contains the client process and the block labeled 4355 contains the server process.

In a first step, the client process obtains and stores the current viewpoint in data location 4305. Data giving the current viewpoint location can be modified by an input device connected to the client process including mouse, joystick, game controller pad or other input device to modify the current viewpoint location. In alternate embodiments, the viewpoint location may be determined by a prescribed camera path.

The client process provides access to data location 4305 to the server process, which copies the data into data location 4310. This copying may occur in a local memory or across a network.

In step 4315, the server process uses the current viewpoint data to predict future locations of the viewpoint. In some embodiments, this prediction employs dead-reckoning and collision constraints, velocity and acceleration limits, and other methods of predicting future viewpoint locations from the current viewpoint location, such as prior-art methods of pathfinding commonly used to determine the navigation of non-player combatants or artificial intelligence agents in computer games or other simulations. (See "Tactical Pathfinding Using A*", Van Der Sterren, William in Game Programming Gems 3, Charles River Media 2002, the entire contents of which are incorporated herein by reference).

In step 4320, the predicted future viewpoint locations are used to determine predicted viewcell transitions, a viewcell transition being a crossing of a viewcell boundary. This step employs both the data from step 4315 and the known arrangement of viewcells for the model. Delta visibility data (also called visibility event information) corresponding to each crossed viewcell boundary, i.e. each viewcell transition, will be read by the server process in later steps.

In step 4325, the minimum time for the current viewpoint to reach the viewcell boundary corresponding to the predicted viewcell transition being processed is determined. This time is a function of the current viewpoint location and velocity, maximum possible acceleration and velocity, as well as local collision and other navigational constraints. This value is stored in the variable PENETRATETIME.

In step 4330, the maximum time to read and transmit the delta visibility information corresponding to the future viewcell transition being processed is determined. This time is determined based on the size of the corresponding delta visibility packet, available transmission bandwidth to client, and possible other factors. This value is stored in the variable TRANSMITTIME.

In subsequent decision step 4335, it is determined if the variable TRANSMITTIME is greater than the variable PENETRATETIME. If, in decision step 4335, it is determined that the variable PENETRATETIME is greater than TRANSMITTIME then process flow proceeds to step 4338.

In step 4338, instructions are sent to the client unit which indicate that the client unit should render the low level-of-detail objects (sent in the subsequent step 4340) using a filter which makes the low level of geometric, texture, or shading detail less visually apparent or objectionable to the viewer. In one embodiment, a blurring filter is used. In alternate embodiments, the instructions sent in step 4338 cause the client rendering unit to render obscuring objects in front of the low level-of-detail objects sent in step 4338 and or in regions of the viewport occupied by the low level-of-detail objects sent in step 4338. Embodiments are possible in which these obscuring objects include liquids or solids (e.g. water, oil, mud, ice, mist) on a windshield or visor that is positioned between the viewpoint and objects in the modeled environment. Other embodiments are possible in which the client unit 4302 automatically renders reduced level-of-detail objects using filters and/or obscuring objects without receiving explicit instructions to do so.

In step 4340 a low level-of-detail (LOD) version of the delta visibility data (e.g., deltaG+submesh data) is read from the out-of-core storage and made available to the client process, which uses this data to update visibility map/PVS data corresponding to the viewcell and stored in data location labeled 4350. In embodiments, this relatively low level-of-detail delta visibility data includes data having a relatively lower level of geometric detail, lower level of texture resolution, or other methods of reduced detail. As an example, a regular model may include a polygon mesh composed of over one million mesh triangles. In some embodiments, the low level-of-detail version of the regular image would include only 10% of the mesh triangles. For existing methods of generating models at multiple levels of detail see Leubke, David; Reddy, Martin et. al, "Level of Detail for 3D Graphics" Morgan Kauffman 2003, ISBN: 1-55860-838-9, the entire contents of which are incorporated herein by reference.

If, in decision step 4335, it is determined that the variable TRANSMITTIME is not greater than the variable PENETRATETIME then process flow proceeds to step 4345.

In step 4345, a higher level-of-detail version of the delta visibility data (e.g. deltaG+submesh data) is read from the out-of-core storage and made available to the client process, which uses this data to update visibility map/PVS data corresponding to the viewcell and stored in data location labeled 4350.

The steps 4315 through 4340 insure that relatively low level-of-detail geometric and/or texture information in delta visibility packets are employed only when the current viewpoint is likely to enter a viewcell before all of the delta visibility information needed to update the PVS for that viewcell has been received by the client process.

The use of lower level-of-detail information in this situation reduces the time required to read and transmit the delta visibility information to the client process; and thereby reduces the chance that the viewpoint will enter a viewcell before all of the delta visibility information required to incrementally construct the PVS for that viewcell has been read/transmitted.

Moreover, the use of this lower level-of-detail information in this situation is not likely to be detected by the user. This is because the delta visibility information supplied (e.g., deltaG+submesh information) correspond to newly exposed surfaces, which, in this situation have been exposed for a very brief time; and it is well known that the human visual system has low visual acuity for surfaces that have been exposed for brief times.

Thus, the present method is a method of initially using relatively low level-of-detail delta visibility information to update the PVS of viewcells for which the current viewpoint is likely to penetrate before the corresponding higher level-of-detail could be supplied. In embodiments, the relatively higher level-of-detail delta visibility information is sent at a later time as the exposure time of the deltaG+submesh surfaces increases, corresponding to an exposure time for which the time-dependent spatial acuity of the user's visual system would allow the user to appreciate the higher level-of-detail geometry and/or texture information. In some embodiments, the time to send the higher level-of-detail visibility information is bounded by a human's ability to perceive objects.

Low level-of-detail graphics information is delivered more quickly to the client unit than higher level-of-detail information. By delivering relatively low level-of-detail information during transient periods when late arrival of graphics information to the client is threatened, the present method substantially prevents late arrival of graphics information. Late arrival of graphics information can be considered a perceptually undesirable failure of a visibility-based prefetch system, since the missing graphic elements (or their sudden reappearance later on) is easily perceived by a viewer and is visually objectionable.

By initially delivering low level-of-detail graphics information during these periods and subsequently sending additional graphics information that can be used to increase the level-of-detail of the initial graphics information, the method can prevent late arrival of graphics information and still achieve a perceptually lossless performance degradation if the substitution schedule matches or exceeds the visual acuity vs. exposure time curve for human dynamic visual acuity.

If the substitution schedule approximates the visual acuity vs. exposure time curve for human dynamic visual acuity, then a perceptually graceful performance degradation will be experienced by the user. This performance degradation will be experienced as a discrete substitution event during the substitution of higher level-of-detail graphics information for lower level-of-detail graphics information. As the substitution schedule approaches the visual acuity vs. exposure time curve for human dynamic visual acuity, this substitution event will become more difficult for the user to perceive. In any case, the substitution event is preferable to the late arrival of graphics information (and subsequent sudden appearance) that would be caused by late arrival of graphics information.

Consequently, this method produces a perceptually lossless or perceptually graceful degradation of performance in the case of transiently low spatiotemporal visibility coherence during the visualization. This transiently low spatiotemporal visibility coherence of the visualization may be caused by transiently high viewpoint velocity or locally low visibility coherence in regions of the model where the visibility tends to change at a high rate (e.g. regions near doors moving indoors to outdoors). This method also is useful in dealing with situations in which the available transmission bandwidth is transiently diminished, or server performance is transiently diminished.

In one important situation, the situation of high viewpoint velocity, the exposure time of deltaG+submesh surfaces may not increase to a duration which allows the user to fully resolve the newly exposed surfaces. This is because at high viewpoint velocity, the time during which the newly exposed surfaces remain in the viewport can be brief.

FIG. 44 is an exemplary block diagram/flowchart illustrating a visibility event server sending, in prefetch mode, visibility event packet corresponding to a parent-to-parent viewcell transition and including labeled silhouette contour (or stored occlusion boundary information) that is used by a client process to generate child PVS data; and the same visibility event server, in demand mode, generating smaller child PVS or delta-PVS packets using the labeled silhouette contour information (or occlusion boundary information) and transmitting the smaller packets.

As described earlier in this specification, and in additional detail in the PCT patent application number PCT/US2011/042309, first-order wedges constructed using the methods of wedge construction and visibility map simplification detailed in FIG. 1 to FIG. 15 of the present application are used, in some embodiments, to generate delta-PVS or visibility event data including the polygons or fragments of polygons that become potentially visible when a viewpoint moves from one viewcell to an adjacent viewcell. This delta-PVS includes deltaG+submesh and deltaG− data that, when respectively added to and subtracted from a PVS for one viewcell produces a PVS for another viewcell, e.g. for a contiguous viewcell.

The methods described in FIG. 13 to FIG. 22 of the present application, describe an exemplary embodiment of the method of effectively encoding the delta-PVS for many child viewcells contained in a parent viewcell by labeling certain seed triangles and silhouette edges of polygon meshes included in the PVS for the parent viewcell. These labeled seed triangles are used to initiate a runtime breadth-first traversal of certain sub-regions of the PVS of the parent viewcell, which terminates at occlusion boundaries that are also generated at runtime from the labeled silhouette contours (FIG. 20 and FIG. 21). This traversal can be used to generate delta-PVS corresponding to a transition from a parent to a child viewcell (deltaG− data), or to generate the PVS of the child viewcell directly from the parent viewcell PVS.

Since the labeled silhouette contour information (or stored occlusion boundary information) has very low storage requirements, this encoding process, in some embodiments, decreases the storage requirements for delta-PVS data.

Moreover, since the labeled silhouette contour (or stored occlusion boundary information) generally requires much less bandwidth to transmit than all of the delta-PVS data for an entire set of children viewcells, this encoding decreases transmission bandwidth requirements for visibility event streaming by transmitting information that can be used to generate the delta-PVS and/or PVS data for a large number of child viewcells by sending only the delta-PVS data for the corresponding parent viewcell plus the labeled silhouette contour (or stored occlusion boundary) data.

The following discussion assumes, in exemplary embodiments, that parent1 and parent2 are two contiguous viewcells which intersect only at a viewcell boundary, and that a child2 viewcell is contained in viewcell 2.

The use of this encoding generally results in sending a relatively large deltaG+submesh data packet (e.g. for a parent1-parent2 viewcell transition) as well as a much smaller amount of labeled silhouette contour (or stored occlusion boundary) data which is used to generate, on the client unit, multiple delta-PVS or PVS for a large number of child viewcells (e.g. the children of parent2). When the decoder-server process that delivers these packets (using navigation-based prefetch) is operating in the nominal prefetch mode, sending packets encoded in this way is very efficient. This is because in prefetch mode, if the predictability of navigation is relatively low, then a relatively large cache PVS data corresponding to viewcells in the region of the current viewpoint is required to be maintained. This large cache is efficiently maintained with visibility event packets corresponding to viewcell transitions between large parent viewcells (e.g. large parent1-large parent2 delta-PVS data+ labeled silhouette contour metadata for parent2's children viewcells).

Conversely, if the transmission of visibility event information is operating in a demand mode, for example in the case of predicted or actual late packet arrival (e.g. that results from the actual-user viewpoint arriving at a viewcell for which no corresponding visibility event data has been received by the client) then the large parent-parent viewcell packets (plus labeled silhouette contour or occlusion boundary) can actually contribute to late packet arrival because the large packet has a long transmission time.

In some embodiments, in demand mode, the decoding process of generating small child PVS (or delta-PVS) packets from a parent PVS and labeled silhouette contour information (or stored occlusion boundary information) is actually performed on the server unit. This results in smaller packets (compared to the larger parent-parent packets) that, in demand mode (e.g. condition of predicted late packet arrival) require less transmission time and are therefore more effective in preventing or minimizing late packet arrival.

Turning now to FIG. 44, a server unit is labeled SERVER. The server unit transmits visibility event information (including delta-PVS information). In some embodiments this transmission is driven by navigation-based prefetch based on a client-user's input controlling viewpoint motion. In other embodiments the transmission is driven by navigation-based prefetch driven by a predetermined camera/viewpoint motion path. In either case, the prefetch may incur predicted or actual late packet arrival, for example resulting from low spatiotemporal visibility coherence of the visualization relative to the available transmission bandwidth between the server and the client.

In decision step 4405 it is determine if late packet arrival is predicted for a particular visibility event packet corresponding to the transition from viewcell parent1 to a contiguous viewcell parent2.

If, in decision step 4405 it is determined that late packet arrival is predicted then process flow proceeds to step 4415.

In step 4415, a visibility event packet smaller than a parent1-parent2 visibility event packet is generated using the decoding process that is, in one embodiment, illustrated in the exemplary flow diagrams of FIGS. 18-22. This decoding can produce a visibility event packet that is much smaller than the parent1-parent2 VE packet, the smaller packet corresponding to, in some embodiments, the PVS of the child2 viewcell that is predicted to be penetrated by the user viewpoint. In some embodiments, this PVS can be generated from the larger PVS of the parent2 viewcell by the decoding method illustrated in FIG. 18 through FIG. 22, which culminate with a rapid traversal (e.g. employing the process of FIG. 21) of connected components of the parent2 PVS that defines the child2 PVS. This method exploits the fact that the PVS of the children viewcells of parent2 viewcell are subsets of the PVS for parent2.

In some embodiments the packet generated is the delta-PVS between parent1 viewcell and the child2 viewcell of contiguous parent2. The latter packet, in some embodiments, is generated from the deltaG+submesh (visibility event packet for parent1-parent2 viewcell transition) by conducting the processes illustrated in FIG. 18 through FIG. 22, including the rapid, hinted traversal process of FIG. 21. This method exploits the fact that the delta-PVS for the viewcell transition between parent1 and a child2 viewcell of parent2 is a subset of the delta-PVS for the viewcell transition between parent1 and parent2 viewcells.

In step 4420, this smaller packet is transmitted to the client. The smaller packet requires less transmission time than the larger parent1-parent2 packet and is consequently more effective in preventing or minimizing late packet arrival than the larger packet. While the decoding step 4415 can add to the latency of transmission for the smaller packet, in the demand mode, transmission bandwidth, not server processing, is generally the bottleneck to packet delivery. Moreover, if the packet is transmitted before decoding (as in the prefetch mode of step 4425), the decoding step, in some embodiments, is performed on the client unit prior to processing. (In some embodiments, this decoding of the larger parent-parent packets can be deferred during threatened late packet arrival; the deferral reducing the time elapsed before rendering can begin, but increasing the frame rendering time, i.e. decreased frame rate, because the entire parent PVS must be rendered instead of the smaller child PVS).

In FIG. 44 a visibility event client unit is labeled CLIENT. In decision step 4435, it is determined if late packet arrival is predicted for the parent1-parent2 viewcell transition. If, in decision step 4435, it is determined that late packet arrival is predicted then process flow proceeds to step 4435.

In step 4445 the child2 PVS (or, in some embodiments, parent1-child2 delta-PVS) is received by the client unit.

In some embodiments, in step 4450 this small PVS is used directly. In alternate embodiments, the small parent1-child2 delta-PVS is used to generate the child2 PVS.

If, in decision step 4435 it is determined that late packet is not predicted and that visibility event information including the delta-PVS for the exemplary parent1-parent2 viewcell transition plus labeled silhouette contour information (or occlusion boundary information) has been transmitted to the client unit then process flow proceeds to step 4455, in which this information is received.

In subsequent step 4460, the labeled silhouette contour information (or, in some embodiments, the stored occlusion boundary information) transmitted along with the delta-PVS data for the parent1-parent2 viewcell transition is subsequently used (by, in some embodiments, methods including methods of FIG. 18-FIG. 22) to generate the PVS of child viewcells of viewcell 2, depending upon a viewpoint's predicted penetration of these child viewcells.

FIG. 45A is an exemplary block diagram/flowchart illustrating additional details of the decoder-server process illustrated in FIG. 44.

In some embodiments, the processes illustrated in FIG. 45A occur on a server unit labeled SERVER in FIG. 45A.

In decision step 4505 it is determine if late packet arrival is predicted for a particular visibility event packet corresponding to the transition from viewcell parent1 to a contiguous viewcell parent2.

If, in decision step 4505 it is determined that late packet arrival is predicted then process flow proceeds to step 4515.

In step 4515 the deltaG+submesh data (delta-PVS information) for the exemplary parent1-parent2 viewcell transition is selected for processing. In some embodiments, this selection includes reading the data from a data store including pre-stored visibility event information including both deltaG+submesh data and labeled silhouette contour information (and/or, in some embodiments, stored occlusion boundary information). This data store is labeled 4510.

In subsequent step 4520, the visibility event information read in step 4515 is used to generate occlusion boundary segments from labeled silhouette contours (in some embodiments using the processes illustrated by the exemplary flow diagrams of FIG. 18 and FIG. 19). In other embodiments the occlusion boundary information is stored directly as part of the visibility event information for the viewcell transition, and can be used without the processes of FIG. 18 and FIG. 19. In step 4520, the labeled silhouette contour information and/or stored occlusion boundary data used is specific for a particular viewcell-viewcell transition, in this example the transition between viewcells parent1 and child2.

In subsequent step 4525, information indicating a seed triangle belonging to the visibility event packet corresponding to the specific viewcell-viewcell transition (e.g. in this case belonging to the deltaG+submesh for the parent1-child2 viewcell transition) is selected. This data is part of the stored visibility event information, labeled 4510.

The resulting occlusion boundary information is used, in some embodiments together with the labeled silhouette contour information in a subsequent step, 4530 in which a traversal of the larger set (e.g. in this exemplary case deltaG+submesh for the parent1-parent2 viewcell transition) to generate a smaller deltaG+submesh set(s) which can be transmitted to the client with lower latency. The traversal of step 4530, in some embodiments employs the fast, hinted traversal process illustrated in the exemplary flow diagrams of FIG. 20, FIG. 22, and related figures.

In subsequent step the traversed polygons and, in some embodiments, polygon fragments traversed in the step 4530, are assembled into the smaller deltaG+submesh for the parent1-child2 viewcell transition. This set is labeled TT.

In subsequent step this smaller visibility event packet is transmitted to the client unit. Process flow for the server-decoder process terminates at step 4540. Process flow proceeds from 4540 to 4560 (FIG. 45B) via process 45-1.

If, in decision step 4505, it is determined that late packet arrival is not predicted then process flow proceeds to step 4550. In step 4550 the visibility event data including the larger deltaG+submesh for the parent1-parent2 viewcell transition are read from the data store 4510 and transmitted TO. In some embodiments the information read and transmitted in step 4550 also includes labeled silhouette contour information (and/or, in some embodiments stored occlusion boundary information) corresponding to one or more viewcell transition between parent2 and the child viewcells of parent2. Process flow proceeds from 4550 to 4575 (FIG. 45B) via process 45-2.

FIG. 45B is an exemplary block diagram/flowchart illustrating additional details of the decoder-client process illustrated in FIG. 44.

In some embodiments, the processes illustrated in FIG. 45A occurs on a client unit labeled CLIENT UNIT in FIG. 45B.

In decision step 4555 it is determine if late packet arrival is predicted for a particular visibility event packet corresponding to the transition from viewcell parent1 to a contiguous viewcell parent2.

If, in decision step 4555 it is determined that late packet arrival is predicted then process flow proceeds to step 4560.

In step 4560 the decoder-client process receives the smaller visibility event packet TT (the smaller deltaG+submesh for the parent1-child2 viewcell transition) sent in the step 4540, performed by the server.

In step 4570 the PVS for the exemplary child2 viewcell is generated by adding the received TT data to the previously cached parent1 PVS data. In some embodiments this addition includes the process of exemplary flowchart FIG. 22, in which the new submesh(deltaG+submesh for the parent1-child2 transition) is attached to the existing submeshes for the parent1 PVS.

This completes the child2 PVS labeled CHILD2PVS, which is available for rendering by a rendering subprocess of the client unit.

The decoder-client process terminates at step 4570.

If, in decision step 4555 it is determined that late packet arrival is not predicted then process flow proceeds to step 4575.

In step 4575 the decoder-client process receives the larger exemplary parent1-parent2 deltaG+submesh data together with the labeled silhouette contour information (and/or, in some embodiments stored occlusion boundary information) sent in the step 4550, executed by the decoder-server process. This labeled silhouette contour information or stored occlusion boundary information includes, in some embodiments, significantly occluding silhouette contours (or stored occlusion boundaries) corresponding to one or more viewcell transitions from parent2 to one or more child viewcells of parent2.

In subsequent step 4580, the labeled silhouette contour information (or, in some embodiments, the stored occlusion boundary information) transmitted along with the delta-PVS data for the parent1-parent2 viewcell transition is subsequently used (by, in some embodiments, methods including methods of FIG. 18-FIG. 22) to generate the PVS of child viewcells of viewcell 2, depending upon a viewpoint's predicted penetration of these child viewcells.

Process flow terminates following step 4580.

Method of employing navigational-based prefetch of visibility event data in which prefetch is controlled by client unit's actual location.

The exemplary flow diagram of FIG. 46 shows a method of navigation-based prefetch of visibility event data in which prefetch is driven by the location of the client unit in a real environment, as determined by GPS (or other positioning modality) or as computed by a 3D map-matching method.

In some embodiments, modeled environments based on actual environments are constructed from data acquired using LIDAR or other ranging modalities, from conventional 3D modeling, or a combination of both acquisition and hand modeling.

Increasingly, 3D data acquired using LIDAR or other ranging technologies is used to generate highly detailed 3D graphical models of complex, densely occluded actual mission environments such as urban theaters. Real-time graphics display technologies, including game engine technologies, can be used to display these models for purposes of analysis, mission planning, mission rehearsal, and to display the evolution of an actual mission in real time.

Unfortunately, these 3D models generally have very large file sizes. Consequently, using existing file download approaches, it can take a very long time to transmit these files from a central command and control server to networked client units, especially in battlefield environments where available transmission bandwidth is frequently limited. The methods of visibility event encoding (FIG. 1-FIG. 17), transmission (FIG. 36-FIG. 40), and decoding (FIG. 18-FIG. 22), in some embodiments, implemented using existing game engine software modules (e.g. FIG. 34) allows the progressive, incremental delivery of massive 3D datasets to network client units without the long download periods.

Moreover, since these models generally represent complex, densely occluded environments, they can be difficult to render at interactive frame rates using the limited graphics hardware that is often available to forward-deployed assets. The present methods of visibility event encoding, transmission, and decoding progressively and incrementally deliver such massive models as visibility event data in which most of the occluded geometry (for the currently relevant viewcells) is not transmitted and not rendered. As described in conjunction with FIG. 12A-12C, and in additional detail in the PCT patent application number PCT/US2011/042309, this reduction in graphical overdraw, in some embodiments, allows the rendering of such massive 3D models at interactive frame rates using inexpensive graphics hardware that is available on forward-deployed client units.

In this way, the visibility event codec, which performs, in some embodiments the methods of FIG. 1-FIG. 7, FIG. 36-40, FIG. 18-FIG. 22, enables the rapid delivery of tactical information in a format that is very useable for purposes of tactical visualization.

Another use of the visibility event encoding, transmission-control, and decoding methods described by the exemplary figures enumerated in the previous paragraph, is to deliver 3D data representing a real environment to mobile client units navigating under the control of a human operator of the vehicle or navigating autonomously, under the control of an autonomous navigation algorithm.

If the modeled environment is based on an actual environment, then the streamed visibility event information includes a virtual, interactive representation of the real environment that is streamed to the client unit, based on the client unit's location and movement in the real environment. A modeled environment can be reconstructed from an actual environment using LIDAR acquisition, multiple-view geometry methods, hand modeling from photographs, and a combination of these and/or other methods. The actual location of a client in a real environment can be determined using such modalities as GPS, inertial navigation and other positioning methods. In addition, the actual location of a client in a modeled environment can also be determined by solving the simultaneous location and mapping (SLAM) problem which includes a variety of important methods in the field of autonomous navigation. (See Montermerlo, M., Thrun, S., FastSLAM, A Scalable Method for the Simultaneous Localization and Mapping Problem in Robotics, Springer Verlag, 2007. ISBN-10-3-540-46399-2.)

The SLAM problem is an important problem in autonomous or robotic navigation. Robotic vehicles navigating autonomously frequently use data from external sensors (e.g. LIDAR, see below) to construct a representation (e.g. a 3D map) of the surrounding environment. In some cases, e.g. while operating in GPS-denied environments, or anywhere an independent method of determining position is not available, the robotic vehicle's autonomous navigation algorithm must determine the robot's position within the environment using the representation of the environment developed from the sensors. In these cases, the autonomous navigation algorithm is said to be computing a solution to the SLAM problem, because the algorithm simultaneously constructs a representation (e.g. a 3D map) and uses this constructed representation, together with sensor data, to determine the robot's position in the actual environment.

As discussed below, if an autonomous navigation algorithm has access to a pre-stored 3D representation of the actual environment, then the solution to the position problem is accelerated because the algorithm does not have to construct the entire 3D map in real -time. Map-matching is a general class of algorithms for determining position in an actual environment using pre-acquired sensor data which has already been precomputed into a representation of the scanned environment and which is made available to the autonomous navigation algorithm.

In one exemplary embodiment, the client unit is an autonomous (i.e., unmanned) vehicle or aircraft operating in a GPS-denied environment. In this embodiment, the actual position of the client unit is determined by solving the SLAM problem using a 3D map -matching algorithm. Map matching algorithms compare a stored model of the environment (the 3D map or represented model) to data (e.g., LIDAR) acquired in real-time in the vehicle's local environment. (See Olesk, A., Wang, J. Geometric and Error Analysis for 3D Map Matching, *International Global Navigation Satellite Systems Society, Symposium* 2009. Holiday Inn Surfers Paradise, Old, Australia. Dec. 1-3, 2009, the entire contents of which are incorporated herein by reference.) Map matching algorithms compare the stored data representing the environment to the data acquired in real time in order to determine the vehicle's location in the environment. Map matching algorithms allow a particularly efficient solution to the SLAM problem because the stored map data can be compared to the data acquired in real time. This is intrinsically more computationally efficient than the approach used by many other SLAM algorithms, which involve acquiring and processing all of the data required to completely construct a useful 3D map (i.e. 3D model) of the environment in real time. In some cases, a fast SLAM solution can be used to augment or increase the precision of a GPS solution which has limited precision (e.g. because of factors contributing to "dilution of precision").

The methods of visibility event encoding (FIG. 1-FIG. 17), transmission (FIG. 36-FIG. 40), and decoding (FIG. 18-FIG. 22), used in conjunction with the method of exemplary flow diagram FIG. 24A in which the "user's location" in step 2420 is the location of an autonomous vehicle determined using map matching, provide an efficient method of delivering useful map data to the autonomous vehicle. This efficiency results in part because using the streaming prefetch and caching methods specified in the co-pending PCT patent application number PCT/US2011/042309 and further specified in the current application, the visibility event packets can be delivered over intermittent and limited networks ("Tactical Edge Characterization Framework" Volume 3, Evolution and Application of the Framework. MITRE Technical Report 080310, Sep. 2008) which often occurs in battlefield environments. Additional efficiency in using the data results because the visibility event packets are decoded into PVS data. Like rendering algorithms, map matching algorithms need only use that portion of the map which is potentially visible from the vehicle to compare to the ranging data acquired in real time. Since the PVS data provides the map matching algorithm with this precise subset of the overall modeled environment (which is typically much larger than any single PVS) the map matching algorithm needs to process much less data.

Turning now to FIG. 46, a server unit is labeled 4610 while a client unit is labeled 4615. In the intrinsically cyclic process involving a bidirectional communications link between the client unit and the server unit, for purposes of exposition, processing starts at decision step 4620.

In exemplary embodiments, the client unit may be a manned vehicle (including aircraft). In such embodiments, the visibility event data streamed to the client unit allows display of a high fidelity 3D representation of the represented environment to a human user.

In other exemplary embodiments, the client unit may be an unmanned vehicle for which navigation is controlled completely or partially by autonomous navigation methods, including map matching.

In decision step 4620, it is determined if the position/velocity of the client unit is acquired by GPS or other modality that does not require a 3D map matching solution. If, in decision step 4620 it is determined that the position and/or velocity of the client unit is acquired by GPS or other modality that does not require a 3D map matching solution, then process flow proceeds to step 4625.

In step 4625, the actual position and or velocity, determined by GPS or other modality that does not require a 3D map matching solution is transmitted to the server unit.

In step 4630, the server unit receives and uses the information transmitted by the client unit in the step 4625 to drive navigation-based prefetch of visibility event data stored on the server unit in the data store labeled 4605. This navigation-based prefetch employs the methods specified in the co-pending PCT patent application no. PCT/US2011/042309 and may further employ the methods of FIG. 34, FIG. 36A, FIG. 36B, FIG. 37, FIG. 38, FIG. 42A, and FIG. 42B of the present specification.

The navigation-based prefetch of step 4630 causes visibility event data or delta-PVS data stored in data store 4605 to be read and sent to the client unit as a visibility event data stream labeled 4635.

In step 4635, the visibility event packets transmitted from the server unit to the client unit are used to maintain one or more PVSs, corresponding to view regions in the vicinity of the client's current location.

If the client unit is a manned vehicle, then this data can be rendered and displayed to persons operating the vehicle. This displayed data can provide a 3D representation of the environment under conditions where optical, thermal, LIDAR or other imaging is restricted.

If, in decision step 4620, it is determined that the position and/or velocity of the client unit is determined by map matching or other SLAM solution that benefits from a pre-acquired model or map of the 3D environment, then process flow proceeds to 4655.

In step 4655, the PVS data (labeled 4645), assembled from the visibility event data in step 4640, is used, together with LIDAR, multiple-view geometry or other ranging data, acquired by the client and stored in data store 4650, to determine the position of the client unit using a map matching or other method which compares stored data representing the surrounding environment (data store 4645) with ranging data acquired by the client unit in real-time or near real-time.

In step 4660, the client position and/or velocity data determined by the map matching algorithm is sent to the server unit.

Step 4665 employs the position and/or velocity data determined in step 4655 to a driver for the navigation-based prefetch described in conjunction with step 4630. In one exemplary embodiment of the method of FIG. 46, the stored visibility event data 4605 is developed from data acquired by reconnaissance assets using LIDAR or other ranging data. This data is converted from a point cloud representation to a boundary representation using polygons and the visibility event packets are determined and encoded using the from region visibility precomputation methods specified in the co-pending PCT patent application number PCT/US2011/042309.

This exemplary embodiment allows a large number of relatively inexpensive reconnaissance assets to be deployed shortly before an engagement mission which will use a less expendable attack asset. The reconnaissance assets can be remotely operated or may employ non-map matching navigational algorithms which are less computationally efficient and which can limit the velocity of the reconnaissance vehicles.

The data acquired by the reconnaissance assets is transmitted to an encoder which uses the from-region visibility precomputation methods specified in the co-pending PCT patent application number PCT/US2011/042309 to generate visibility event data stored in data store 4605.

In some embodiments, the visibility event data store of 4605 is determined using the methods of from-region visibility determination employing conservative linearized umbral event surfaces (CLUES) as described in conjunction with FIG. 1-FIG. 12. In some embodiments the CLUES data is used to generate visibility event data which includes delta-PVS data and additional metadata (labeled significantly occluding silhouette contours) which is used to generate PVS data at runtime on the client unit. The method of including labeled silhouette contour data, as described in the encoding process of FIG. 16 and FIG. 17, and the decoding process of FIG. 18-FIG. 22, decreases the bandwidth requirements for visibility event packet transmission. This improved bandwidth efficiency can be very useful in battlefield environments where high bandwidth connections are often not available.

This visibility event data can then be efficiently streamed to the attack asset, even as the attack asset is en route to the mission area. As previously described, the PVS data that is constructed from the streamed visibility event data (in step 4640) can accelerate map matching algorithms executed by the attack asset, since only small subsets of the 3D map (the PVS) need to be compared to the real-time acquired data in the region of the attack asset. This acceleration of the autonomous navigation solution can enable the attack asset to accurately navigate complex, densely occluded environments at velocities greater than those possible under the control of a human operator.

Method of accessing visibility event stream from cached data on local units when visibility event stream from primary server is inaccessible.

When the visibility event codec is employed in the manner shown in FIG. 24A in which the user's location specified in step 2420 is an actual location of the client unit in a real environment then the codec realizes a streaming, interactive, 3D virtual map that is updated based on the client's position.

The visibility event data in this case is supplied, in some embodiments, by a primary server that is located at some distance from the client. For example, the connection between this primary server and the client unit employs satellite communications.

FIG. 47 is an exemplary flow diagram illustrating a process by which the visibility event data stream is maintained even if the communication link with the primary server is lost.

In decision step 4710, it is determined if the visibility event stream with the primary server is intact. If, in decision step 4710 it is determined that the visibility event stream is not accessible from the primary server, then process flow proceeds to step 4715.

In step 4715, the current client accesses cached visibility event data from other clients. Other client units in the geographic vicinity of the current client are likely to have the visibility event information used by the current client stored in cache. This method of using client units as secondary servers implements a fully-connected network topology that improves the reliability of transmission in the case where communication with the primary server is lost.

If, in decision step 4710, it is determined that the visibility event packets are accessible from the primary server then, process flow proceeds to step 4720, in which the client continues to receive visibility event packets from the primary server.

FIG. 48 is an exemplary block diagram/flowchart illustrating forward deployed reconnaissance asset vehicles acquiring 3D data in an actual environment, transmitting this data to a visibility event encoder, and streaming the encoded visibility event data to a engagement or attack asset based on the attack assets movements in the actual environment.

FIG. 48 is an exemplary block diagram/flowchart illustrating one exemplary embodiment of the method illustrated in FIG. 46.

In some embodiments, units labeled 4805-4808 represent reconnaissance assets or vehicles which acquire 3D data about an actual environments. The 3D data acquired by the reconnaissance assets 4805-4808 is acquired, in some embodiments, using LIDAR, multiple-view geometry (e.g. Multiple View Geometry in Computer Vision Second Edition, Hartley, R., Zisserman A. Cambridge University Press 2003. ISBN 0521 54051 8, the entirety of which is incorporated herein by reference) or other methods of obtaining data that can be used to construct a three dimensional representation of an actual environment. The resulting 3D data is stored, in some embodiments as point cloud data. In some embodiments, the point cloud data is further processed into a polygon or polygon mesh representations.

The use of multiple reconnaissance units allows a more rapid acquisition of 3D data which can be assembled to a more complete 3D representation (also called a 3D reconstruction) than is possible using a single reconnaissance unit. The completeness of a 3D representation is dependent upon acquiring 3D data from multiple camera/sensor locations, which is facilitated by using multiple reconnaissance units. In some embodiments, reconnaissance units include relatively inexpensive, expendable assets include remotely operated or autonomous small aircraft or ground vehicles which may operate in restricted spaces including inside buildings and other densely occluded environments. In the exemplary block diagram/flowchart of FIG. 48, the actual environment that is the subject of reconnaissance (e.g., for the purposes of conducting an engagement or attack mission) is labeled 4850.

The data acquired by the reconnaissance units 4805-4808 is, in some embodiments, sent to a visibility event encoder process, labeled 4810 in FIG. 48. In some embodiments, the 3D data is streamed from the reconnaissance assets to the visibility event encoding unit is streamed in real-time or near real-time, whereby loss of a reconnaissance vehicle does not result in significant loss of data.

In some embodiments the raw point-cloud data or polygon data received from the reconnaissance assets is first converted to polygon mesh or manifold polygon mesh data. Commodity software for converting point cloud date to polygon mesh data is available, for example VRMesh software application from VirtualGrid company, Bellevue City, WA. The visibility event encoder, in some embodiments, employs the methods of FIGS. 1-14 (as well as, in some embodiments, other visibility event encoding and compression methods described in the U.S. Provisional Application 61/382,056) to create visibility event packets that are streamed to an attack asset via the visibility event server.

The resulting visibility event data is stored in data store 4812 of FIG. 48. This visibility event data is, in some embodiments, the same as the delta-PVS/visibility event data stored in data store 3305 OF FIG. 33, and data store 2515 of FIG. 25.

In some embodiments, the visibility event encoder process 4810 a visibility event decoder-server process are implemented using computing resources of a command center asset, labeled 4820, which includes a command and control unit in which data from multiple reconnaissance assets and different types of reconnaissance assets is integrated into a unified 3D reconstruction of reconnoitered actual environment. In some embodiments, the visibility event encoder process 4810 and the visibility event decoder-server process are hosted on different devices.

The visibility event data stored in data store is read by a visibility event decoder-server process, labeled 4815 using navigation-based prefetch which is, in some embodiments, driven by the movement of an attack or engagement asset, labeled 4830. In some embodiments, the actual engagement asset is autonomous and employs GPS, 3D map matching, or other methods to determine position. The engagement asset position data is sent from the engagement asset to the visibility event decoder-server process 4815, as illustrated by the dashed connecting line 4835. If the position or other navigational data is determined using map-matching, then the communication channel 4835 is, in some embodiments, equivalent to the communications channel indicated by the unidirectional connecting line connecting process 3360 (client unit) to process 3365 (server unit) of the FIG. 33. If the position or other navigational data is determined using a method other than map-matching, then the communication channel 4835 is, in some embodiments, equivalent to the communications channel indicated by the unidirectional connecting line connecting process 3325 (client unit) to process 3330 (server unit) of the FIG. 33.

In some embodiments, the position and other navigational data received by the visibility event decoder-server process 4815, is used to drive navigational-based prefetched of visibility event data 4812 from a visibility event decoder-server process labeled 4815 to a visibility event decoder-client process labeled 4840, wherein process 4840 is implemented on the engagement asset 4830. In the exemplary block diagram/flowchart of FIG. 48, the delivery of this visibility event data is illustrated as communication channel labeled 4845.

As described in conjunction with the description of FIG. 46, for embodiments in which the decoder-client unit position is determined using a 3D map-matching solution to the SLAM problem, the method of supplying a 3D map as visibility event data allows for a particularly efficient solution since the resulting 3D map is delivered in the form of PVS data which eliminates the need to process irrelevant data (i.e. not belonging to a PVS for a corresponding viewcell). The computational efficiency gained by using PVS data in 3D map -matching allows higher velocities during autonomous navigation, which can enable a more effective engagement mission.

The exemplary embodiments illustrated in FIG. 46 and FIG. 48, not only enable higher velocities during autonomous navigation missions, but also can increase the dispatch of such missions by allowing a real-time delivery of 3D map data acquired in the vicinity of the objective target while the engagement asset is en-route. Moreover, in some embodiments, any additional or updated reconnaissance data that is acquired by the reconnaissance assets (4805-4808) and transmitted to and processed by the visibility event encoder (4810) during the engagement mission is streamed to the decoder-client unit 4840. This additional data can be used to improve the precision of the transmitted 3D map and consequently enhance the accuracy of the engagement asset's mission.

The visibility event data stored in data store 4812, in some embodiments, is also used for analysis, tactical visualization of the objective target area, and mission planning. Mission planning, in some embodiments, includes robotic path planning. In this phase of a mission, preferred navigational paths for autonomously navigating engagement asset(s) are selected. In some embodiments, the visibility event data stream delivered to the decoder-client unit is determined by the preferred primary or secondary navigational paths decided during this mission planning phase. Path planning, in some embodiments, is dependent upon the amount of 3D data acquired during the reconnaissance phase in specific regions of the target environment.

In some embodiments, for training and entertainment purposes, visibility event data, includes camera/viewpoint motion data that is used to control a virtual camera. For example, in the exemplary SIM embodiment of FIG. 24A, data describing a prescripted camera motion path is sent from a visibility event decoder-server unit to a visibility event decoder-client unit, wherein the data drives the virtual camera during the display of visibility event content stream having restricted interactivity. In an exemplary embodiment of FIG. 48A, the camera motion control is replaced, in some embodiments, with vehicular position/velocity controls instructions which are used to effect the navigation of the engagement asset along a desired path. In such embodiments the unit 4820, functions as an integrated command and control system supporting tactical visualization, analysis, robotic mission planning, and mission execution through a bidirectional visibility event data stream driven by navigation-based prefetch of visibility event packets.

FIG. 49A is perspective diagram illustrating a two reconnaissance assets acquiring a three dimensional representation of an actual environment and sending the representation to an encoder for encoding as visibility event data.

Objects labeled 4905 and 4906 are reconnaissance assets which, in some embodiments, acquire 3D data about an actual environment. In some embodiments, the reconnaissance assets 4905 and 4906 are small, relatively inexpensive aircraft that are remotely operated or navigate using an autonomous navigation solution employing SLAM without map-matching, and therefore operating at a lower velocity than is possible with map matching. This lower velocity makes the targets more vulnerable.

In FIG. 49A objects of an actual environment including buildings 4901 and 4902, as well as a target vehicle 4950 are illustrated. The vehicle 4950 is in this example an enemy vehicle which is the target/subject of a reconnaissance assets 4905 and 4906 (as well as the target of attack asset 4908, described in FIG. 49B).

In the example of FIG. 49A, the reconnaissance assets send 3D data about the actual environment (e.g., obtained using LIDAR, multiple-view geometry, or other method) to a command center unit for encoding as visibility event data using the encoder process 4810, described in conjunction with FIG. 48. In some embodiments the encoder process is located far from the reconnaissance region, for example in a command and control unit. Data is delivered to the visibility event encoder through the communication channels labeled "3D DATA TO ENCODER" in FIG. 49A.

Also illustrated in FIG. 49A is a set of viewcells corresponding to viewcells for which visibility event data has been encoded (for example by process 4810 of FIG. 48).

FIG. 49B is perspective diagram illustrating an autonomous engagement/attack asset receiving a visibility event data stream representing an actual environment, and using the visibility event data in an efficient 3D map-matching SLAM solution for autonomous navigation.

Objects labeled 4901, 4902, and 4950 are modeled objects, based on objects in an actual environment and modeled by 3D reconstruction using 3D data acquired by reconnaissance assets 4905 and 4906 of FIG. 49A, and encoded by the process of 4810 of FIG. 48.

Object 4908 is a depiction of an attack asset. In some embodiments, the attack asset is an autonomous vehicle such as the Northrop Grumman MQ-8 Firescout rotary wing aircraft.

In FIG. 48B attack asset object 4908 is shown receiving a visibility event data stream and using the PVS data decoded from the visibility event stream to compute an efficient SLAM solution using map-matching. This allows high-speed autonomous navigation by the attack asset. The high operating velocity makes the attack asset less vulnerable to an offensive or defensive objective target, for example, the object labeled 4950 in FIG. 49.

FIG. 49B also illustrates a set of viewcells having viewcell boundaries corresponding to visibility event packets that are part of the visibility event cache for the attack asset's decoder-client process.

Using the efficient visibility event encoding process described in FIG. 1-FIG. 17, 3D data acquired during a reconnaissance mission depicted in FIG. 49A is, in some embodiments, rapidly converted to visibility event data which is streamed with little delay to an attack asset depicted in FIG. 49B, even while the attack asset is en-route to the objective target. Efficient visibility event encoding also enables data obtained during ongoing reconnaissance acquisition to be rapidly delivered to the attack asset, providing a frequently updated representation of the tactical situation in the region of the objective target. Thus, the attack asset, from this 3D data, is able to determine is actual position in an environment and any other hazards that are posed to the attack asset, even in a GPS-denied environment.

In some embodiments, the visibility event encoding process (e.g. process 4815 of FIG. 48) as well as the decoder-server process (4815 of FIG. 48) and the decoder-client process (4840 of FIG. 48) are all conducted by processing means located on a physical engagement asset (4830 of FIG. 48).

FIG. 50 is a block diagram of a processor 5000. In some embodiments, the processor 5000 is implemented in the visibility event server and configured to perform anyone of the above methods performed by the server. In additional embodiments, the processor 5000 is implemented in the client and configured to perform anyone of the above methods performed by the client device.

In one embodiment, the processor 5000 includes a CPU 5080 which processes data and instructions stored in main memory 5040 and/or ROM 5050. The CPU 5080 also processes information stored on the disk 5010 or CD-ROM 5020. As an example, the CPU 5080 is an IBM System X from IBM of America employing at least one Xenon processor from Intel of America or an Opteron processor from AMD of America. Thus, instructions corresponding to a process in a mobile device are stored on any one of the disk 5010, CD-ROM 5020, main memory 5040 or ROM 5050.

In one embodiment, the processor 5000 also includes a network interface 5075, such as an Intel Ethernet PRO network interface card from Intel Corporation of America, a display controller 5030, such as a NVIDIA GeForce GTX graphics adaptor from NVIDIA Corporation of America for interfacing with a display 5002, such as a Hewlett Packard HP L2445w LCD monitor. The processor 5000 also includes an I/O interface 5090 for interfacing with a keyboard 5095 and pointing device 5085, such as a roller ball or mouse. According to some embodiments, the disk controller 5060 interconnects disk 5010, such as a hard disk drive or FLASH memory drive, and CD-ROM 5020 or DVD drive with bus 5070, which is an ISA, EISA, VESA, PCI, or similar for interconnecting all of the components of the server 5000. A description of the general features and functionality of the display 5002, keyboard 5095 and pointing device 5085, as well as the display controller 5030, disk controller 5060, network interface 5075 and I/O interface 5090 is also omitted for brevity as these features are well known. Of course, other processor and hardware vendors and types are known in the art such as Freescale ColdFire, i.MX and ARM processors from Freescale Corporation of America.

The example processor 5000 of FIG. 50 is a hardware platform of a computing device, such as a PC, and CPU 5080 is an Intel Pentium Processor, or any other desired processor known in the art. The computer-readable instructions stored on any one of the main memory 5040, ROM 5050, disk 5010 or CD-ROM 5020 is provided as a utility application, background daemon, or component of an operating system, or combination thereof, executing in conjunction with CPU 5080 and an operating system such as Microsoft VISTA, UNIX, Solaris, LINUX, Apple MAC-OS and other systems known to those skilled in the art.

Main memory 5040 is a random access memory (RAM), FLASH memory, EEPROM memory, or the like, while ROM 5050 is Read Only Memory, such as PROMs. Further descriptions of the main memory 5040 and the ROM 5050 are omitted for brevity as such memory is well known.

In additional embodiments, the client device is a smartphone, such as an iPhone, that is configured to perform any of the above methods performed by the client device. In further embodiments, the client device is a tablet computer, such as an iPad, that is configured to perform any one of the above methods performed by the client device. As an example, an application may be downloaded to an iPhone® or iPad®, where the application permits the iPhone or iPad to communicate with a visibility event server and perform anyone of the above methods performed by the client device.

Obviously, numerous modifications and variations of the present advancements are possible in light of the above teachings. It is therefore to be understood that within the scope of the appended claims, the advancements may be practiced otherwise than as specifically described herein.

The invention claimed is:

1. A method, conducted on a server, of sending renderable graphics information to a client device, said graphics information including at least one set of graphics information visible from a second view region and not visible from a first view region, the method comprising:
   a) determining, using processing circuitry, a likelihood that a viewpoint undergoes movement from said first view region to said second view region;
   b) sending said at least one set of graphics information upon determination that the likelihood that the viewpoint undergoes movement from said first view region to said second view region is greater than a predetermined threshold, said movement determined according to a predetermined motion path or by user input to said client device; and
   c) said at least one set of graphics information includes a set of mesh polygons or fragments of said mesh polygons visible from said second view region and not visible from said first view region, said first and second view regions having a plurality of view region vertices, said mesh polygons forming polygon meshes, and said set of mesh polygons or fragments of said mesh polygons visible from said second view region is determined by:
      c1) determining, using the processing circuitry, at least one first-order silhouette edge of said polygon meshes, said at least one first-order silhouette edge being an edge of said polygon meshes having:
         first and second polygons sharing said at least one first-order silhouette edge,
         the first polygon backfacing to each view region vertex from the plurality of view region vertices of said second view region,
         the second polygon front-facing to at least one view region vertex from the plurality of view region vertices of said second view region, and
         the first and second polygons having a backfacing orientation with respect to each other,
      c2) determining, using the processing circuitry, at least one supporting polygon between said second view region and said polygon meshes, said at least one supporting polygon being determined between said second view region and at least one vertex of said at least one first-order silhouette edge;

c3) constructing, using the processing circuitry, at least one wedge from said at least one supporting polygon, said at least one wedge extending away from said second view region beyond at least said at least one first-order silhouette edge;

c4) determining, using the processing circuitry, one or more intersections of said at least one wedge with said mesh polygons; and c5) determining, using the processing circuitry, said set of said mesh polygons or fragments of said mesh polygons visible from said second view region using said determined one or more intersections of said at least one wedge with said polygon meshes.

2. A method, conducted on a server, of sending renderable graphics information to a client device, said graphics information including at least one set of graphics information visible from a second view region and not visible from a first view region, the method comprising:

a) determining, using processing circuitry, a likelihood that a viewpoint undergoes movement from said first view region to said second view region;

b) sending said at least one set of graphics information upon determination that the likelihood that the viewpoint undergoes movement from said first view region to said second view region is greater than a predetermined threshold, said movement determined according to a predetermined motion path or by user input to said client device; and c) said at least one set of graphics information includes a set of mesh polygons or fragments of said mesh polygons visible from said second view region and not visible from said first view region, said first and second view regions having a plurality of view region vertices, said mesh polygons forming polygon meshes, and said set of mesh polygons or fragments of said mesh polygons visible from said second view region determined by:

c1) determining, using the processing circuitry, at least one first-order silhouette edge of said polygon meshes, wherein said at least one first-order silhouette edge includes:

first and second polygons sharing said at least one first-order silhouette edge, the first polygon backfacing to each view region vertex from the plurality of view region vertices, the second polygon front-facing to at least one view region vertex from the plurality of view region vertices, the first and second polygons having a backfacing orientation with respect to each other;

c2) determining, using the processing circuitry, if said at least one first-order silhouette edge and another first-order silhouette edge share a vertex forming an inside corner vertex of said polygon mesh;

c3) upon determination that said at least one first-order silhouette edge and another first-order silhouette edge share a vertex forming an inside corner vertex of said polygon mesh, determining at least one supporting polygon between said second view region and said at least one first-order silhouette edge, wherein said at least one supporting polygon is formed by said inside corner vertex and at least two view region vertices from said plurality of view region vertices, said at least two view region vertices and said inside corner vertex forming a plane, said plane having a same sidedness orientation as said first polygon sharing said at least one first-order silhouette edge, and said plane not front-facing with respect to each view region vertex from said plurality of view region vertices;

c4) constructing, using the processing circuitry, at least one wedge from said at least one supporting polygon, said at least one wedge extending away from said second view region beyond said at least one first-order silhouette edge;

c5) determining, using the processing circuitry, one or more intersections of said wedges with said mesh polygons; and c6) determining, using the processing circuitry, said set of said mesh polygons or fragments of said mesh polygons visible from said second view region using said determined one or more intersections of said at least one wedge with said polygon meshes.

3. A method, conducted on a server, of sending renderable graphics information to a client device, said graphics information including at least one set of graphics information visible from a second view region and not visible from a first view region, the method comprising:

a) determining, using processing circuitry, a likelihood that a viewpoint undergoes movement from said first view region to said second view region;

b) sending said at least one set of graphics information upon determination that the likelihood that the viewpoint undergoes movement from said first view region to said second view region is greater than a predetermined threshold, said movement determined according to a predetermined motion path or by user input to said client device; and c) said at least one set of graphics information includes a set of mesh polygons or fragments of said mesh polygons visible from said second view region and not visible from said first view region, said first and second view regions having a plurality of view region vertices, said mesh polygons forming polygon meshes, and said set of mesh polygons or fragments of said mesh polygons visible from said second view region determined by:

c1) determining, using the processing circuitry, at least one first-order silhouette edge of said polygon meshes, said at least one first-order silhouette edge includes:

first and second polygons sharing said at least one first-order silhouette edge, the first polygon backfacing to each view region vertex from the plurality of view region vertices, the second polygon front-facing to at least one view region vertex from the plurality of view region vertices, and the first and second polygons having a backfacing orientation with respect to each other, c2) determining, using the processing circuitry, at least one supporting polygon between said second view region and said at least one first-order silhouette edge;

c3) constructing, using the processing circuitry, at least one wedge from said at least one supporting polygon, said at least one wedge extending away from said second view region beyond said at least said at least one first-order silhouette edge;

c4) determining, using the processing circuitry, one or more intersections of said at least one wedge with said mesh polygons;

c5) determining, using the processing circuitry, if said at least one wedge intersects at least one second first-order silhouette edge, said intersection forming a compound silhouette vertex;

c6) upon determining that said at least one wedge intersects said at least one second first-order silhouette edge forming a compound silhouette vertex, forming at least one second wedge, wherein said at least one second wedge is formed by said compound silhouette vertex and at least two view region vertices from said plurality of view region vertices, said at least two view region vertices and said compound silhouette vertex forming a plane, said plane not front-facing with respect to each view region vertex from said plurality of view region vertices; and c7) determining, using the processing circuitry, said set of said mesh polygons or fragments of said mesh polygons visible from said second view region using said determined one or more intersections of said at least one wedge with said polygon meshes.

4. A method, conducted on a server, of sending renderable graphics information to a client device, said graphics information including at least one set of graphics information visible from a second view region and not visible from a first view region, and said graphics information including a second set of graphics information visible from said second view region and not visible from said first view region, said second set of graphics information representing advertising, the method comprising:

a) sending said first set of graphics information upon determination, using processing circuitry, that the likelihood that a viewpoint moves from said first view region to said second view region is greater than a predetermined movement threshold, said movement threshold determined according to user input to said client device or by a predetermined motion path; and b) sending said second set of graphics information upon determination, using the processing circuitry, that the likelihood that the viewpoint moves from said first view region to said second view region is greater than the predetermined movement threshold, said movement threshold determined according to the user input to said client device or by a predetermined motion path, and upon determination that an available transmission bandwidth from said server to said client device exceeds a predetermined threshold.

5. The method of claim 4, wherein said first set of graphics information and said second set of graphics information are determined by:

c) determining, using the processing circuitry, at least one first-order silhouette edge of said polygon meshes, wherein said at least one first-order silhouette edge includes:
first and second polygons sharing said at least one first-order silhouette edge,
the first polygon backfacing to each view region vertex from the plurality of view region vertices,
the second polygon front-facing to at least one view region vertex from the plurality of view region vertices, and
the first and second polygons having a backfacing orientation with respect to each other;

d) determining, using the processing circuitry, if said at least one first-order silhouette edge and another first-order silhouette edge share a vertex forming an inside corner vertex of said polygon mesh;

e) upon determination that said at least one first-order silhouette edge and another first-order silhouette edge share a vertex forming an inside corner vertex of said polygon mesh, determining at least one supporting polygon between said second view region and said at least one first-order silhouette edge, wherein said at least one supporting polygon is formed by said inside corner vertex and at least two view region vertices from said plurality of view region vertices, said at least two view region vertices and said inside corner vertex forming a plane,
said plane having a same sidedness orientation as said first polygon sharing said at least one first-order silhouette edge, and
said plane not front-facing with respect to each view region vertex from said plurality of view region vertices;

f) constructing, using the processing circuitry, at least one wedge from said at least one supporting polygon, said at least one wedge extending away from said second view region beyond said at least one first-order silhouette edge;

g) determining, using the processing circuitry, one or more intersections of said wedges with said mesh polygons; and h) determining, using the processing circuitry, said set of said mesh polygons or fragments of said mesh polygons visible from said second view region using said determined one or more intersections of said at least one wedge with said polygon meshes.

6. The method of claim 4, wherein said first set of graphics information and said second set of graphics information are determined by:

c) determining, using processing circuitry, at least one first-order silhouette edge of said polygon meshes, wherein said at least one first-order silhouette edge includes:
first and second polygons sharing said at least one first-order silhouette edge,
the first polygon backfacing to each view region vertex from the plurality of view region vertices,
the second polygon front-facing to at least one view region vertex from the plurality of view region vertices,
the first and second polygons having a backfacing orientation with respect to each other;

d) determining, using the processing circuitry, at least one supporting polygon between said second view region and at least one first-order silhouette edge;

e) constructing, using the processing circuitry, at least one wedge from said at least one supporting polygon, said at least one wedge extending away from said second view region beyond said at least one first-order silhouette edge;

f) determining, using the processing circuitry, one or more intersections of said wedges with said mesh polygons;

g) determining, using the processing circuitry, if said at least one wedge intersects at least one second first-order silhouette edge, said intersection forming a compound silhouette vertex;

h) upon determining that said at least one wedge intersects said at least one second first-order silhouette edge forming a compound silhouette vertex, forming at least one second wedge, wherein said at least one second wedge is formed by said compound silhouette vertex and at least two view region vertices from said plurality of view region vertices, said at least two view region vertices and said compound silhouette vertex forming a plane, said plane not front-facing with respect to each view region vertex from said plurality of view region vertices; and i) determining, using the processing circuitry, said set of said mesh polygons or fragments of said mesh polygons visible from said second view region using said determined one or more intersections of said at least one wedge with said polygon meshes.

7. The method of claim 5, wherein said graphics information is targeting information, which includes information about age or gender of said user of said client device.

8. The method according to claim 6, wherein said graphics information is targeting information, which includes information indicating previous responses to advertising made by said user of said client device.

9. The method of claim 4, wherein said graphics information comprises graphics information selectable by a viewer, and further comprising:
c) receiving information from said client device, indicating a selection of said second set of graphics information representing said advertising; and
d) sending, upon receiving information from said client device indicating a selection of said second set of graphics information representing said advertising, a third set of graphics information, said second and third sets of graphics information representing related products or services associated with said advertising.

10. The method of claim 4, wherein said graphics information comprises graphics information selectable by a viewer, and further comprising:
c) receiving information from said client device, indicating a selection of said second set of graphics information representing said advertising; and
d) sending, upon receiving information from said client device indicating a selection of said second set graphics information representing said advertising, a third set of graphics information, said third set of graphics information representing an object that can be used by a client user in a modeled environment.

11. The method of claim 10, further comprising:
e) charging the user in accordance with said selection.

12. A method, conducted on a client device, of receiving renderable graphics information from a server, said graphics information including at least one set of graphics information visible from a second view region and not visible from a first view region, the method comprising:
a) determining, using processing circuitry, a likelihood that a user viewpoint moves from said first view region to said second view region, said user viewpoint movement determined according to a predetermined motion path or by user input to a client device;
b) sending data to the server, said data representing a request for said at least one set of graphics information, upon determination that a likelihood that the viewpoint undergoes movement from said first view region to said second view region is greater than a predetermined movement threshold;
c) receiving at least one set of graphics information from the server;
d) said at least one set of graphics information includes a set of mesh polygons or fragments of said mesh polygons visible from said second view region and not visible from said first view region, said first and second view regions having a plurality of view region vertices, said mesh polygons forming polygon meshes, and said set of mesh polygons or fragments of said mesh polygons visible from said second view region determined by:
d1) determining, using the processing circuitry, at least one first-order silhouette edge of said polygon meshes, said at least one first-order silhouette edge being an edge of said polygon meshes having:
first and second polygons sharing said at least one first-order silhouette edge,
the first polygon backfacing to each view region vertex from the plurality of view region vertices of said second view region,
the second polygon front-facing to at least one view region vertex from the plurality of view region vertices of said second view region, and
the first and second polygons having a backfacing orientation with respect to each other,
d2) determining, using the processing circuitry, at least one supporting polygon between said second view region and said polygon meshes, said at least one supporting polygon being determined between said second view region and at least one vertex of said at least one first-order silhouette edge;
d3) constructing, using the processing circuitry, at least one wedge from said at least one supporting polygon, said at least one wedge extending away from said second view region beyond said at least one first-order silhouette edge;
d4) determining, using the processing circuitry, one or more intersections of said at least one wedge with said mesh polygons; and
d5) determining, using the processing circuitry, said set of said mesh polygons or fragments of said mesh polygons visible from said second view region using said determined one or more intersections of said at least one wedge with said polygon meshes.

13. A method, conducted on a client device, of receiving renderable graphics information from a server, said graphics information including at least one set of graphics information visible from a second view region and not visible from a first view region, the method comprising:
a) determining, using processing circuitry, a likelihood that a viewpoint undergoes movement from said first view region to said second view region, said movement determined according to a predetermined motion path or by user input to said client device;
b) sending data to the server, said data representing a request for at least one set of graphics information, upon determination that the likelihood that the viewpoint undergoes movement from said first view region to said second view region is greater than a predetermined threshold;
c) receiving said at least one set of graphics information from the server;
d) said at least one set of graphics information includes a set of mesh polygons or fragments of said mesh polygons visible from said second view region and not visible from said first view region, said first and second view regions having a plurality of view region vertices, said mesh polygons forming polygon meshes, said first set of graphics information determined from said mesh polygons or fragments of said mesh polygons visible from said second view region, and said mesh polygons or fragments of said mesh polygons visible from said second view region determined by:

d1) determining, using the processing circuitry, at least one first-order silhouette edge of said polygon meshes, wherein said at least one first-order silhouette edge includes:
   first and second polygons sharing said at least one first-order silhouette edge,
   the first polygon backfacing to each view region vertex from the plurality of view region vertices,
   the second polygon front-facing to at least one view region vertex from the plurality of view region vertices, and
   the first and second polygons having a backfacing orientation with respect to each other;
d2) determining, using the processing circuitry, at least one supporting polygon between said second view region and said polygon meshes, said at least one supporting polygon being determined between said second view region and at least one vertex of said at least one first-order silhouette edge;
d3) constructing, using the processing circuitry, at least one wedge from said at least one supporting polygon, said at least one wedge extending away from said second view region beyond at least said one first-order silhouette edge;
d4) determining, using the processing circuitry, one or more intersections of said at least one wedge with said mesh polygons;
d5) determining, using the processing circuitry, if said at least one wedge intersects at least one second silhouette edge, said intersection forming a compound silhouette vertex;
d6) upon determining that said at least one wedge intersects said at least one second first-order silhouette edge forming a compound silhouette vertex, forming at least one second wedge, wherein said at least one second wedge is formed by said compound silhouette vertex and at least two view region vertices from said plurality of view region vertices, said at least two view region vertices and said compound silhouette vertex forming a plane, said plane not front-facing with respect to each view region vertex from said plurality of view region vertices; and
d7) determining, using the processing circuitry, said set of said mesh polygons or fragments of said mesh polygons visible from said second view region using said determined one or more intersections of said at least one wedge with said polygon meshes.

14. A method, conducted on a client device, of receiving renderable graphics information from a server, said graphics information including at least one set of graphics information visible from a second view region and not visible from a first view region, and said at least one set of graphics representing advertising, the method comprising:
   a) determining, using processing circuitry, a likelihood that a viewpoint undergoes movement from said first view region to said second view region, said movement determined according to a predetermined motion path or by user input to said client device;
   b) sending data to the server, said data representing a request for at least one set of graphics information, upon determination that the likelihood that the viewpoint undergoes movement from said first view region to said second view region is greater than a predetermined threshold;
   c) receiving said at least one set of graphics information from the server;
   d) said at least one set of graphics information includes a set of mesh polygons or fragments of said mesh polygons visible from said second view region and not visible from said first view region, said first and second view regions having a plurality of view region vertices, said mesh polygons forming polygon meshes, and said mesh polygons or fragments of said mesh polygons visible from said second view region determined by steps of:
      d1) determining, using the processing circuitry, at least one first-order silhouette edge of said polygon meshes, wherein said at least one first-order silhouette edge includes:
         first and second polygons sharing said at least one first-order silhouette edge,
         the first polygon backfacing to each view region vertex from the plurality of view region vertices,
         the second polygon front-facing to at least one view region vertex from the plurality of view region vertices, and
         the first and second polygons having a backfacing orientation with respect to each other;
      d2) determining, using the processing circuitry, at least one supporting polygon between said second view region and at least one first-order silhouette edge;
      d3) constructing, using the processing circuitry, at least one wedge from said at least one supporting polygon, said at least one wedge extending away from said second view region beyond at least one first-order silhouette edge;
      d4) determining, using the processing circuitry, one or more intersections of said wedges with said mesh polygons;
      d5) determining, using the processing circuitry, if said at least one wedge intersects at least one second silhouette edge, said intersection forming a compound silhouette vertex;
      d6) upon determining that said at least one wedge intersects said at least one second first-order silhouette edge forming a compound silhouette vertex, forming at least one second wedge, wherein said at least one second wedge is formed by said compound silhouette vertex and at least two view region vertices from said plurality of view region vertices, said at least two view region vertices and said compound silhouette vertex forming a plane, said plane not front-facing with respect to each view region vertex from said plurality of view region vertices; and
      d7) determining, using the processing circuitry, said set of said mesh polygons or fragments of said mesh polygons visible from said second view region using said determined one or more intersections of said at least one wedge with said polygon meshes;
   e) displaying the at least one set of graphics information with a visual indication that the set of graphics information is selectable with only a single button press; and
   f) transmitting a selection result of the displayed second set of graphics information to the server.

15. The method according to claim 12, wherein step c) of receiving said at least one set of graphics information from the server is performed upon determination that said user input to the client device is detected.

16. The method according to claim 12, wherein step b of receiving said at least one set of graphics information from the server is performed upon determination that said user input to the client device is not detected for a predetermined period of time.

17. A method, conducted on a client device, of receiving renderable graphics information from a server, said graphics information including a first set of graphics information visible from a second view region and not visible from a first view region, said first set of graphics information representing entertainment content, and said graphics information including a second set of graphics information visible from said second view region and not visible from said first view region, said second set of graphics information including graphics information representing advertising, the method comprising:

a) receiving said first set of graphics information upon determination, using processing circuitry, that a likelihood that a viewpoint moves from said first view region to said second view region is greater than a predetermined movement threshold, said movement determined according to user input to said client device or by a predetermined motion path; and b) receiving said second set of graphics information upon determination, using the processing circuitry, that the likelihood that the viewpoint moves from said first view region to said second view region, said movement being determined according to the user input to said client device or by a predetermined motion path, and upon determination that user of said client device has selected to receive said second set of graphics information.

18. The method of claim 17, wherein said first of graphics information and said second set of graphics information are determined by:

a) determining, using processing circuitry, at least one first-order silhouette edge of said polygon meshes, wherein said at least one first-order silhouette edge includes:

first and second polygons sharing said at least one first-order silhouette edge, the first polygon backfacing to each view region vertex from the plurality of view region vertices, the second polygon front-facing to at least one view region vertex from the plurality of view region vertices, and the first and second polygons having a backfacing orientation with respect to each other;

b) determining, using the processing circuitry, at least one supporting polygon between said second view region and at least one first-order silhouette edge;

c) constructing, using the processing circuitry, at least one wedge from said at least one supporting polygon, said at least one wedge extending away from said second view region beyond said at least one first-order silhouette edge;

d) determining, using the processing circuitry, one or more intersections of said wedges with said mesh polygons;

e) determining, using the processing circuitry, if said at least one wedge intersects at least one second first-order silhouette edge, said intersection forming a compound silhouette vertex;

f) upon determining that said at least one wedge intersects said at least one second first-order silhouette edge forming a compound silhouette vertex, forming at least one second wedge, wherein said at least one second wedge is formed by said compound silhouette vertex and at least two view region vertices from said plurality of view region vertices, said at least two view region vertices and said compound silhouette vertex forming a plane, said plane not front-facing with respect to each view region vertex from said plurality of view region vertices; and g) determining, using the processing circuitry, said set of said mesh polygons or fragments of said mesh polygons visible from said second view region using said determined one or more intersections of said at least one wedge with said polygon meshes.

* * * * *